United States Patent [19]
Ohtake et al.

[11] Patent Number: 5,867,325
[45] Date of Patent: Feb. 2, 1999

[54] ZOOM LENS RANGING TO WIDE ANGLES

[75] Inventors: Motoyuki Ohtake, Kanagawa; Akihiko Obama, Tokyo, both of Japan

[73] Assignee: Nikon Corporation, Tokyo, Japan

[21] Appl. No.: 577,467

[22] Filed: Dec. 22, 1995

[30]  Foreign Application Priority Data

| | | | |
|---|---|---|---|
| Jan. 5, 1995 | [JP] | Japan | 7-015534 |
| Jan. 5, 1995 | [JP] | Japan | 7-015535 |
| Feb. 10, 1995 | [JP] | Japan | 7-046335 |
| Feb. 10, 1995 | [JP] | Japan | 7-046336 |

[51] Int. Cl.$^6$ ............... G02B 15/14; G02B 3/02
[52] U.S. Cl. .............. 359/684; 359/689; 359/686; 359/715
[58] Field of Search .................. 359/689, 684, 359/686, 715

[56]  References Cited

U.S. PATENT DOCUMENTS

| | | | |
|---|---|---|---|
| 4,586,792 | 5/1986 | Tanaka et al. | 359/684 |
| 5,175,648 | 12/1992 | Mori | 359/689 |
| 5,270,866 | 12/1993 | Oizumi | 359/689 |
| 5,276,553 | 1/1994 | Tatsuno | 359/686 |
| 5,289,317 | 2/1994 | Ikemori | 359/689 |
| 5,483,380 | 1/1996 | Nozawa | 359/686 |
| 5,493,447 | 2/1996 | Ohtake . | |
| 5,499,141 | 3/1996 | Ohtake . | |
| 5,523,888 | 6/1996 | Nishio | 359/686 |
| 5,539,582 | 7/1996 | Kohno | 359/689 |
| 5,666,230 | 9/1997 | Tatsuno | 359/686 |

*Primary Examiner*—Georgia Epps
*Assistant Examiner*—Evelyn A. Lester
*Attorney, Agent, or Firm*—Oliff & Berridge, PLC

[57]  ABSTRACT

A small wide-angle zoom lens having good performance, in order from the object side, comprises at least a first lens group G1 having a negative refractive power, a second lens group G2 having a positive refractive power, and a third lens group G3 having a negative refractive power. During zooming from a maximum wide-angle state to a maximum telephoto state, each lens group can move toward the object side so that the distance between the first lens group G1 and the second lens group G2 decreases and the distance between the second lens group G2 and the third lens group G3 decreases. The second lens group can comprise first, second and optional third lens group units. The zoom lens is configured to satisfy various conditions to achieve advantageous results.

29 Claims, 105 Drawing Sheets

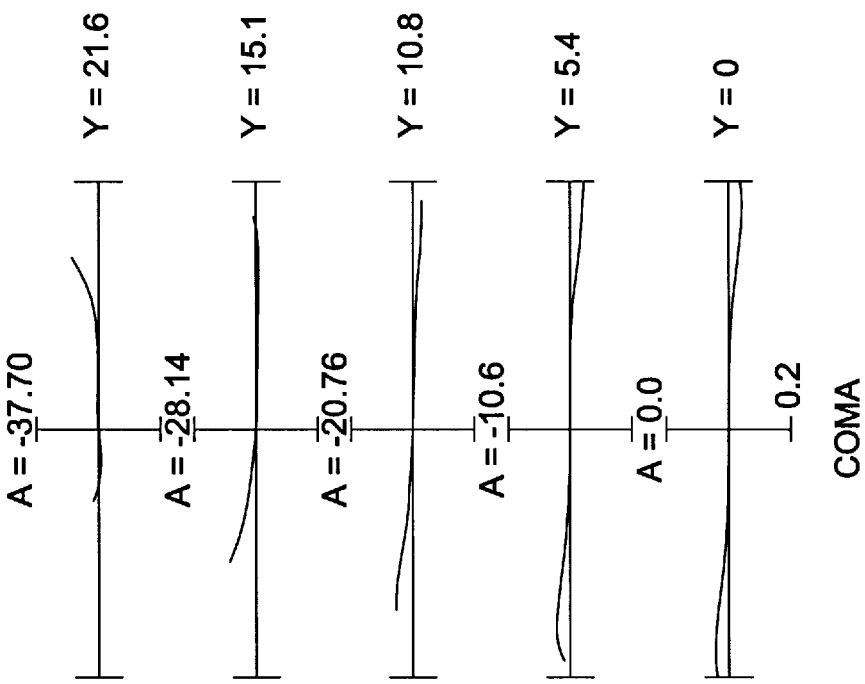
FIG. 3(d)
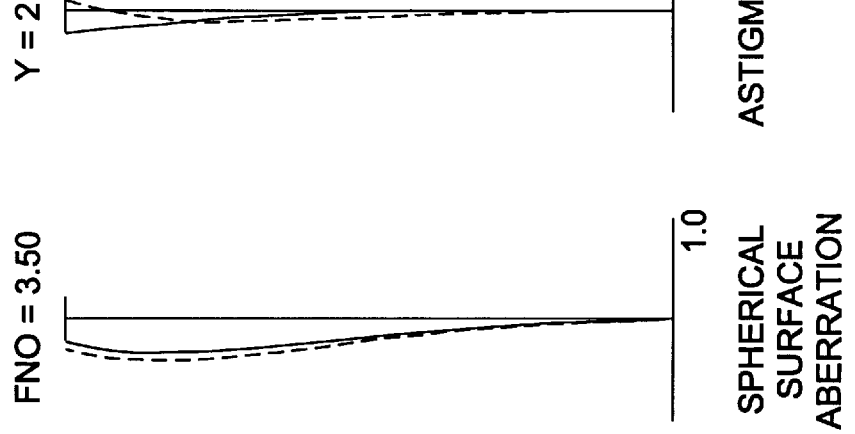
FIG. 3(c)
FIG. 3(b)
FIG. 3(a)

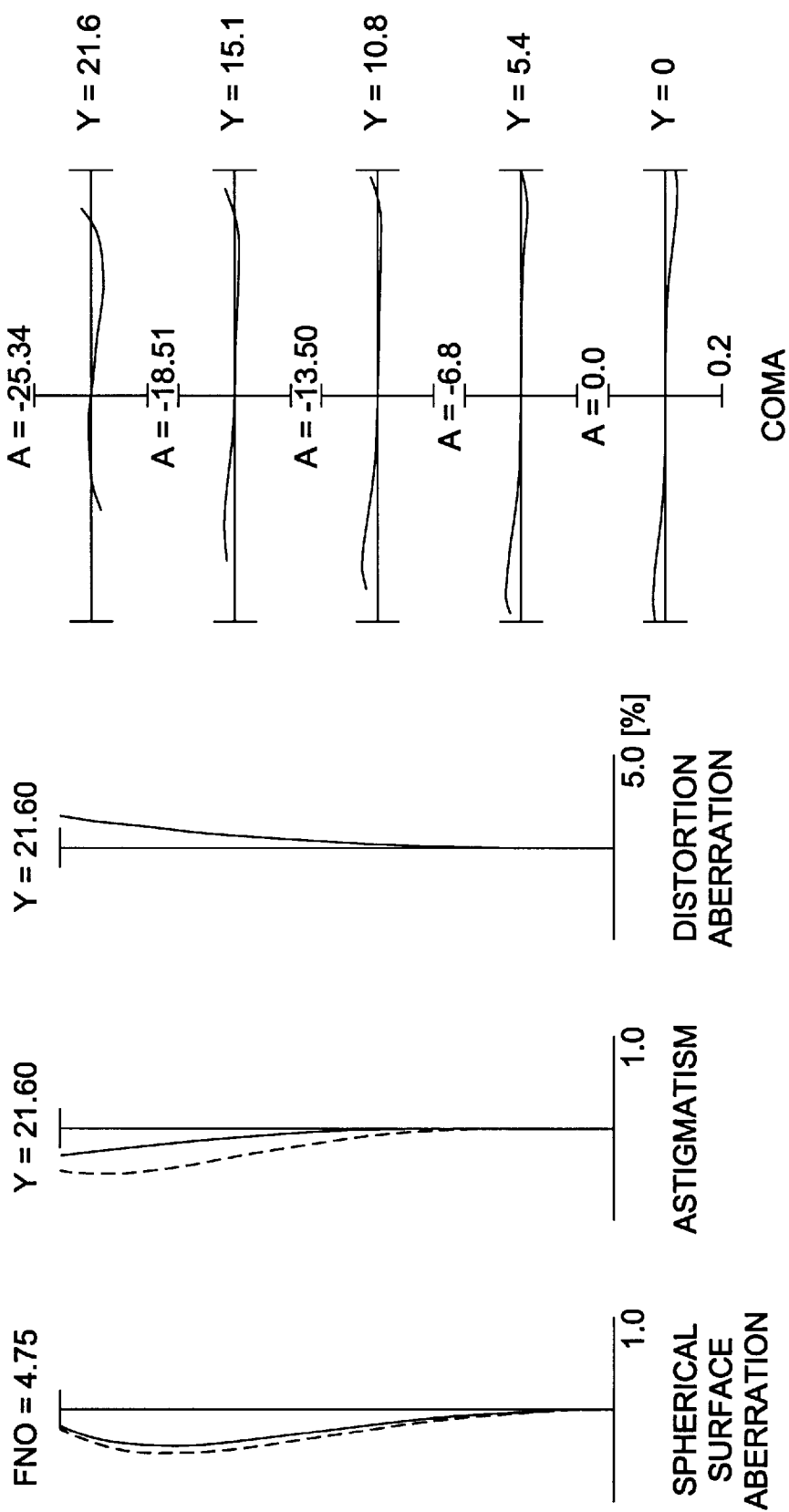

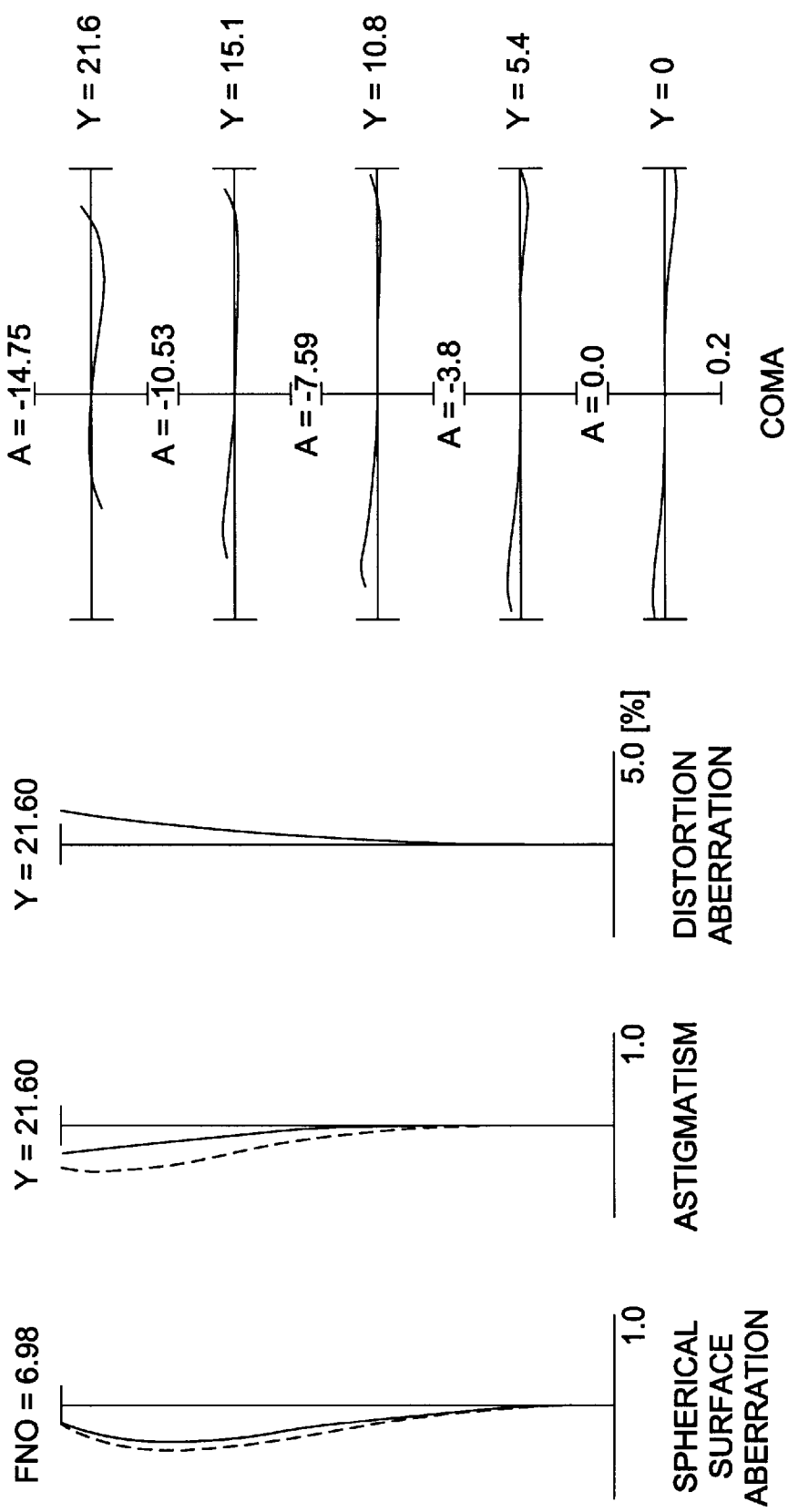

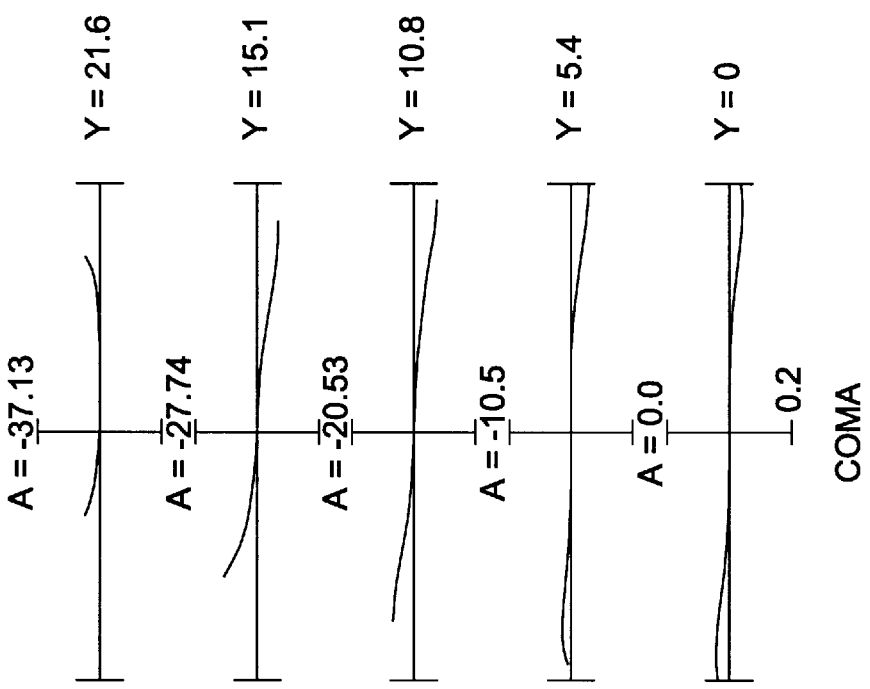
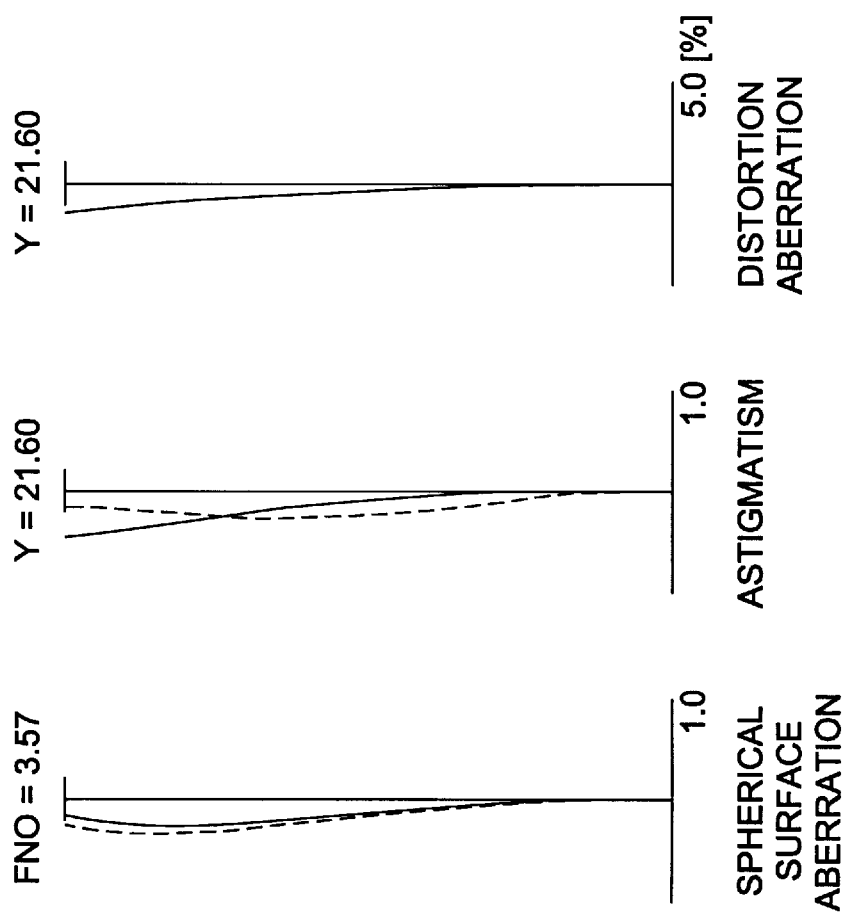
FIG. 7(a)   FIG. 7(b)   FIG. 7(c)   FIG. 7(d)

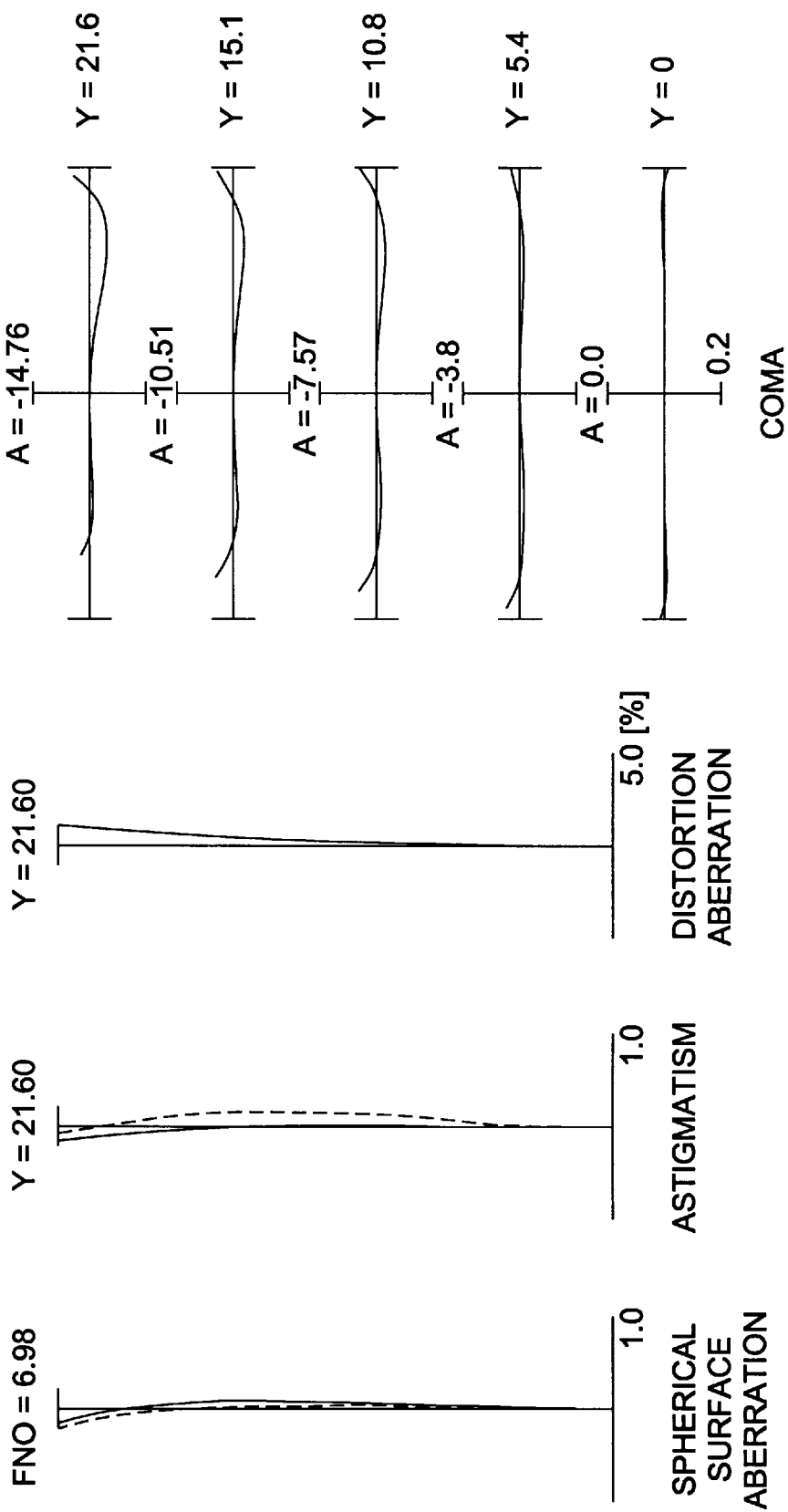

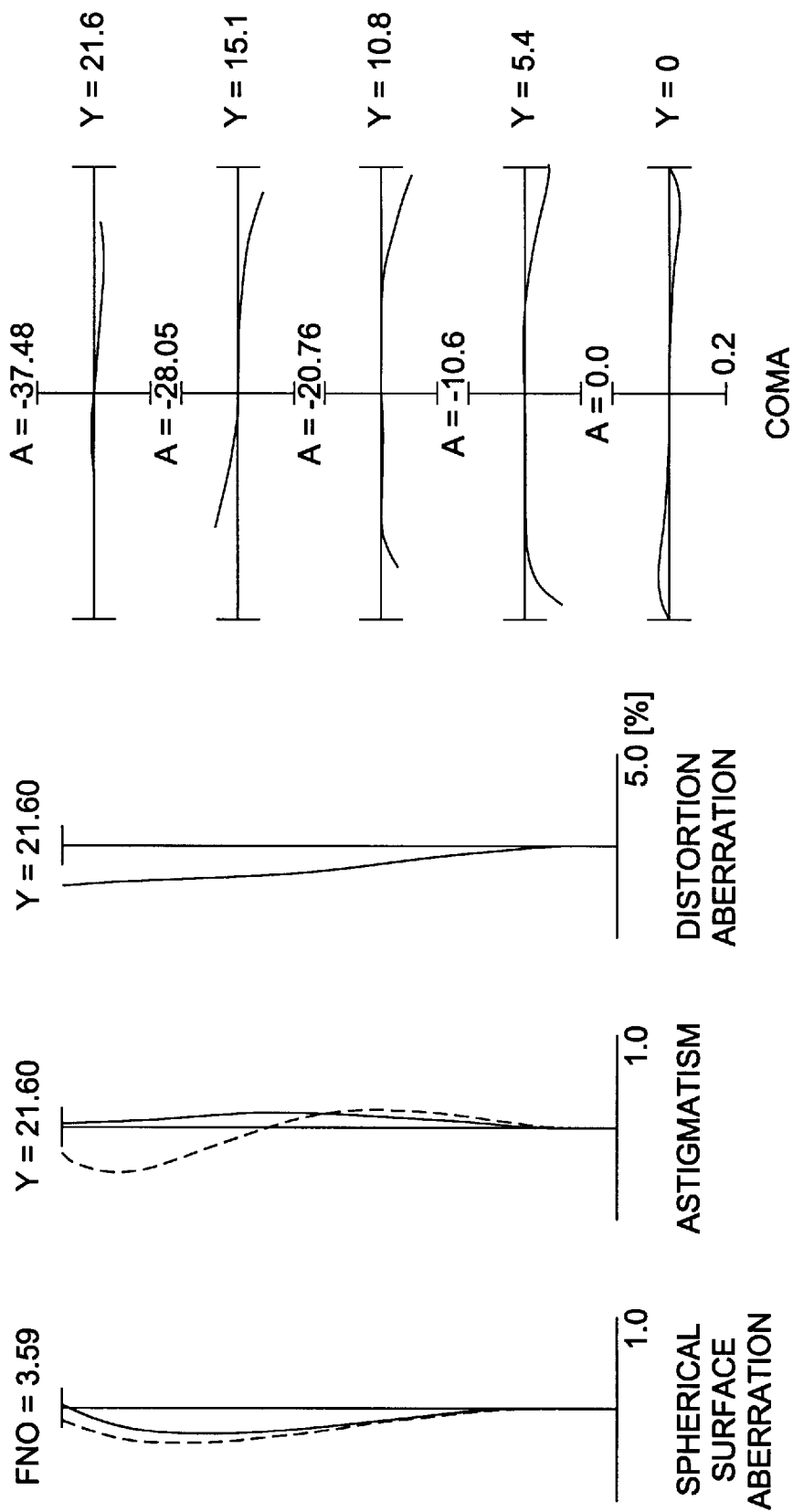

FIG. 13(a) SPHERICAL SURFACE ABERRATION — FNO = 6.99, 1.0

FIG. 13(b) ASTIGMATISM — Y = 21.60, 1.0

FIG. 13(c) DISTORTION ABERRATION — Y = 21.60, 5.0 [%]

FIG. 13(d) COMA — 0.2
- A = 0.0, Y = 0
- A = -3.8, Y = 5.4
- A = -7.61, Y = 10.8
- A = -10.56, Y = 15.1
- A = -14.86, Y = 21.6

FIG. 15(a) SPHERICAL SURFACE ABERRATION

FIG. 15(b) ASTIGMATISM

FIG. 15(c) DISTORTION ABERRATION

FIG. 15(d) COMA

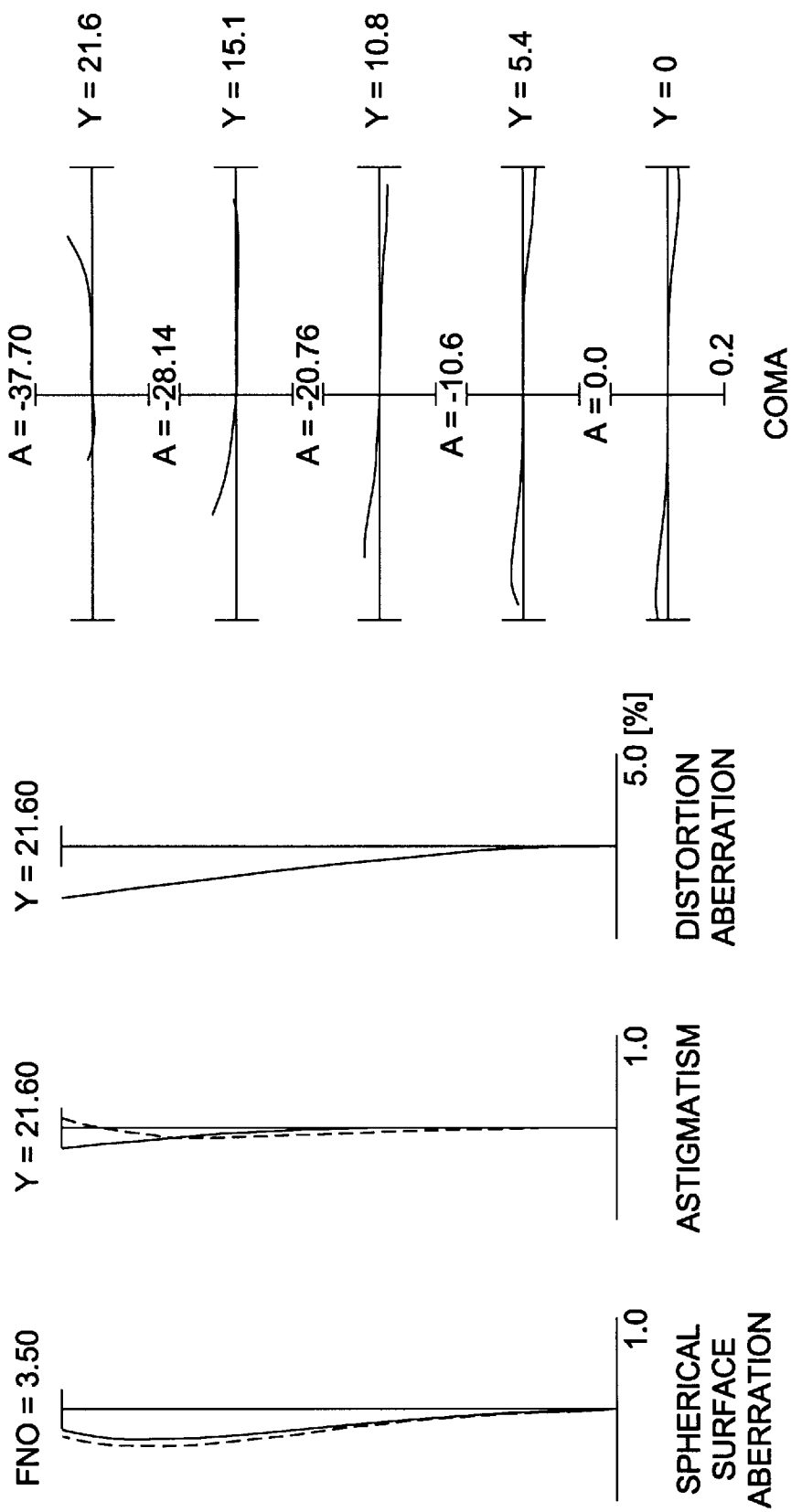

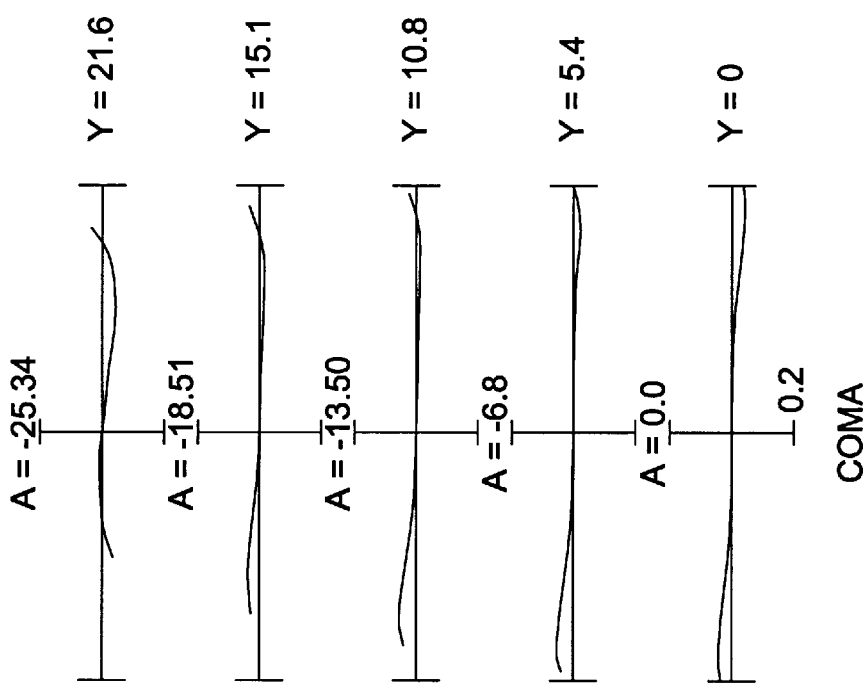
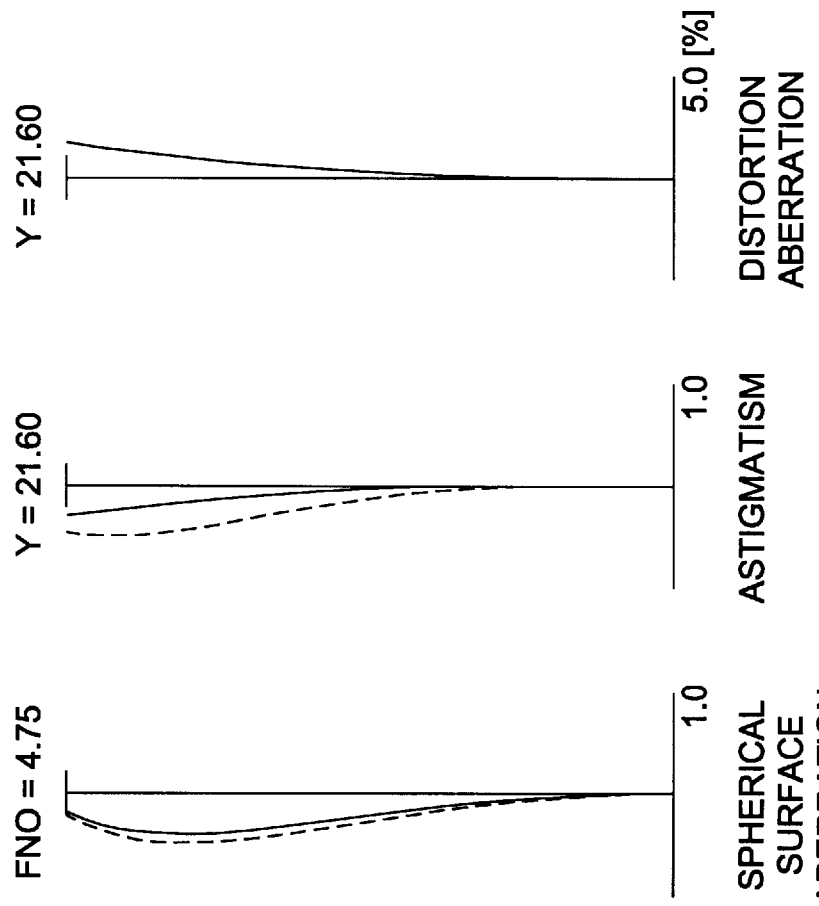
FIG. 22(a) SPHERICAL SURFACE ABERRATION
FIG. 22(b) ASTIGMATISM
FIG. 22(c) DISTORTION ABERRATION
FIG. 22(d) COMA

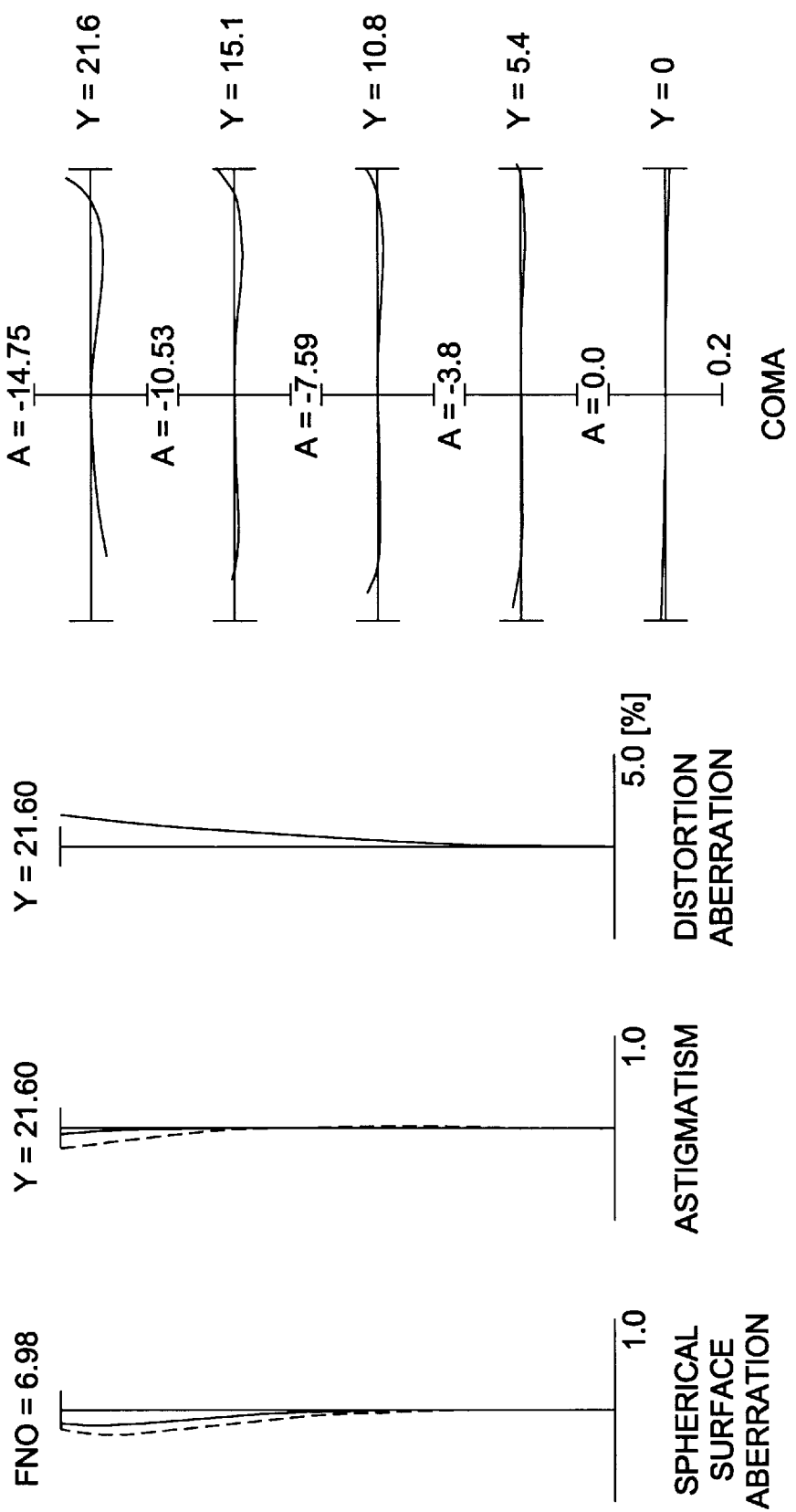

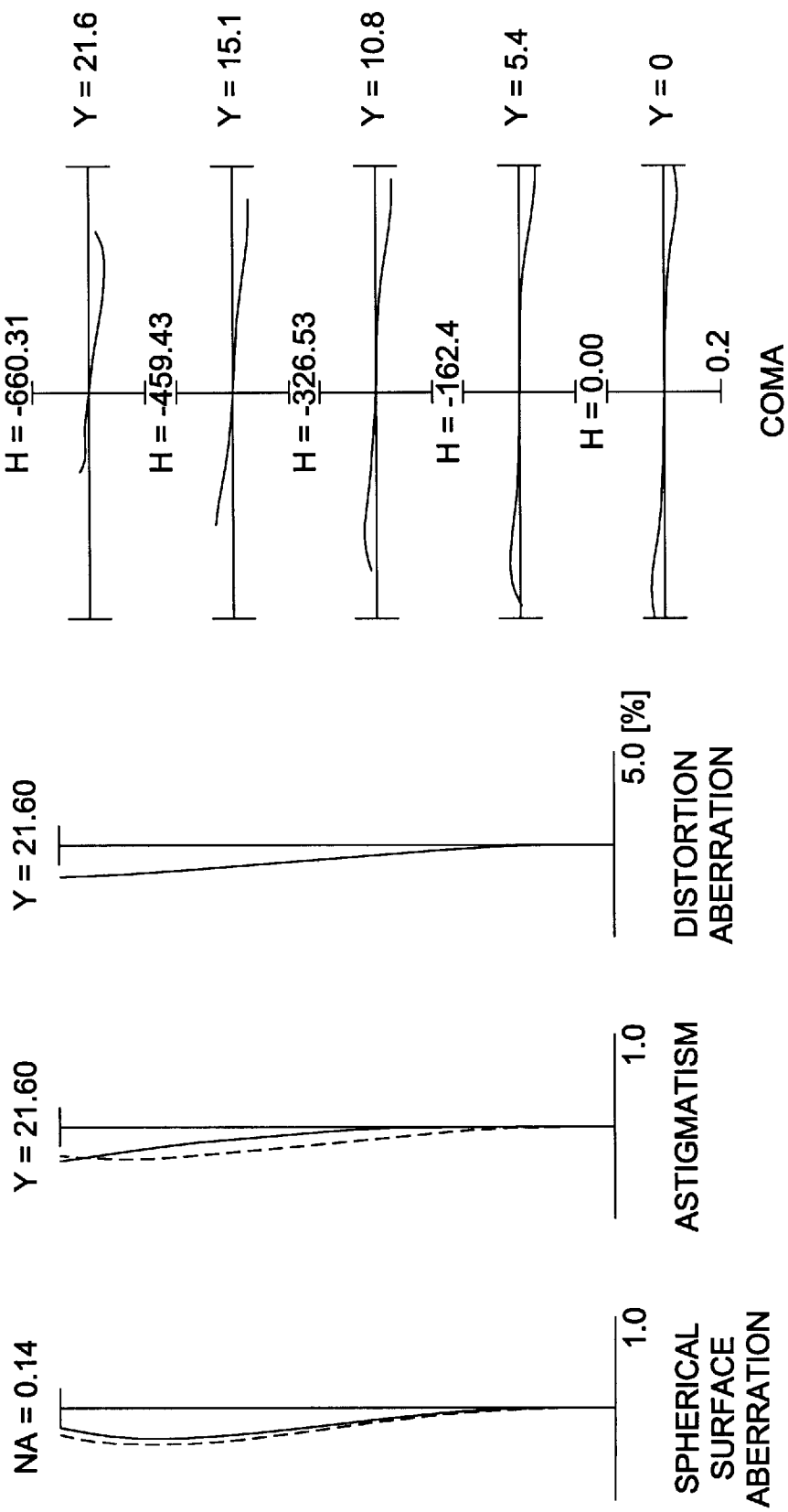

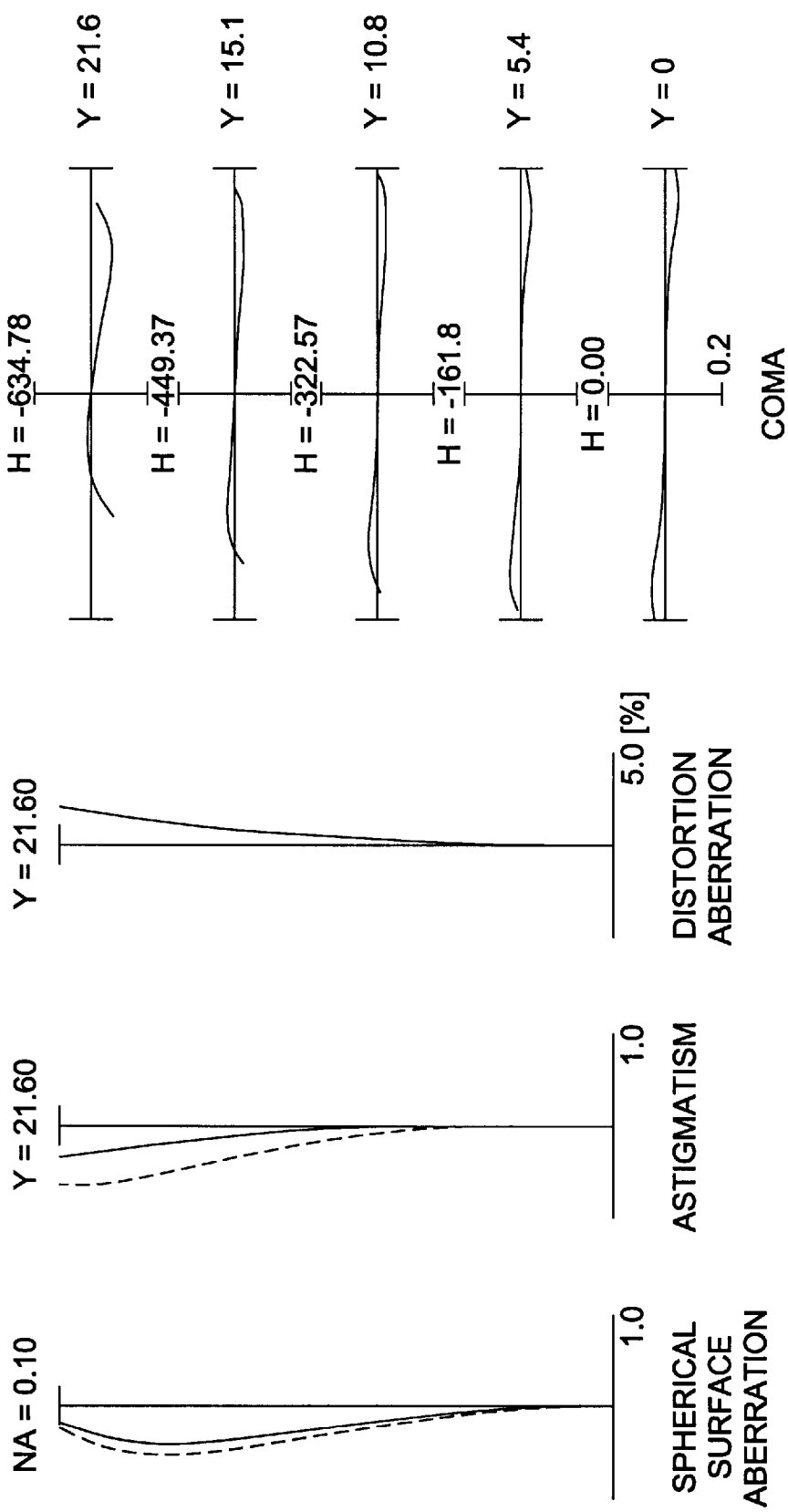

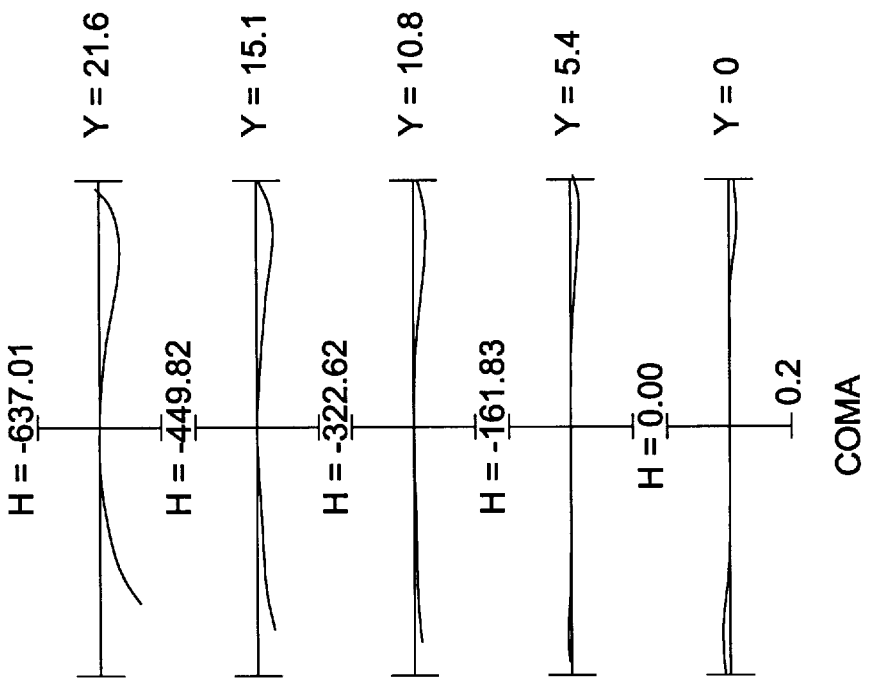
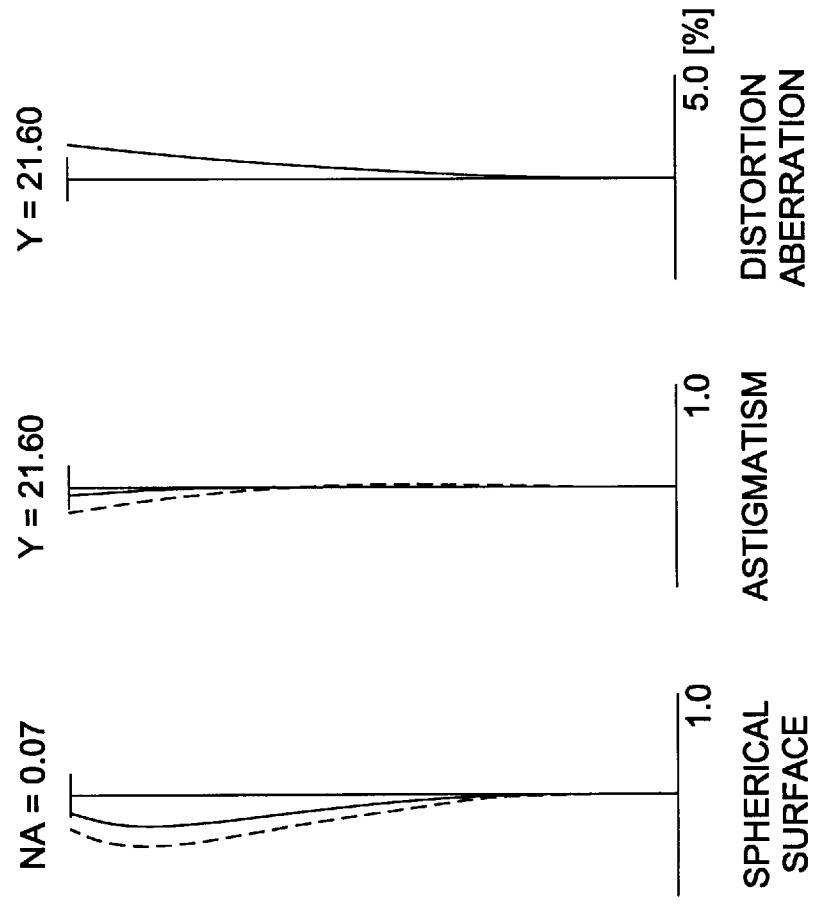
FIG. 26(a)  FIG. 26(b)  FIG. 26(c)  FIG. 26(d)

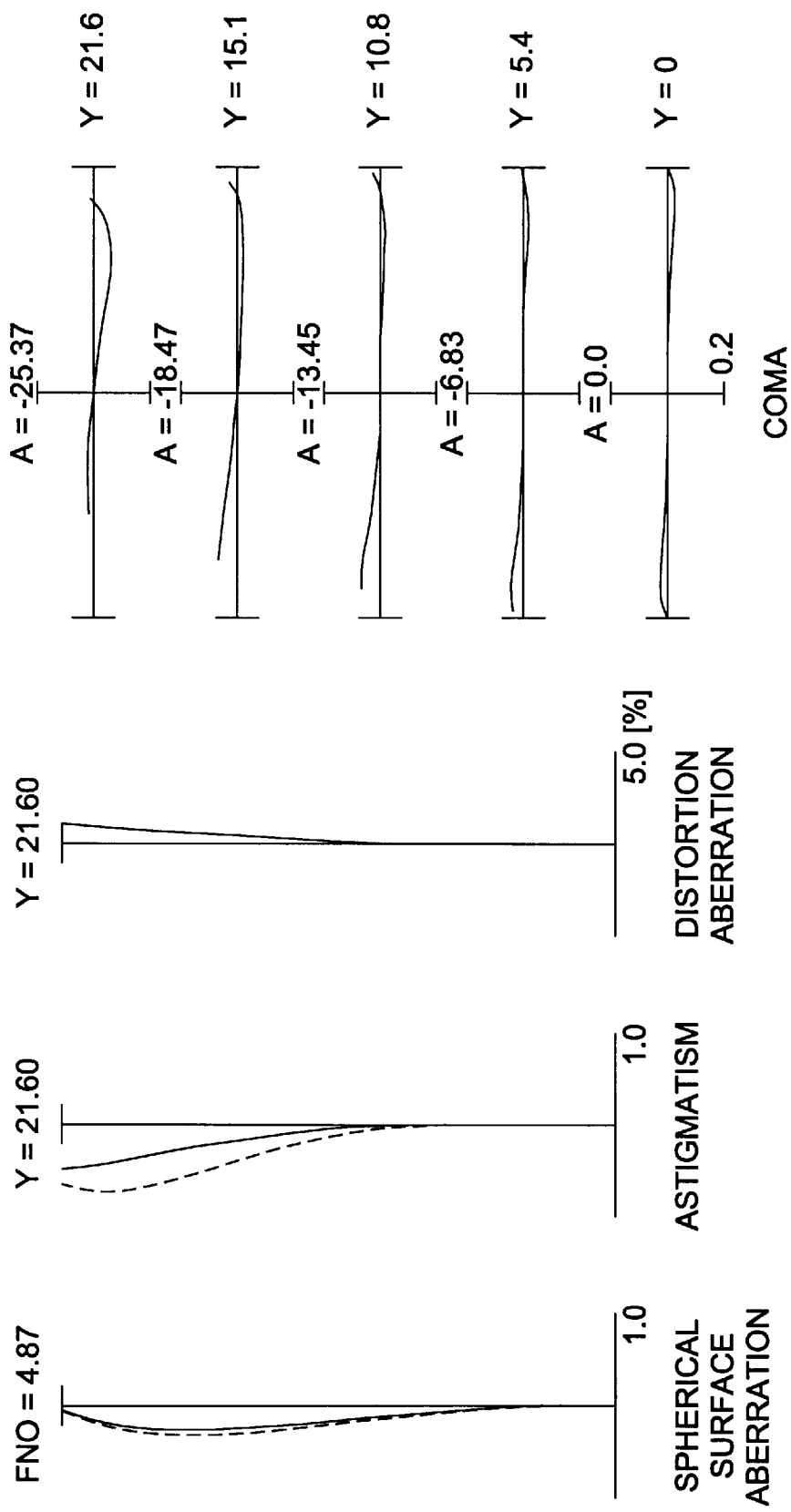

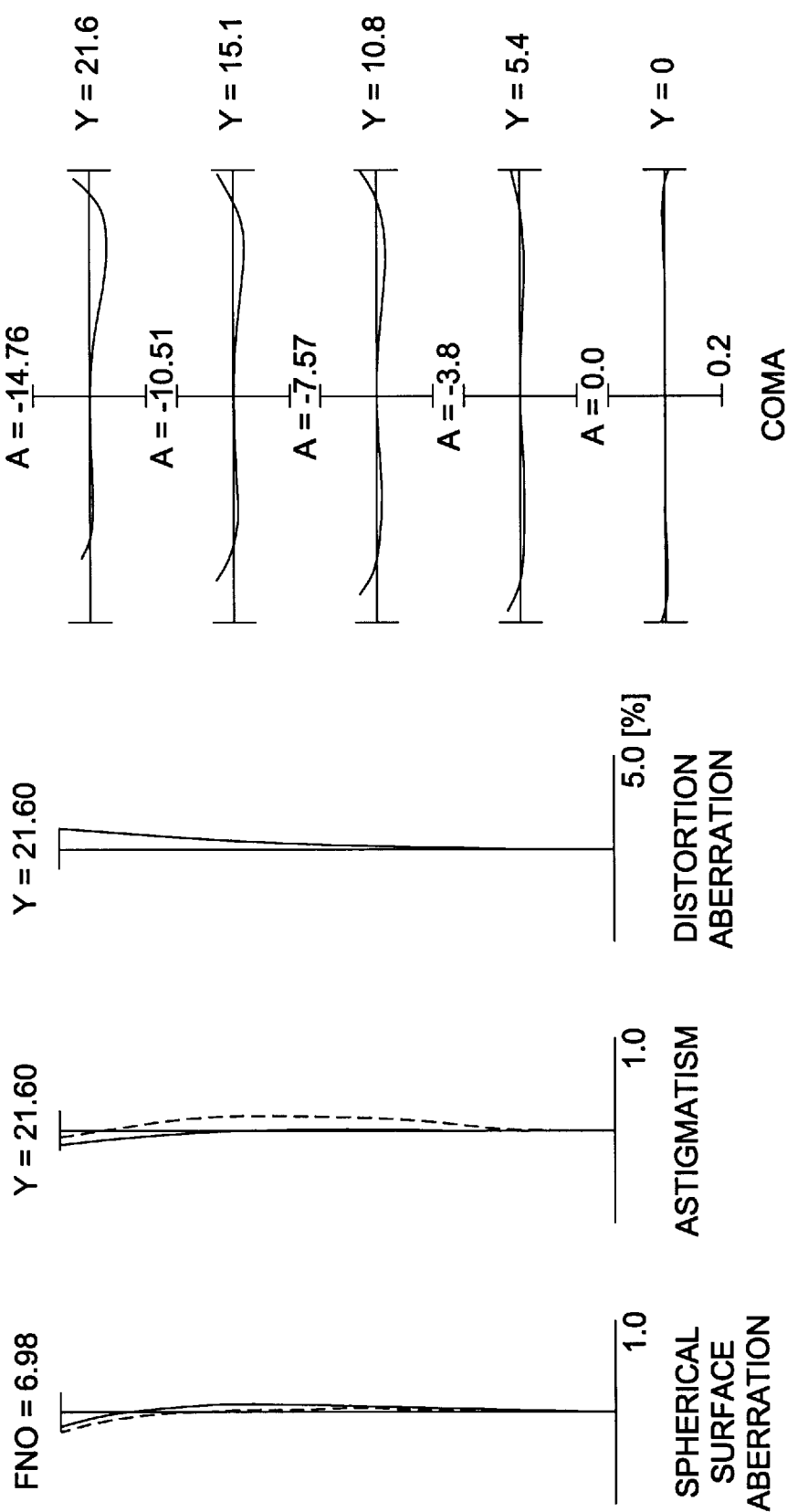

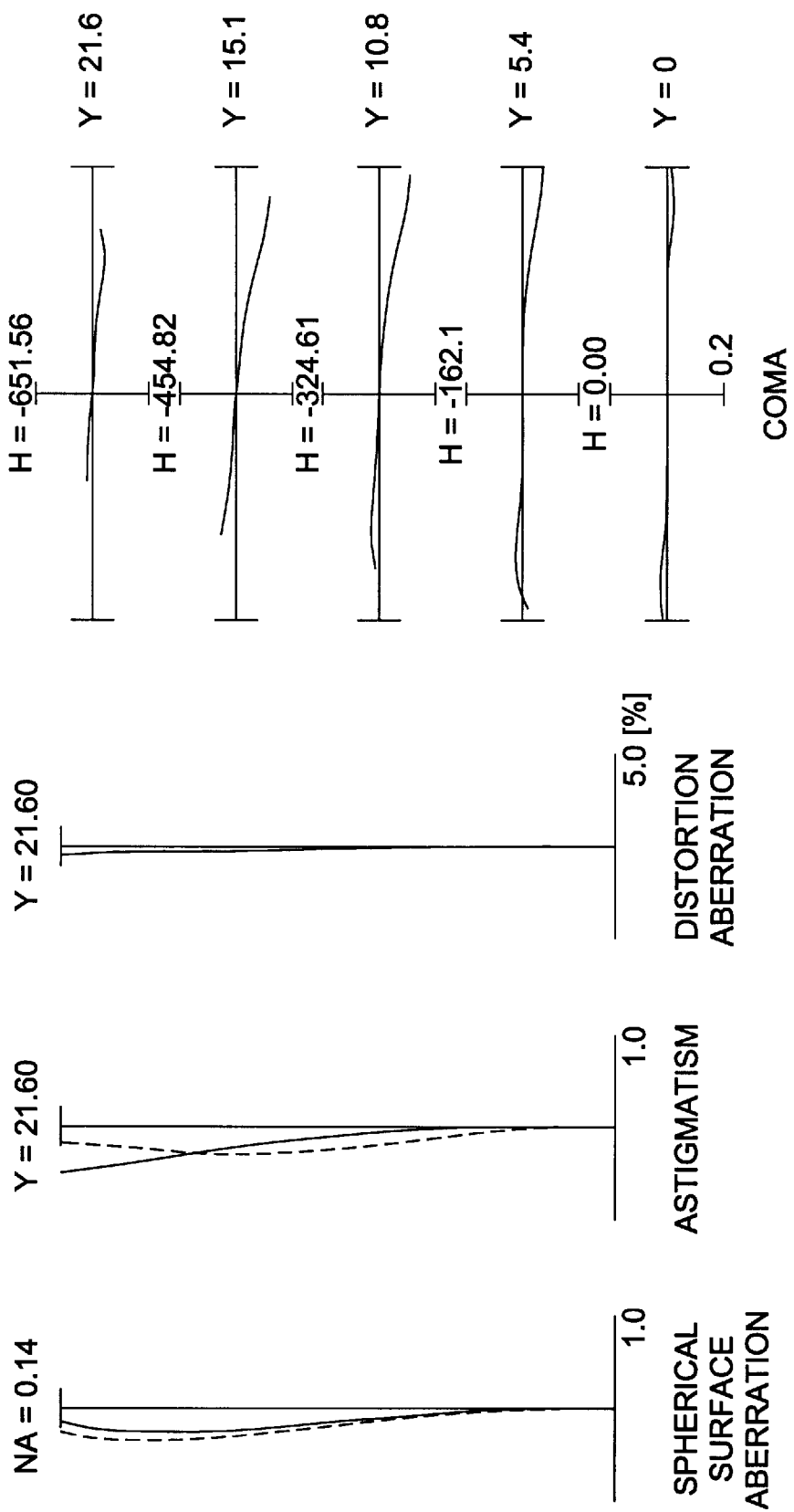

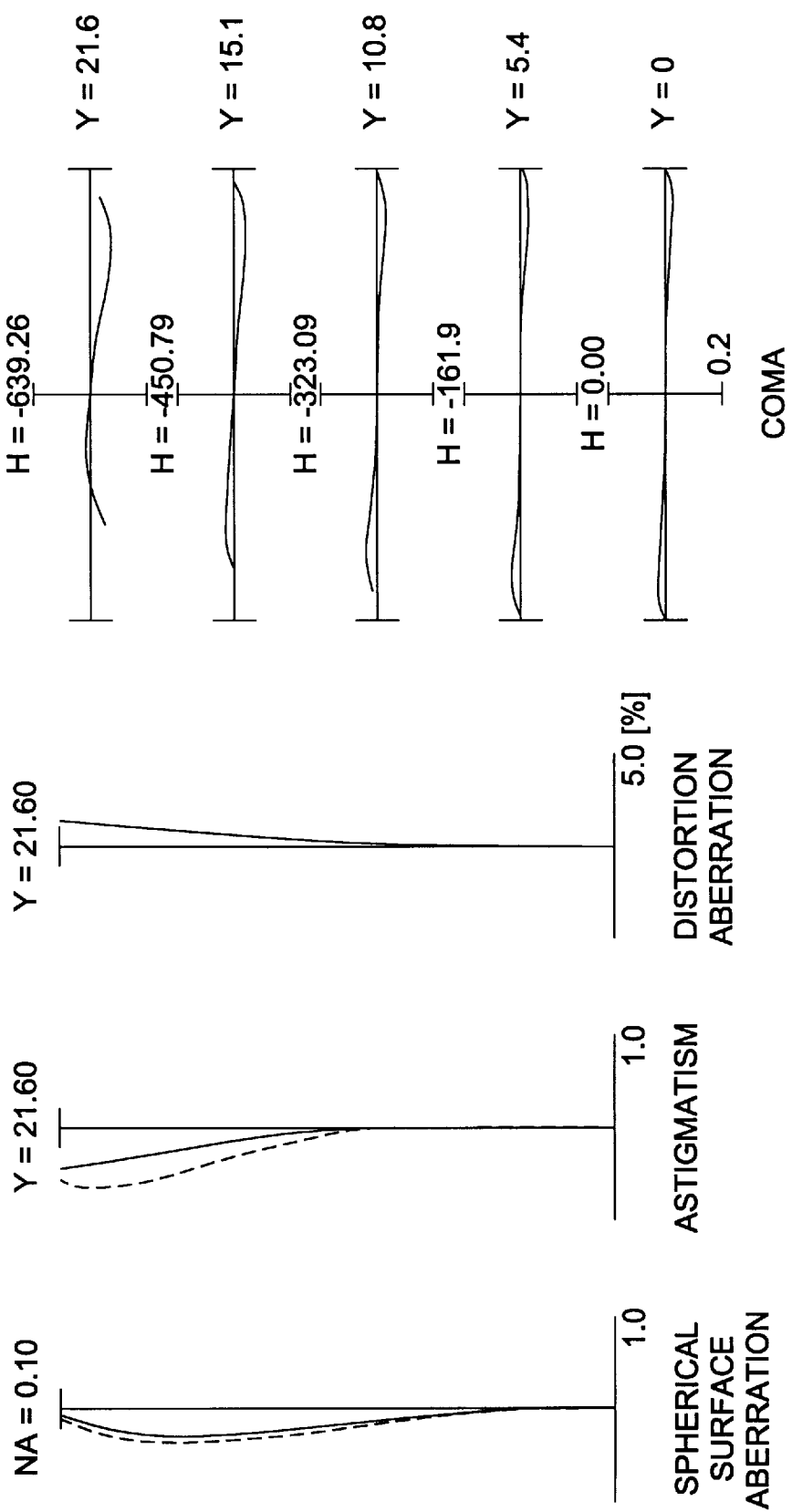

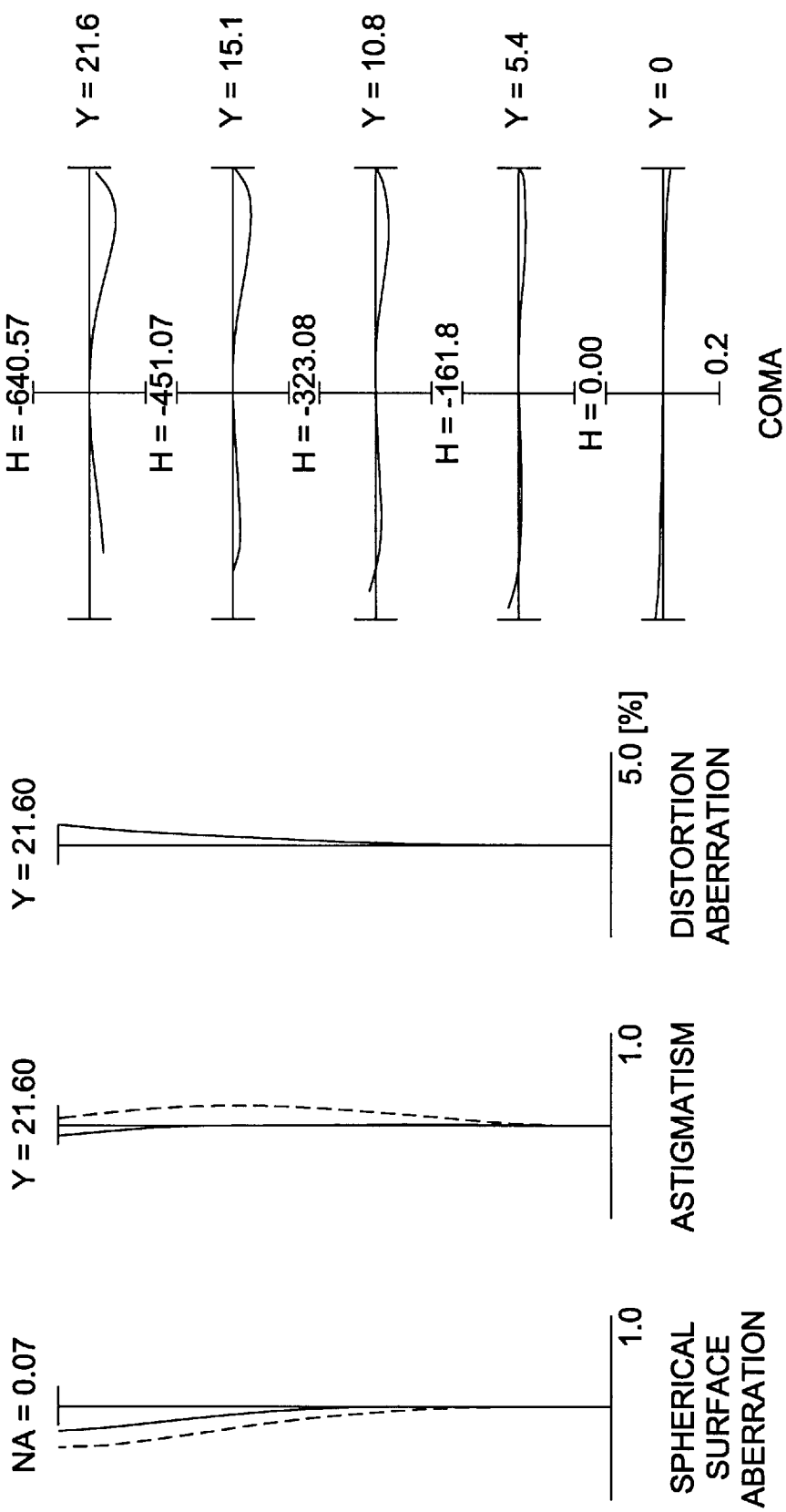

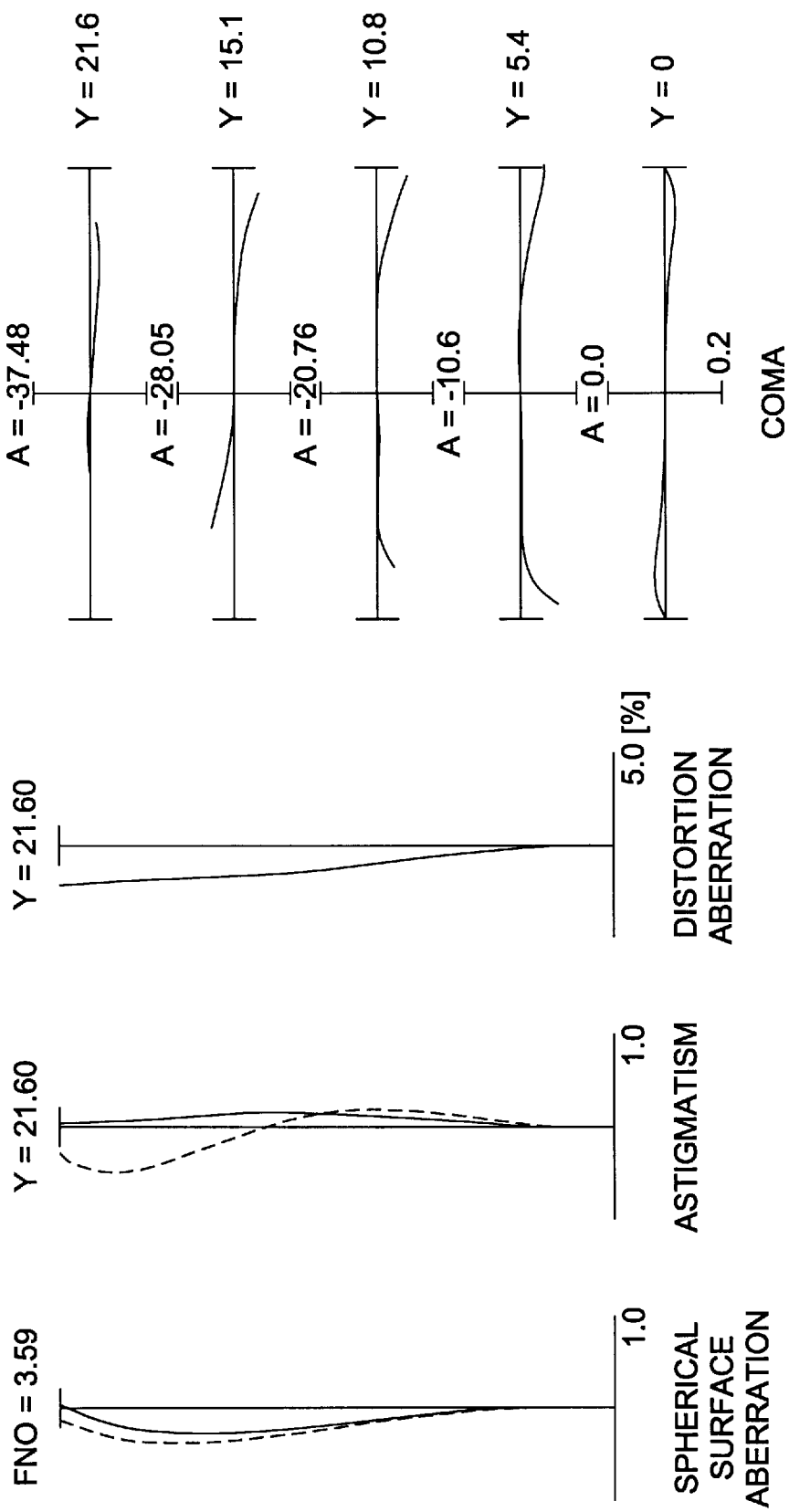

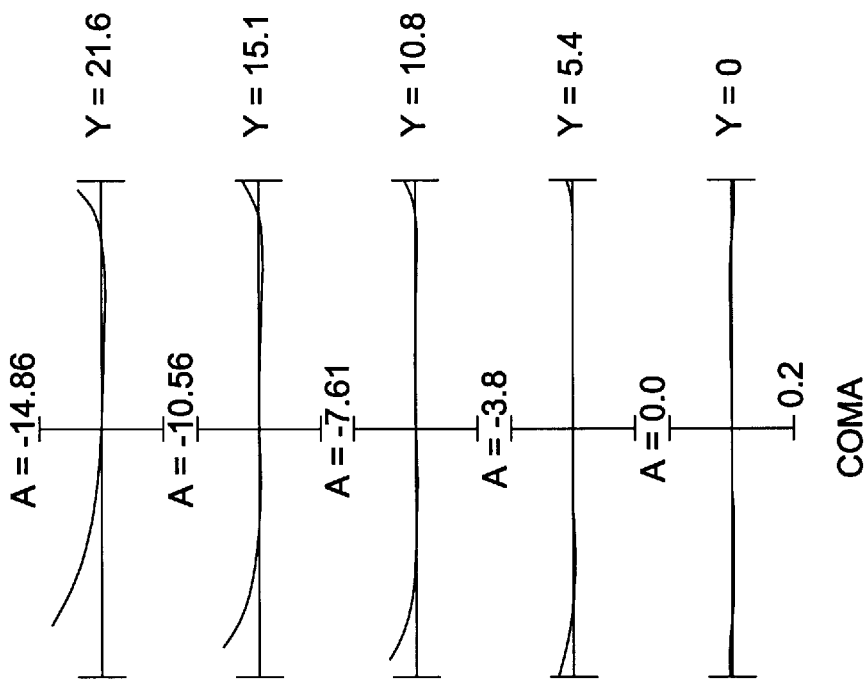
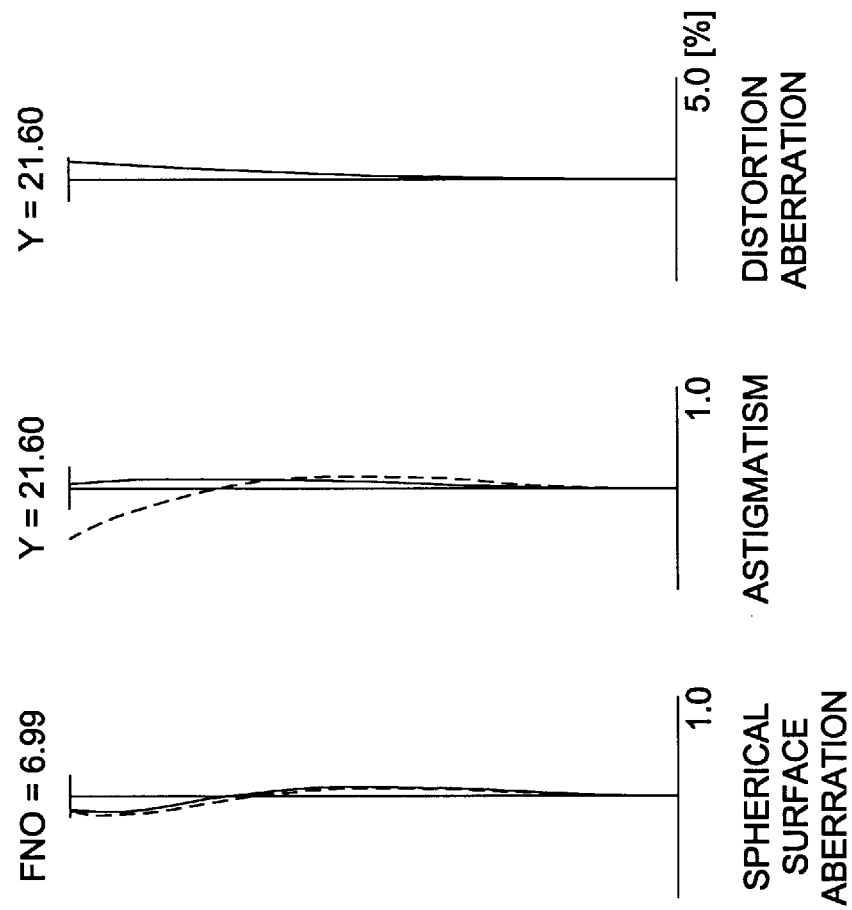
FIG. 37(a) SPHERICAL SURFACE ABERRATION
FIG. 37(b) ASTIGMATISM
FIG. 37(c) DISTORTION ABERRATION
FIG. 37(d) COMA

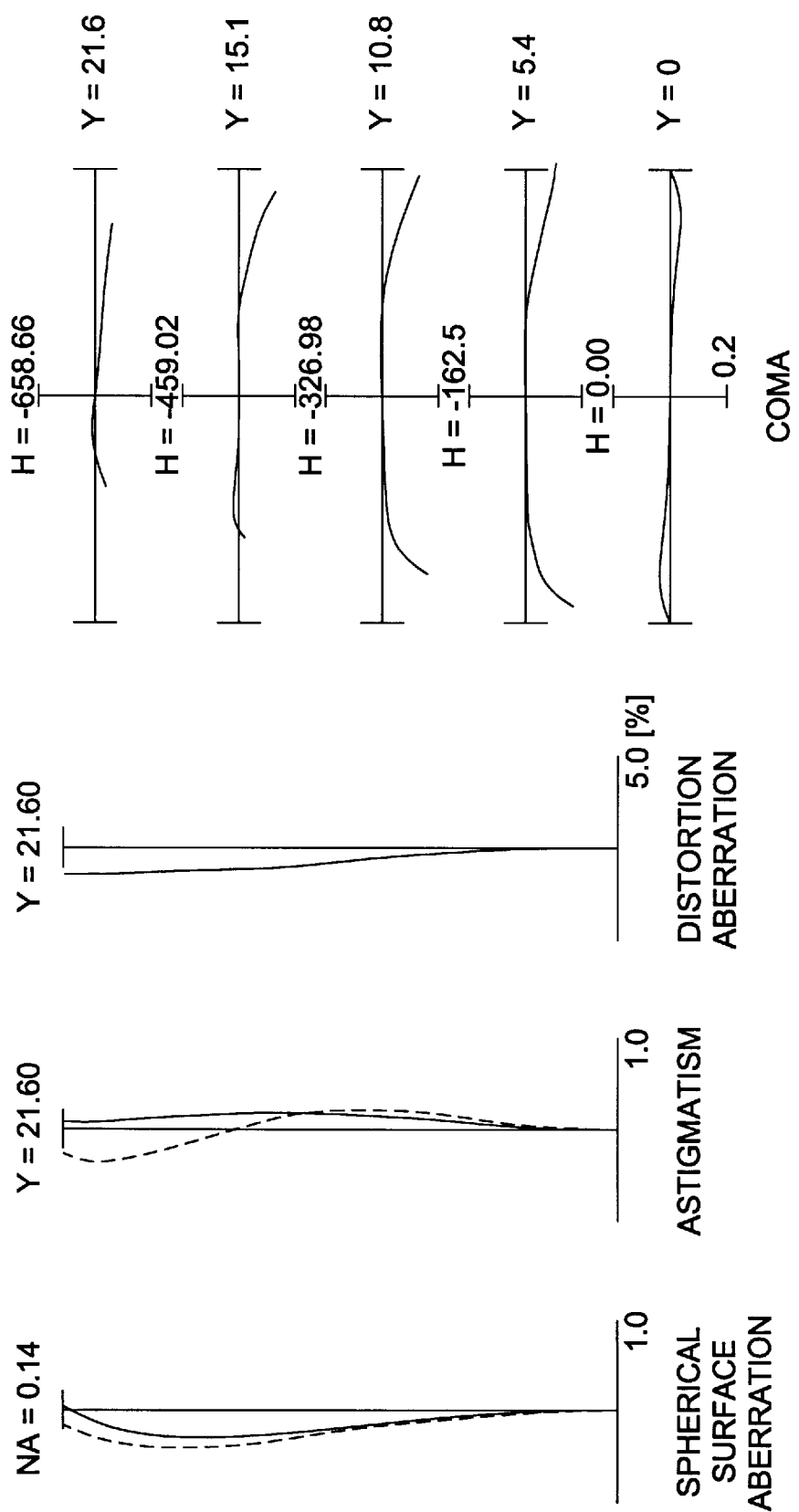

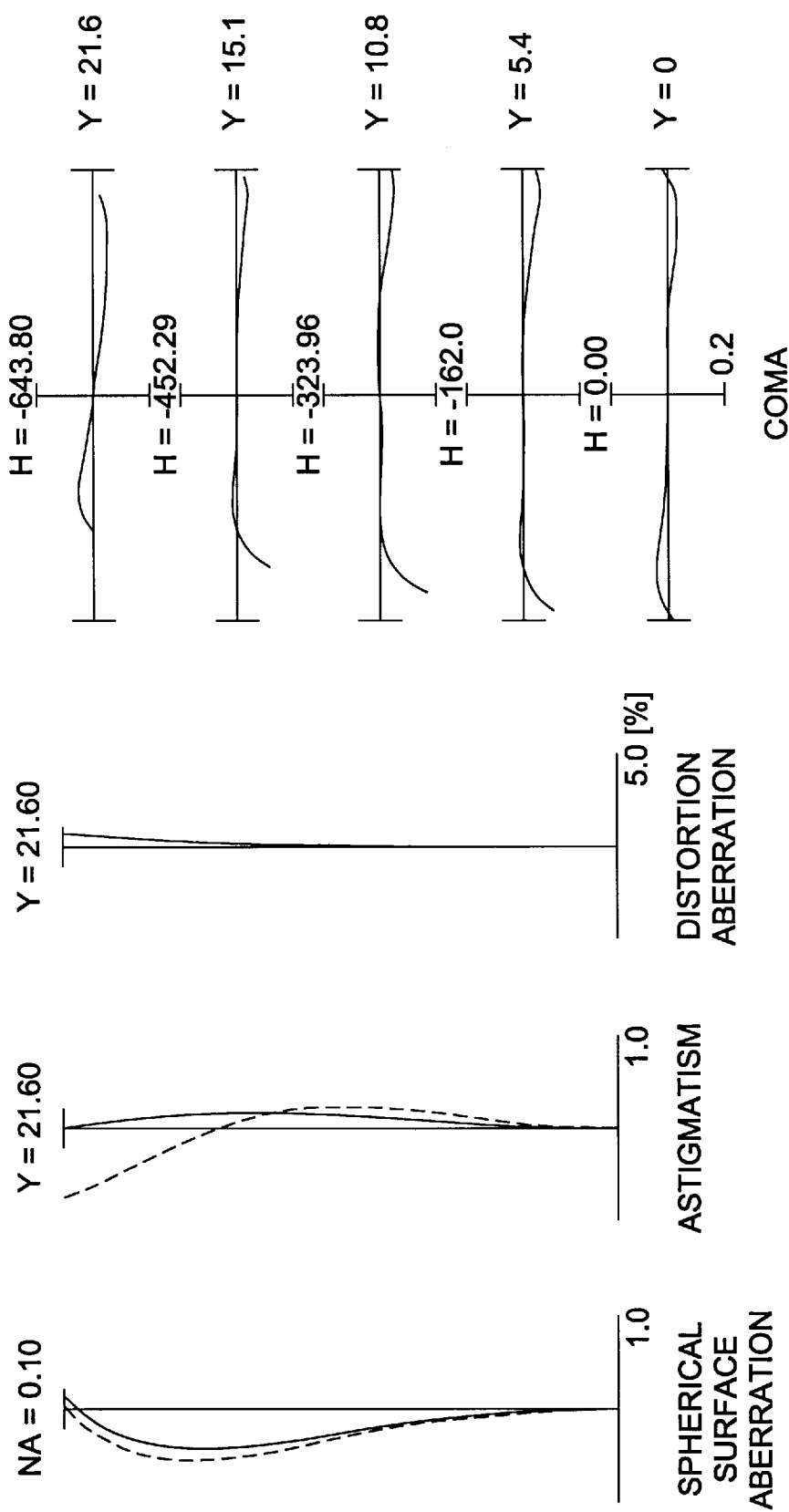

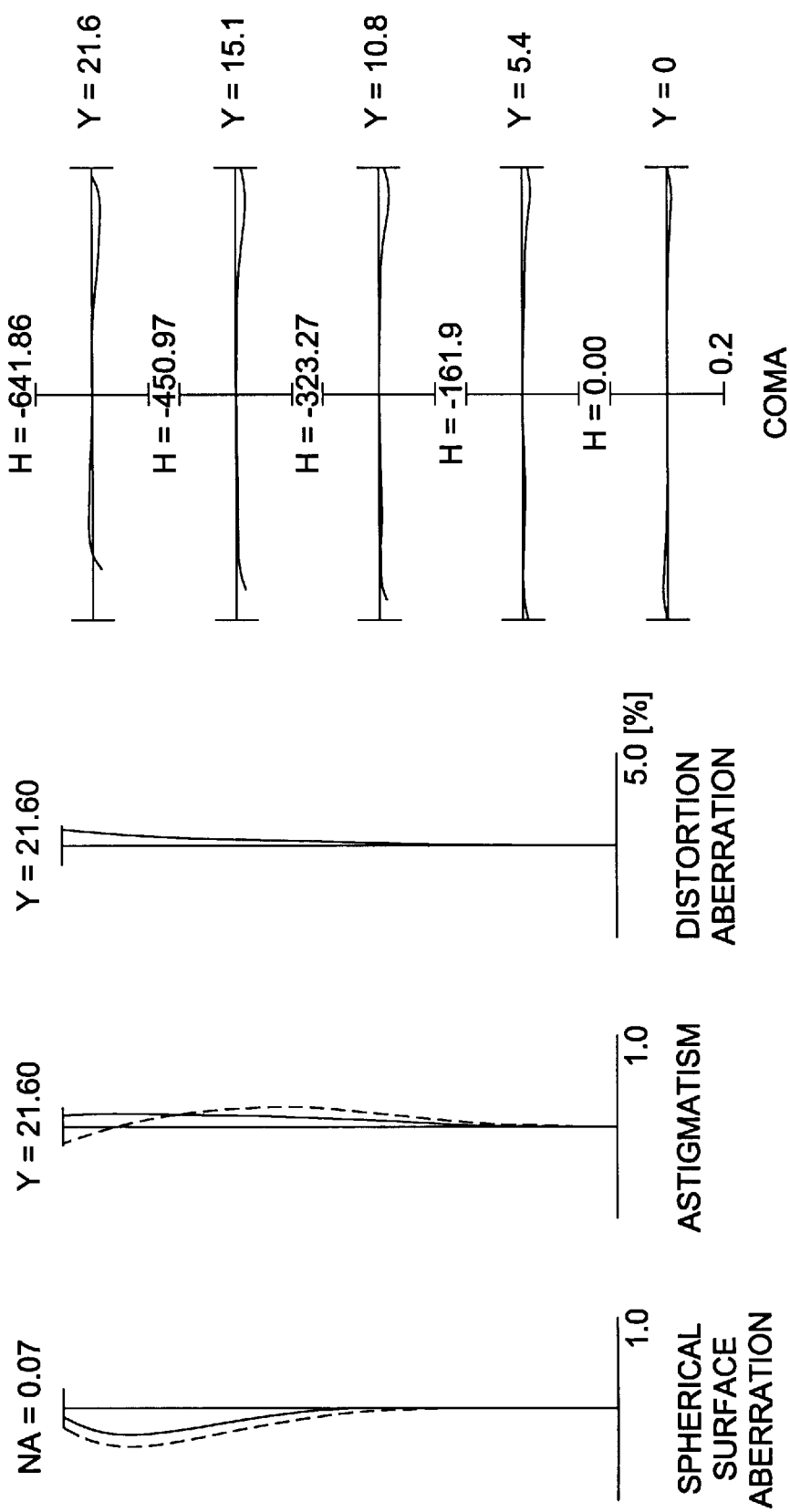

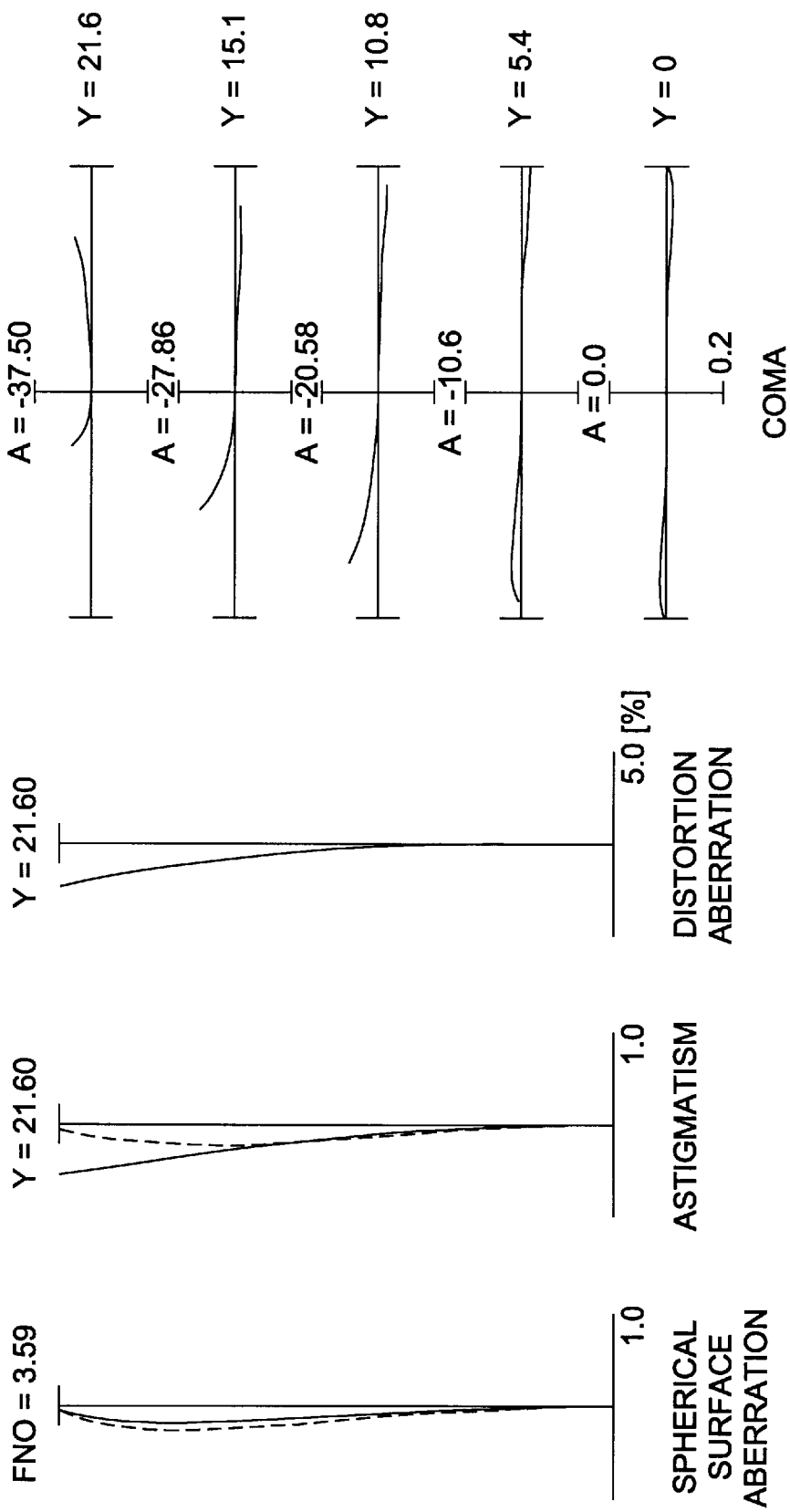

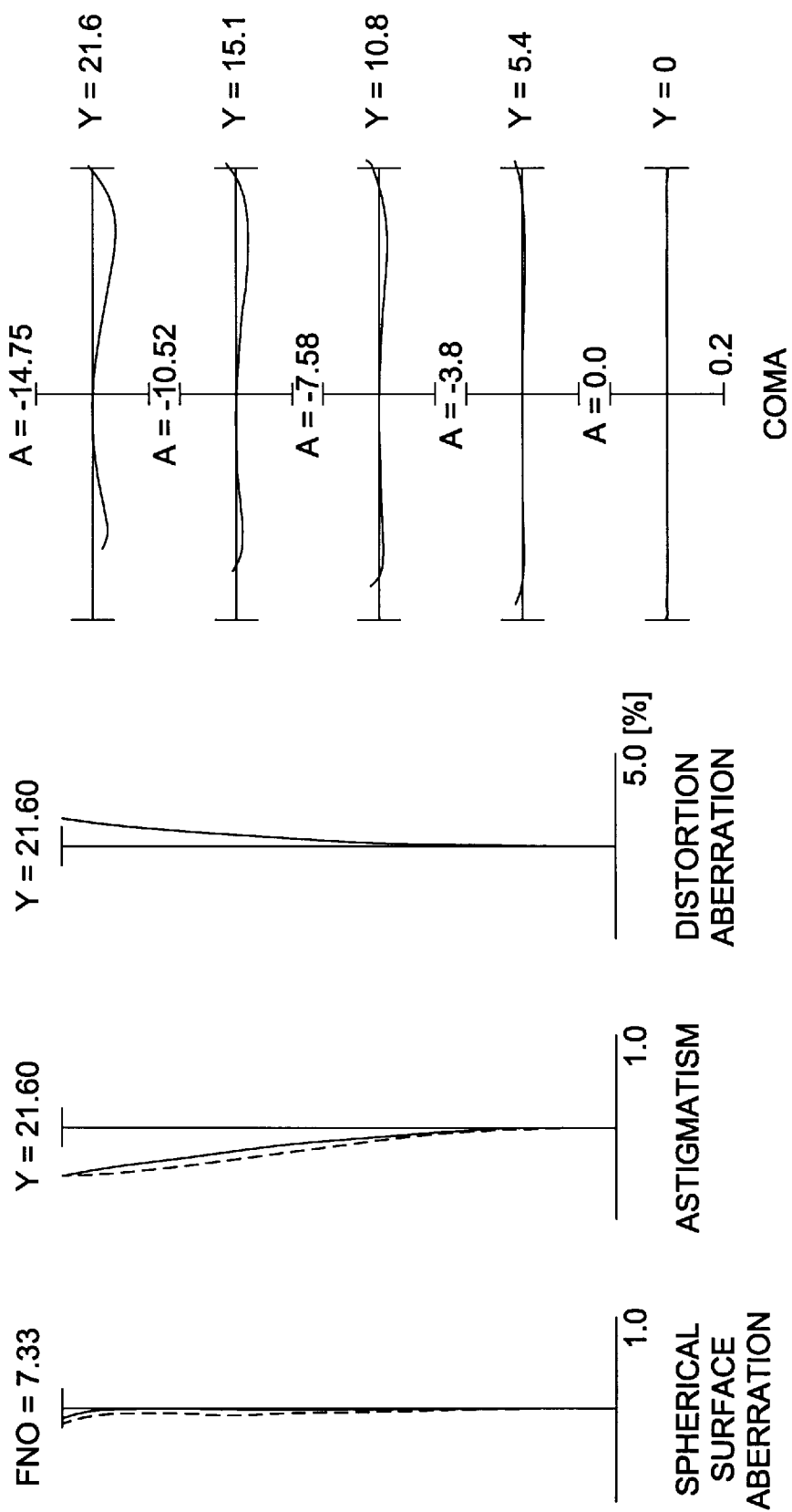

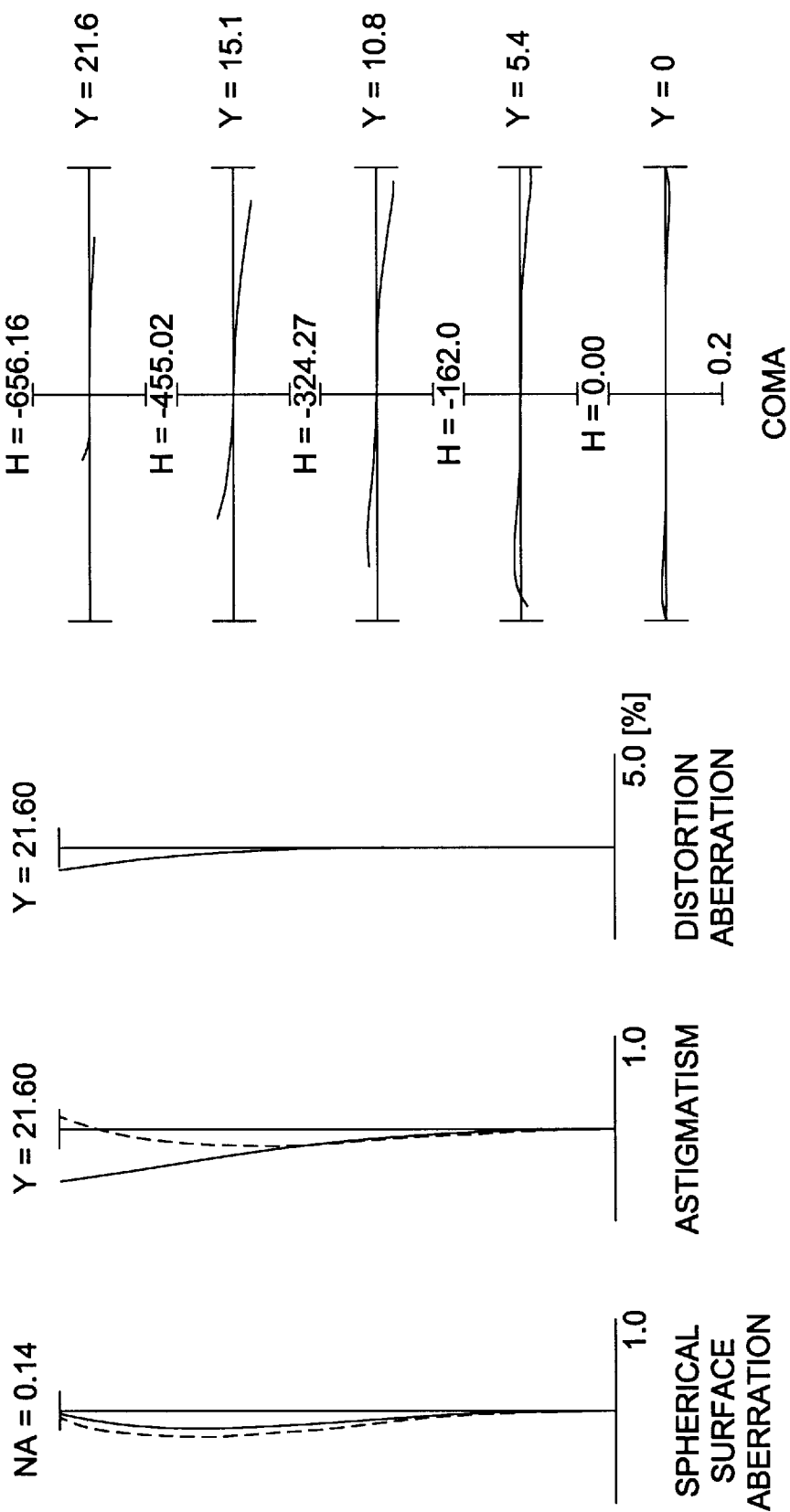

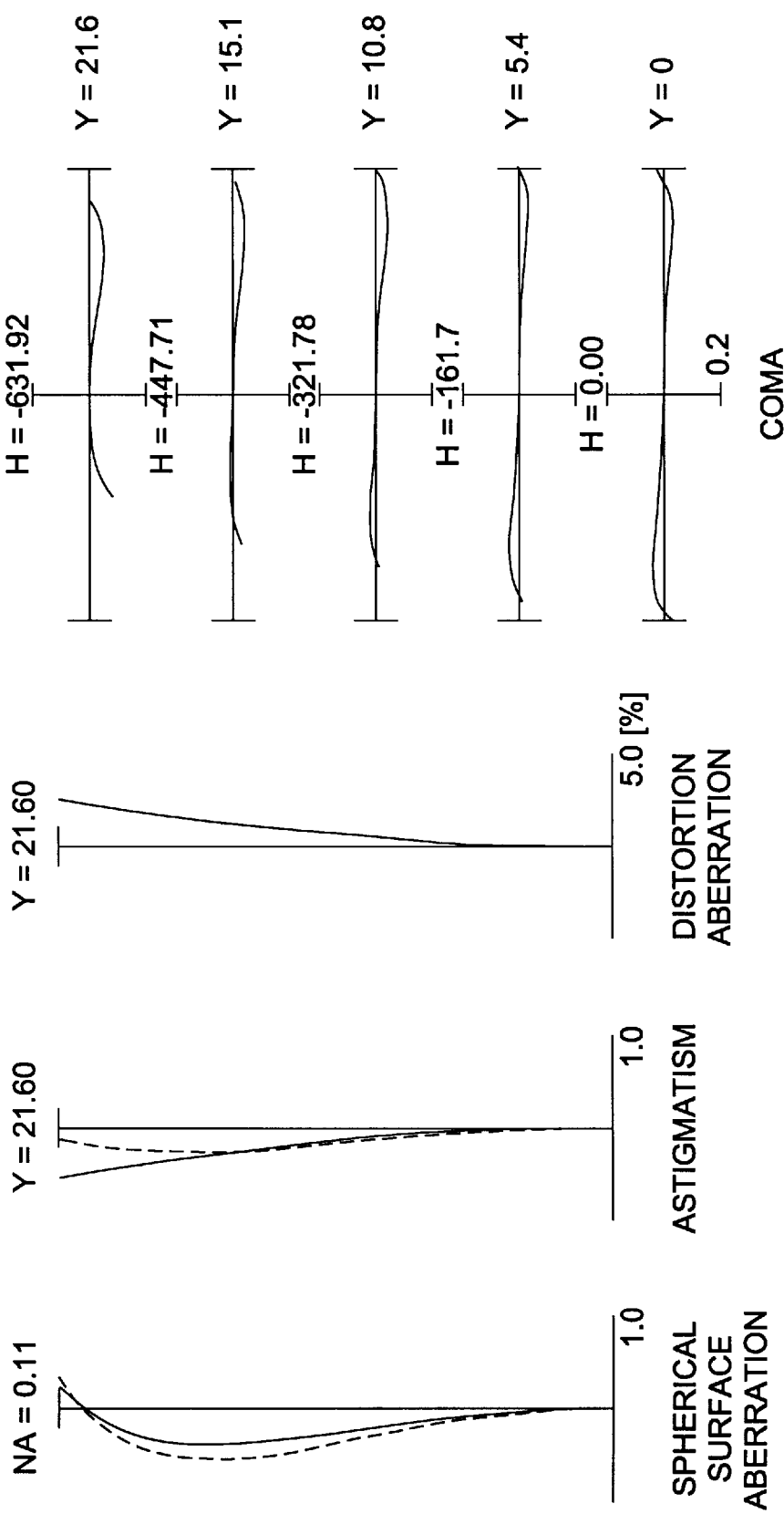

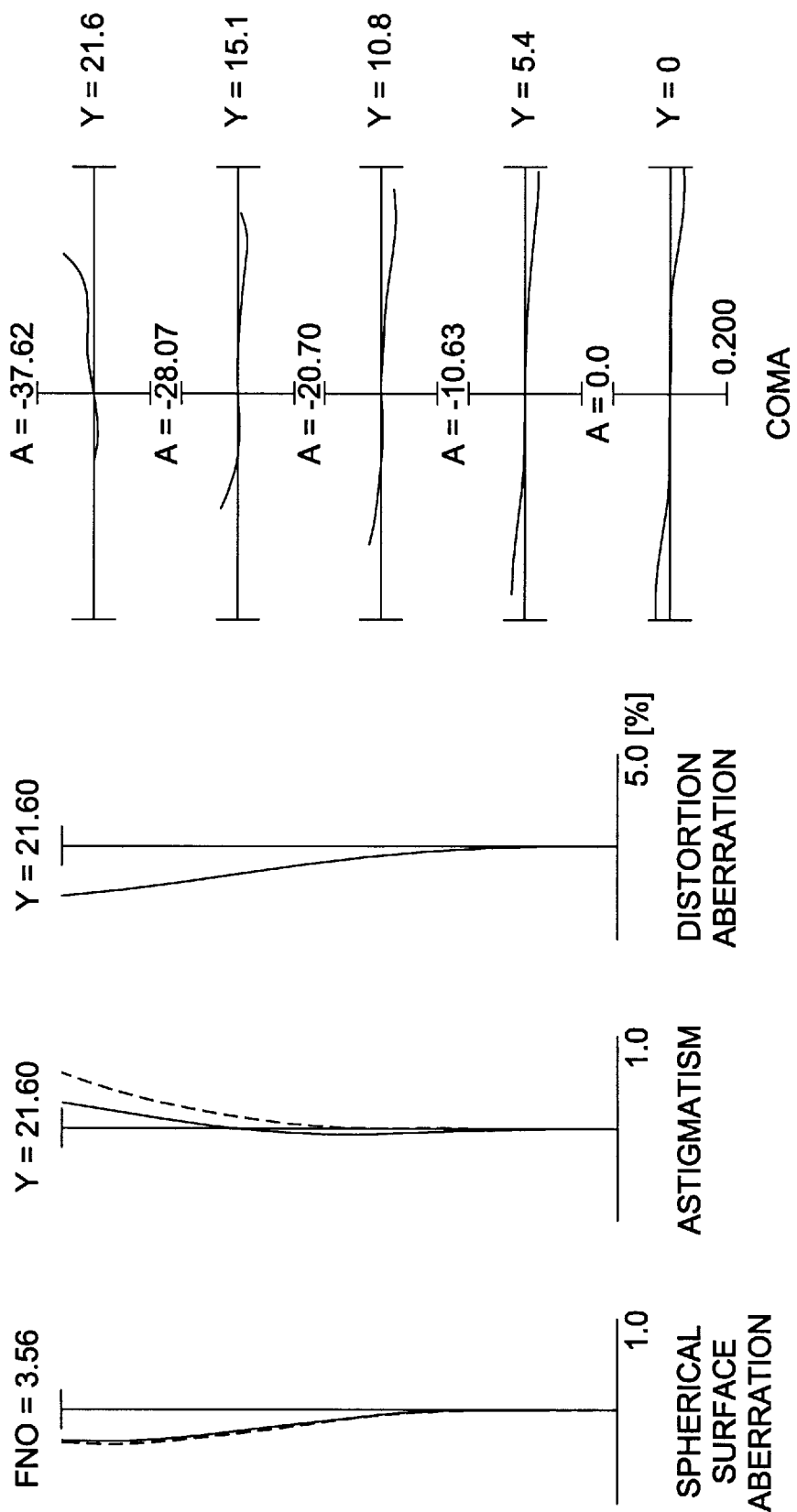

FIG. 54(a) SPHERICAL SURFACE ABERRATION

FIG. 54(b) ASTIGMATISM

FIG. 54(c) DISTORTION ABERRATION

FIG. 54(d) COMA

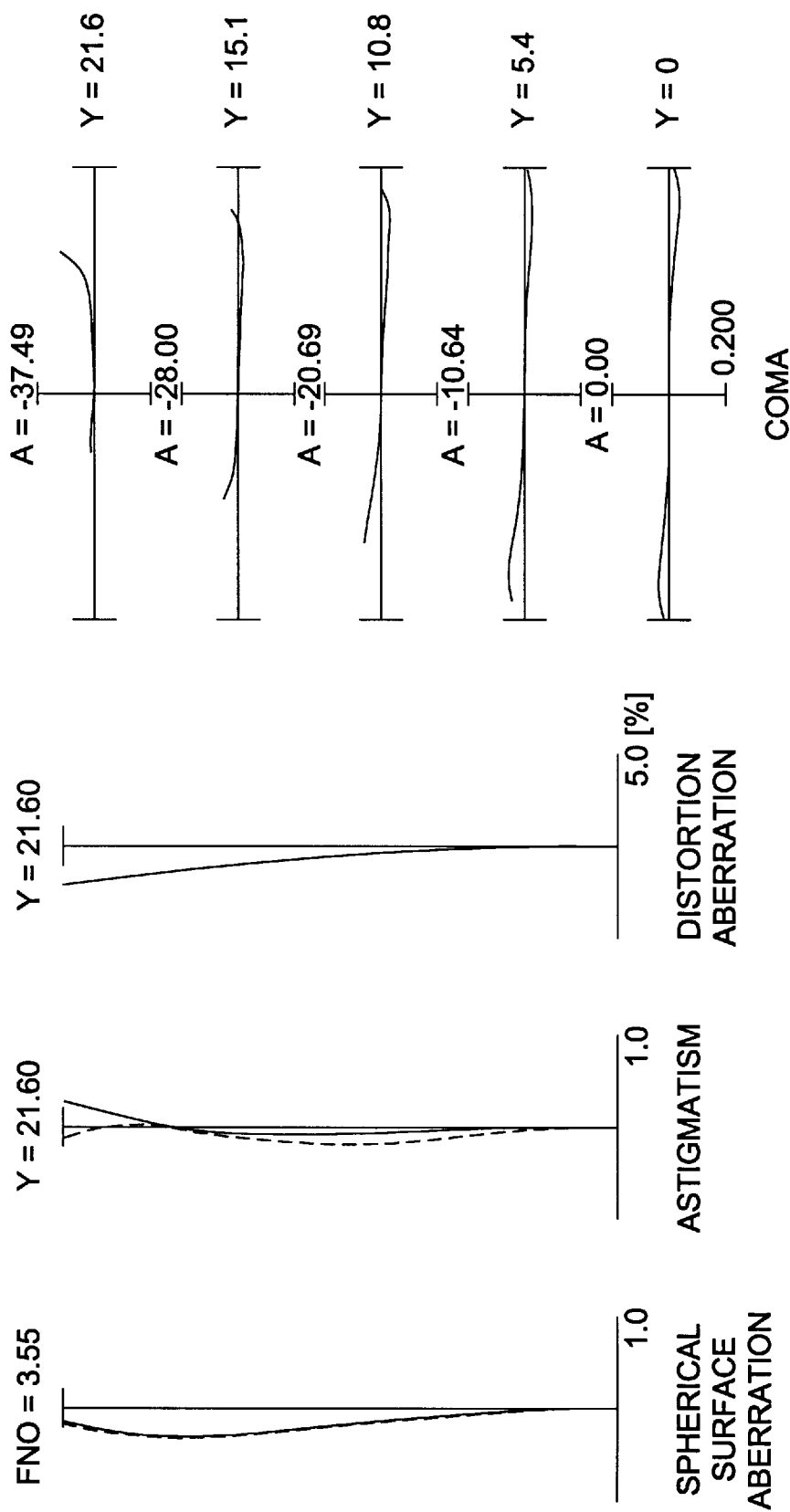

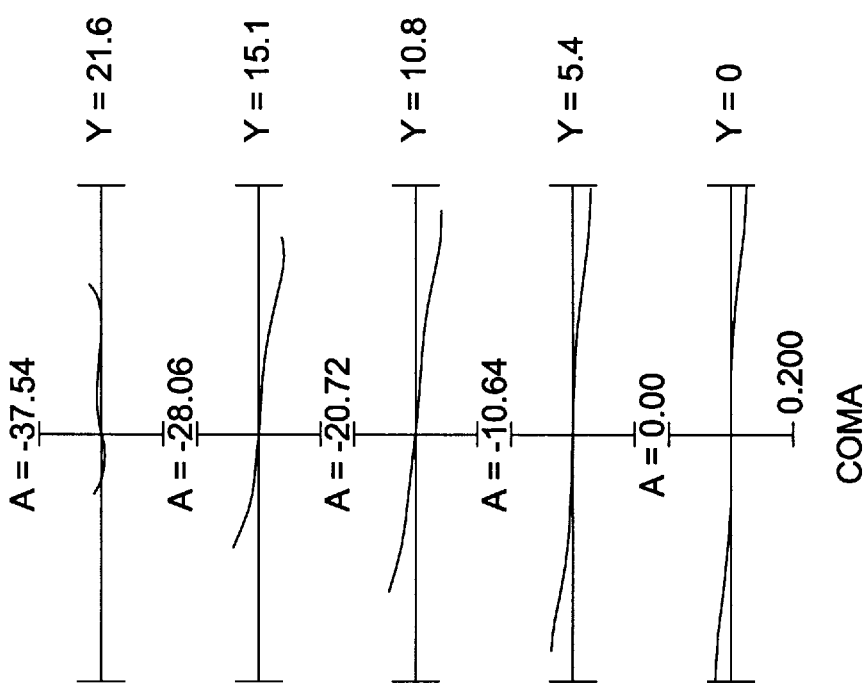
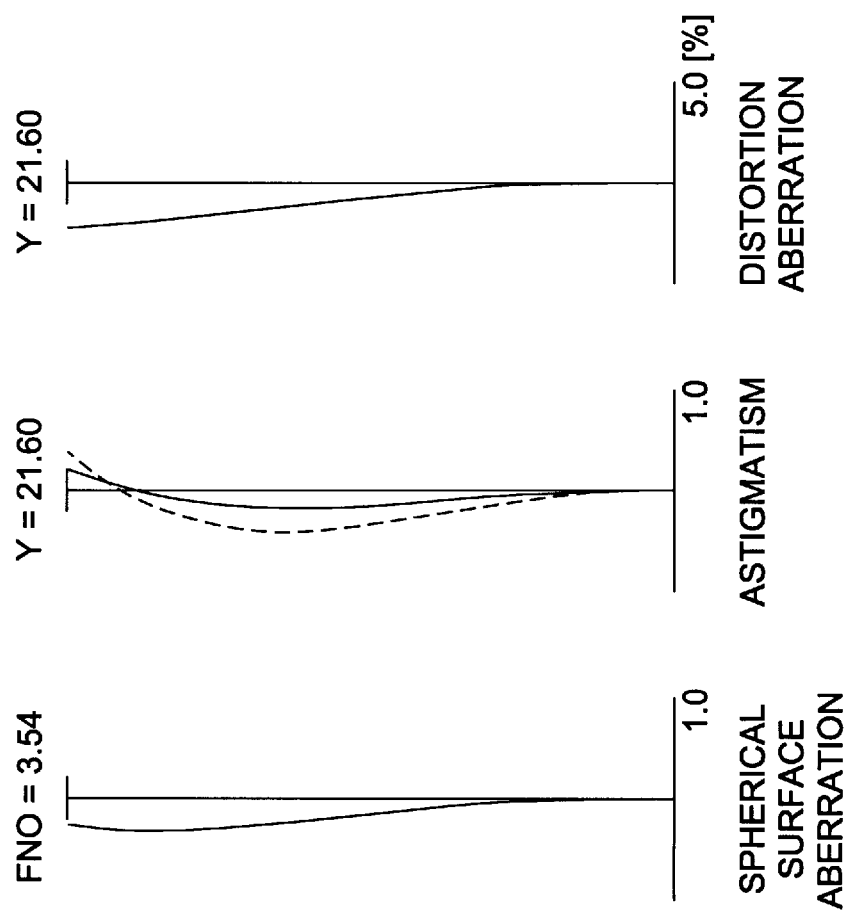
FIG. 62(a)  FIG. 62(b)  FIG. 62(c)  FIG. 62(d)

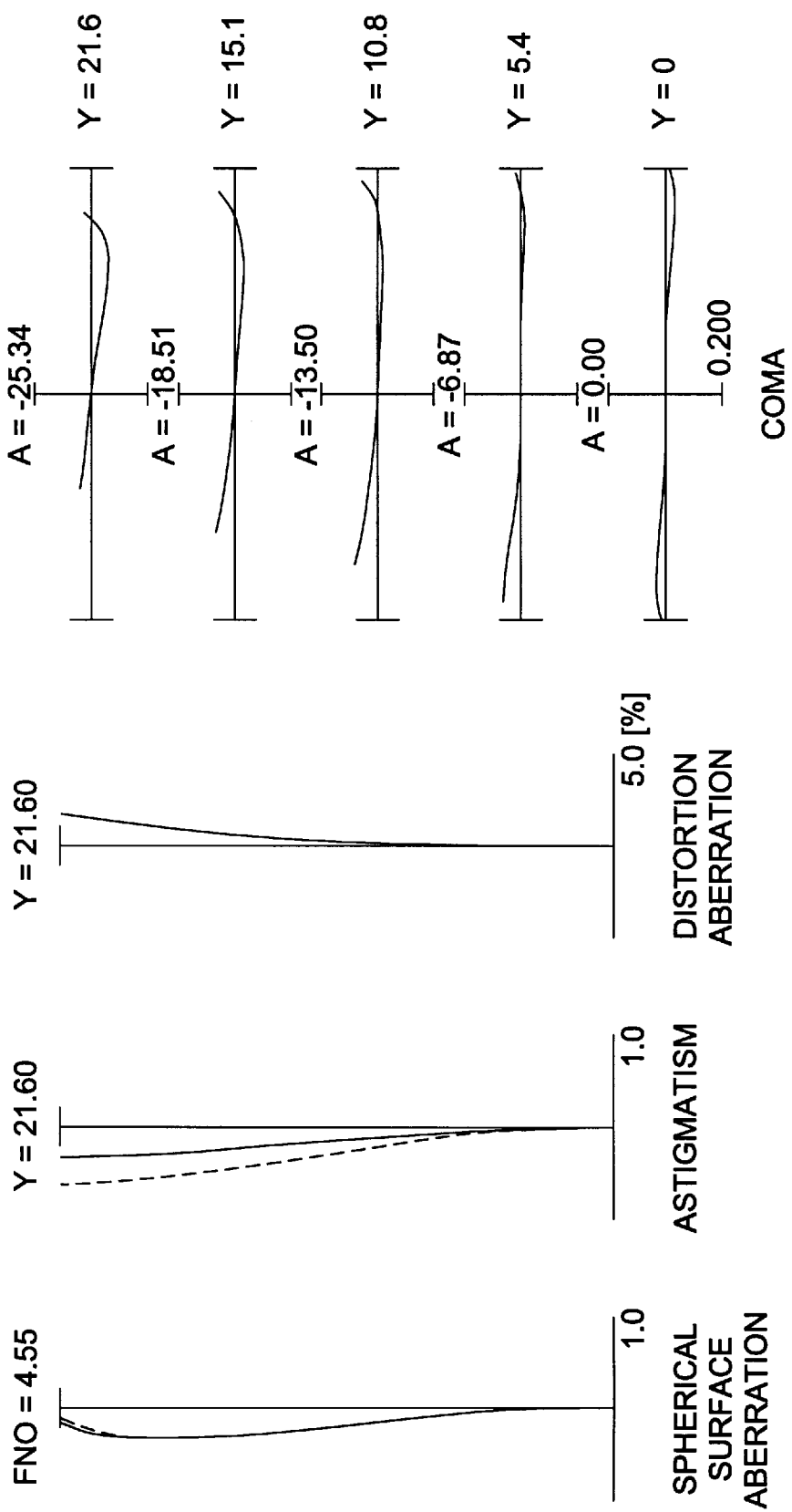

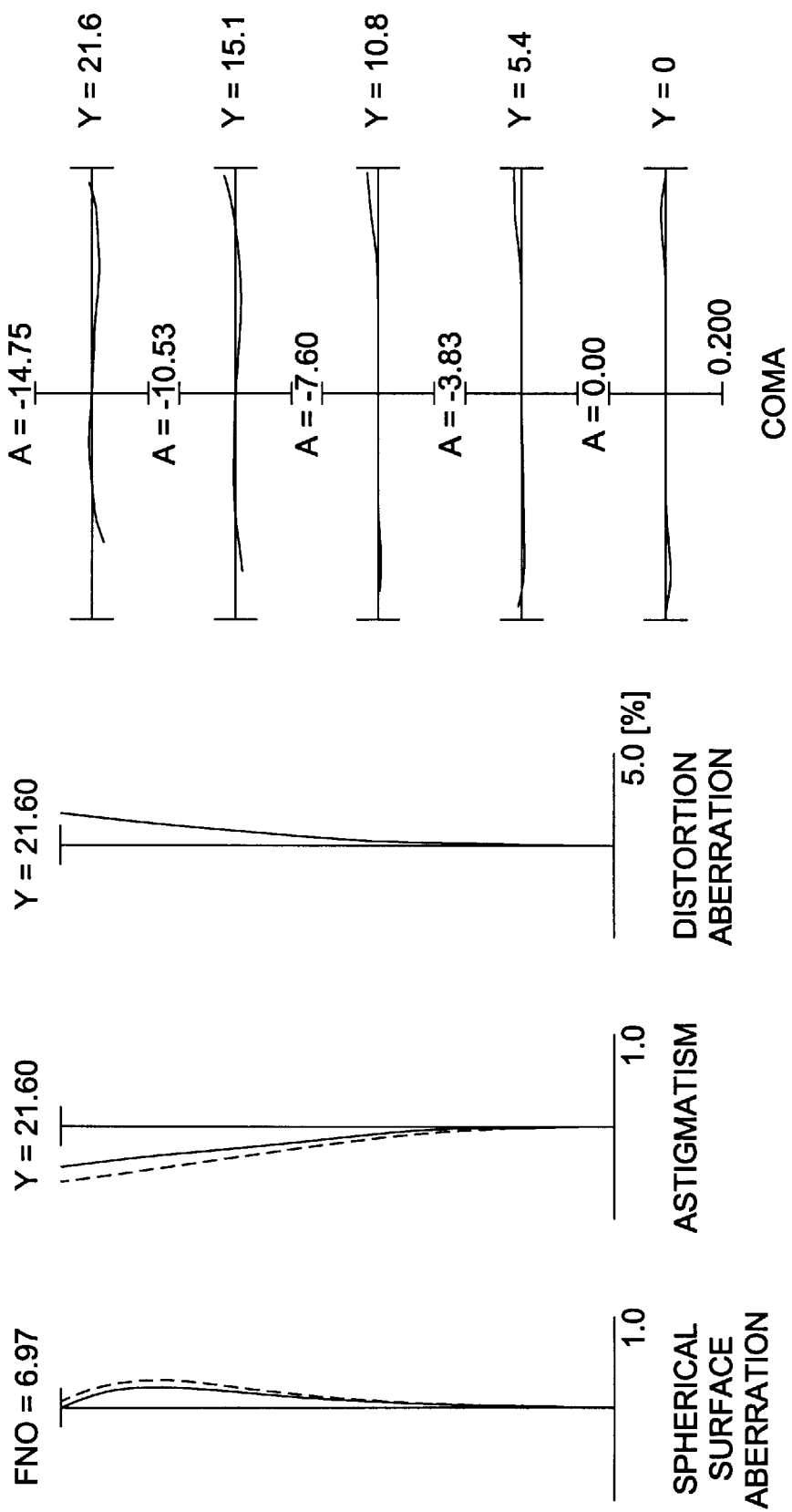
FIG. 64(a) SPHERICAL SURFACE ABERRATION
FIG. 64(b) ASTIGMATISM
FIG. 64(c) DISTORTION ABERRATION
FIG. 64(d) COMA

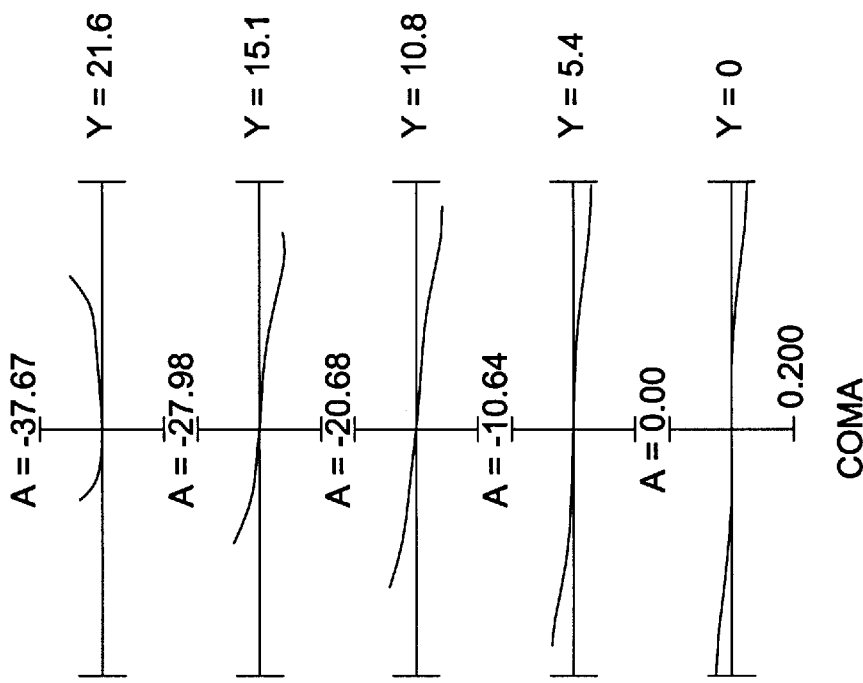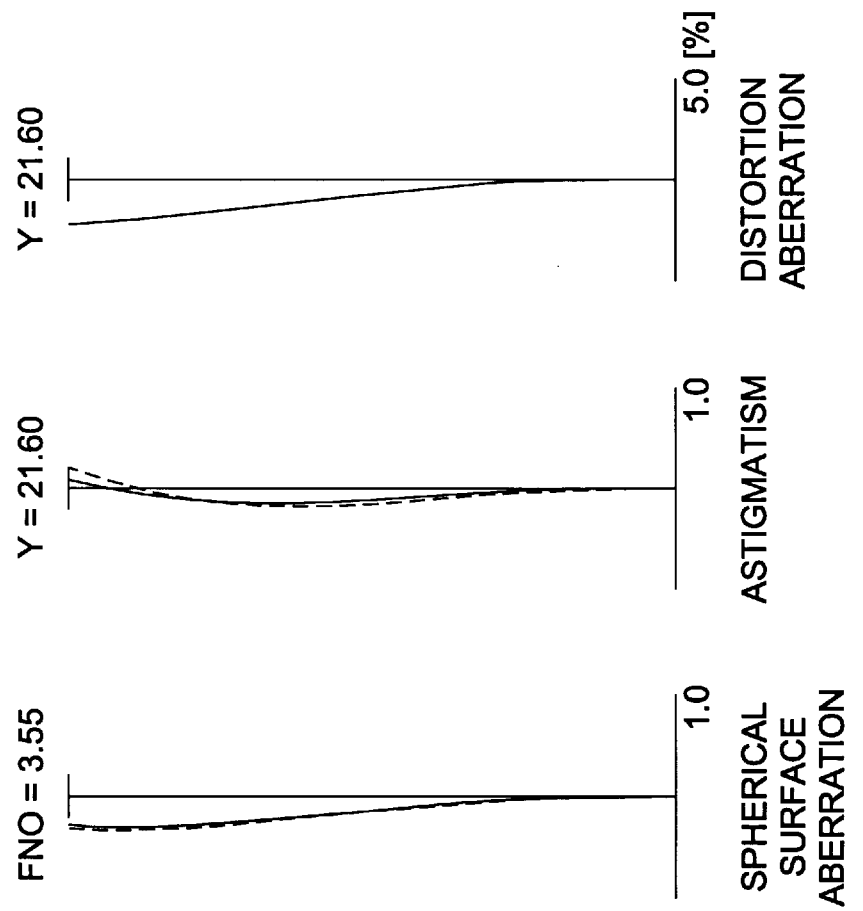

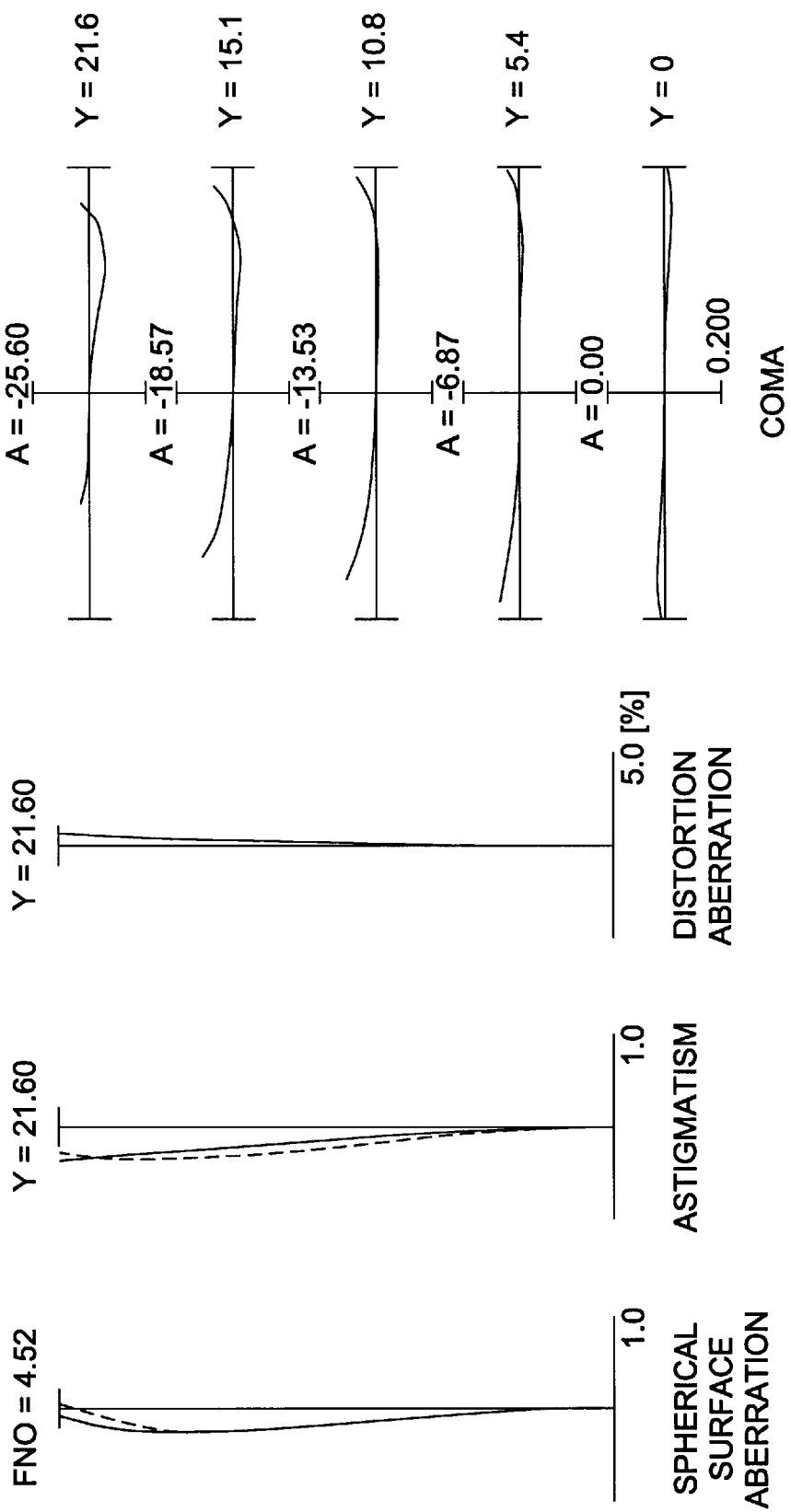

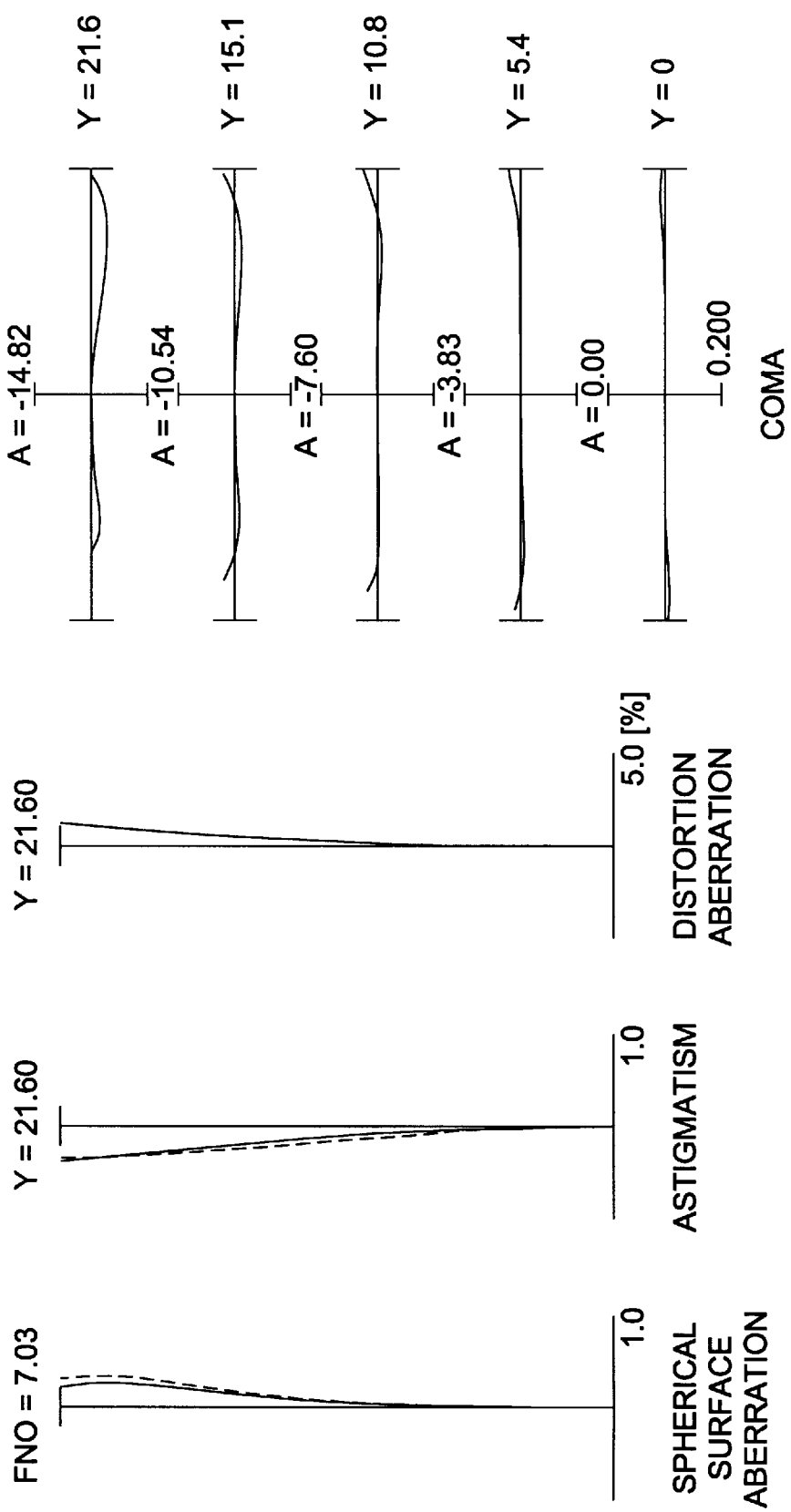
FIG. 68(a) SPHERICAL SURFACE ABERRATION
FIG. 68(b) ASTIGMATISM
FIG. 68(c) DISTORTION ABERRATION
FIG. 68(d) COMA

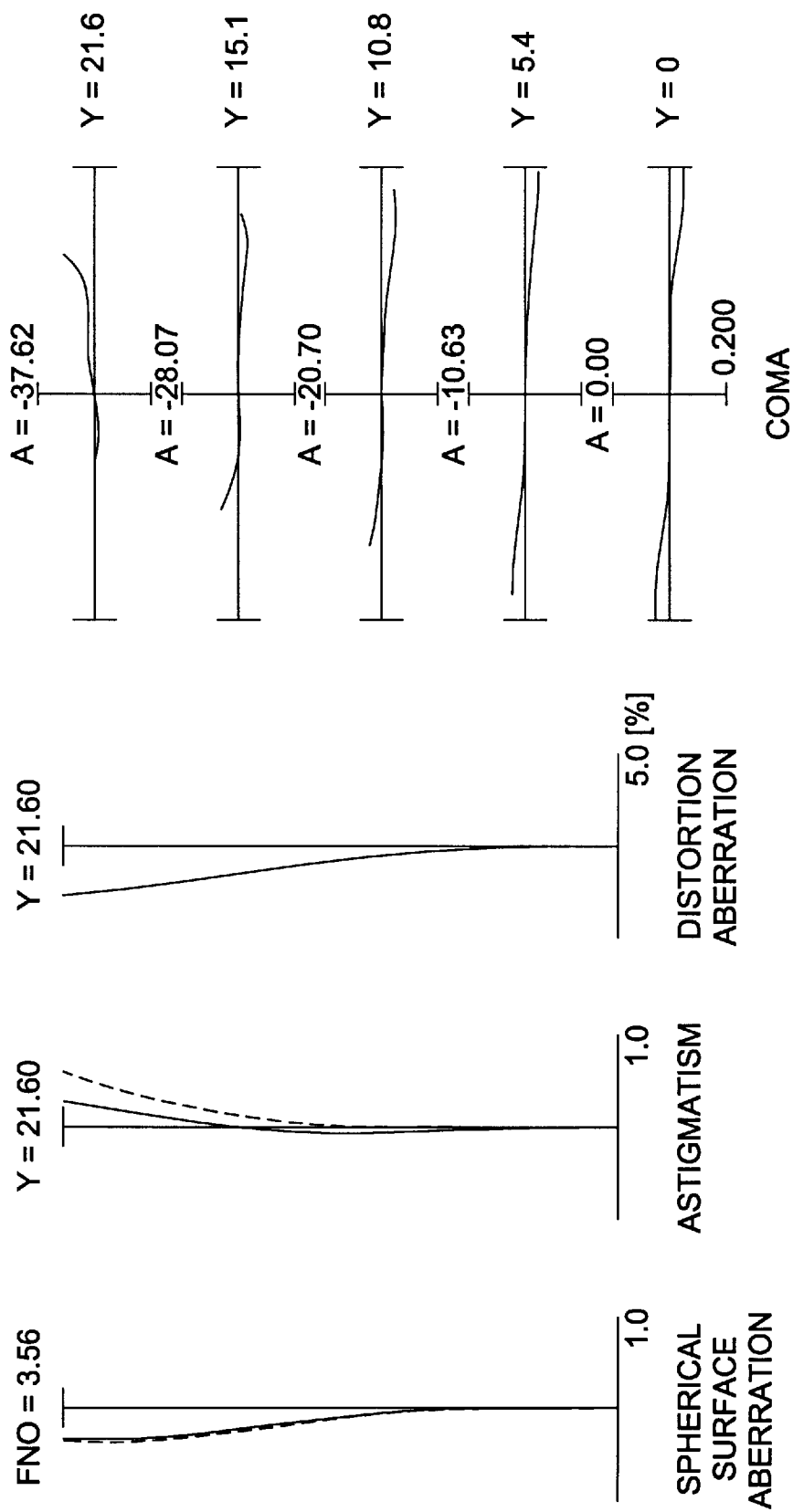

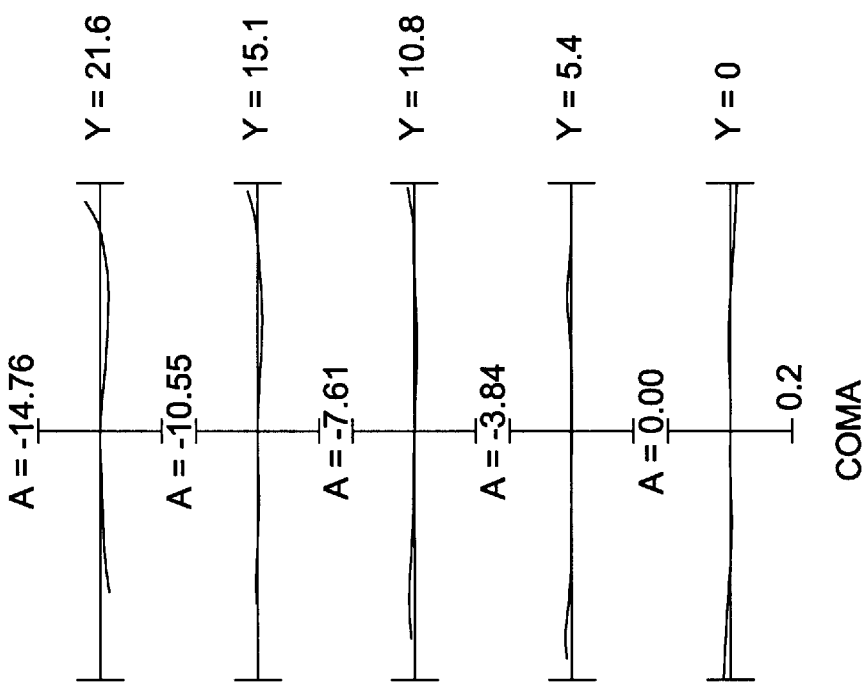
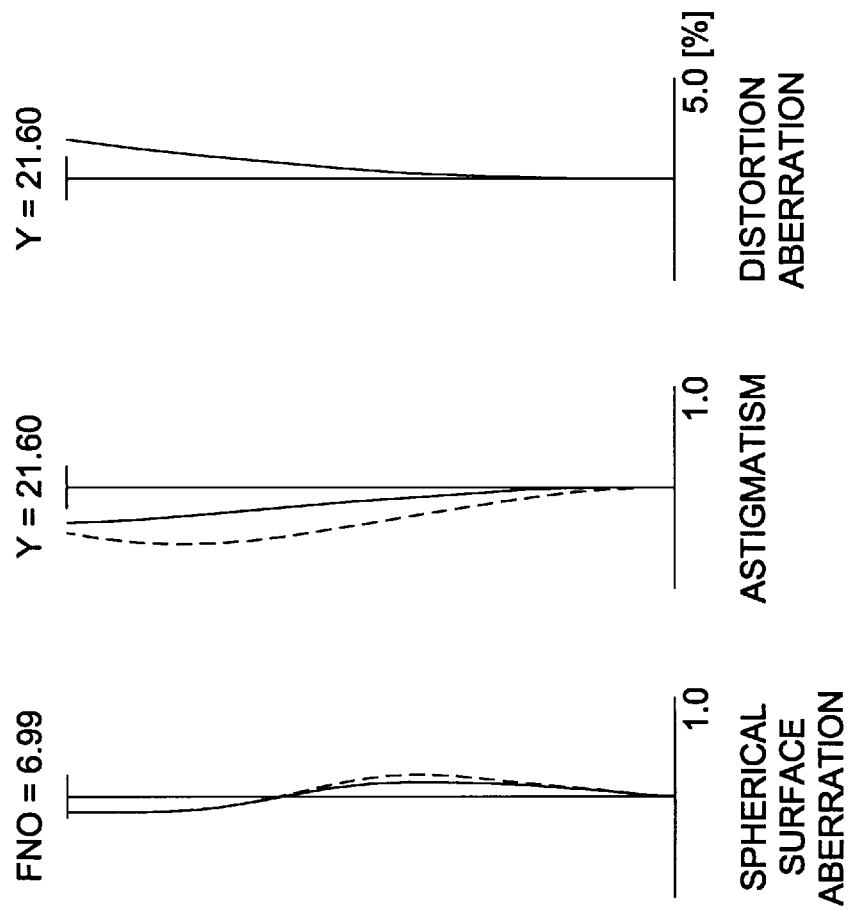
FIG. 74(a)    FIG. 74(b)    FIG. 74(c)    FIG. 74(d)

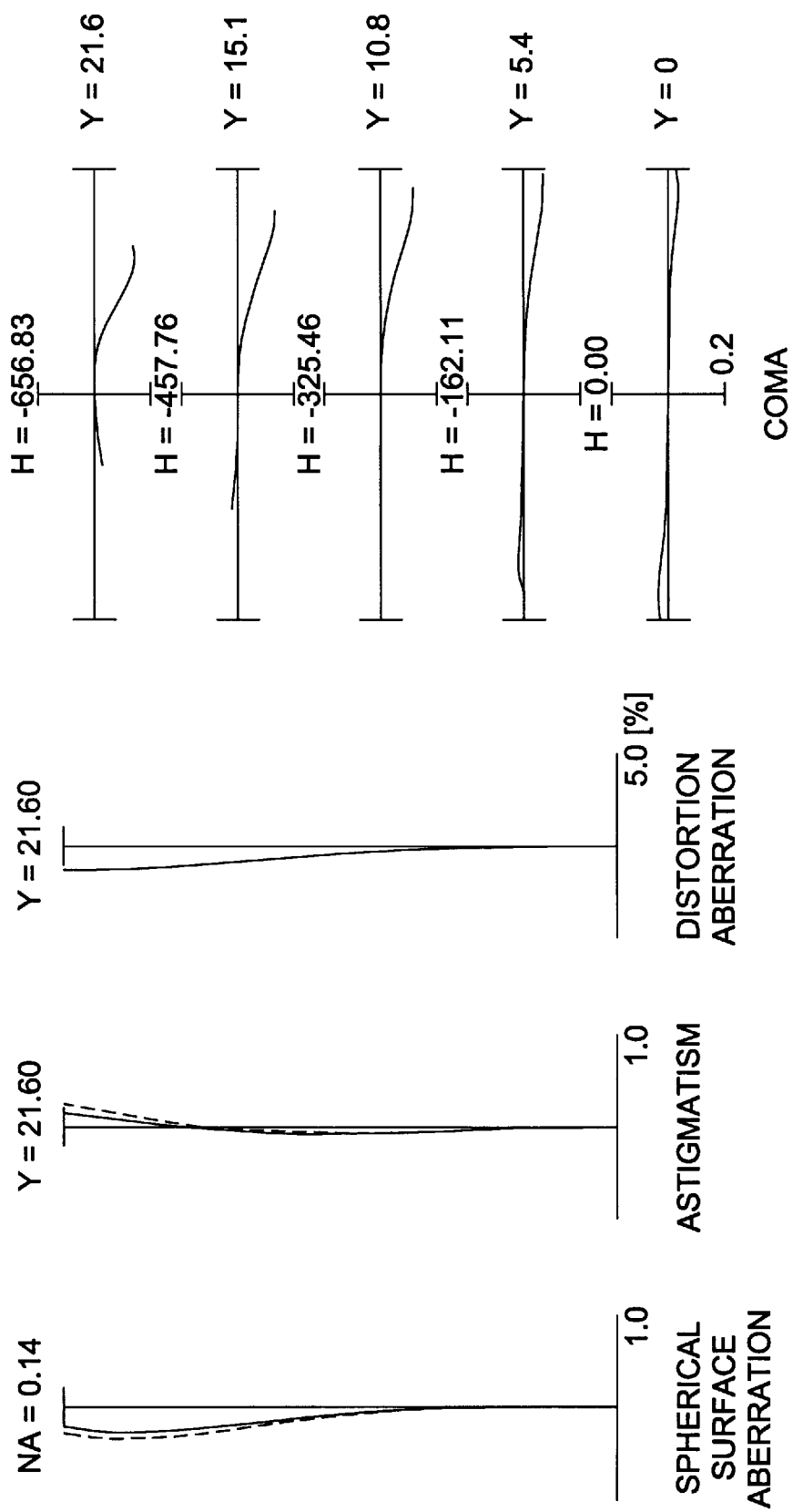

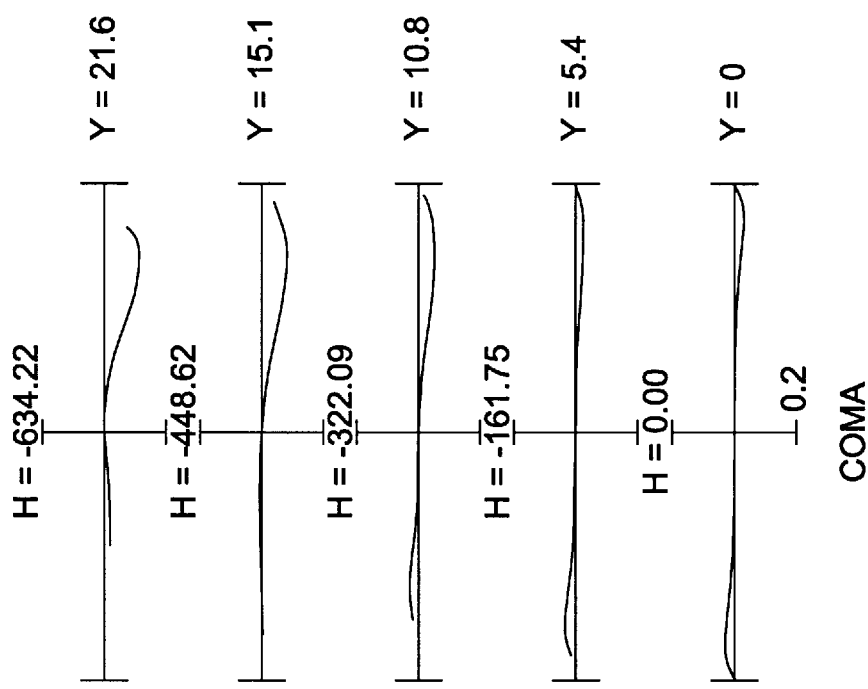
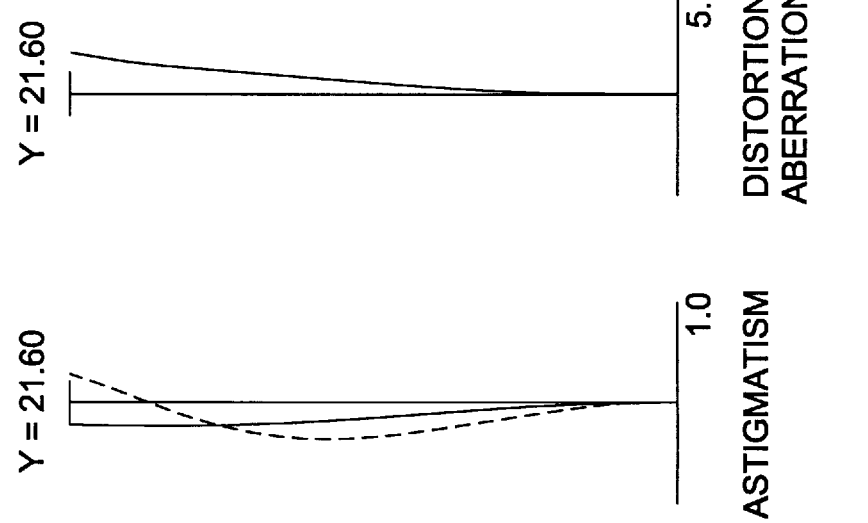
FIG. 76(a) SPHERICAL SURFACE ABERRATION
FIG. 76(b) ASTIGMATISM
FIG. 76(c) DISTORTION ABERRATION
FIG. 76(d) COMA

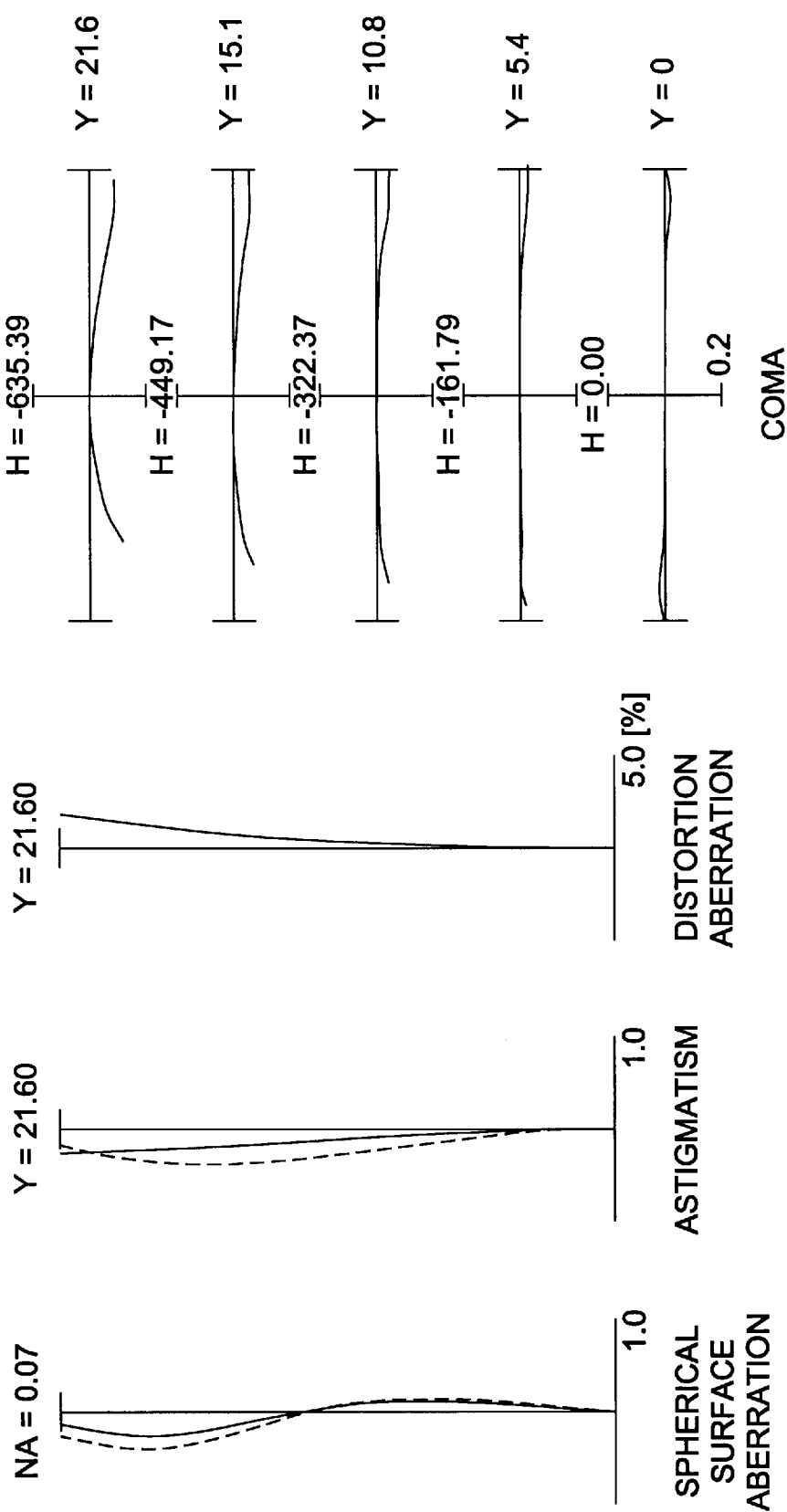

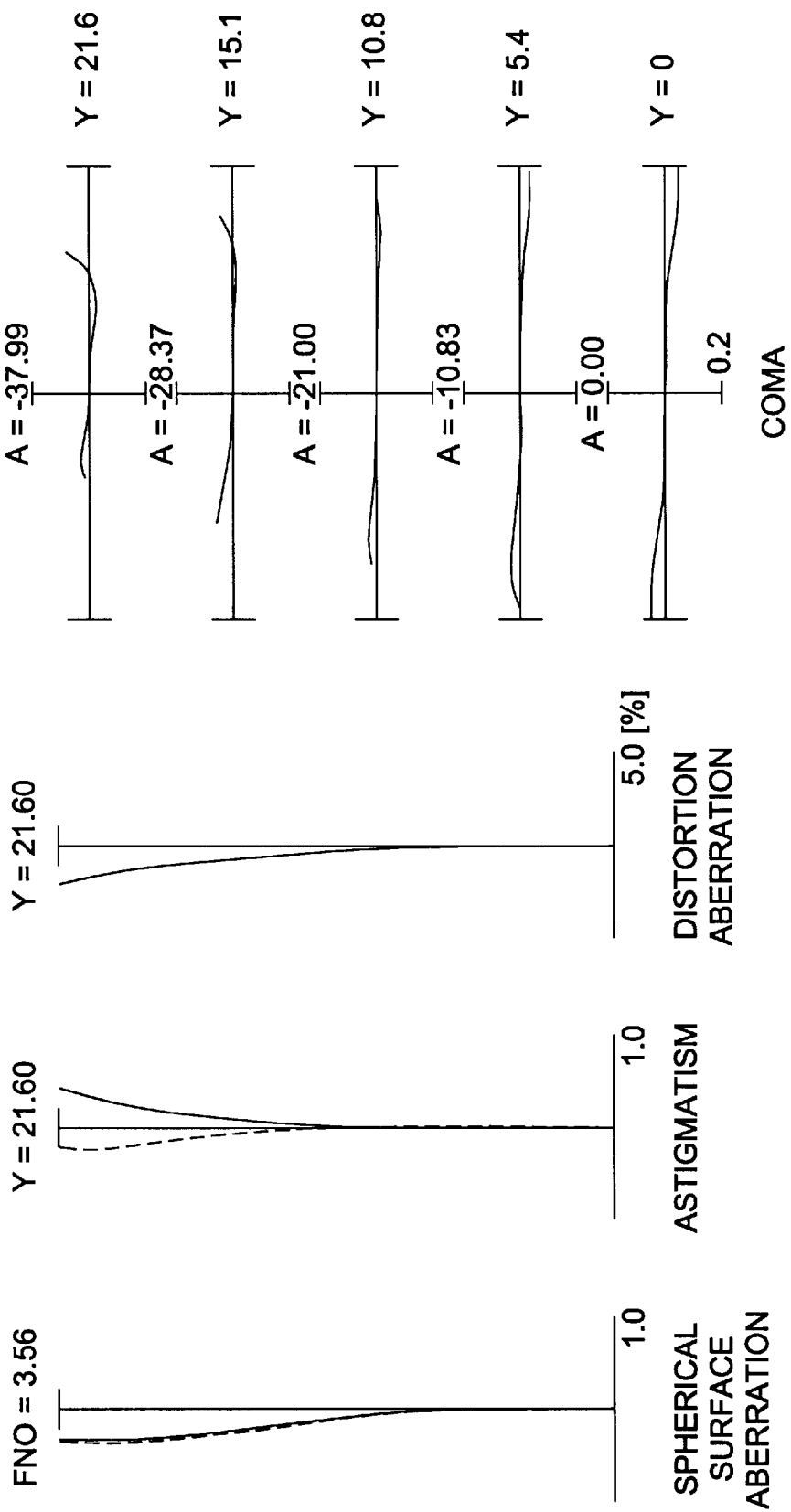

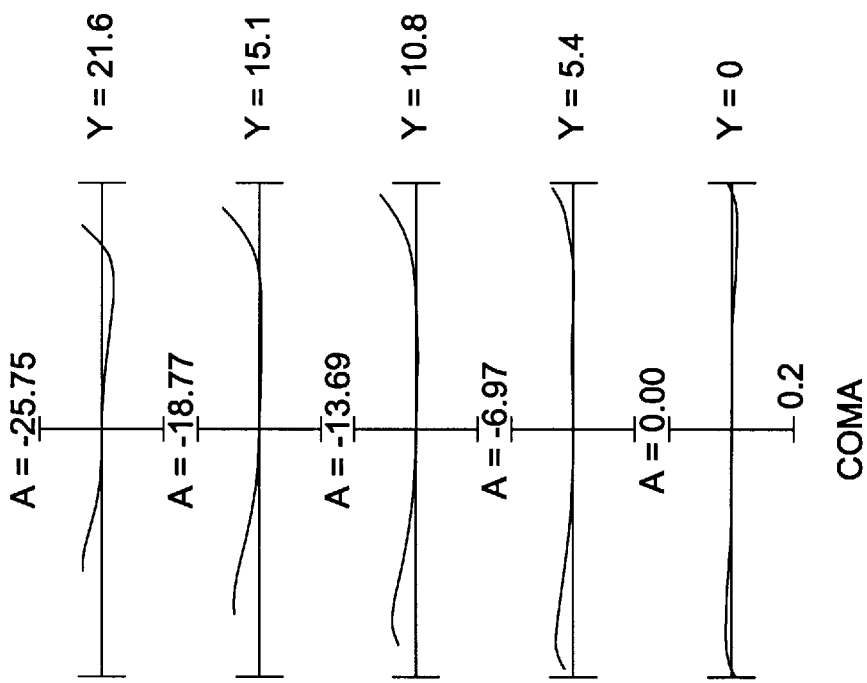
FIG. 80(d)
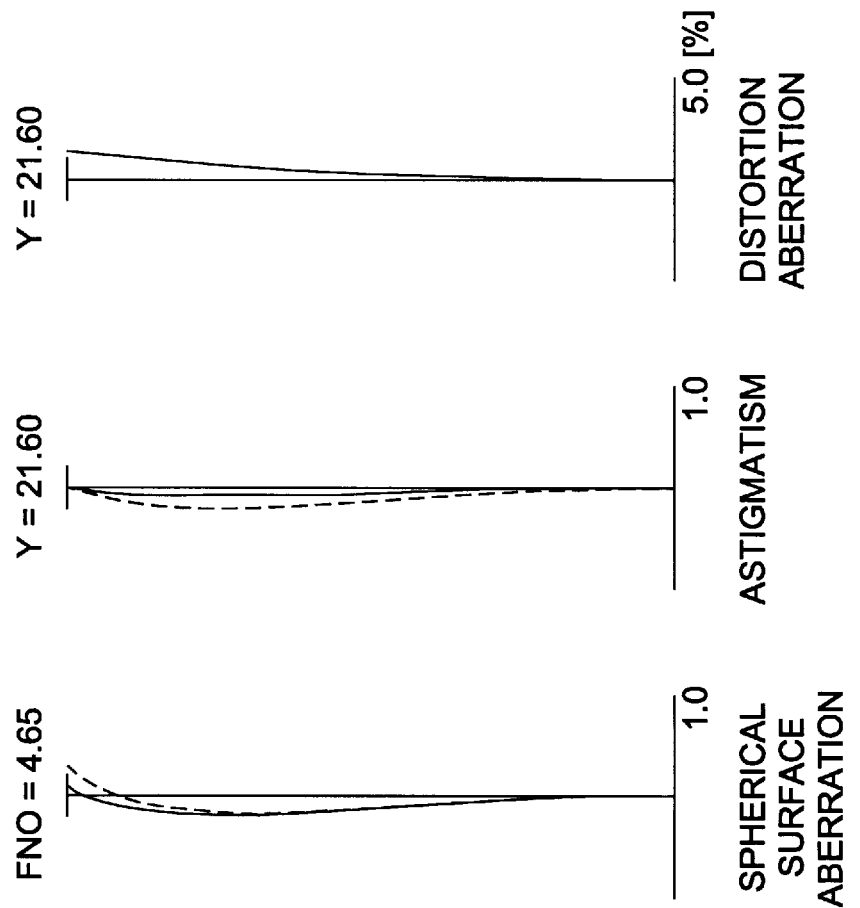
FIG. 80(c)
FIG. 80(b)
FIG. 80(a)

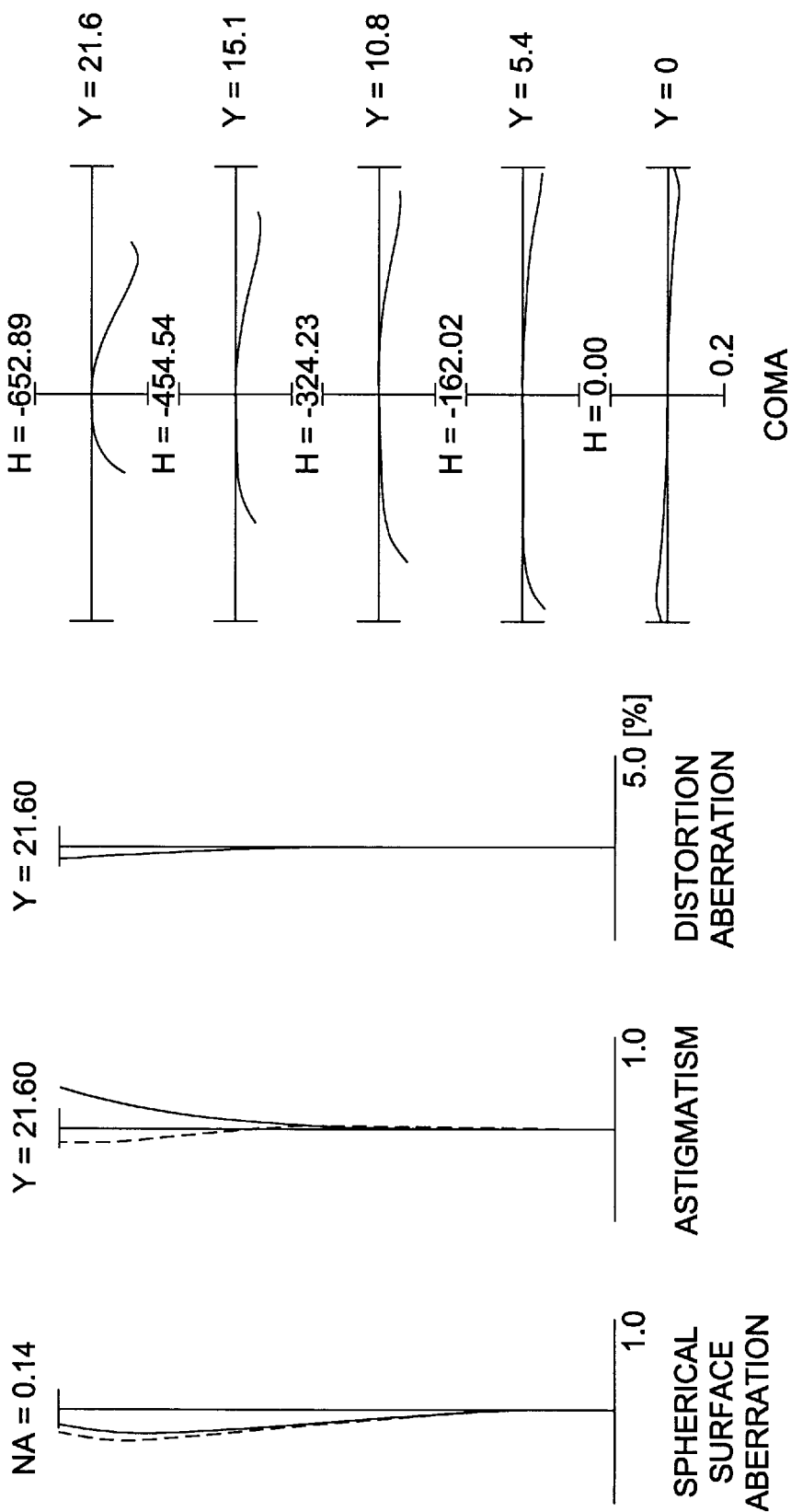

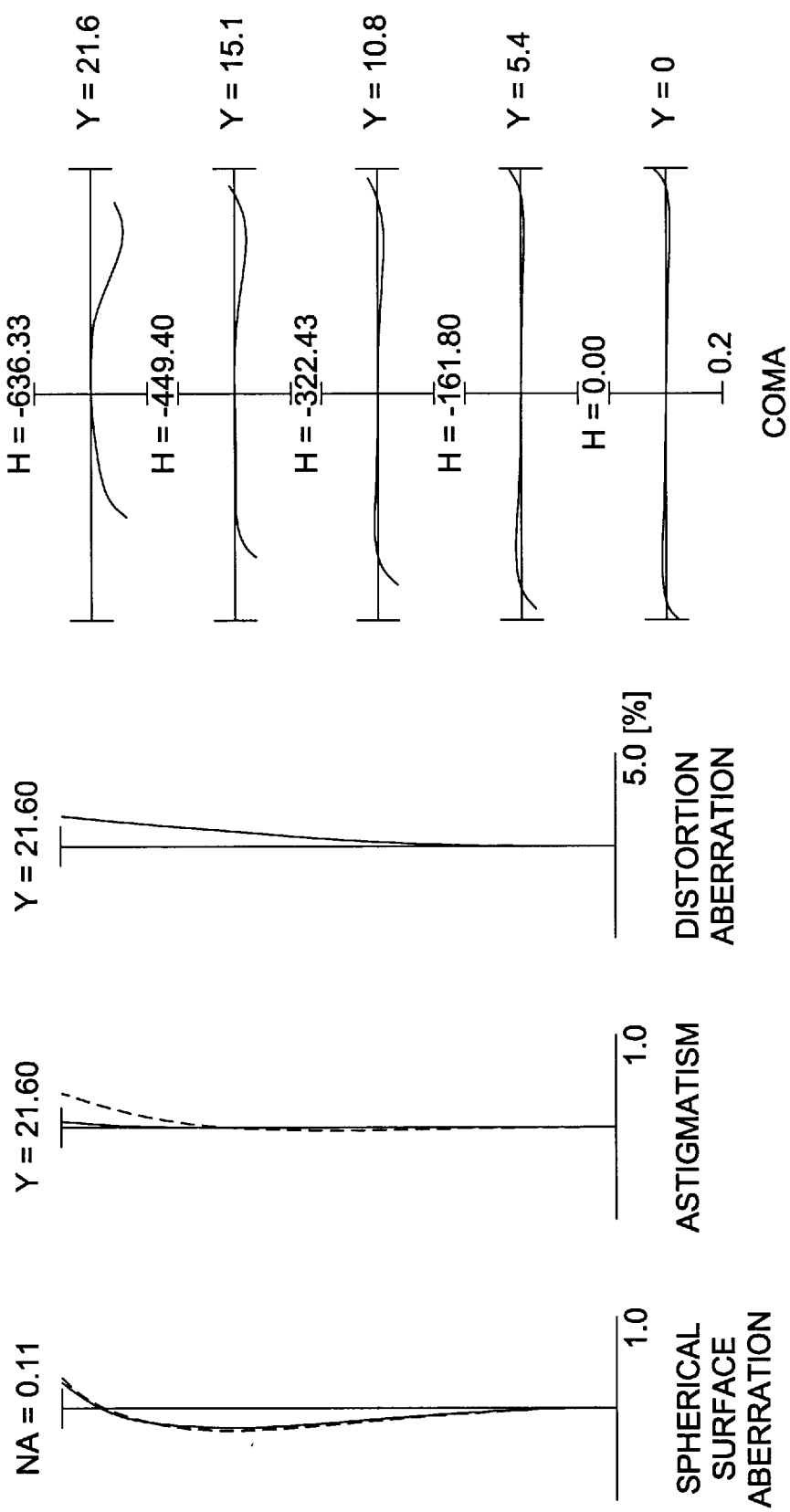
FIG. 83(a) SPHERICAL SURFACE ABERRATION
FIG. 83(b) ASTIGMATISM
FIG. 83(c) DISTORTION ABERRATION
FIG. 83(d) COMA

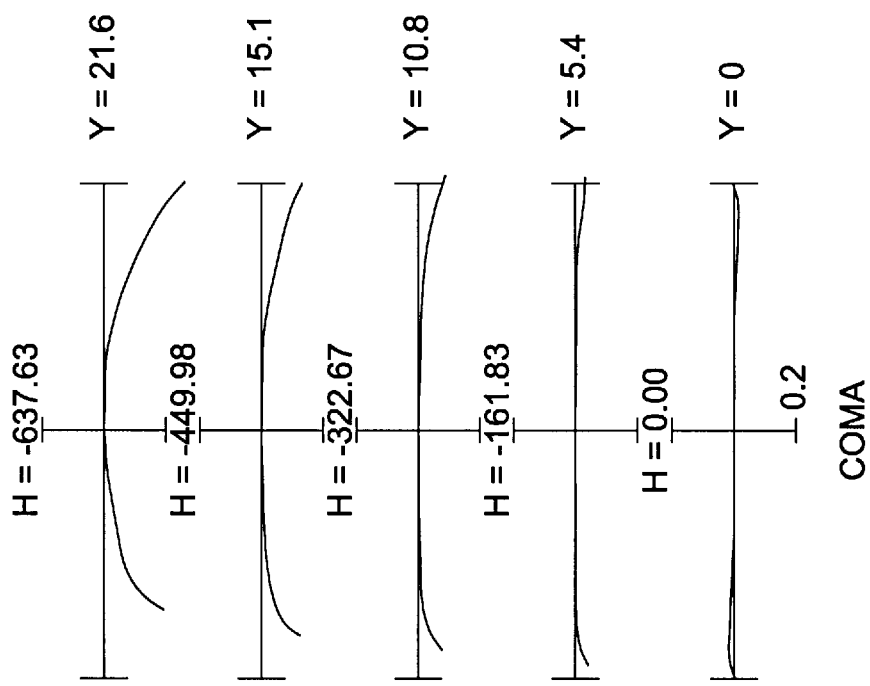
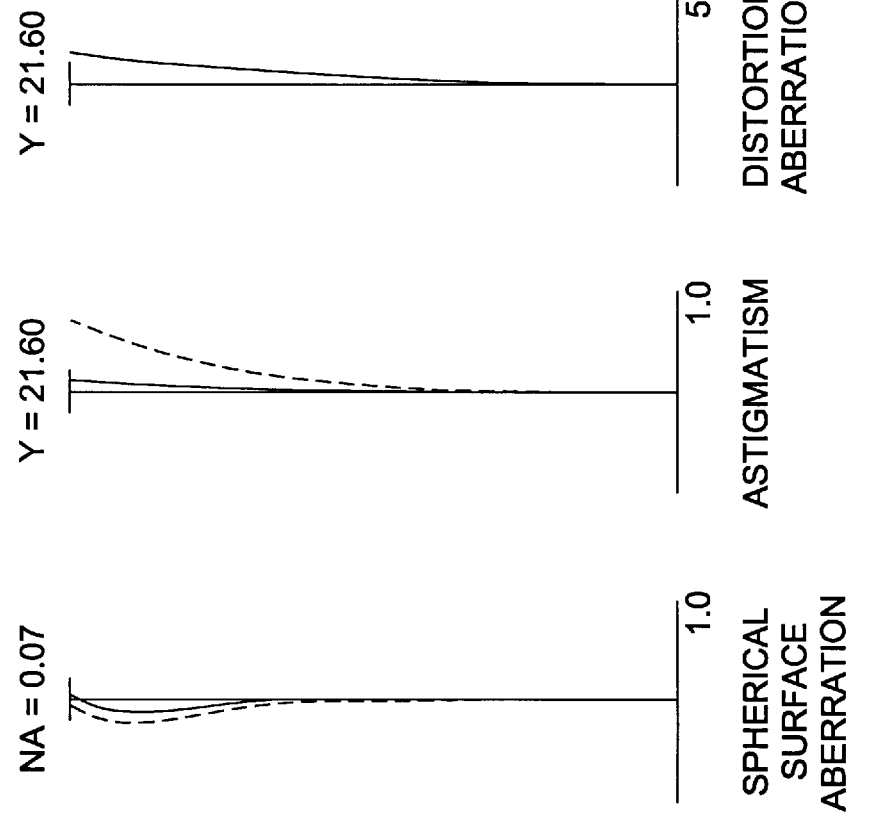
FIG. 84(a) SPHERICAL SURFACE ABERRATION
FIG. 84(b) ASTIGMATISM
FIG. 84(c) DISTORTION ABERRATION
FIG. 84(d) COMA

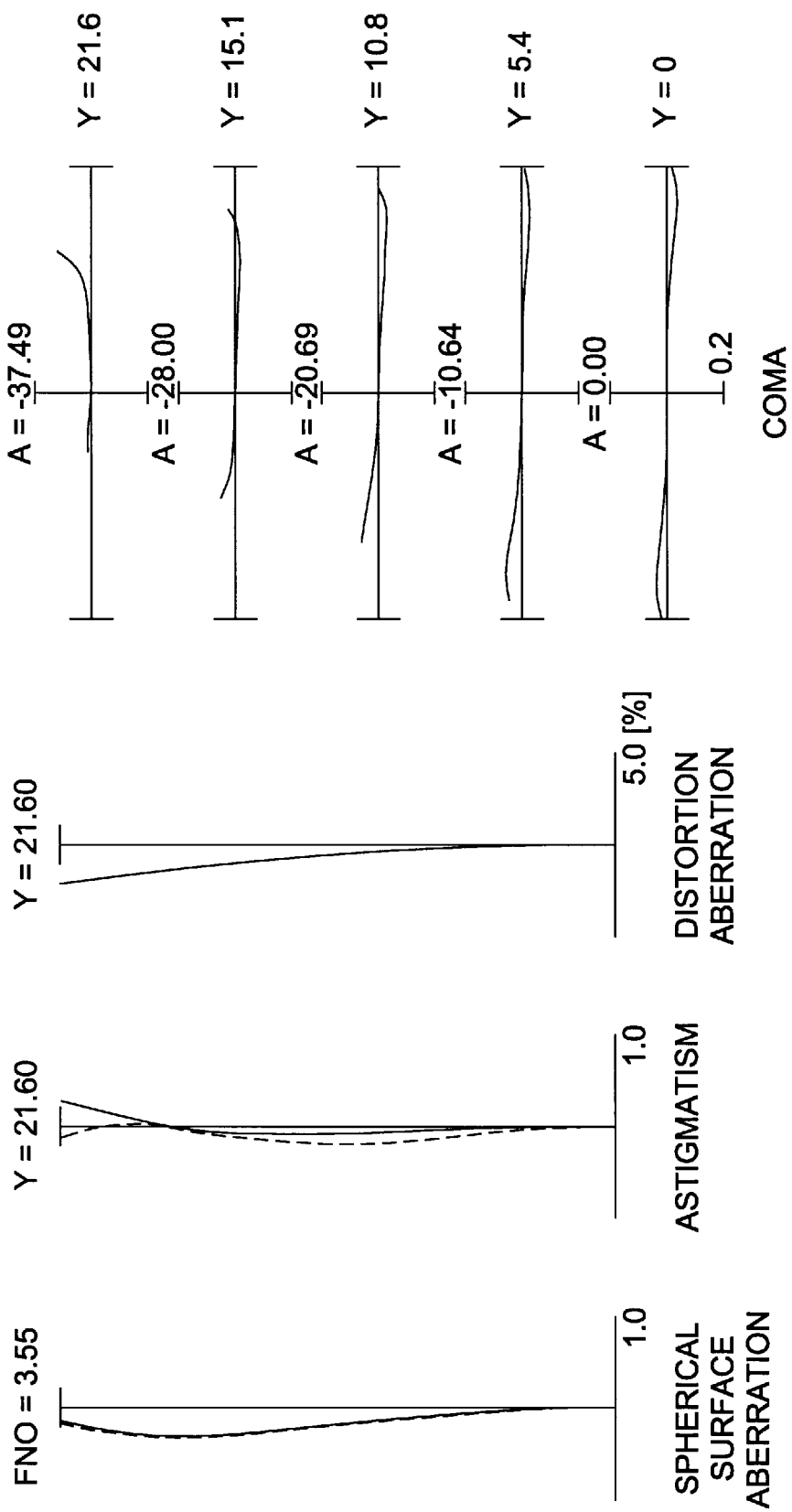

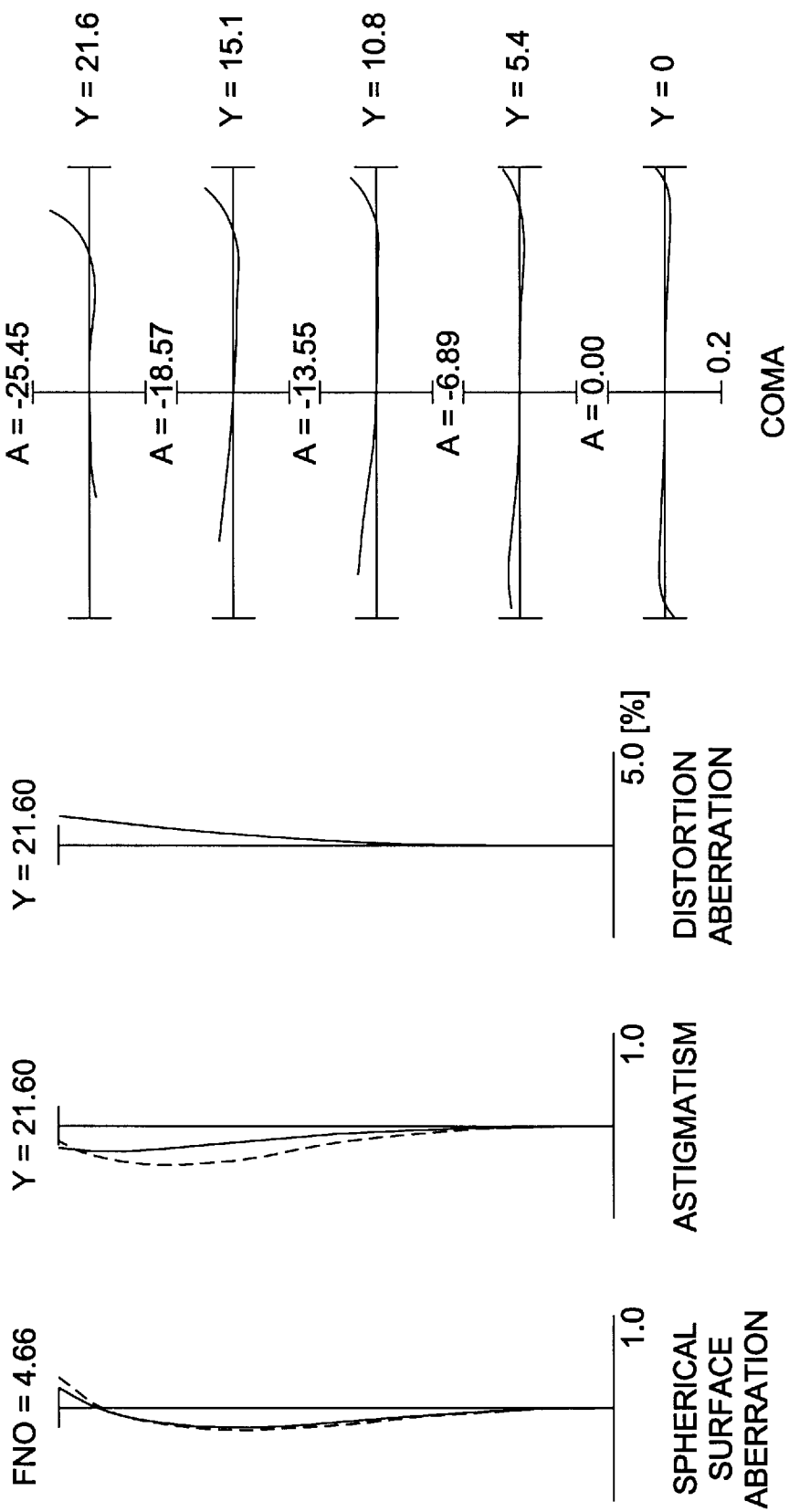

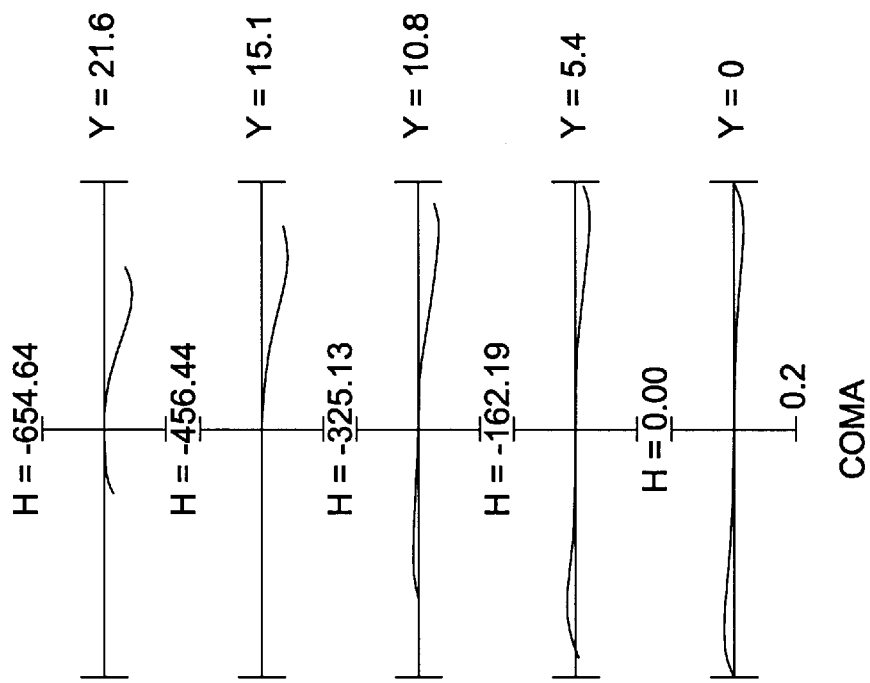
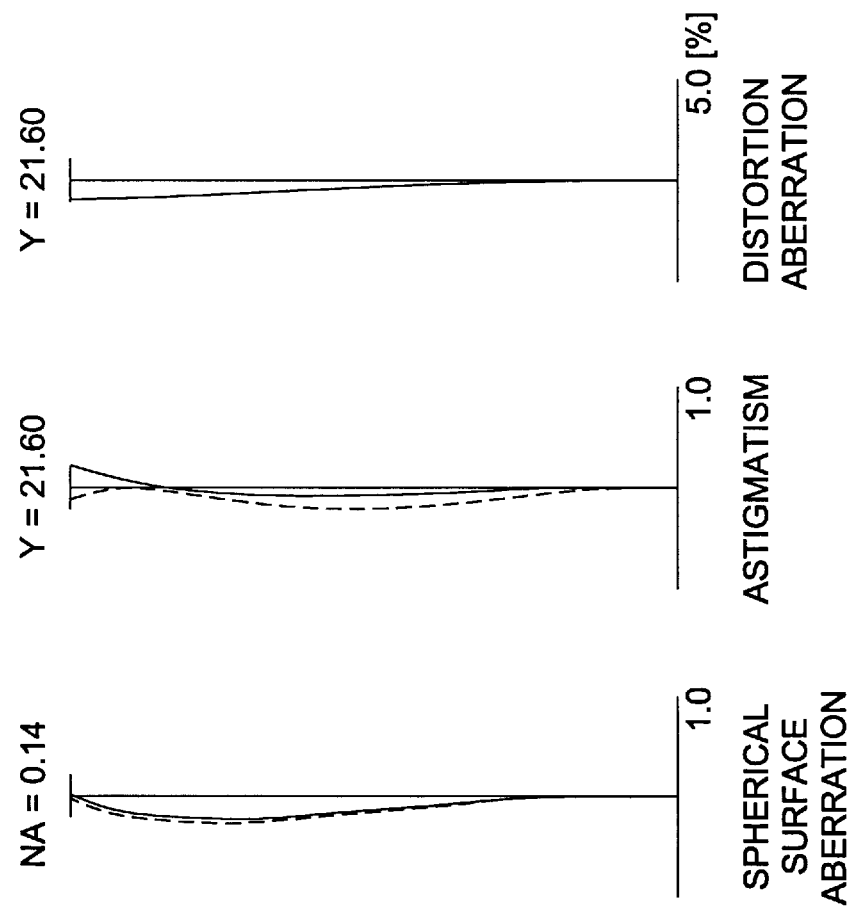
FIG. 89(a) FIG. 89(b) FIG. 89(c) FIG. 89(d)

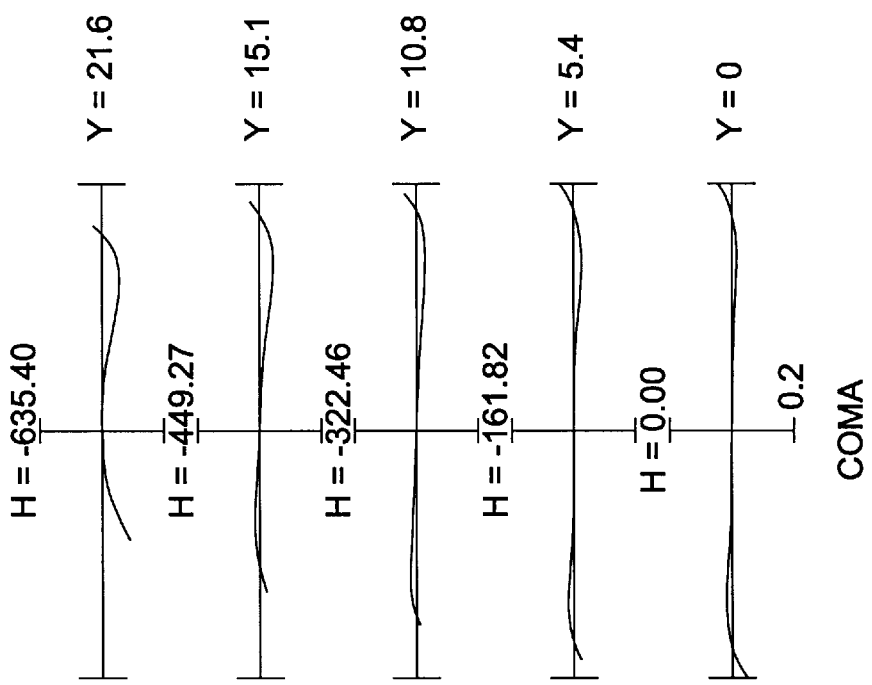
FIG. 90(d)
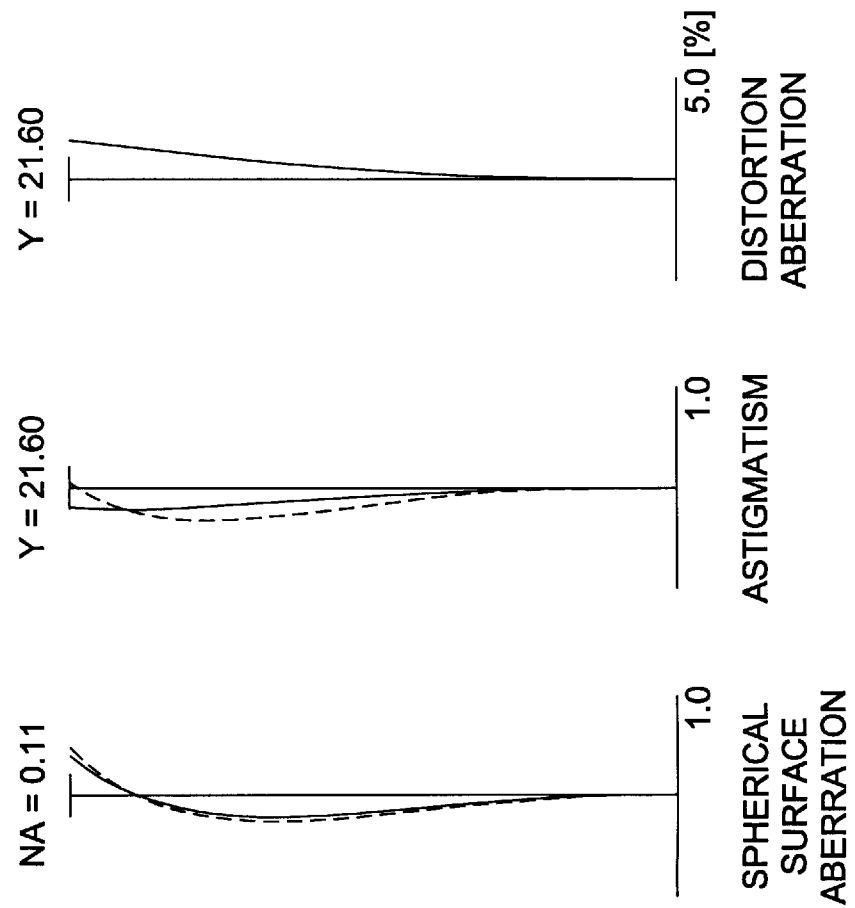
FIG. 90(c)
FIG. 90(b)
FIG. 90(a)

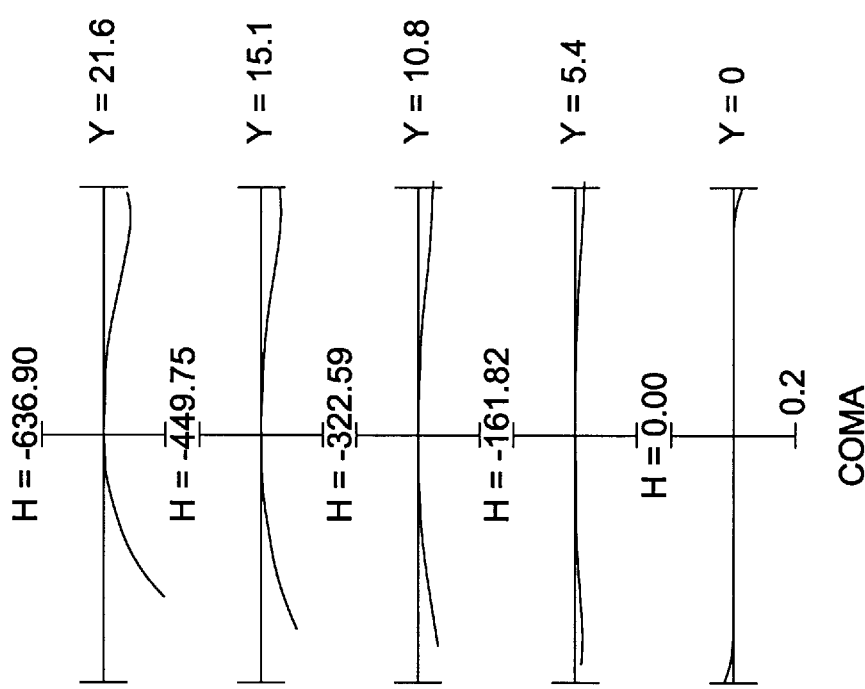
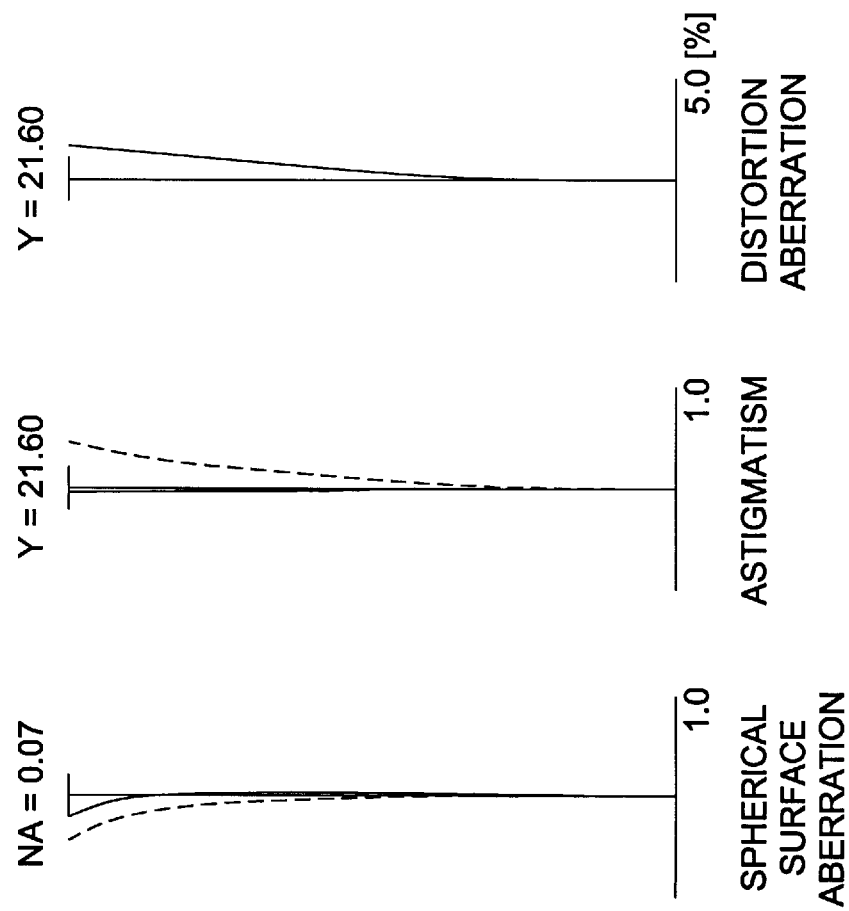
FIG. 91(a)  FIG. 91(b)  FIG. 91(c)  FIG. 91(d)

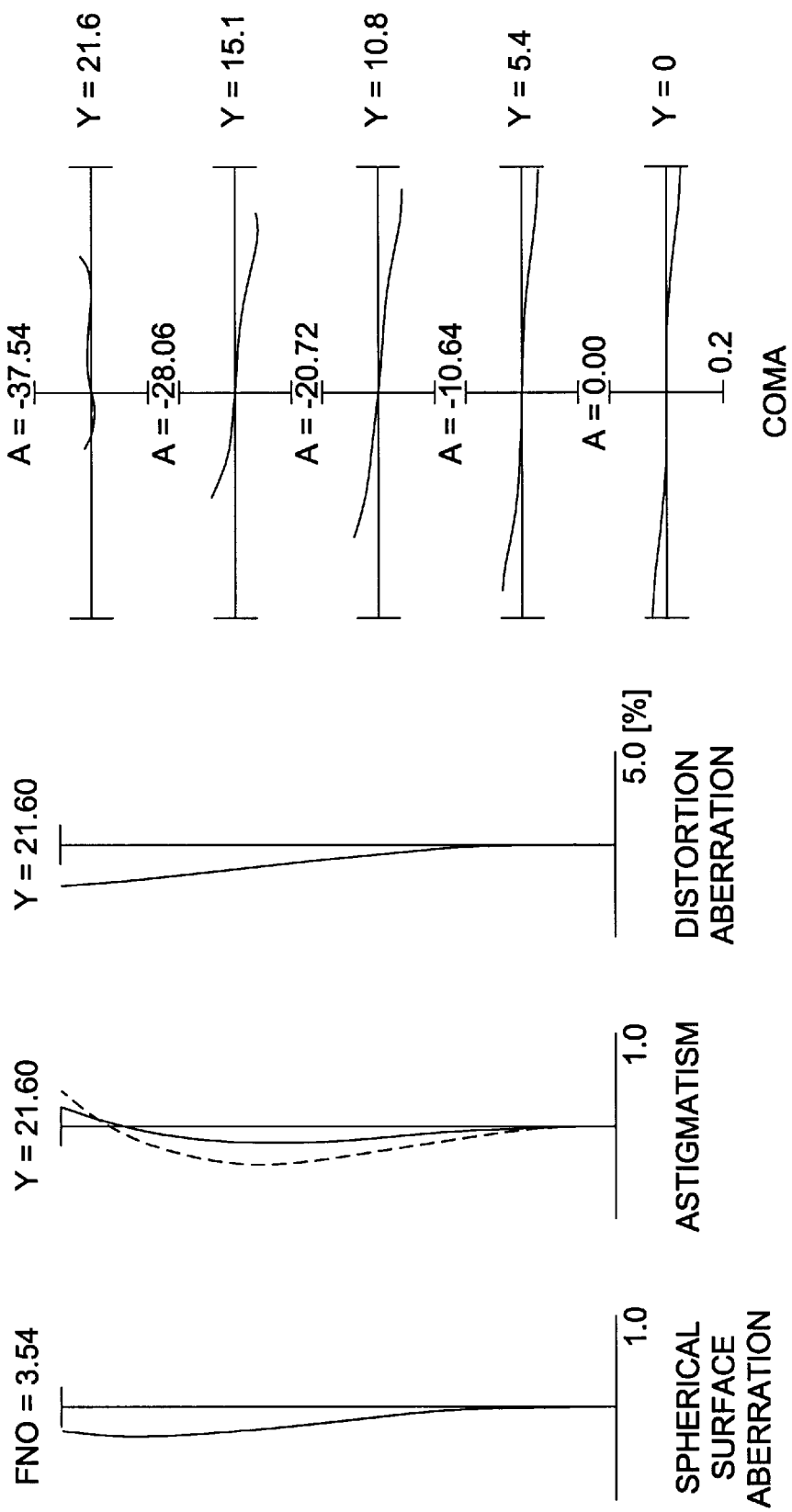

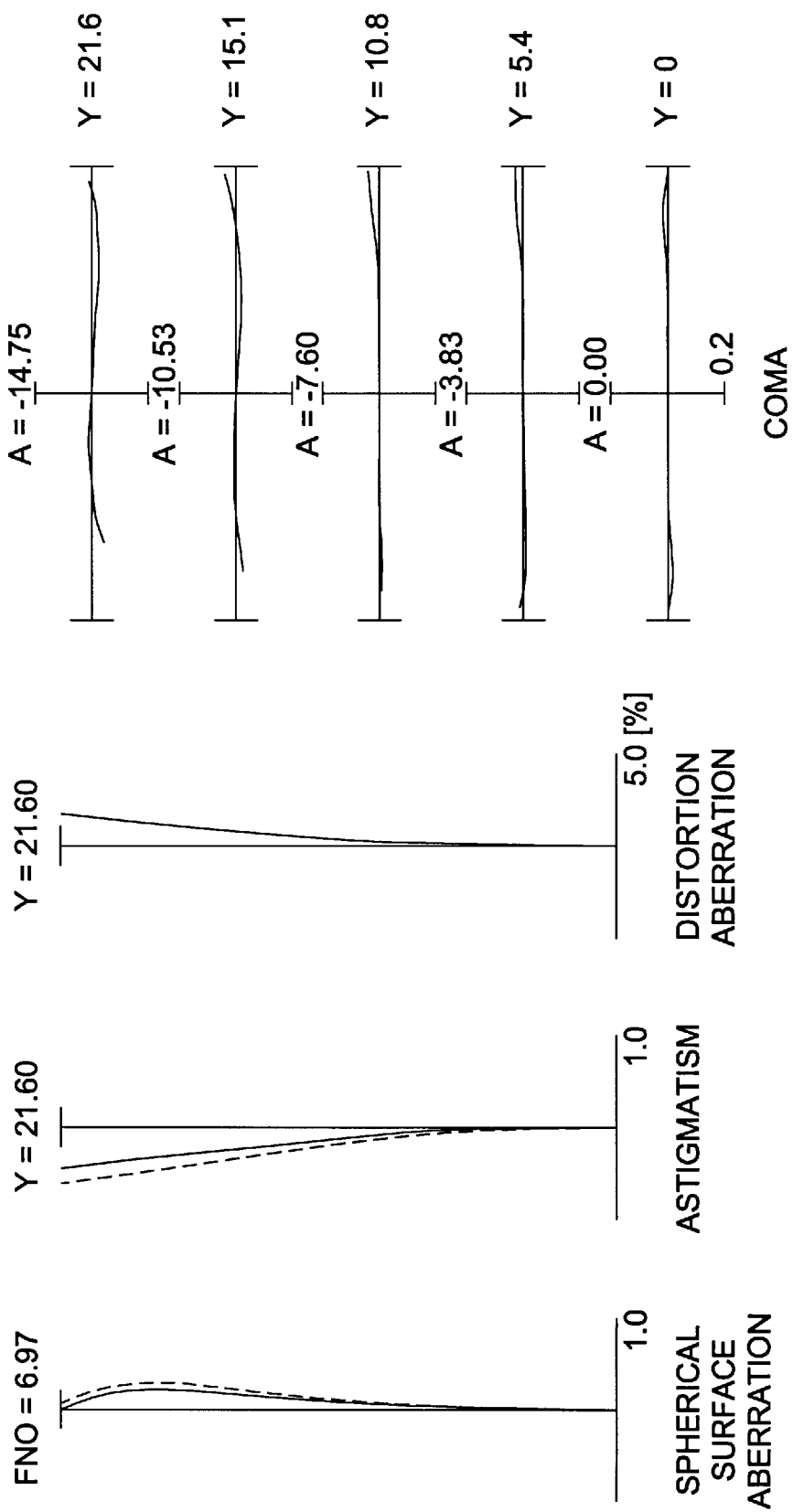

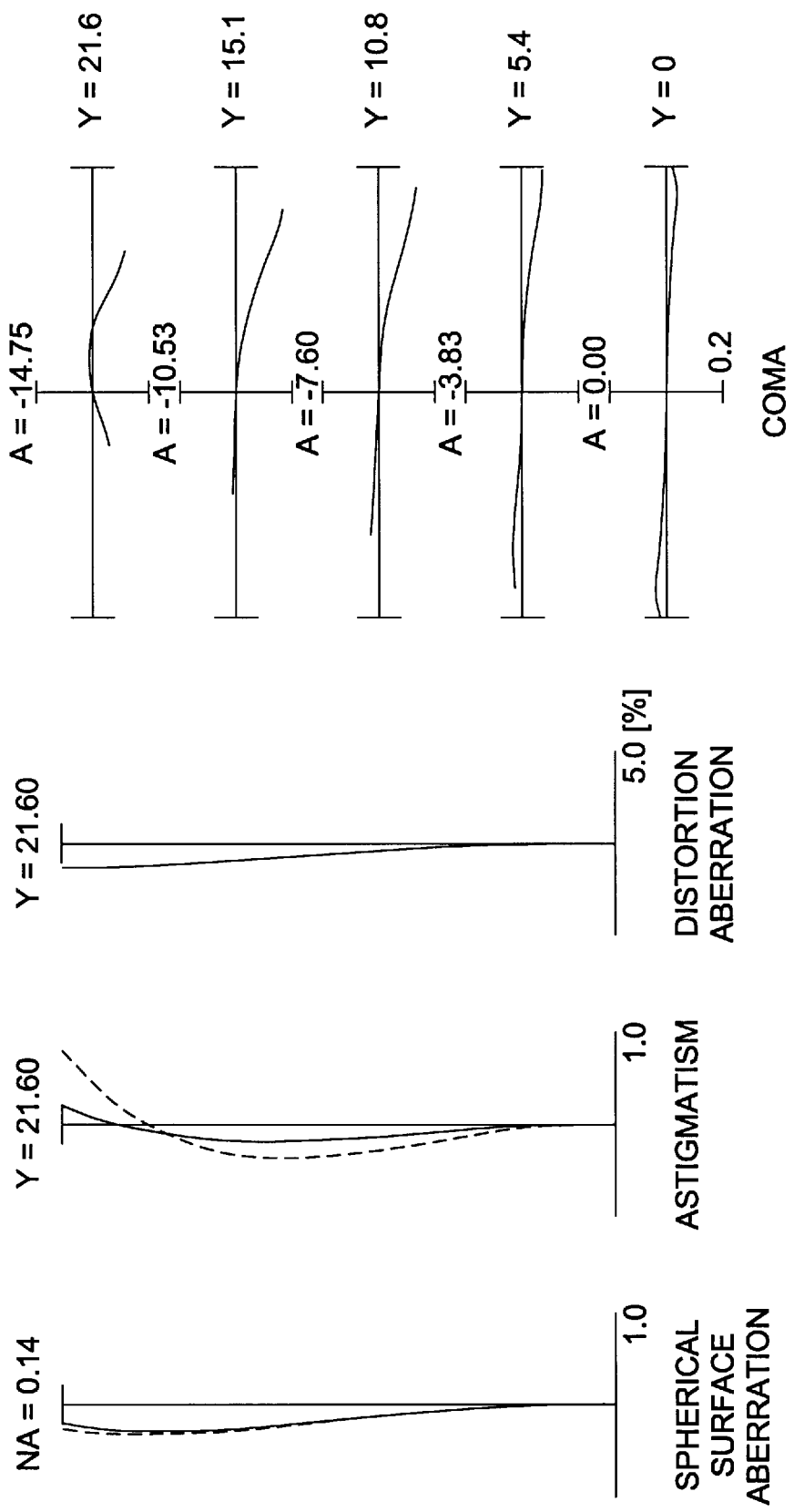
FIG. 96(a) SPHERICAL SURFACE ABERRATION
FIG. 96(b) ASTIGMATISM
FIG. 96(c) DISTORTION ABERRATION
FIG. 96(d) COMA

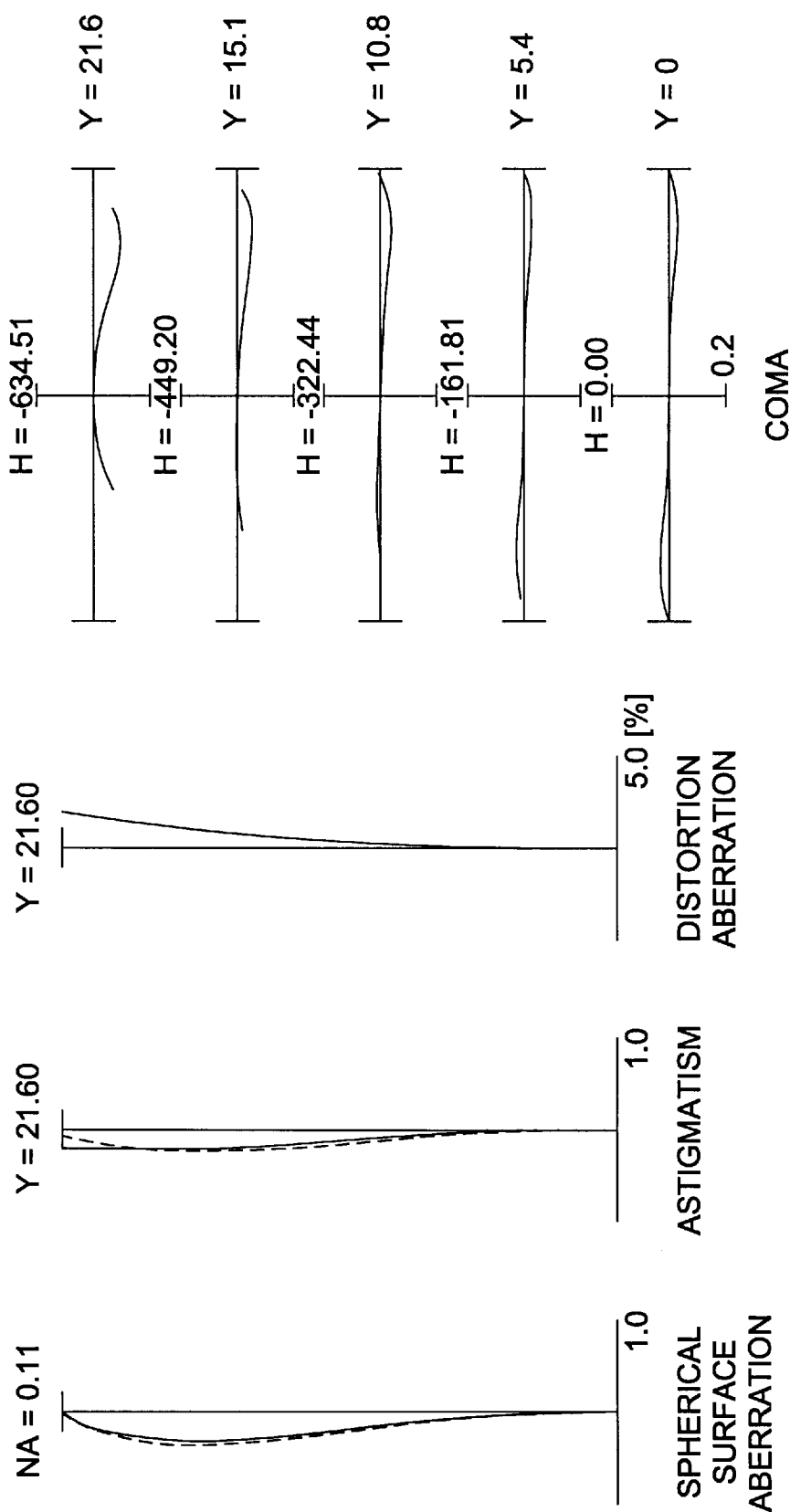

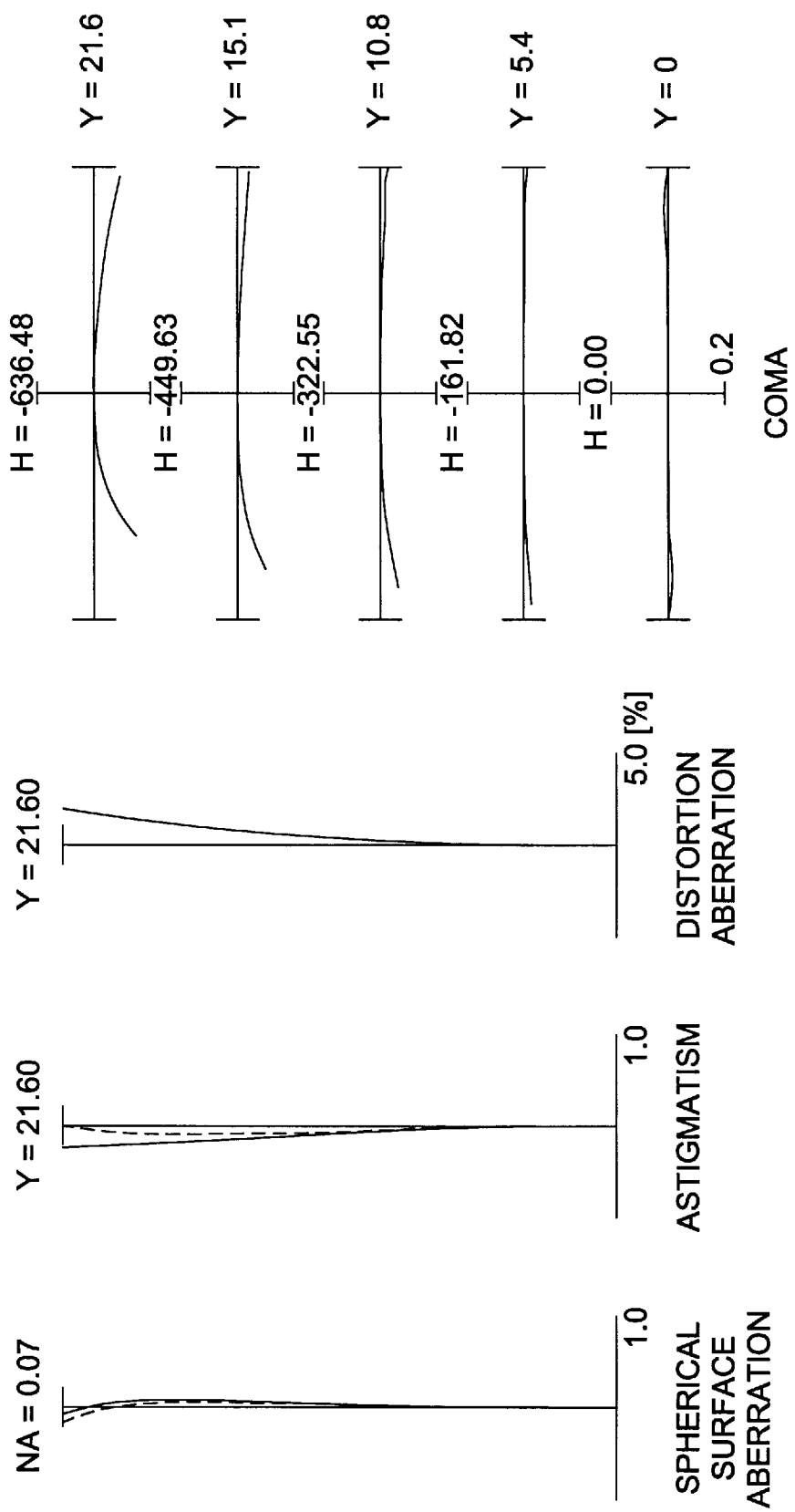

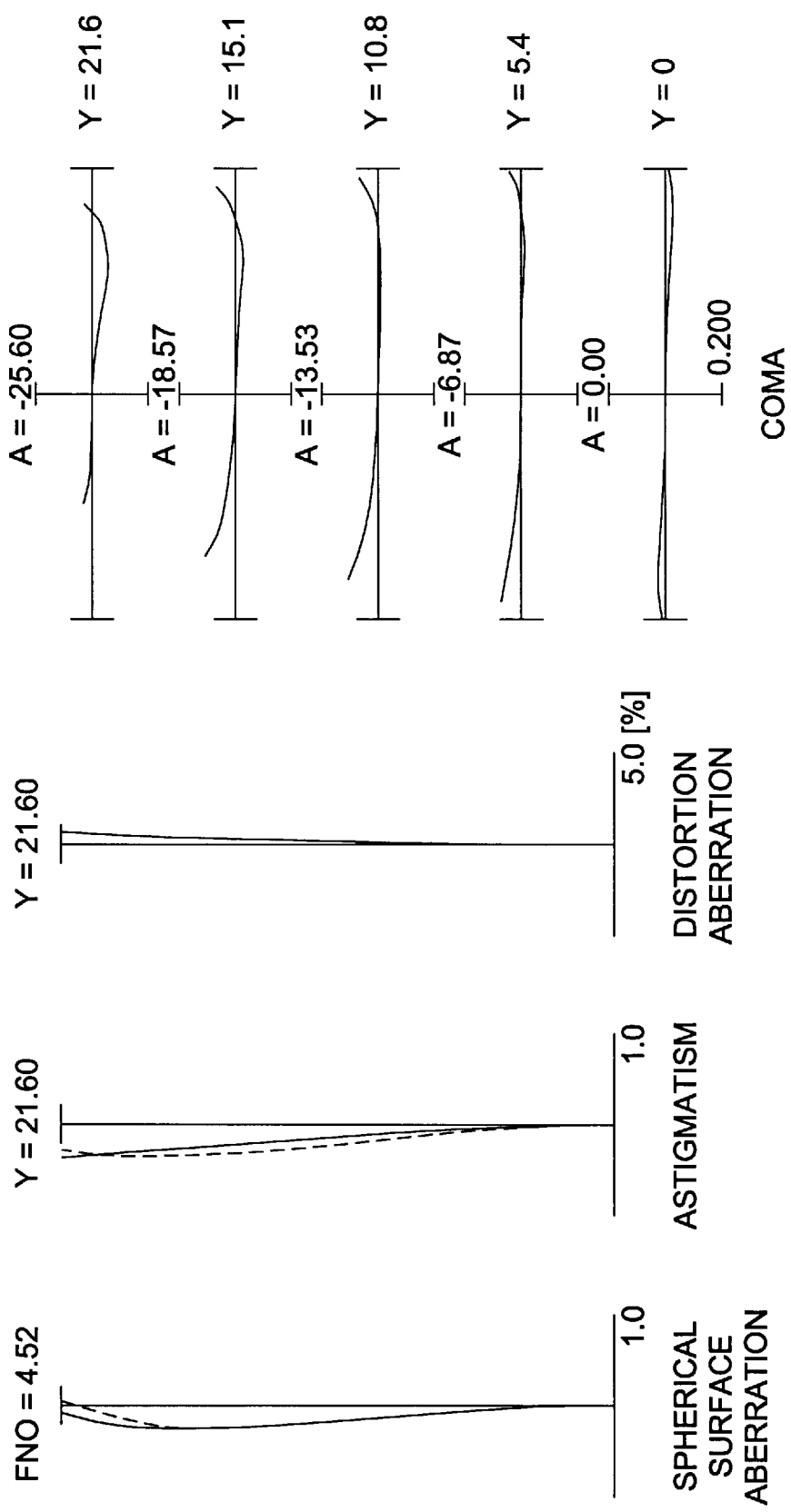

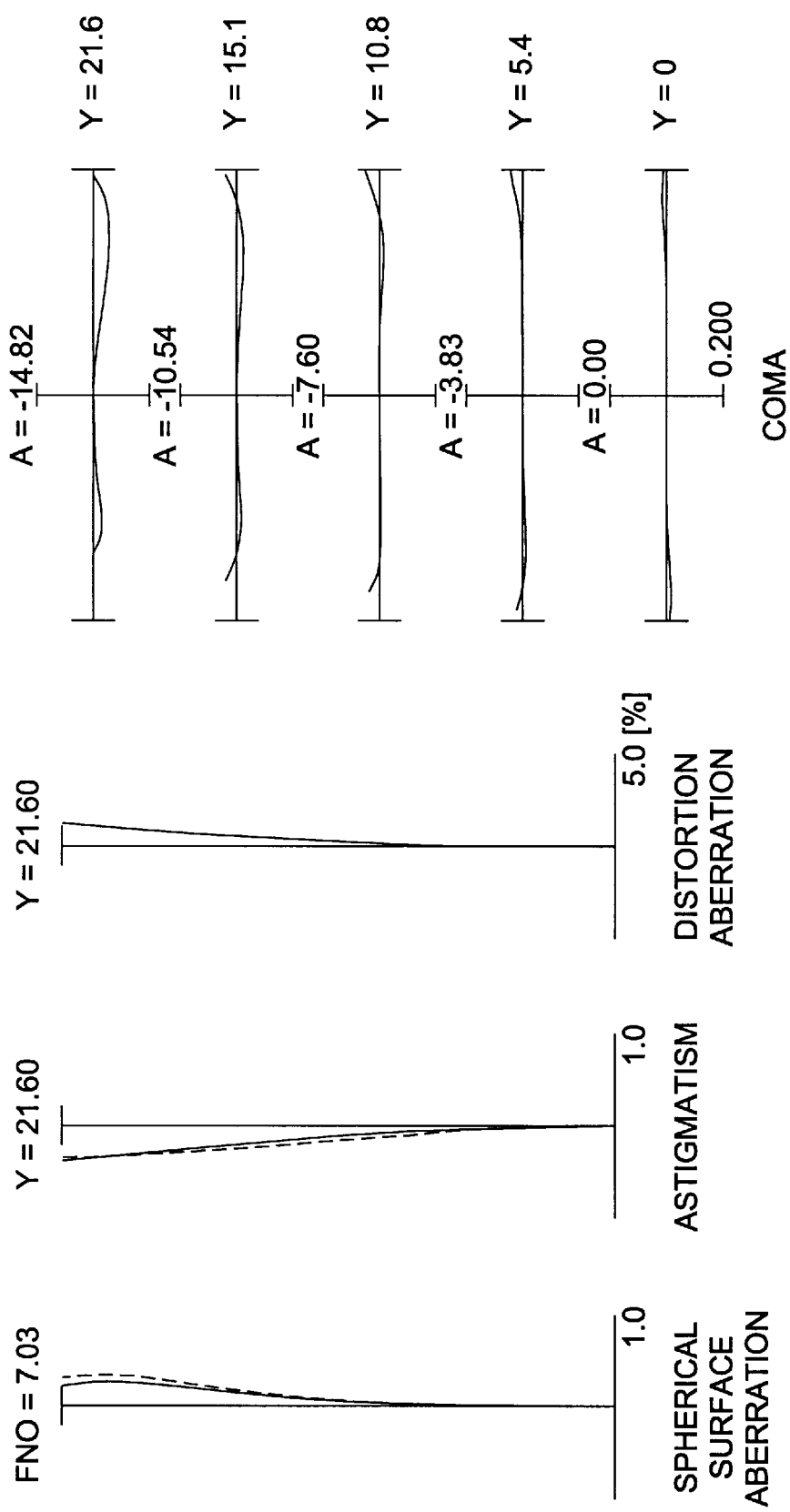

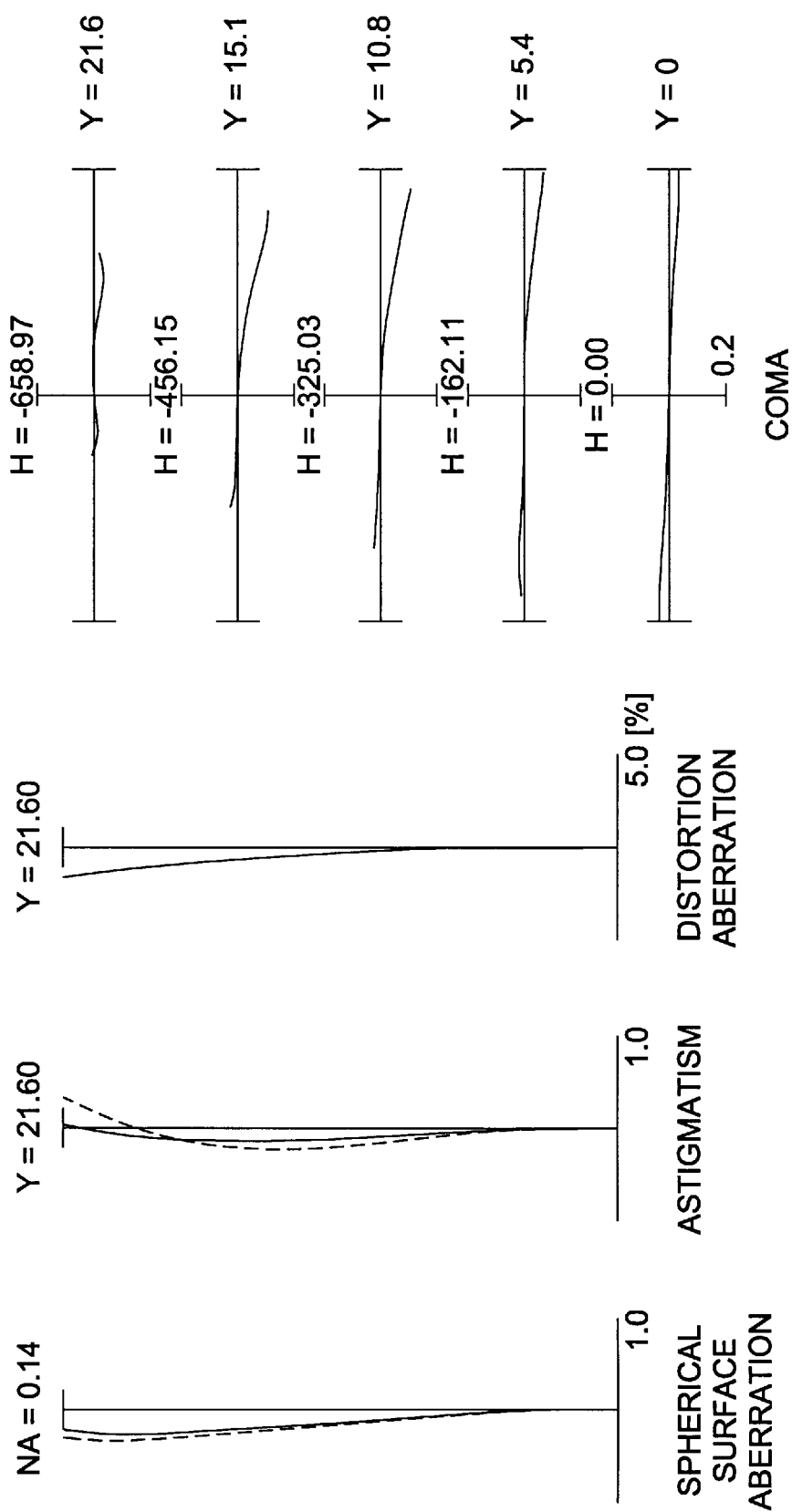

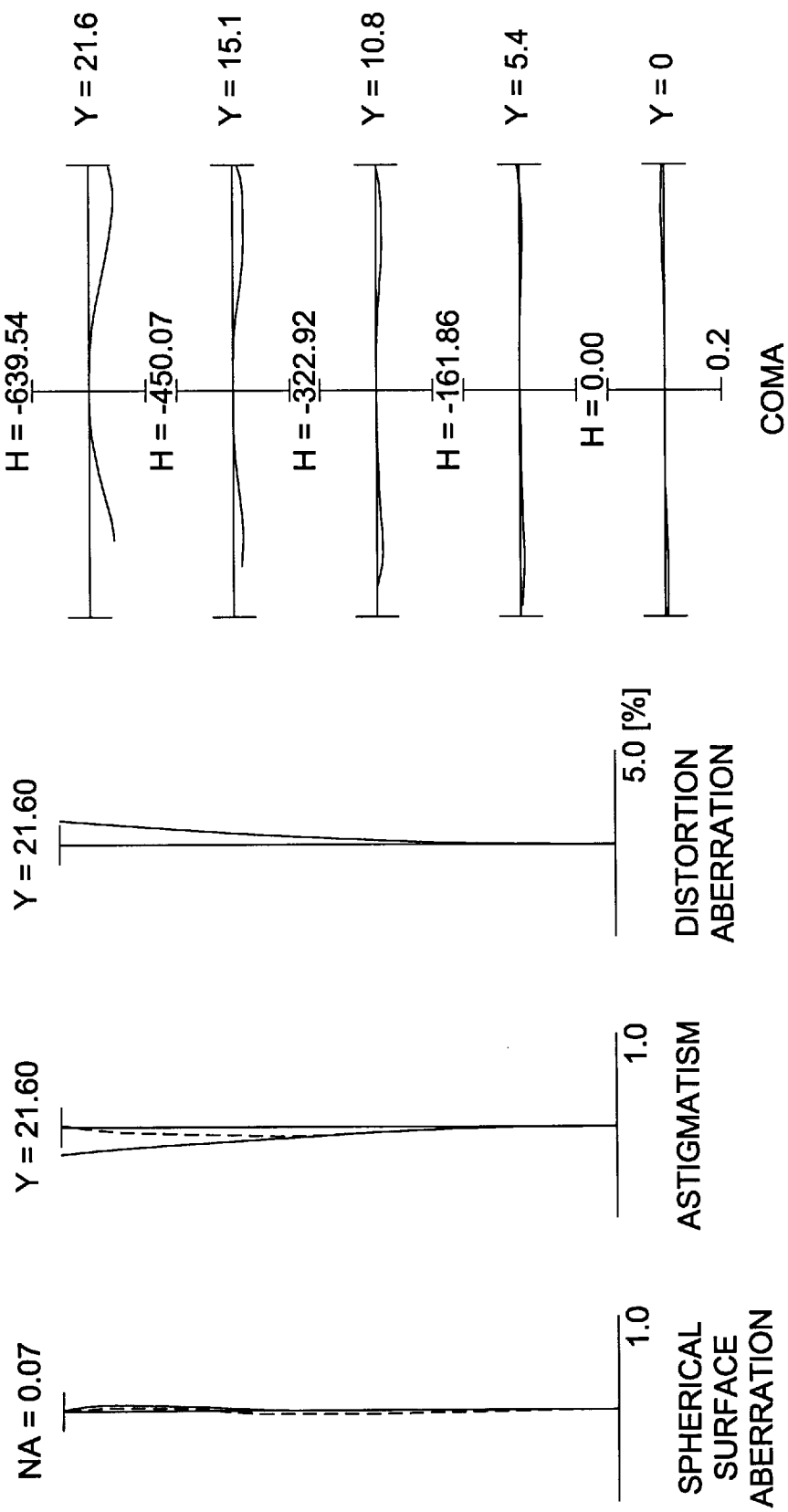

ZOOM LENS RANGING TO WIDE ANGLES

BACKGROUND OF THE INVENTION

1. Field of the Invention

The present invention relates to a wide-angle zoom lens. In particular, the wide-angle zoom lens is suitable for use with a shutter camera with no restriction in back focus.

2. Background of Related Art

Lens shutter type cameras that are equipped with zoom lenses are very common. In recent years, the number of cameras equipped with high zooming ratio zoom lenses with a zooming ratio exceeding two and a wider range of angles have increased. Lens shutter type camera bodies have become more compact and more light weight. Generally, a zoom lens is retracted in the body as the distance between each of the lens groups is minimized during each zooming, in a lens shutter type camera with a zoom lens. Consequently, minimizing the thicknesses of the lens groups and lens diameter of each lens element in a zoom lens becomes important in making a camera body more compact.

Additionally, in lens shutter type cameras equipped with a zoom lens without restrictions in back focus, the back focus can be shortened at the maximum wide-angle state by placing a negative lens group closest to the image plane of the lens system. Furthermore, attempts have been made to range to more wide angles in lens shutter type cameras with a zoom lens by causing the height of the off-axis rays passing through a negative lens group to be separated from the optical axis. Thus, correcting fluctuations in coma aberrations that accompany changes in the field angle is easier. Further, by making the back focus larger during zooming from a maximum wide-angle state to a maximum telephoto state, the change in the height of off-axis rays and off-axis aberrations fluctuations are suppressed during zooming.

A negative-positive-negative type zoom lens is a conventional zoom type lens with a high zoom ratio and with a high range for the wide angle have high zooming ratio zoom lenses with wide angles. For example, these lenses are known in Japanese Laid-Open Patent Publications Hei 2-238,416 and Sho 54-781,149. These negative-positive-negative three group zoom lenses comprise three movable lens groups. These lens groups are, in order from the object side, a first lens group having negative refractive power, a second lens group having positive refractive power, and a third lens group having negative refractive power. Furthermore, during zooming from the maximum wide-angle state to the maximum telephoto state, each lens group moves so the distance between the first lens group and the second lens group decreases, and the distance between the second lens group and the third lens group decreases.

However, with the conventional negative-positive-negative type zoom lens, the refractive power of the first lens group is weak, which causes separation of the height of an off-axis ray from the optical axis. Therefore, the off-axis aberrations and the on-axis aberrations are independently corrected. However, if a wide-angle is desired, the off-axis ray may be further separated from the optical axis. Thus, it is difficult to properly minimize lens diameter.

Moreover, in a zoom lens where negative lens groups are closest to the image side, a sufficient back focus can not be obtained at a maximum wide-angle state to achieve a wide-angle lens state. Therefore, a shadow of any debris on the rearmost lens surface can be each recorded on the film's surface.

In the zoom lens in Japanese Laid-Open Patent Publication Hei 2-238416, a field angle wider than 70° can be included at a maximum wide-angle state. However, sufficient back focus could not be obtained at the maximum wide-angle state. Thus, a shadow of any debris on the rearmost lens surface can be easily recorded on the film's surface.

Several methods for focusing at close range by moving only one of the zoom lens groups of the lens system are also known. When focusing at close distances from a far distance, the following three methods of focusing are known:

(A) the FF (front focus) method;
(B) the IF (inner focus) method; and
(C) the RF (rear focus) method.

For these methods, focusing lens unit, which moves along the optical axis for focusing at close distances, must have a small lens diameter and a small amount of movement. If these two conditions are satisfied, the lens structure is simplified, and the lens system can be made smaller.

When focusing at a close distance with known negative-positive-negative three group zoom lens, the FF method (A) and the RF method (C) can be used. However, in negative-positive-negative three group zoom lenses, the diameters of first and third lens groups would be large. Thus, the FF method (A) and RF method (C) are not suitable for compactness.

Moreover, in zooming from a maximum wide-angle state to a maximum telephoto state, the second lens group could not be used as a focusing lens group by the IF method (B), because the lateral magnification of the second lens group changes from the first range (from −1 to 0) to the second range (less than −1), and the direction of movement of the second lens group is opposite that which is needed between the first range and the second range. This is not suitable for the known methods.

Moreover, with known negative-positive-negative three group zoom lens such as disclosed in Japanese Laid-Open Patent Publication Sho 54-78149, the back focus may be restricted. Consequently, the vertical height difference between the on and off-axis rays, which pass through the third lens group at a maximum wide-angle state, is small. The change in height of the off-axis rays is small when zooming from the maximum wide-angle state to the maximum telephoto state. Therefore, the aberration correction burden on the third lens group will be small, and it will be difficult to increase the zooming ratio.

Further, as auto focus cameras have become more common, the various methods have been used for focusing at close distances. For an optimum zoom lens in an auto focus camera, the focusing lens group, which moves during focusing at close distances, must be small. Also, the work displacement (displacement×mass) during focusing at close distances must be small to improve auto-focus systems with high speed focusing and a simple structure.

In a negative-positive-negative type zoom lens, as disclosed in U.S. Pat. No. 5,268,792, the lens unit of the second lens group, which is arranged closest to the object side, is used as the focusing lens group and may be formed from a single lens. Consequently, its refractive power could not be strengthened to adequately correct fluctuations in various aberrations created during focusing. It is impossible to shorten the total length of the lens system at the maximum telephoto state, because the principal point of the second lens group is positioned on the object side.

SUMMARY OF THE INVENTION

In view of the foregoing, it is an object of the present invention to provide a wide-angle lens, which is compact, yet has a superior performance.

The description of the invention herein uses characters G1, G2 and G3 to generally represent the three lens groups, also known as lens units, meaning an optical unit that functions as a group. The term lens group is intended to include a plurality of lens elements or a single lens element. Further, the term lens element can also include known optical components, such as a prism. This is for ease and simplification of explanation purposes. The use of G1, G2 and G3 is in no way meant to limit the invention.

In order to overcome the problems described above, a wide-angle zoom lens according to one aspect of the invention can comprise, in order from the object side, a first lens group G1 having a negative refractive power, a second lens group G2 having a positive refractive power, and a third lens group G3 having a negative refractive power. During zooming from a maximum wide-angle state to a maximum telephoto state, at least the second lens group G2 and the third lens group G3 are moved toward the object side of the zoom lens so the distance between the first lens group G1 and the second lens group G2 decreases and the distance between the second lens group G2 and the third lens group G3 decreases.

With a zoom lens in which the back focus is not restricted, and which is suitable for a lens shutter type camera, positioning a negative lens group closest to the image plane is beneficial to reduce the total length of the lens system. Accordingly, the third lens group G3 having a negative refractive power is positioned closest to the image plane. Thus, the back focus at the maximum wide-angle state is shortened. Furthermore, the height of the off-axis rays that pass through the third lens group G3 are separated from the optical axis. This makes the correction of fluctuations in coma aberrations easier and also enables ranging to the wide angle.

However, when the back focus at the maximum wide-angle state is too short, the height of the off-axis rays passing through the third lens group G3 is separated from the optical axis. Thus, the diameter of the third lens group G3 must become bulkier. Consequently, it is preferable to set the back focus at a maximum wide-angle state to a value within an appropriate range.

Furthermore, by providing a large change in the back focus for zooming from the maximum wide-angle state to the maximum telephoto state, it is possible to make the height change of the off-axis rays passing through that third lens group G3 large. Therefore, adequate correction of the fluctuations in coma aberration during zooming is possible.

Where a wide-angle zoom lens is desired, off-axis rays passing through the first lens group G1 at a maximum wide-angle state are substantially separated from the optical axis, if the first lens group G1 has positive refractive power. Moreover, the amount of light at a marginal zone decreases due to the fourth cosine law, when compared to aperture efficiency. Therefore, if the amount of light in the marginal zone is more than a predetermined amount, the diameter of frontmost lens must become larger. Thus, it is impossible to reduce the size of the lens system.

Accordingly, the off-axis rays passing through the first lens group G1 at the maximum wide-angle state should approach the optical axis. Also, the diameter of the frontmost lens should be smaller, by having the first lens group G1 with a negative refractive power positioned closest to the object side. Thus, the correction of distortion and chromatic aberrations of magnification is simplified.

Moreover, the second lens group G2 is the only lens group of the zoom lens, that has a positive refractive power.

Accordingly, the second lens group G2 should have a strong positive refractive power.

Rays remain axially oriented or on-axis to the second lens group G2 remain incident to the second lens group G2 after being dispersed by the first lens group G1. Consequently, if negative spherical aberrations are created in the second lens group G2 and are not adequately corrected, it is impossible to obtain a good performance with the zoom lens. Additionally, the incident angle to the second lens group G2 of the off-axis rays change dramatically during zooming, while the height of the off-axis rays passing through the second lens group G2 does not substantially change. Consequently, it is necessary to adequately correct the fluctuations in the off-axis aberrations created in the second lens group G2.

When the dispersion working of the first lens group G1 becomes strong, the angle of the on-axis rays incident to the second lens group G2 at the maximum wide-angle state becomes smaller. It is thus possible to control fluctuations in the off-axis aberrations for the second lens group G2. However, because the off-axis rays incident to the second lens group G2 diverge, it is difficult to correct adequately negative spherical aberrations created in the second lens group G2. Conversely, as the dispersion effect of the first lens group G1 becomes weaker, it becomes difficult to control fluctuations in the off-axis aberrations in the second lens group G2.

Therefore, it is important to find a proper value for ratio of the focal length of the first lens group G1 and the focal length of the second lens group G2 to obtain good performance of the zoom lens.

The Petzval sum is as a known standard for a correction condition of curvature of the image plane to correct aberrations of a lens system. The Petzval sum is the sum of values obtained by dividing the refractive power of each lens surface by its respective refractive index. In general, negative image plane warping is large when the Petzval sum is a large positive value. Conversely, positive image plane warping is large when the Petzval sum is a large negative value.

With wide-angle lenses, the field angle is wide, and adequate performance is required at the center of the picture and at the marginal zones of the picture. Accordingly, it is necessary to correct the image plane warping by forming a zoom lens with a Petzval sum having a predetermined value.

Further, according to one aspect of the invention with the focal length f1 of the first lens group G1, the focal length f3 of the third lens group G3, the back focus at a maximum wide-angle state Bwf, the back focus at a maximum telephoto state Bft, the focal length fw of the totality of lens system at a maximum wide-angle state, and the focal length ft of the totality of the lens system at a maximum telephoto state, the zoom lens should satisfy the following conditions:

$$-0.25 < (f1 - f3)/(f1 + f3) < 0.45$$
$$0.65 < (Bft - Bfw)/(ft - fw) < 0.9$$
$$0.65 < |f1|/(fw \times ft)^{1/2} < 0.925$$

Further, the following conditions may be satisfied:

$$-0.75 < f2/f1 < -0.5$$

$$0.15 < (d23w - d23t)/(d12w - d12t) < 0.6,$$

where f2 is the focal length of the second lens group G2, d23w is an axial distance between the second lens group G2 and the third lens group G3 at a maximum wide-angle state, d23w is an axial distance between the second lens group G2 and the third lens group G3 at a maximum telephoto state, d12w is an axial distance between the first lens group G1 and the second lens group G2 at a maximum wide-angle state, and d12t is an axial distance between the first lens group G1 and the second lens group G2 at a maximum telephoto state.

In order to overcome above-stated problems, a wide-angle zoom lens according to another aspect of the invention can comprise, in order from the object side, a first lens group G1 having a negative refractive power, a second lens group G2 having a positive refractive power, and a third lens group G3 having a negative refractive power. During zooming from a maximum wide-angle state to a maximum telephoto state, each lens group moves toward the object side of the zoom lens so the distance between the first lens group G1 and the second lens group G2 decreases, and the distance between the second lens group G2 and the third lens group G3 decreases. The second lens group can comprise, in order from object side of the zoom lens, a lens group G2a having a positive refractive power, a lens group G2b having a positive refractive power, wherein focusing on objects at close distance is caused the lens group G2b moving along the optical axis. Further, with an imaging magnification β2bw of the lens group G2b at a maximum wide-angle state and an imaging magnification β2bt of the lens group G2b at the maximum telephoto state, the zoom lens can satisfy the following condition:

$$(\beta 2bw \times \beta 2bt)^{1/2} < 0.45$$

Further, the zoom lens can satisfy the following conditions:

$$0.85 < f2b/(fw \times ft)^{1/2} < 1.20$$

$$0.65 < |f1|/(fw \times ft)^{1/2} < 0.925,$$

where, f1 is the focal length of the first lens group G1, f2b is the focal length of the second lens group G2, fw is the total focal length of the lens system at a maximum wide-angle state, and ft is the total focal length of the lens system at a maximum telephoto state.

In order to overcome the above-described problems, a wide-angle zoom lens according to yet another aspect of the invention can comprise, in order from the object side, a first lens group G1 having a negative refractive power, a second lens group G2 having a positive refractive power, and a third lens group G3 having a negative refractive power. During zooming from maximum wide-angle state to a maximum telephoto state, at least the second lens group G2 and the third lens group G3 move toward the object side of the zoom lens so that the distance between the first lens group G1 and the second lens group G2 decreases and the distance between the second lens group G2 and the third lens group G3 decreases. Further, with the focal length f1 of the first lens group G1, the focal length of the third lens group f3, the lateral magnification β2w of the second lens group G2 at a maximum wide-angle state, the lateral magnification β2t of the second lens group G2 at a maximum telephoto state, the lateral magnification β3w of the third lens group G3 at a maximum wide-angle state, and the lateral magnification β3t of the third lens group G3 at a maximum telephoto state, the zoom lens should satisfy the conditions:

$$-0.75 < (f1-f3)/(f1+f3) < -0.35$$

$$0.4 < (\beta 3t/\beta 3w)/(\beta 2t/\beta 2w) < 0.75.$$

Further, the second lens group G2 can comprise a lens group G2a having a positive refractive power and a lens group G2b having negative refractive power. Therefore, the focal length f2a of the lens group G2a and the focal length f2b of the lens group G2b, the zoom lens can satisfy the following conditions:

$$0.3 < f2a/|f2b| < 0.7.$$

$$0.35 < Bfw/fw < 0.60$$

where Bfw is the back focus at a maximum wide-angle state, and fw is the focal length of the entire lens system at a maximum wide-angle state.

In order to overcome the above-described problems, a zoom lens according to yet a further aspect of the invention can comprise, in order from the object side, a first lens group G1 having a negative refractive power, a second lens group G2 having a positive refractive power, and a third lens group G3 having a negative refractive power. During zooming from a maximum wide-angle state to a maximum telephoto state, at least the second lens group G2 and the third lens group G3 move toward the object side so the distance between the first lens group G1 and the second lens group G2 decreases, and the distance between the second lens group G2 and the third lens group G3 decreases. The second lens group G2 has, in order from object side, a lens group G2a having a positive refractive power, a lens group G2b having a positive refractive power, and a lens group G2c having a negative refractive power. Focusing on objects at close distances is caused by moving the lens group G2b along the optical axis. The imaging magnification βbt of the lens group G2b at the maximum telephoto state satisfies the condition:

$$(\beta bt)^2 < 0.5.$$

Further, the zoom lens can satisfy the conditions:

$$1 < f2b/fw < 3$$

$$-0.8 < (f1-f3)/(f1+F3) < -0.3,$$

where f2b is the focal length of lens group G2b, f1 is the focal length of the first lens group G1, f3 is the focal length of the third lens group G3, and f2 is the focal length of the entire lens system at the maximum wide-angle state.

Other objects, advantages and salient features of the invention will become apparent from the following detailed description, which, taken in conjunction with the annexed drawing, discloses preferred embodiments of the invention.

BRIEF DESCRIPTION OF THE DRAWINGS

The invention will be described in detail with reference to the following drawings in which like reference numerals refer to like elements.

FIGS. 3(a)–3(d) show various aberration diagrams for an infinite focus state at a maximum wide-angle state according to the first preferred embodiment.

FIGS. 4(a)–4(d) show various aberration diagrams for an infinite focus state at a medium focal length state according to the first preferred embodiment.

FIGS. 5(a)–5(d) show various aberration diagrams for infinite focus state at a maximum telephoto state according to the first preferred embodiment.

FIGS. 7(a)–7(d) show various aberration diagrams for an infinite focus state at a maximum wide-angle state according to the second preferred embodiment.

FIGS. 9(a)–9(d) show various aberration diagrams for an infinite focus state at a maximum telephoto state according to the second preferred embodiment.

FIGS. 11(a)–11(d) show various aberration diagrams for an infinite focus state at a maximum wide-angle state according to the third preferred embodiment.

FIGS. 13(a)–13(d) show various aberration diagrams for an infinite focus state at a maximum telephoto state according to the third preferred embodiment.

FIGS. 21(a)–21(d) show various aberration diagrams for an infinite focus state at a maximum wide-angle state according to the fifth preferred embodiment.

FIGS. 22(a)–22(b) show various aberration diagrams for an infinite focus state at a medium focal length state according to the fifth preferred embodiment.

FIGS. 23(a)–23(d) show various aberration diagrams for an infinite focus state at a maximum telephoto state according to the fifth preferred embodiment.

FIGS. 24(a)–24(d) show various aberration diagrams for a close distance focus state at a maximum wide-angle state according to the fifth embodiment.

FIGS. 25(a)–25(d) show various aberration diagrams for a close distance focus state at a medium focal length state according to the fifth preferred embodiment.

FIGS. 26(a)–26(d) show various aberration diagrams for a close distance focus state at a maximum telephoto state according to the fifth preferred embodiment.

FIGS. 29(a)–29(d) show various aberration diagrams for an infinite focus state at a medium focal length state according to the sixth preferred embodiment.

FIGS. 30(a)–30(d) show various aberration diagrams for an infinite focus state at a maximum telephoto state according to the sixth preferred embodiment.

FIGS. 31(a)–31(d) show various aberration diagrams for a close distance focus state at a maximum wide-angle state according to the sixth preferred embodiment.

FIGS. 32(a)–32(d) show various aberration diagrams for a close distance focus state at a medium focal length state according to the sixth preferred embodiment.

FIGS. 33(a)–33(d) show various aberration diagrams for close distance focus state according to the sixth preferred embodiment.

FIGS. 35(a)–35(d) show various aberration diagrams for an infinite focus state at a maximum wide-angle state according to the seventh preferred embodiment.

FIGS. 37(a)–37(b) show various aberration diagrams for an infinite focus state at a maximum telephoto state according to the seventh preferred embodiment.

FIGS. 38(a)–38(d) show various aberration diagrams for close distance focus state at a maximum wide-angle state according to the seventh preferred embodiment.

FIGS. 39(a)–39(d) show various aberration diagrams for close distance focus state at medium focal length state according to the seventh preferred embodiment.

FIGS. 40(a)–40(d) show various aberration diagrams for close distance focus state at a maximum telephoto state according to the seventh preferred embodiment.

FIGS. 42(a)–42(d) show various aberration diagrams for an infinite focus state at a maximum wide-angle state according to the eighth preferred embodiment.

FIGS. 44(a)–44(d) show various aberration diagrams for an infinite focus state at a maximum telephoto state according to the eighth preferred embodiment.

FIGS. 45(a)–45(d) show various aberration diagrams for a close distance focus state at a maximum wide-angle state according to the eighth preferred embodiment.

FIGS. 46(a)–46(d) show various aberration diagrams for a close distance focus state at a medium focal length state according to the eighth preferred embodiment.

FIGS. 50(a)–50(d) show various aberration diagrams for an infinite focus state at a maximum wide-angle state according to the ninth preferred embodiment of the invention.

FIGS. 58(a)–58(d) show various aberration diagrams for an infinite focus state at a maximum wide-angle state according to the eleventh preferred embodiment of the invention.

FIGS. 62(a)–62(d) show various aberration diagrams for an infinite focus state at a maximum wide-angle state according to the twelfth preferred embodiment of the invention.

FIGS. 63(a)–63(d) show various aberration diagrams for an infinite focus state at a medium focal length state according to the twelfth preferred embodiment of the invention.

FIGS. 64(a)–64(d) show various aberration diagrams for an infinite focus state at a maximum telephoto state according to the twelfth preferred embodiment of the invention.

FIGS. 66(a)–66(d) show various aberration diagrams for an infinite focus state at a maximum wide-angle state according to the thirteenth preferred embodiment of the invention.

FIGS. 67(a)–67(b) show various aberration diagrams for an infinite focus state at a medium focal length state according to the thirteenth preferred embodiment of the invention.

FIGS. 68(a)–68(d) show various aberration diagrams for an infinite focus state at a maximum telephoto state according to the thirteenth preferred embodiment of the invention.

FIGS. 72(a)–72(d) show various aberrations for an infinite focus state at a maximum wide-angle state according to the fourteenth preferred embodiment of the invention.

FIGS. 74(a)–74(d) show various aberrations for the infinite focus state at a maximum telephoto state according to the fourteenth preferred embodiment of the invention.

FIGS. 75(a)–75(d) show various aberrations in a photographic magnification of $-\frac{1}{30}$ at a maximum wide-angle state according to the fourteenth preferred embodiment of the invention.

FIGS. 76(a)–76(d) show various aberrations in a photographic magnification of $-\frac{1}{30}$ at medium focal length according to the fourteenth preferred embodiment of the invention.

FIGS. 77(a)–77(d) show various aberrations in a photographic magnification of $-\frac{1}{30}$ at a maximum telephoto state according to the fourteenth preferred embodiment of the invention.

FIGS. 79(a)–79(d) show various aberrations for the infinite focus state at a maximum wide-angle state according to the fifteenth preferred embodiment of the invention.

FIGS. 80(a)–80(d) show the various aberrations for the infinite focus state at medium focal length state according to the fifteenth preferred embodiment of the invention.

FIGS. 82(a)–82(d) show various aberrations in a photographic magnification of $-\frac{1}{30}$ at a maximum wide-angle state according to the fifteenth preferred embodiment of the invention.

FIGS. 83(a)–83(d) show various aberrations in a photographic magnification of $-\frac{1}{30}$ at medium focal length according to the fifteenth preferred embodiment of the invention.

FIGS. 84(a)–84(d) show various aberrations in a photographic magnification of $-\frac{1}{30}$ at a maximum telephoto state according to the fifteenth preferred embodiment of the invention.

FIG. 86(a)–86(d) show various aberrations for the infinite focus state at a maximum wide-angle state according to the sixteenth preferred embodiment of the invention.

FIGS. 87(a)–87(b) show various aberrations for the infinite focus state at medium focal length state according to the sixteenth preferred embodiment of the invention.

FIGS. 89(a)–89(d) show various aberrations in a photographic magnification of $-\frac{1}{30}$ at a maximum wide-angle state according to the sixteenth preferred embodiment of the invention.

FIGS. 90(a)–90(d) show various aberrations in a photographic magnification of $-\frac{1}{30}$ at medium focal length according to the sixteenth preferred embodiment of the invention.

FIGS. 91(a)–91(d) show various aberrations in a photographic magnification of –1/30 at a maximum telephoto state according to the sixteenth preferred embodiment of the invention.

FIGS. 93(a)–93(d) show various aberrations for the infinite focus state at a maximum wide-angle state according to the seventeenth preferred embodiment of the invention.

FIGS. 95(a)–95(d) show various aberrations for the infinite focus state at a maximum telephoto state according to the seventeenth preferred embodiment of the invention.

FIGS. 96(a)–96(d) show various aberrations in a photographic magnification of –1/30 at a maximum wide-angle state according to the seventeenth preferred embodiment of the invention.

FIGS. 97(a)–97(d) show various aberrations in a photographic magnification of –1/30 at medium focal length according to the seventeenth preferred embodiment of the invention.

FIGS. 98(a)–98(d) show various aberrations in a photographic magnification of –1/30 at a maximum telephoto state according to the seventeenth preferred embodiment of the invention.

FIGS. 101(a)–101(b) show various aberrations for the infinite focus state at a medium focal length state according to the eighteenth preferred embodiment of the invention.

FIGS. 102(a)–102(b) show the various aberrations for the infinite focus state at a maximum telephoto state according to the eighteenth preferred embodiment of the invention.

FIGS. 103(a)–103(d) show various aberrations in a photographic magnification of –1/30 at a maximum wide-angle state according to the eighteenth preferred embodiment of the invention.

FIGS. 105(a)–105(d) show various aberrations in a photographic magnification of –1/30 at a maximum telephoto state according to the eighteenth preferred embodiment of the invention.

DETAILED DESCRIPTION OF PREFERRED EMBODIMENTS

Figure 1:
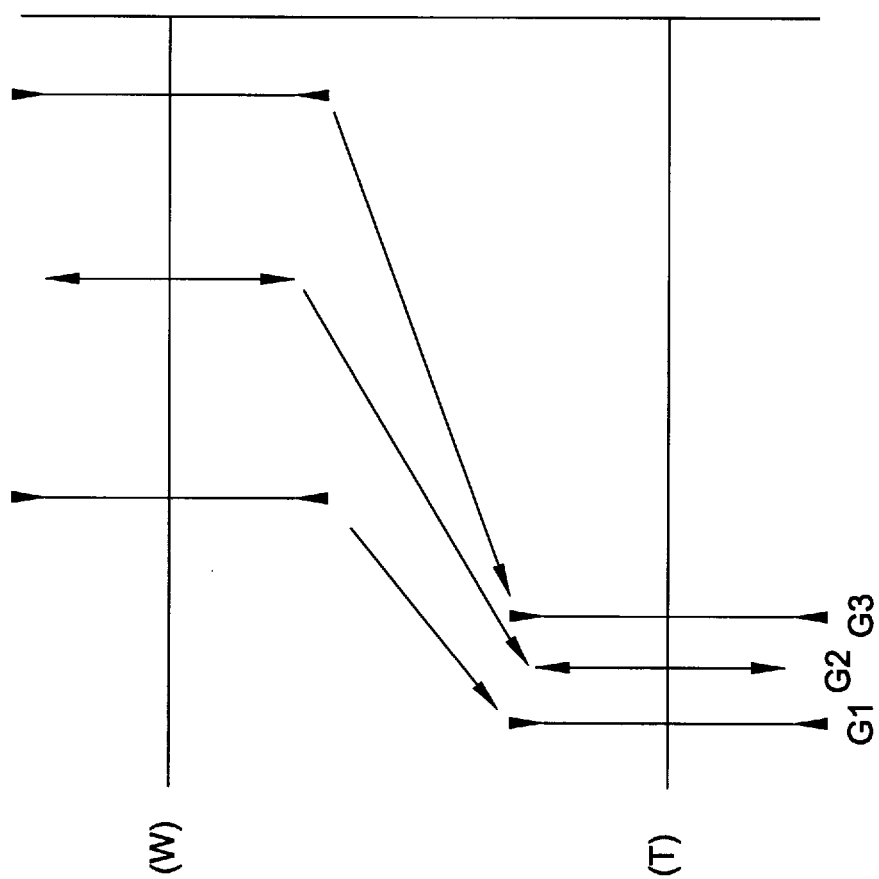
FIG. 1 shows the basic structure of a zoom lens and the movement of each lens group during zooming from a maximum wide-angle state to a maximum telephoto state for the first-fourth preferred embodiments of the invention.

The zoom lens of the first through fourth preferred embodiments of the invention comprises, in order from the object side, a first lens group G1 having a negative refractive power, a second lens group G2 having a positive refractive power, and a third lens group G3 having a negative refractive power. During zooming from a maximum wide-angle state to a maximum telephoto state, each lens group moves toward the object side of the zoom lens so the distance between the first lens group G1 and the second lens group G2 decreases, and the distance between the second lens group G2 and the third lens group G3 decreases. Further, the following conditions (1)–(3) achieve both a range with a wider angle and superior performance.

$$-0.25 < (f1 - f3)/(f1 + f3) < 0.45 \quad (1)$$
$$0.65 < (Bft - Bfw)/(ft - fw) < 0.9 \quad (2)$$
$$0.65 < |f1|/(fw \times ft)^{1/2} < 0.925 \quad (3)$$

where f1 is the focal length of the first lens group G1, f3 is the focal length of the third lens group G3, Bfw is the back focus at a maximum wide-angle state, Bft is the back focus at a maximum telephoto state, fw is the total focal length of the lens system at a maximum wide-angle state, and ft is the total focal length of the lens system at a maximum telephoto state.

Condition (1) balances the focal length of the first lens group G1 and the focal length of the third lens group G3. If the upper limit of condition (1) is exceeded, a divergence effect by first lens group G1 would become too small, and a sufficient back focus could not be obtained at a maximum wide-angle state. Therefore, the diameter of the rearmost lens would become too large. Moreover, lens system symmetry would be destroyed, and positive distortion aberrations could not be controlled.

On the other hand, if the lower limit of conditional equation (1) is not reached, an off-axis rays that passes through first lens group G1 at a maximum wide-angle state, would approach the optical axis. Therefore, the diameter of the frontmost lens would be smaller, and at the same time the diameter of the rearmost lens would also be smaller to obtain sufficient back focus. However, a reduction in size of the lens system could not be achieved, because the lens systems total length at a maximum telephoto state would become too large.

Condition (2) equation defines the total length change of the lens system during zooming from a maximum wide-angle state to a maximum telephoto state and defines the variation of the lateral magnification of the third lens group from the maximum wide angle state to the maximum telephoto state. If the upper limit of condition (2) is exceeded, the variation of the lateral magnification of third lens group G3 during zooming would become too large. Thus, the off-axis aberration fluctuations generated by the third lens group G3 during zooming could not be controlled. on the other hand, if the lower limit of condition (2) is not reached, a change in the lateral magnification of the second lens group G2 during zooming would become large. Thus, the ratio representing the contribution of third lens group G3 during zooming would become small. Moreover, the off-axis aberration fluctuations generated by second lens group G3 during zooming could not be controlled.

In general, in a zoom lens where a negative lens group is closest to the image side and an aperture stop is close to the object side, the divergence by the negative lens group becomes larger with an increased ray distance from the optical axis. Thus, a diameter of an exit pupil in a region away from the axis becomes smaller, compared to one in a region near the axis because the exit pupil away from the axis is closer to the image plane. As a result, the actual amount of light in the marginal zone would become smaller than an amount of light in the marginal zone, even when there is no vignetting of the light rays.

The zoom lens also has the third lens group G3, with a negative refractive power, placed closest to the image plane in the lens system. A decrease in the amount of light in the marginal zone computed by fourth cosine law becomes substantial, because the field angle exceeds 70° at a maximum wide-angle state. To obtain a sufficient amount of light in the marginal zone, the back focus at a maximum wide-angle state would be large, and off-axis rays that pass through the third lens group G3 would approach the optical axis for controlling positive distortion aberrations generated by the third lens group G3. This would also control a shift of the exit pupil position in the regions near and far from the optical axis.

Condition (3) defines a proper range for the focal length of first lens group G1. To obtain a sufficient back focus at a maximum wide-angle state, the focal length of the lens group G1 must have a proper length. Thus, if the upper limit of condition (3) is exceeded, the size of the focal length f1 of the first lens group G1 would become too large and a sufficient back focus could not be obtained.

On the other hand, if the lower limit of the condition (3) is not reached, the focal length f1 of the lens group G1 becomes too small and an off-axis ray that passes through the first lens group G1 at a maximum wide-angle state, would approach the optical axis. Thus, off-axis and on-axis aberrations could not be independently corrected and the coma fluctuations due to the field angle could not be controlled.

To obtain a good performance of the zoom lens, and to reduce the size of the lens system at a maximum telephoto state, the upper limit of condition (3) should be to 0.9. Moreover, to obtain a superior performance and a high zoom ratio, the zoom lens should satisfy conditions (4) and (5):

$$-0.75 < f2/f1 < -0.5 \quad (4)$$

$$0.15 < (d23w - d23t)/(d12w - d12t) < 0.6 \quad (5)$$

where f2 is a focal length of the second lens group G2, d23w is the axial distance between the second lens group and the third lens group at a maximum wide-angle state, d23t is the axial distance between the second lens group and the third lens group at a maximum telephoto state, d12w is the axial distance between the first lens group and the second lens group at a maximum wide-angle state, d12t is the axial distant between first lens group and second lens group at a maximum telephoto state, where the axial distances are measured on the optical axis.

Condition (4) defines a range for a ratio of the first lens group G1 focal length and the second lens group G2 focal length. As described above, to obtain a superior performance, while maintaining high zoom ratio, a balance should be maintained between the focal lengths of first lens group G1 and second lens group G2.

If the lower limit of condition (4) is not reached, the focal length of first lens group G1 would become a small negative value or the focal length of second lens group G2 would become a large positive value. If the focal length of first lens group G1 becomes small negative value, an off-axis ray that passes through first lens group G1 would approach the optical axis at a maximum wide-angle state. Thus, coma fluctuations caused by a field angle could not be controlled. On the other hand, if the focal length of second lens group G2 becomes a large positive value, the total length of the lens system would become too large. The lens system could not then have a reduced size.

If the upper limit of condition (4) is exceeded, the focal length of first lens group G1 would become a large negative value or the focal length of second lens group G2 would become a small positive value. If the focal length of first lens group G1 becomes a large negative value, an off-axis ray that passes through first lens group G1 would be separated from the optical axis at a maximum wide-angle state. Thus, coma fluctuation caused by a field angle could be controlled satisfactorily. However, the diameter of the lens would become too large to obtain the predetermined amount of light in the marginal zone. On the other hand, if the focal length of second lens group G2 becomes a small positive value, the negative spherical surface aberrations generated by second lens group G2 could not be corrected. Thus, to provide a small diameter of the lens at a maximum wide-angle state, the upper limit of condition (4) should be −0.52.

Condition (5) defines a proper range for ratio of the axial change amount between the first lens group G1 and second lens group G2 and the axial change amount between second lens group G2 and third lens group G3, during zooming from a maximum wide-angle state to a maximum telephoto state. With condition (5), a balance is maintained during zooming between the variation of the lateral magnification in the second lens group G2 and third lens group G3. Particularly, the balance is regulated so the axial change amount between first lens group G1 and second lens group G2 is larger than the axial change amount between second lens group G2 and third lens group G3. Thus, a sufficient back focus can be obtained at a maximum wide-angle state.

If the upper limit of condition (5) is exceeded, the variation of the lateral magnification of the third lens group G3 would become too large. Thus, the off-axis aberration fluctuation generated by the lens group G3 zooming could not be controlled. Moreover, a sufficient back focus could not be obtained at a maximum wide-angle state.

Conversely, if the lower limit of condition (5) is not reached, the variation of the lateral magnification of the third lens group G3 would become too large, and the incident angle of an off-axis ray of lens group G2 would undergo substantial changes from a maximum wide-angle state to a maximum telephoto state. However, the height at which an off-axis ray passes through the third lens group G3 would change very little. Therefore, the off-axis aberration fluctuation could not be controlled.

Moreover, to make the diameter of the lens even smaller, an aperture stop could be placed in or adjacent the second lens group G2. In particular, by placing the aperture stop between second lens group G2 and third lens group G3, the diameter of the stop can be made even smaller.

The invention according to the first-fourth preferred embodiments is capable of thoroughly controlling the aberration fluctuations generated during an image blur, when the image shift is executed by properly moving or decentering one or a multiplicity of lens groups, which comprise the zoom lens, in a direction substantially orthogonal to the optical axis. Moreover, the first lens group G1 or the third lens group G3 can be moved to obtain better performance. Also, focusing can be executed by moving a part of the second lens group G2.

Hereafter, each of the first through fourth preferred embodiments of the invention will be described based on the attached drawings.

FIG. 1 shows a zoom lens and the movement of each lens group during zooming from a maximum wide-angle state (W) to a maximum telephoto state (T) according to the first-fourth preferred embodiments.

Figure 2:
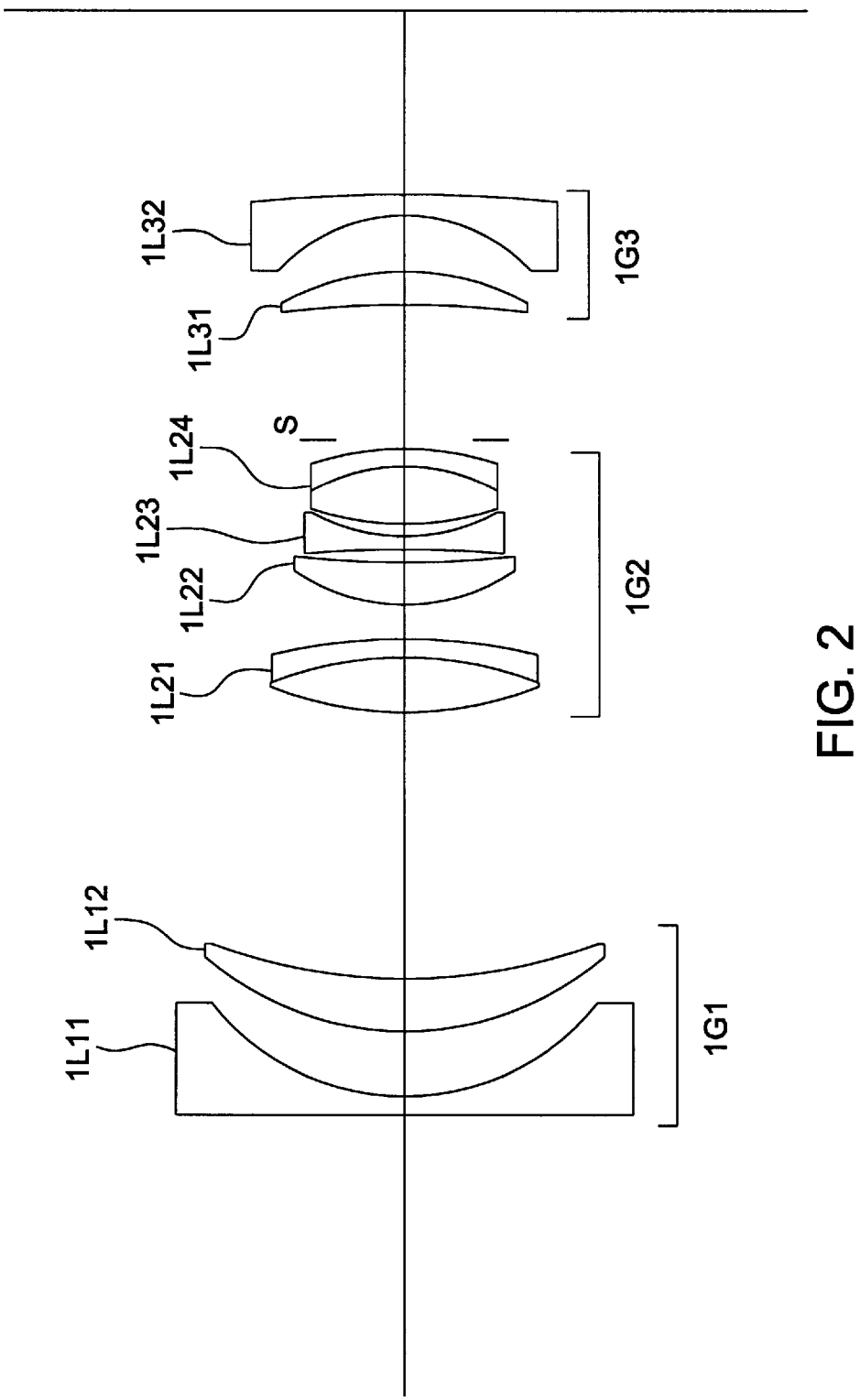
FIG. 2 shows the structure of a zoom lens according to the first preferred embodiment of the invention.

FIG. 2 describes the structure of a zoom lens according to a first preferred embodiment. The zoom lens shown in FIG. 2 comprises, in order from the object side, a first lens group 1G1, which consists of a negative meniscus lens 1L11 with the convex surface facing the object side and a positive meniscus lens 1L12 with the convex surface facing the object side; a second lens group 1G2, which consists of a cemented positive lens 1L21 having a biconvex lens and a negative meniscus lens with the concave surface facing the object side, a positive meniscus lens 1L22 with the convex surface facing the object side, a biconcave lens 1L23 and a cemented positive lens 1L24 having a biconvex lens and a negative meniscus lens with the concave surface facing the object side; and a third lens group 1G3, which consists of a positive meniscus lens 1L31 with the concave surface facing the object side and a negative meniscus lens 1L32 with the concave surface facing the object side of the zoom lens.

FIG. 1 shows the positional relationship of each lens group at a maximum wide-angle state. Each lens group moves during zooming on the optical axis along the zoom locus as shown by the arrow in FIG. 1 to a maximum telephoto state.

An aperture stop S can be placed between the second lens group 1G2 and the third lens group 1G3, adjacent to the second lens group 1G2. The aperture stop S moves with the second lens group 1G2 as one unit during zooming.

The values of various dimensions of the first preferred embodiment are listed in Table (1) below. In Table (1), f is focal length, FNO is F-number, 2ω is field angle, and Bf is back focus. Moreover, refractive indices and Abbe numbers correspond to a d-line ($\lambda$=587.6 nm). The aperture ratio is defined by F-number (FNO). The surface number indicates the lens surface order from the object side of the zoom lens along a direction in which light rays move.

TABLE 1 f = 28.80–44.81–80.69 mm
FNO = 3.54–4.78–7.00
2ω = 75.41°–50.68°–29.50°

| Surface Number | Radius of Curvature | Intersurface Distance | Abbe Number | Refractive Index |
|---|---|---|---|---|
| 1 | 998.8858 | 1.409 | 45.37 | 1.79668 |
| 2 | 17.5826 | 4.681 | | |
| 3 | 21.8995 | 3.842 | 25.50 | 1.80458 |
| 4 | 43.0166 | (d4 = variable) | | |
| 5 | 27.7367 | 3.842 | 64.10 | 1.51680 |
| 6 | −26.0150 | 1.281 | 23.01 | 1.86074 |
| 7 | −43.9216 | 2.561 | | |
| 8 | 13.8897 | 3.051 | 61.09 | 1.58913 |
| 9 | 76.7671 | 0.837 | | |
| 10 | −89.9191 | 1.025 | 33.89 | 1.80384 |
| 11 | 14.9793 | 0.897 | | |
| 12 | 26.7040 | 4.007 | 39.15 | 1.62606 |
| 13 | −14.4413 | 1.281 | 45.37 | 1.79668 |
| 14 | −25.3154 | 0.640 | | |
| 15 | ∞ | (d15 = variable) | (aperture stop S) | |
| 16 | −54.3114 | 2.305 | 40.76 | 1.58144 |
| 17 | −19.4416 | 4.070 | | |
| 18 | −12.6007 | 1.537 | 49.45 | 1.77279 |
| 19 | −104.8258 | (Bf) | | |

Variable Space For Zooming

| f | 28.8000 | 44.8257 | 80.6862 |
|---|---|---|---|
| d4 | 19.1553 | 10.2316 | 1.9211 |
| d15 | 9.7465 | 6.8430 | 4.4726 |
| Bf | 12.9019 | 25.7915 | 51.8792 |

Values Corresponding To Conditions f1 = −44.0343
f2 = 24.9909
f3 = −32.7108
(f1 − f3)/(f1 + f3) = 0.148       (1)
(Bft − Bfw)/(ft − fw) = 0.751     (2)
|f1|/(fw × ft)$^{1/2}$ = 0.913     (3)
f2/f1 = −0.568                     (4)
(d23w − d23t)/(d12w − d12t) = 0.306 (5)

FIGS. 3(a)–5(d) show various aberration diagrams for the first preferred embodiment. FIGS. 3(a)–3(d) show various aberration diagrams for an infinite focus state at a maximum wide-angle or shortest focal length state. FIGS. 4(a)–4(d) show various aberration diagrams for an infinite focus state at a medium focal length state. FIGS. 5(a)–5(d) show various aberration diagrams for an infinite focus state at a maximum telephoto or longest focal length state.

In each aberration diagram for all of the first through eighteenth preferred embodiments, FNO is F-number, NA is numerical aperture, Y is image height, A is the field angle with respect to each image height, and H is the object height with respect to each image height.

In all of the aberration diagrams for all of the first to eighteenth preferred embodiments showing astigmatism, the solid line represents the sagittal image plane, while the broken line represents the meridional image plane. Furthermore, in all of the aberration diagrams for all of the first-eighteenth preferred embodiments showing a spherical surface aberration, the broken line represents the sine condition. Each aberration diagram shows that various aberrations are favorably corrected at each focal length condition from infinite focus state to close distance focus state.

Figure 6:
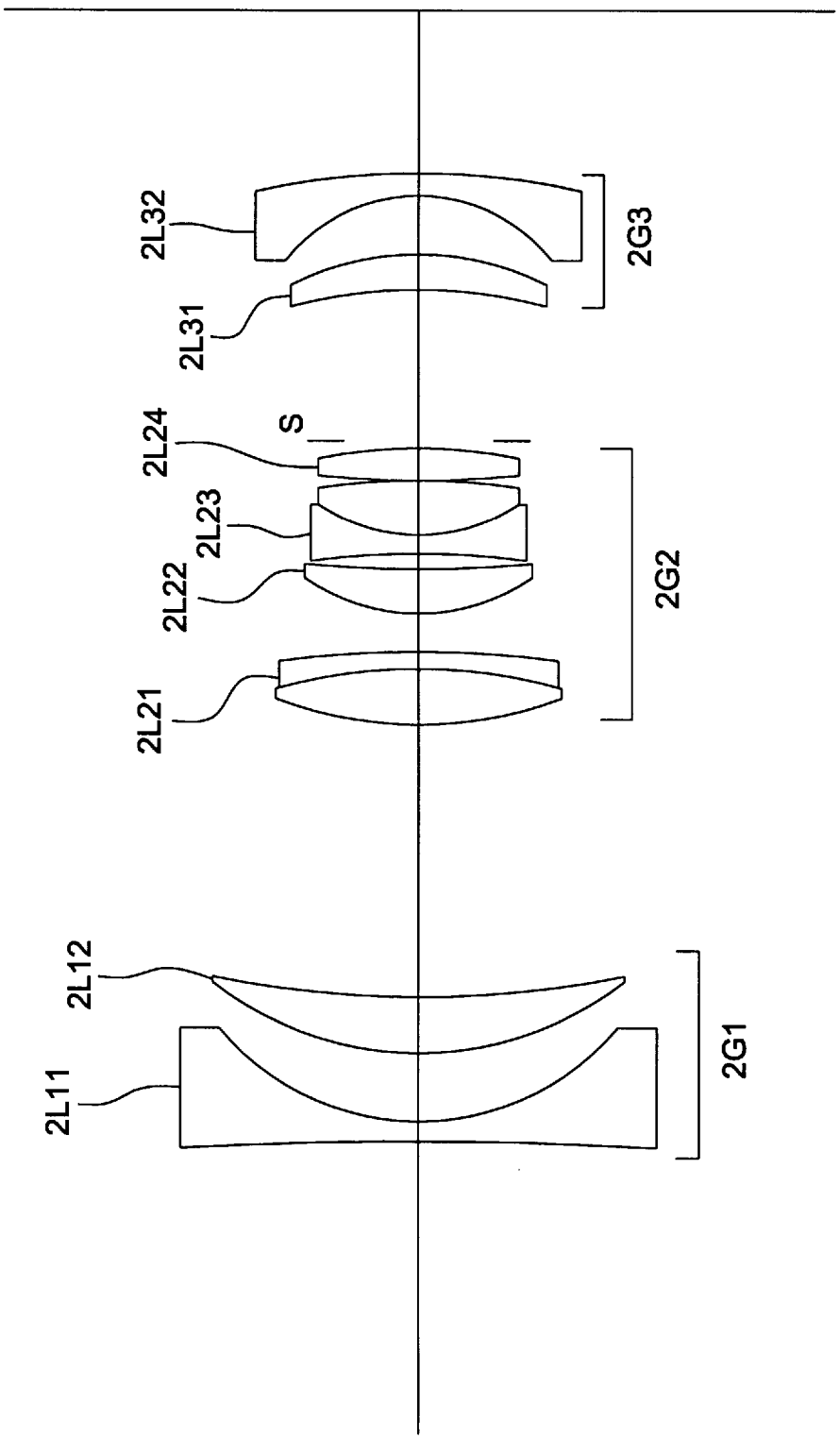
FIG. 6 shows the structure of the zoom lens according to a second preferred embodiment of the invention.
Figures 8A, 8B, 8C, 8D:
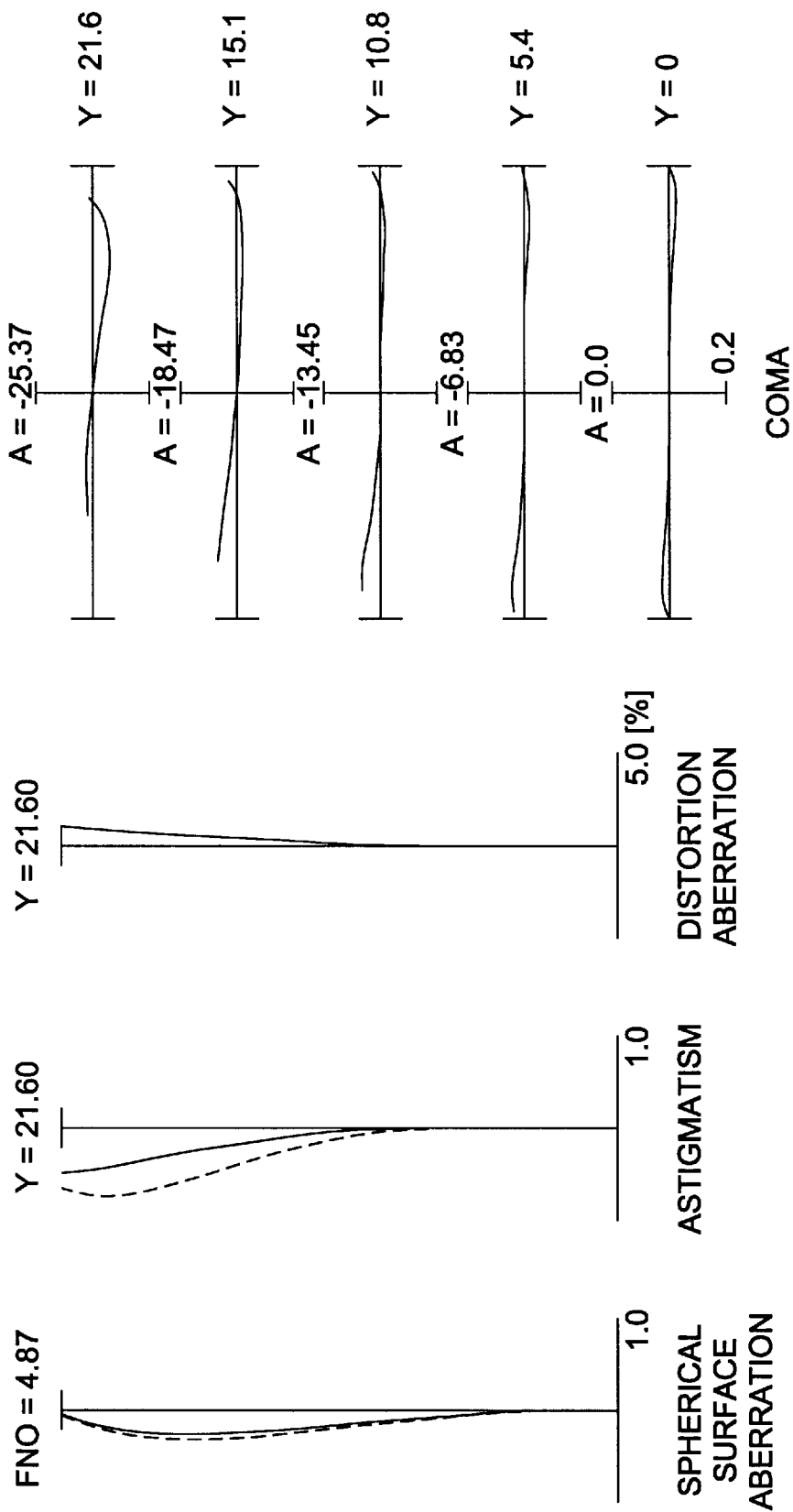
FIGS. 8(a)–8(d) show various aberration diagrams for an infinite focus state at a medium focal length state according to the second preferred embodiment.

FIG. 6 shows a zoom lens according to a second preferred embodiment of the invention. The zoom lens shown in FIG. 6 comprises, in order from the object side, a first lens group 2G1, which consists of a biconcave lens 2L11 and a positive meniscus lens 2L12 with the convex surface facing the object side; a second lens group 2G2 which consists of a cemented positive lens 2L21 having a biconvex lens and a negative meniscus lens with the concave surface facing the object side, a positive meniscus lens 2L22 with the convex surface facing the object side, a cemented positive lens 2L23 having a biconcave lens and a biconvex lens; and a third lens group 2G3 which consists of a positive meniscus lens 2L31 with the concave surface facing the object side and a negative meniscus lens 2L32 with the concave surface facing the object side.

FIG. 6 shows the positional relationship of each lens group at a maximum wide-angle state. Each lens group moves on the optical axis along the zoom locus as shown by the arrow in FIG. 1, during zooming to a maximum telephoto state.

Moreover, an aperture stop S can be placed between the focusing lens group 2G2 and the third lens group G3, adjacent to the focusing lens group 2G2. The aperture stop S moves with the second lens group 2G2 as one unit during zooming.

The values of various dimensions for the second preferred embodiment are listed in Table (2) below. In Table (2), f is focal length, FNO is F-number, 2ω is field angle, and Bf is back focus. Moreover, refractive indices and Abbe numbers correspond to a d-line ($\lambda$=587.6 nm). The aperture ratio is defined by F-number (FNO). Moreover, the surface number indicates the lens surface order from the object side of the zoom lens along a direction in which light rays move.

TABLE 2 f = 28.96–45.05–81.08 mm
FNO = 3.60–4.88–7.00
2ω = 74.26°–50.74°–29.52°

| Surface Number | Radius of Curvature | Intersurface Distance | Abbe Number | Refractive Index |
|---|---|---|---|---|
| 1 | −305.9674 | 1.416 | 45.37 | 1.79668 |
| 2 | 17.3432 | 4.707 | | |
| 3 | 23.4997 | 3.861 | 25.50 | 1.80458 |
| 4 | 60.5091 | (d4 = variable) | | |

TABLE 2-continued f = 28.96–45.05–81.08 mm
FNO = 3.60–4.88–7.00
2ω = 74.26°–50.74°–29.52°

| | | | | |
|---|---|---|---|---|
| 5 | 28.2251 | 3.861 | 61.09 | 1.58913 |
| 6 | −33.3708 | 1.287 | 23.01 | 1.86074 |
| 7 | −71.4381 | 2.574 | | |
| 8 | 15.2185 | 2.831 | 61.09 | 1.58913 |
| 9 | 52.5879 | 1.287 | | |
| 10 | −68.6486 | 1.287 | 43.35 | 1.84042 |
| 11 | 12.5237 | 3.827 | 64.10 | 1.51680 |
| 12 | −71.7120 | 0.257 | | |
| 13 | 239.3287 | 1.965 | 55.60 | 1.69680 |
| 14 | −41.9365 | 0.644 | | |
| 15 | ∞ | (d15 = variable) | (aperture stop S) | |
| 16 | −35.9648 | 2.573 | 28.19 | 1.74000 |
| 17 | −18.9160 | 3.846 | | |
| 18 | −12.0798 | 1.544 | 47.47 | 1.78797 |
| 19 | −55.2593 | (Bf) | | |

| Variable Space For Zooming | | | |
|---|---|---|---|
| f | 28.9577 | 45.0452 | 81.0813 |
| d4 | 19.0243 | 10.3967 | 1.9305 |
| d15 | 10.4030 | 6.9591 | 4.4088 |
| Bf | 13.2561 | 27.5897 | 55.6423 |

| Values Corresponding To Conditions | |
|---|---|
| f1 = −43.4007 | |
| f2 = 25.3798 | |
| f3 = −35.2183 | |
| (f1 − f3)/(f1 + f3) = 0.104 | (1) |
| (Bft − Bfw)/(ft − fw) = 0.813 | (2) |
| \|f1\|/(fw × ft)$^{1/2}$ = 0.802 | (3) |
| f2/f1 = −0.585 | (4) |
| (d23w − d23t)/(d12w − d12t) = 0.351 | (5) |

FIGS. 7(a)–9(d) show various aberration diagrams for the second preferred embodiment. FIGS. 7(a)–7(d) show various aberration diagrams for the infinite focus state at a maximum wide-angle state, FIGS. 8(a)–8(d) show various aberration diagrams for the infinite focus state at a medium focal length state, and FIGS. 9(a)–9(d) show various aberration diagrams for the infinite focus state at a maximum telephoto state.

Figure 10:
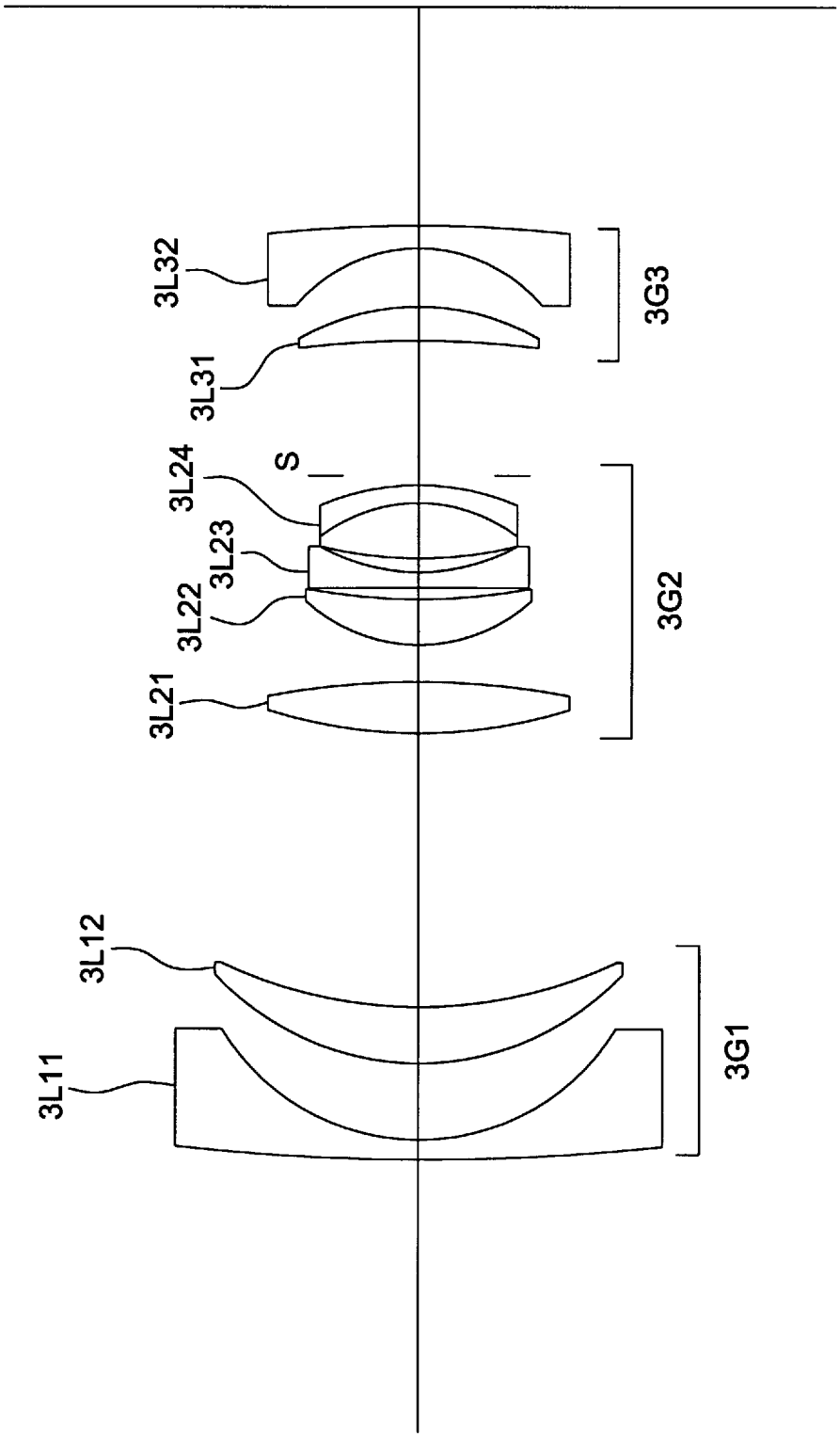
FIG. 10 shows the structure of the zoom lens according to the third preferred embodiment of the invention.
Figures 12A, 12B, 12C, 12D:
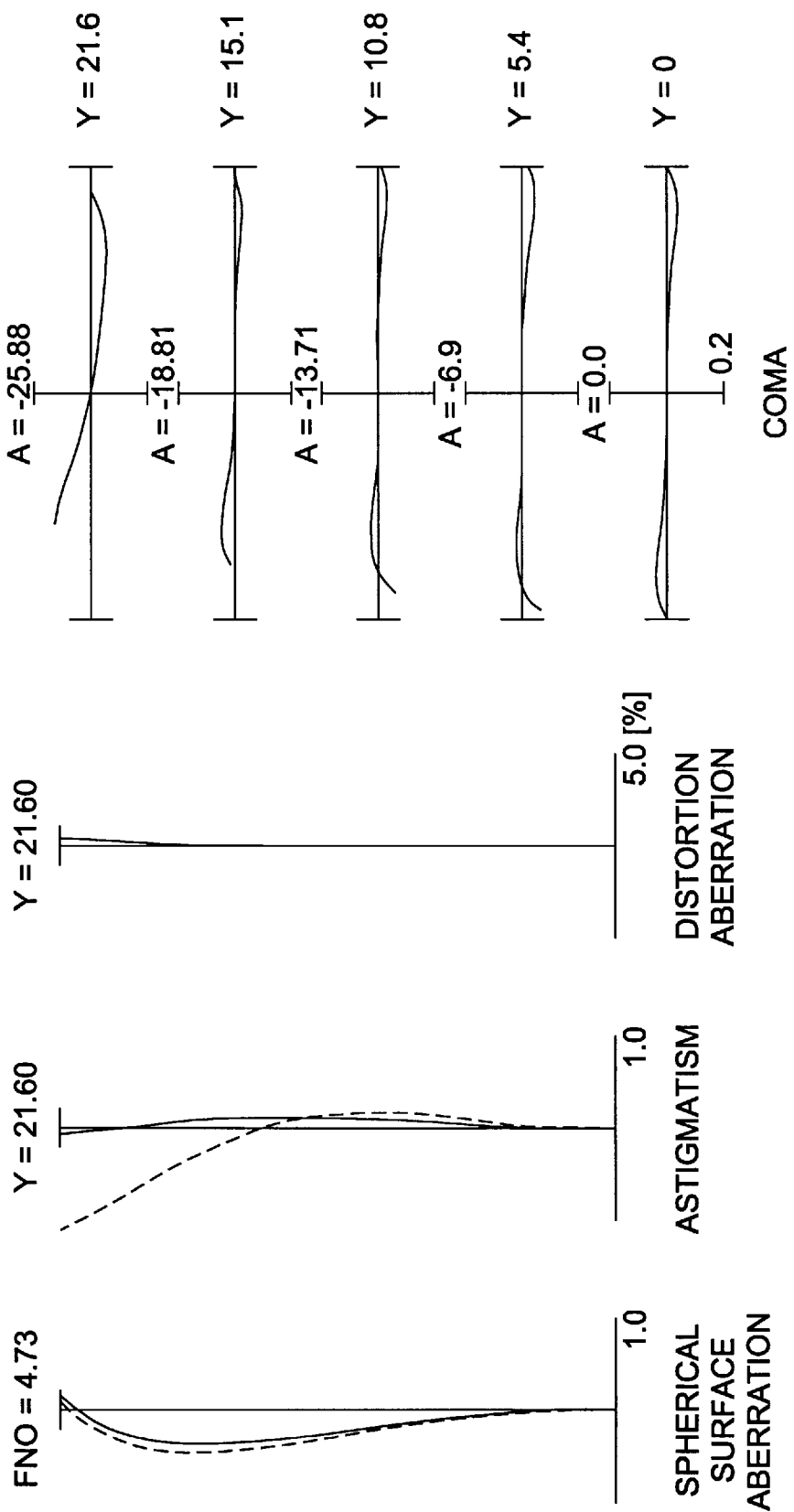
FIGS. 12(a)–12(d) show various aberration diagrams for an infinite focus state at a medium focal length state according to the third preferred embodiment.

FIG. 10 describes the structure of a zoom lens in a third preferred embodiment of the present invention. The zoom lens in FIG. 10 comprises, in order from the object side, a first lens group 3G1, which consists of a negative meniscus lens 3L11 with a convex surface facing the object side 3L11 and a positive meniscus lens 3L12 with the convex surface facing the object side; a second lens group 3G2, which consists of a biconvex lens 3L21 and a positive meniscus lens 3L22 with the convex surface facing the object side, a biconcave lens 3L23, a cemented positive lens 3L24 having a biconvex lens and a negative meniscus lens with the concave surface facing the object side; and a third lens group 3G3, which consists of a positive meniscus lens 3L31 with the concave surface facing the object side and a negative meniscus lens 3L32 with the concave surface facing the object side.

FIG. 10 shows the positional relationship of each lens group at a maximum wide-angle state. Each lens group moves on the optical axis along the zoom locus as shown by the arrow in FIG. 1, during zooming to a maximum telephoto state.

Moreover, an aperture stop S can be placed between the focusing lens group 3G2 and the third lens group G3, adjacent to the focusing lens group 3G2. The aperture stop S moves with the second lens group 3G2 as one unit during zooming.

The values of various dimensions for the third preferred embodiment are listed in Table (3) below. In Table (3), f is focal length, FNO is F-number, 2ω is field angle, and Bf is back focus. Moreover, refractive indices and Abbe numbers correspond to a d-line (λ=587.6 nm), respectively. The aperture ratio is defined by F-number (FNO). Moreover, the surface number indicates the lens surface order from the object side of the zoom lens along an direction in which light rays move.

TABLE 3 f = 28.81–44.30–80.64 mm
FNO = 3.60–4.72–7.00
2ω = 74.96°–51.76°–29.73°

| Surface Number | Radius of Curvature | Intersurface Distance | Abbe Number | Refractive Index |
|---|---|---|---|---|
| 1 | 158.6153 | 1.408 | 45.37 | .79668 |
| 2 | 16.5253 | 5.253 | | |
| 3 | 20.8320 | 3.840 | 25.50 | 1.80458 |
| 4 | 32.8210 | (d4 = variable) | | |
| 5 | 36.8162 | 3.456 | 56.05 | 1.56883 |
| 6 | −67.7923 | 2.560 | | |
| 7 | 12.8474 | 3.072 | 57.03 | 1.62280 |
| 8 | 44.9067 | 0.896 | | |
| 9 | −106.2553 | 1.024 | 25.50 | 1.80458 |
| 10 | 14.5488 | 0.896 | | |
| 11 | 26.1364 | 3.968 | 40.76 | 1.58144 |
| 12 | −12.1979 | 1.280 | 45.37 | 1.79668 |
| 13 | −21.2128 | 0.640 | | |
| 14 | ∞ | (d14 = variable) | (aperture stop S) | |
| 15 | −43.2743 | 2.560 | 33.75 | 1.64831 |
| 16 | −17.4168 | 3.956 | | |
| 17 | −12.0751 | 1.536 | 49.45 | 1.77279 |
| 18 | −54.0782 | (Bf) | | |

| Variable Space For Zooming | | | |
|---|---|---|---|
| f | 28.805 | 44.3046 | 80.6363 |
| d4 | 19.2380 | 10.5111 | 1.9200 |
| d14 | 9.5159 | 6.3618 | 4.1010 |
| Bf | 15.8915 | 30.0264 | 58.5580 |

| Values Corresponding To Conditions | |
|---|---|
| f1 = −39.1922 | |
| f2 = 25.2093 | |
| f3 = −43.9347 | |
| (f1 − f3)/(f1 + f3) = −0.057 | (1) |
| (Bft − Bfw)/(ft − fw) = 0.823 | (2) |
| \|f1\|/(fw × ft)$^{1/2}$ = 0.661 | (3) |
| f2/f1 = −0.643 | (4) |
| (d23w − d23t)/(d12w − d12t) = 0.313 | (5) |

FIGS. 11(a)–13(d) show various aberration diagrams for the third preferred embodiment. FIGS. 11(a)–11(d) show various aberration diagrams for the infinite focus state at a maximum wide-angle state, FIGS. 12(a)–12(d) show various aberration diagrams for the infinite focus state at a medium focal length state and FIGS. 13(a)–13(d) show various aberration diagrams for the infinite focus state at a maximum telephoto state.

Figure 14:
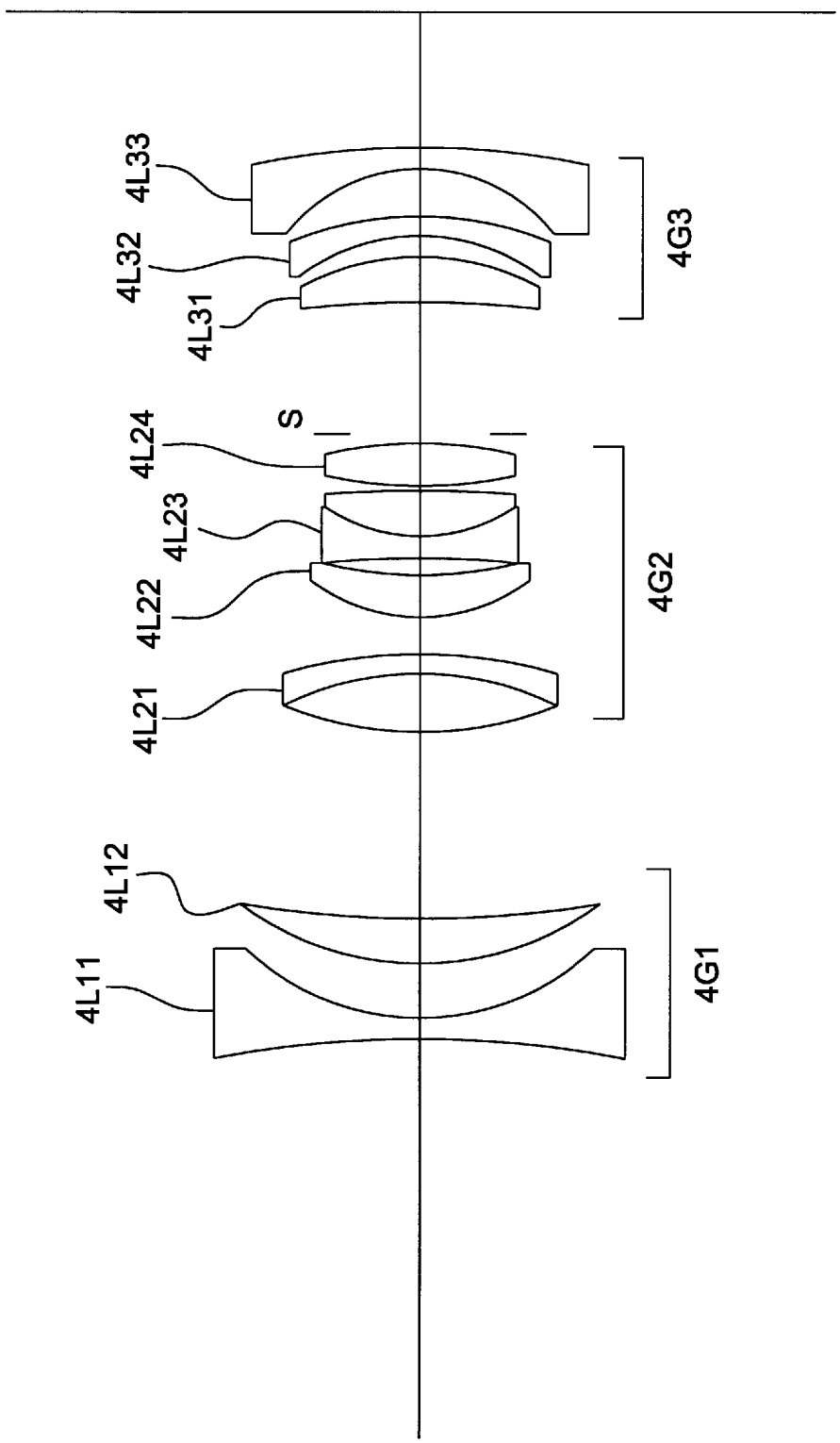
FIG. 14 shows the structure of the zoom lens according to the fourth preferred embodiment of the invention.

FIG. 14 describes the structure of a zoom lens in fourth preferred embodiment of the present invention. The zoom lens of FIG. 14 comprises, in order from the object side, a first lens group 4G1, which consists of a biconcave lens 4L11 and a positive meniscus lens 4L12 with the convex surface facing the object side; a second lens group 4G2 which consists of a cemented positive lens 4L21 having a biconvex lens and a negative meniscus lens with the concave surface facing the object side, a positive meniscus lens 4L22 with the convex surface facing the object side, a cemented lens 4L23 having a biconcave lens and a biconvex lens, and a biconvex lens 4L24; and a third lens group 4G3 which consists of a positive meniscus lens 4L31 with the concave surface facing the object side and a negative meniscus lens 4L32 with the concave surface facing the object side.

FIG. 14 shows the positional relationship of each lens group at a maximum wide-angle state. Each lens group moves on the optical axis along the zoom locus as shown by the arrow in FIG. 1 during zooming to a maximum telephoto state.

Moreover, aperture stop S can be placed between the focusing lens group 4G2 and the third lens group 4G3 adjacent to the focusing lens group 4G2. The aperture-stop S moves with the second lens group 4G2 as one unit during zooming.

The values of various dimensions for the fourth preferred embodiment are listed in Table (4) below. In Table (4), f is focal length, FNO is F-number, 2ω is field angle, and Bf is back focus. Moreover, refractive indices and Abbe numbers correspond to a d-line ($\lambda$=587.6 nm), respectively. The aperture ratio is defined by F-number (FNO). Moreover, the surface number indicates the lens surface order from the object side of the zoom lens along the direction in which light rays move.

TABLE 4 f = 28.87–44.91–80.84 mm
FNO = 3.60–4.43–7.34
2ω = 75.00°–50.38°–29.51°

| Surface Number | Radius of Curvature | Intersurface Distance | Abbe Number | Refractive Index |
|---|---|---|---|---|
| 1 | −82.7365 | 1.412 | 49.45 | 1.77279 |
| 2 | 18.1947 | 3.850 | | |
| 3 | 21.8527 | 3.080 | 27.61 | 1.75520 |
| 4 | 71.7324 | (d4 = variable) | | |
| 5 | 31.5772 | 3.850 | 64.10 | 1.51680 |
| 6 | −21.3396 | 1.283 | 25.50 | 1.80458 |
| 7 | −32.8561 | 2.566 | | |
| 8 | 13.1157 | 2.823 | 64.10 | 1.51680 |
| 9 | 34.9292 | 1.283 | | |
| 10 | −49.1259 | 1.283 | 43.35 | 1.84042 |
| 11 | 11.6852 | 3.465 | 69.98 | 1.51860 |
| 12 | −104.8487 | 0.257 | | |
| 13 | 30.9481 | 2.951 | 64.10 | 1.51680 |
| 14 | −30.3113 | 0.642 | | |
| 15 | ∞ | (d15 = variable) | (aperture stop S) | |
| 16 | −52.5153 | 3.208 | 28.34 | 1.72825 |
| 17 | −16.4585 | 1.283 | | |
| 18 | −14.7819 | 1.283 | 45.37 | 1.79668 |
| 19 | −29.1527 | 3.336 | | |
| 20 | −12.3545 | 1.540 | 49.45 | 1.77279 |
| 21 | −55.9648 | (Bf) | | |

Variable Space For Zooming

| f | 28.8717 | 44.9125 | 80.8350 |
|---|---|---|---|
| d4 | 13.4200 | 6.6257 | 1.2832 |
| d15 | 9.1810 | 6.6263 | 3.8495 |
| Bf | 9.3340 | 20.9825 | 47.2478 |

Values Corresponding To Conditions f1 = −43.9378
f2 = 23.3365
f3 = −24.1491
(f1 − f3)/(f1 + f3) = 0.280     (1)
(Bft − Bfw)/(ft − fw) = 0.730    (2)
|f1|/(fw × ft)$^{1/2}$ = 0.889    (3)
f2/f1 = −0.531                    (4)
(d23w − d23t)/(d12w − d12t) = 0.439  (5)

Figure 15:
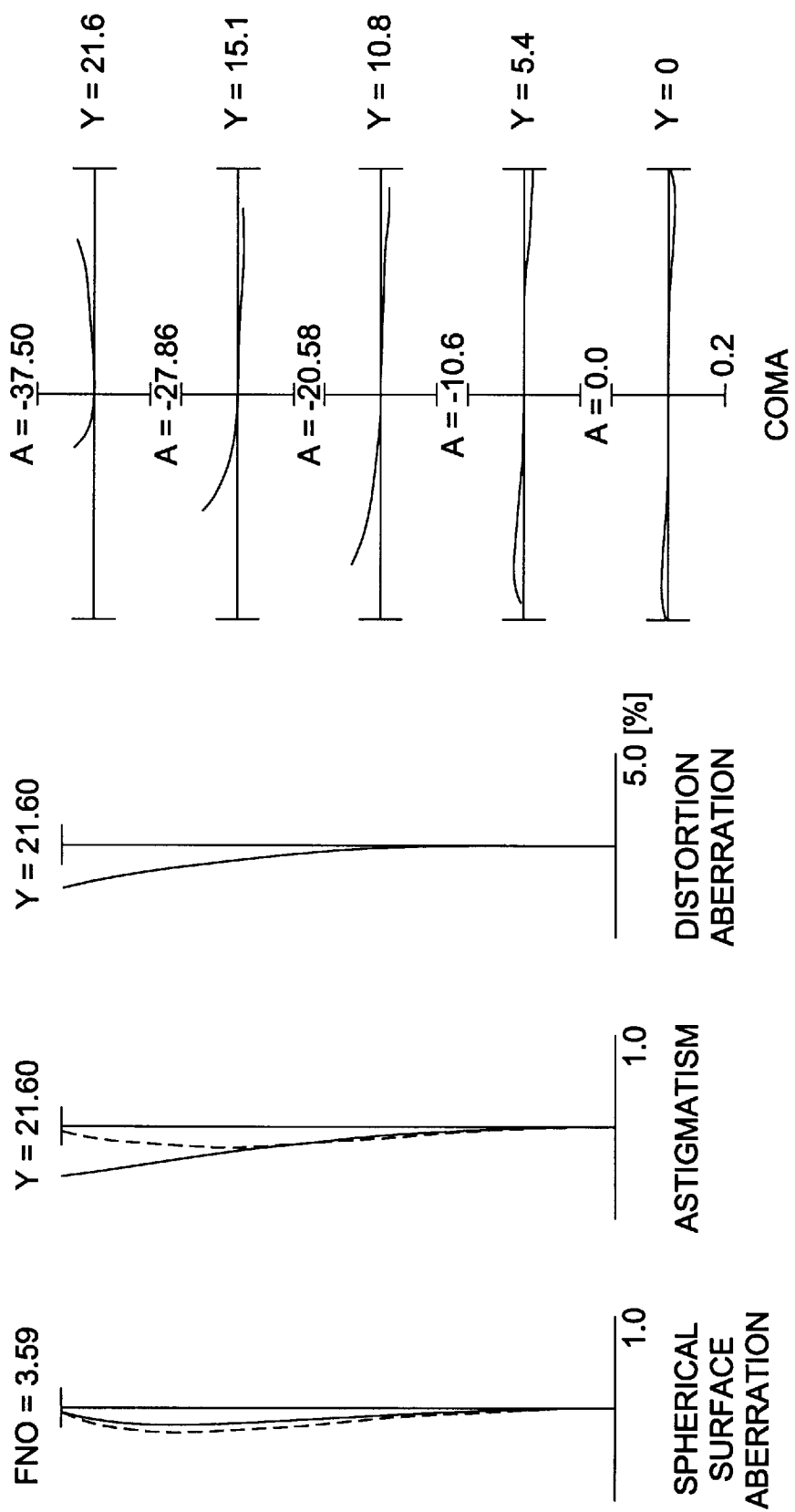
FIGS. 15(a)–15(d) show various aberration diagrams for an infinite focus state at a maximum wide-angle state according to the fourth preferred embodiment.
Figure 16:
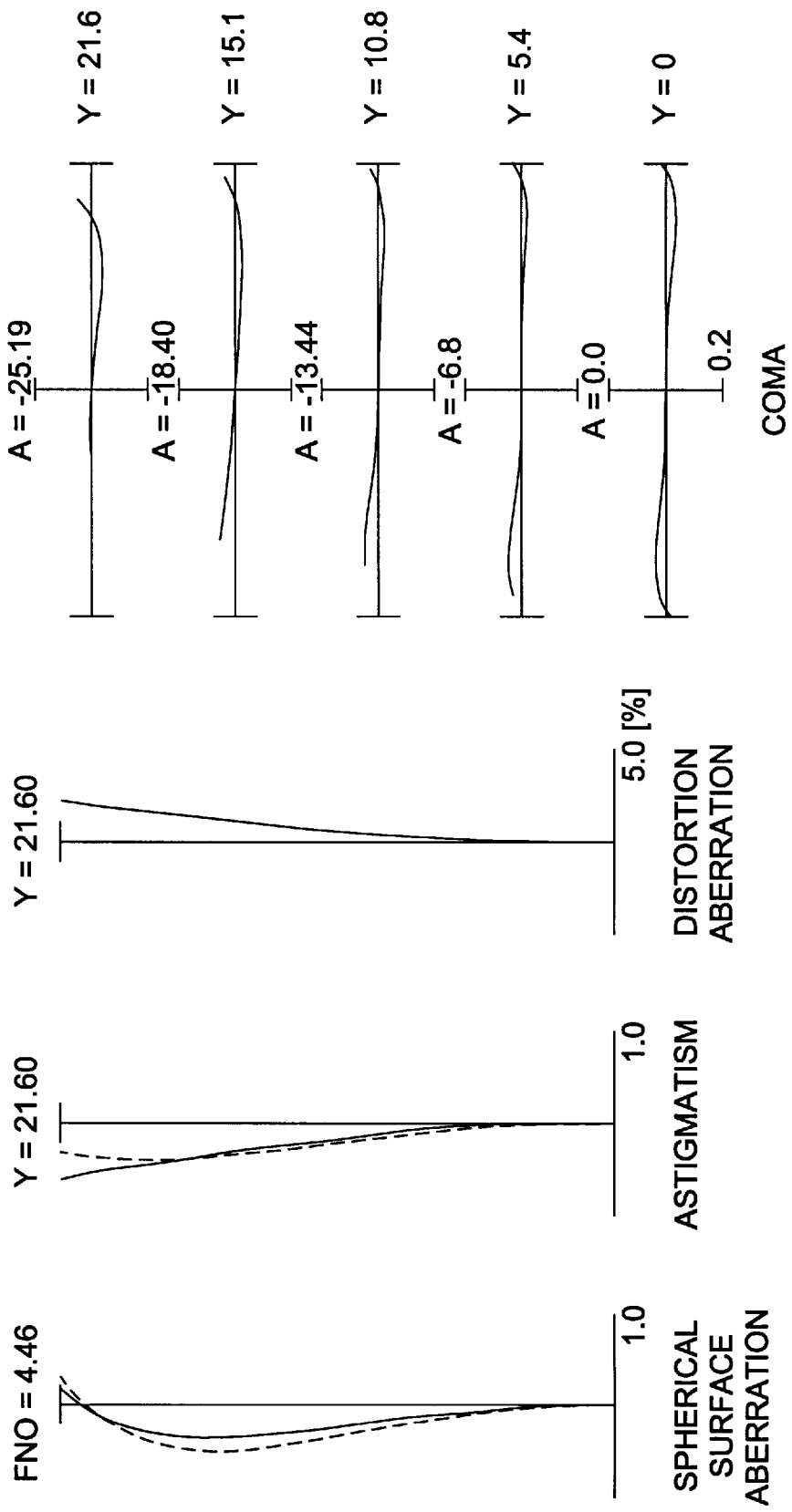
FIGS. 16(a)–16(d) show various aberration diagrams for an infinite focus state at a medium focal length state according to the fourth preferred embodiment.
Figure 17:
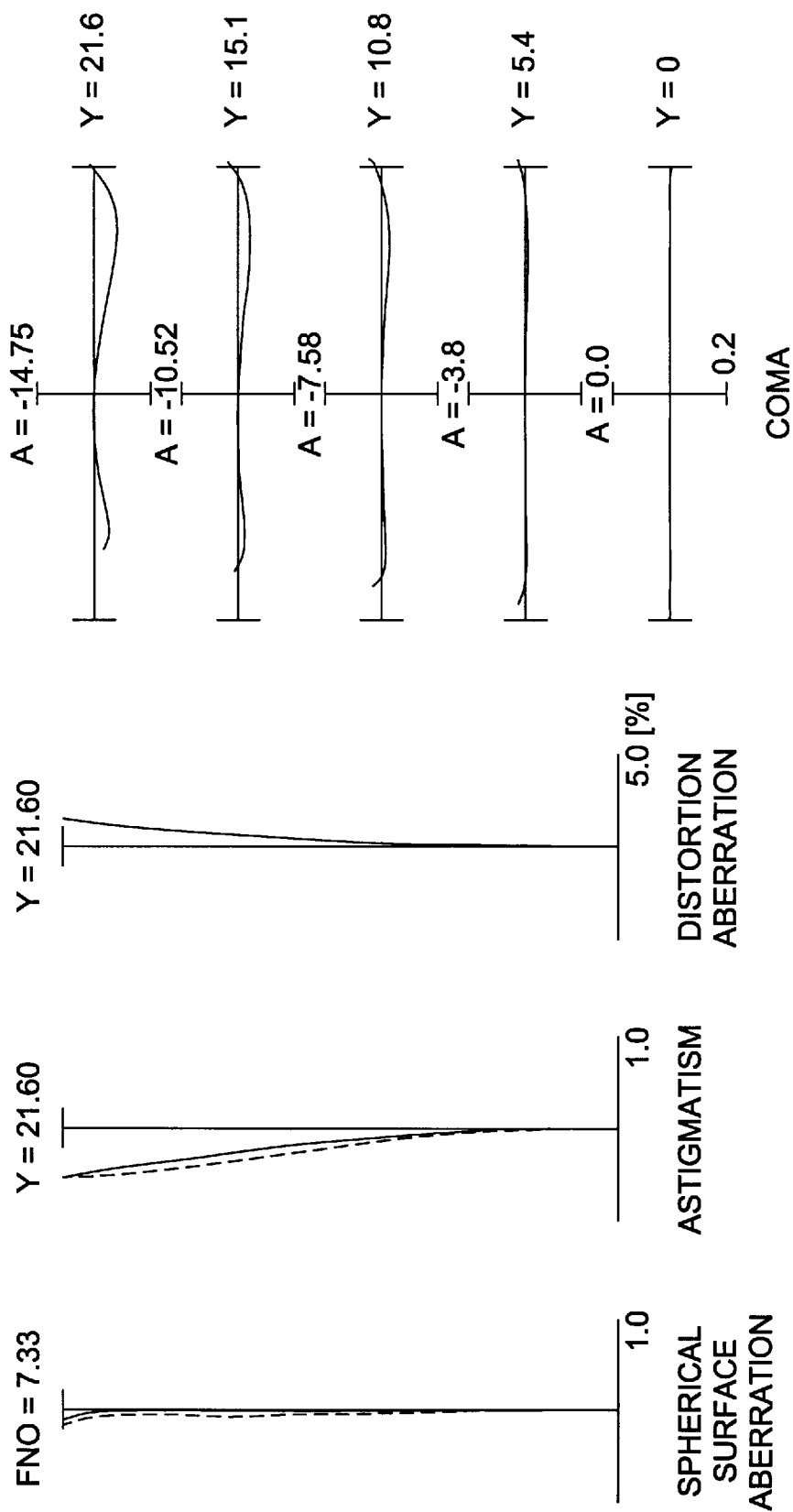
FIGS. 17(a)–17(d) show various aberration diagrams for an infinite focus state at a maximum telephoto state according to the fourth preferred embodiment.

FIGS. 15(*a*)–17(*d*) show various aberration diagrams for the fourth preferred embodiment FIGS. 15(*a*)–15(*d*) show various aberration diagrams for the infinite focus state at a maximum wide-angle state, FIGS. 16(*a*)–16(*d*) show various aberration diagrams for the infinite focus state at a medium focal length state, and FIGS. 17(*a*)–17(*d*) show various aberration diagrams for the infinite focus state at a maximum telephoto state.

As described above, the invention according to the first-fourth embodiments provides a wide-angle zoom lens capable of a high zooming ratio and having a field angle of more than 70°. Thus, the zoom lens achieves superior performance.

Figure 18:
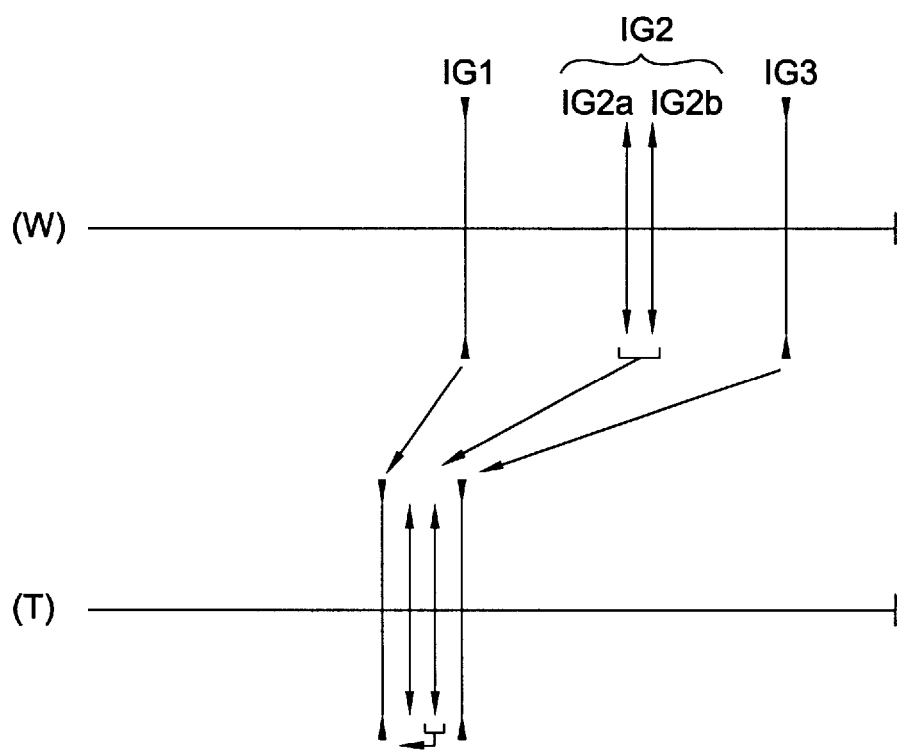
FIG. 18 shows the basic structure of a zoom lens and the movement of each lens group during zooming from a maximum wide-angle state to a maximum telephoto state and of the condition of the movement of the lens group during focusing in the fifth-eighth preferred embodiments of the invention.

The zoom lens of the fifth through eighth preferred embodiments will now be described. Referring to FIG. 18, the zoom lens of the fifth-eighth preferred embodiments generally comprises, in order from the object side, a first lens group IG1 having a negative refractive power, a second lens group IG2 having a positive refractive power, and a third lens group IG3 having a negative refractive power. During zooming from a maximum wide-angle state to a maximum telephoto state, each lens group moves toward the object side of the zoom lens so the distance between the first lens group IG1 and the second lens group IG2 decreases, and the distance between the second lens group IG2 and the third lens group IG3 decreases. The second lens group has, in order from object side, a lens sub-group or first lens unit IG2*a* having a positive refractive power and a lens sub-group or second lens unit IG2*b* having a positive refractive power. The lens unit IG2*b* moves along the optical axis to focus on objects at close distances. Both a wide-angle and superior performance can be achieved, enabling a good performance over an infinite focus state to a finite focus state for the zoom lens.

Hereafter, the focusing by a second lens unit IG2*b*, according to the fifth-eighth preferred embodiments, will now be described. As stated above, like reference characters represent like elements, however prefixes are added to clarify understanding.

When an object moves from far focus status to near focus status, the focusing is conducted by moving the focusing lens unit IG2*b* so the image position of first lens group IG1, through the focusing lens unit IG2*b*, becomes constant with respect to third lens group IG3. Conditions to make amount of movement Δ, of the focusing lens unit IG2*b* small will be described using a thin lens system.

Figure 19:
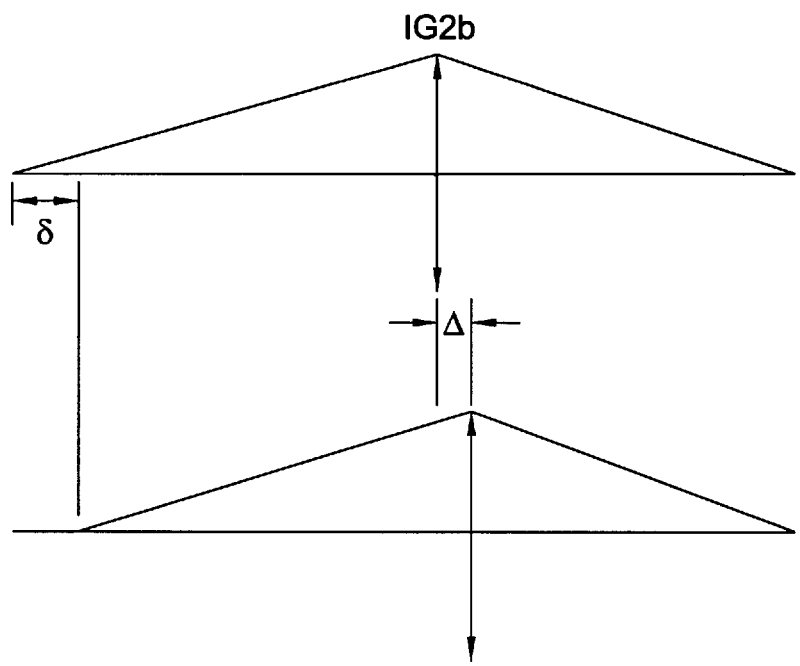
FIG. 19 shows the focusing method according to the fifth through eighth preferred embodiments of the invention.

In FIG. 18, if the object moves by an amount δ with respect to focusing lens unit IG2*b*, lens unit IG2*b* moves by an amount Δ to maintain a constant object position with respect to a third focusing group IG3, as in FIG. 19. The amount of movement Δ of lens unit IG2*b* is obtained by the equation (a):

$$\Delta = (\beta 2b^2/(\beta 2b^2 - 1)) \times \delta \quad \text{(a)}$$

where, β2b is imaging magnification of lens unit IG2*b*.

In (a), by letting k=β2b$^2$/(β2b−1), conditions (*b*) and (c) for k are obtained, where values of k depends on β2b$^2$.

$$1 \leq k(\beta 2b^2 > 1) \quad \text{(b)}$$

$$0 > k(\beta 2b^2 < 1) \quad \text{(c)}$$

Therefore, to make amount of movement Δ of lens unit IG2*b* smaller, k should approach to 1 in (*b*), i.e., ½βb should approach 0. In the fifth-eighth preferred embodiments, the amount of movement of lens unit IG2*b* is small during focusing, making β2b approach 0.

The combined refractive power of lens unit IG2*b* and lens unit IG2*a* should be as close to 0 as possible, because β2b approaches 0. β2a is the lateral magnification of lens group IG2*a*, and 1/β2a should approach 0. Therefore, in focusing using lens unit IG2b, proper values must be assigned for the magnifications of lens units IG2a and IG2b.

The conditions for the fifth-eighth preferred embodiments of the invention will now be described.

The zoom lens for the fifth-eighth preferred embodiments of the invention satisfies the condition (6).

$$(\beta 2bw \times \beta 2bt)^{1/2} < 0.45 \qquad (6)$$

where, $\beta 2bw$ is the magnification of focusing lens unit IG2b at a maximum wide-angle state and $\beta 2bt$ is the magnification of focusing lens unit IG2b at a maximum telephoto state. Condition (6) defines magnification of focusing lens group G2b.

If the upper limit of condition (6) is exceeded, the amount of movement focusing of lens unit IG2b would become large during the near focusing state. Thus, simplification and a compact zoom lens system could not be achieved. This results in a large lens system, which is inconvenient.

Moreover, according to the fifth-eighth preferred embodiments, conditions (7) and (8) should also be satisfied.

$$0.85 < f2b/(fw \times ft)^{1/2} < 1.20 \qquad (7)$$

$$0.65 < |f1|/(fw \times ft) < 0.925 \qquad (8)$$

where, f2b is the focal length of the focusing lens unit IG2b, f1 is the focal length of the first lens group IG1, fw is the total focal length of the lens system at a maximum wide-angle state, ft is the total focal length of the lens system at a maximum telephoto state.

Condition (7) defines a range for focal length of focusing lens unit IG2b. If the upper limit of the condition (7) is exceeded, the focal length of lens unit IG2b would become a large positive value, and the focusing movement amount of lens unit IG2b would become large during a near distance focusing state.

If the lower limit of condition (7) is not reached, the focal length of lens unit IG2b would become a small positive value, and off-axis aberration fluctuations generated during focusing on the object at close range could not be controlled.

In general, in a zoom lens where a negative lens group is placed closest to the image side of the zoom lens, and an aperture stop is closer to the object side relative to the negative lens group, the divergence of rays by the negative lens group becomes large with the distance of the rays from the optical axis. Thus, diameter of an exit pupil in a region away from the axis should become smaller, compared to one in a region near the axis, because an exit pupil away from the axis is closer to the image plane. As a result, the actual amount of light in the marginal zone becomes smaller than the amount of light in the marginal zone, as computed by fourth cosine law, even when there is no vignetting of the light rays.

The zoom lens also has the third lens group IG3 with a negative refractive power placed closest to the image plane in the lens system. A decrease in the amount of light in the marginal zone, as computed by cosine fourth law, becomes substantial because the field angle exceeds 70° at a maximum wide-angle state. To obtain a sufficient amount of light in the marginal zone, the back focus at a maximum wide-angle state should be large and an off-axis ray that passes through the third lens group G3 should approach the optical axis to control positive distortion aberrations generated by the third lens group IG3. This also controls a shift of the exit pupil position in the region near the region away from the optical axis.

Condition (8) defines a proper range for the absolute value of the focal length of first lens group IG1. To obtain sufficient back focus at a maximum wide-angle state, a proper value must be assigned for the focal length of the lens group IG1. Thus, if the upper limit of condition (8) is exceeded, the size of the focal length f1 of the first lens group IG1 would become too large. A sufficient back focus could not be obtained at a maximum wide-angle state.

On the other hand, if the lower limit of the condition (8) is not reached, the focal length size f1 of the lens group IG1 would become too small and an off-axis ray that passes through the first lens group IG1 at a maximum wide-angle state would approach the optical axis. Thus, off-axis and on-axis aberrations could not be independently corrected and coma fluctuations, due to the field angle, could not be controlled.

Moreover, to achieve both a high zoom ratio, and superior performance of a zoom lens, conditions (9) and (10) should be satisfied:

$$0.7 < f2a|f1| < 1.40 \qquad (9)$$

$$0.15 < (d23w - d23t)/(d12w - d12t) < 0.6 \qquad (10)$$

where f2 is the focal length of the second lens group TG2, d23w is the axial distance between the second lens group and the third lens group at a maximum wide-angle state, d23t is the axial distance between the second lens group and the third lens group at a maximum telephoto state, d12w is the axial distance between the first lens group and the second lens group at a maximum wide-angle state, and d12t is the axial distance between the first lens group and the second lens group at a maximum telephoto state.

Condition (9) defines a range for a ratio between the focal lengths of lens unit IG2a and lens group IG1. If the upper limit of condition (9) is exceeded, a divergence of light rays by first lens group IG1 would become too strong and an off-axis ray that passes through the first lens group IG1 would move towards the optical axis. Therefore, on-axis and off-axis aberrations could not be independently corrected.

If the lower limit of condition (9) is not reached, the combined refractive power of first lens group IG1 and lens unit IG2a at a maximum telephoto state would become too large. Thus, the lateral magnification of focusing lens unit IG2b would assume a value away from 0, which would result in a large movement amount during focusing.

Condition (10) defines a range for ratio of the amount of axial change between first lens group IG1 and second lens group IG2, and the amount of axial change between second lens group IG2 and third lens group IG3, during zooming from a maximum wide-angle state to a maximum telephoto state. With condition (10), between the change in the lateral magnification of the second lens group IG2 during zooming and the change in lateral magnification of the third lens group IG3 during zooming. Particularly, the balance should be regulated so the amount of axial change between first lens group IG1 and second lens group IG2 is larger than the amount of axial change between second lens group IG2 and third lens group IG3. This ensures that a sufficient back focus can be obtained at a maximum wide-angle state.

If the upper limit of condition (10) is exceeded, the ratio of contribution by third lens group G3 would become too large. Thus, the off-axis aberration fluctuation generated by lens group IG3 during zooming could not be controlled. Moreover, a sufficient back focus could not be obtained at a maximum wide-angle state.

Conversely, if the lower limit of condition (10) is not reached, the variation of the lateral magnification of the third lens group IG3 would become too large during zooming, and the incident angle of off-axis ray of lens group IG2 would change substantially during zooming from a maximum wide-angle state to a maximum telephoto state. However, the height at which off-axis rays pass through the lens group IG2 would change very little. Thus, the off-axis aberration fluctuation could not be controlled.

Moreover, if an off-axis ray that passes through focusing lens unit IG2b moves away from the optical axis more than an on-axis ray moves, the diameter of the lens could not be made smaller. Thus, the diameter of the lens in the focusing lens unit IG2b could be smaller by placing an aperture stop adjacent to the object side or the image side of the focusing lens unit IG2b.

The invention according to the fifth-eighth preferred embodiments can control aberration fluctuations generated during an image shift, when the image shift is executed by properly moving or decentering all, one lens group or a multiplicity of lens groups in a direction substantially orthogonal to the optical axis.

Hereinafter, each of the fifth-eighth preferred embodiments of the invention will be described with reference to the attached drawings.

FIGS. 18 and 19 show a zoom lens according to the fifth-eighth preferred embodiments and the movement of each lens group during zooming from a maximum wide-angle state (W) to a maximum telephoto state (T).

Figure 20:
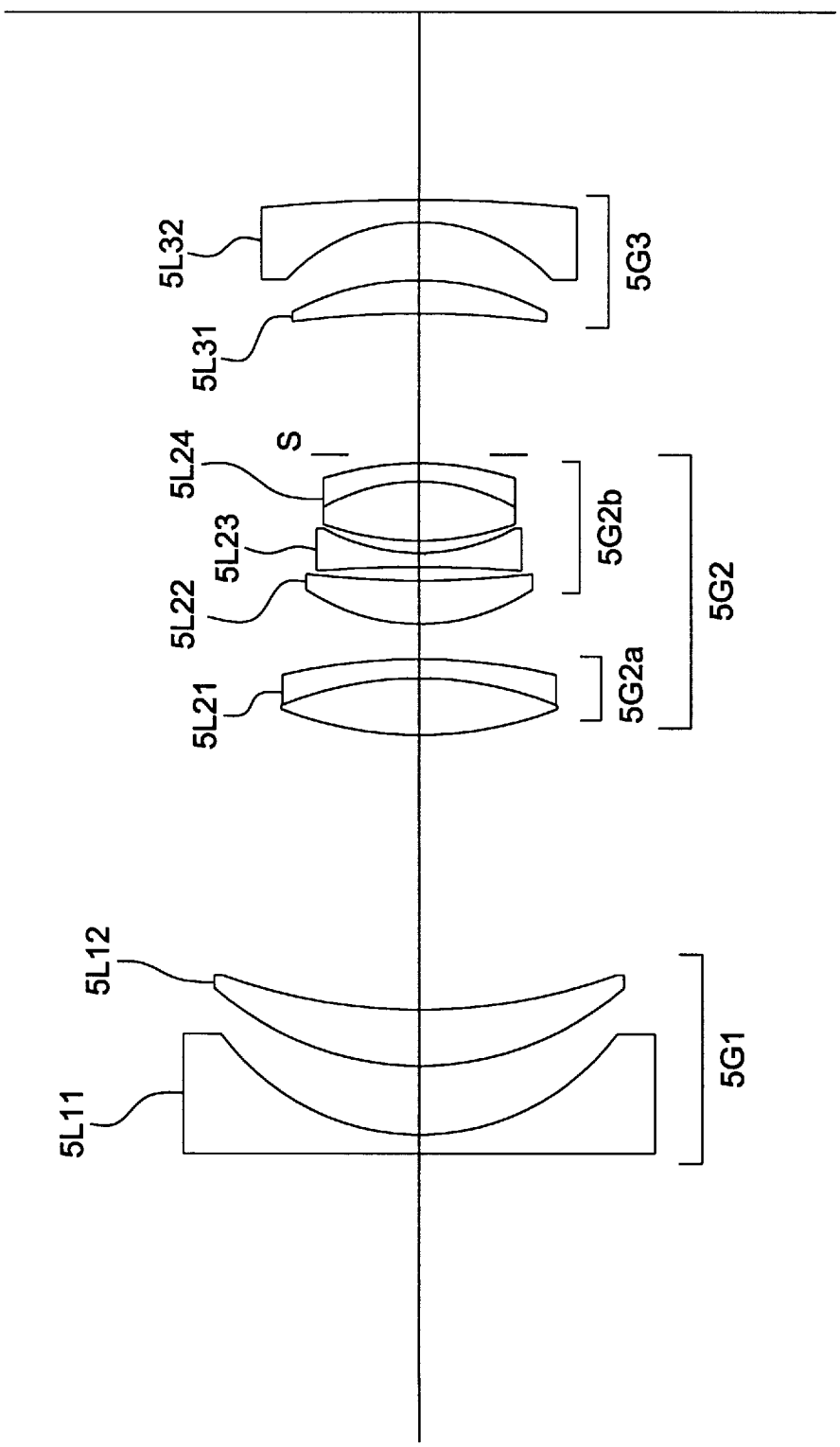
FIG. 20 shows a zoom lens according to a fifth preferred embodiment of the invention.

FIG. 20 describes the particular structure of a zoom lens according to a fifth preferred embodiment of the invention. The zoom lens shown in the FIG. 20 comprises, in order from the object side, a first lens group 5G1, which consists of negative meniscus lens 5L11 with the convex surface facing the object side and positive meniscus lens 5L12 with the convex surface facing the object side; a lens unit 5G2a which consists of a cemented positive lens 5L21 having a biconvex lens and a negative meniscus lens with the concave surface facing the object side; a focusing lens unit 5G2b consisting of a positive meniscus lens 5L22 with the convex surface facing the object side, a biconcave lens 5L23 and a cemented positive lens 5L24 having a biconvex lens and a negative meniscus lens with the concave surface facing the object side; and a third lens group 5G3 consists of a positive meniscus lens 5L31 with the concave surface facing the object side and a negative meniscus lens 5L32 with the concave surface facing the object side.

FIG. 20 shows the positional relationship of each lens group at a maximum wide-angle state. Each lens group moves on the optical axis along the zoom locus as shown by the arrow in FIG. 18 during zooming to a maximum telephoto state.

Moreover, an aperture stop S can be placed between the focusing lens unit 5G2b and the third lens group 5G3 or adjacent to the focusing lens unit 5G2b. The aperture stop S can move with the second lens group 5G2 as one unit during zooming.

The values of various dimensions of the fifth preferred embodiment are listed in Table (5) below. In Table (5), f is focal length, FNO is F-number, 2ω is field angle, and Bf is back focus. Moreover, refractive indices and Abbe numbers correspond to a d-line (λ=587.6 nm). The aperture ratio at the infinite focus state and at the close distance focus state is defined by F-number (FNO), and numerical apertures (NA). Moreover, the surface number indicates the lens surface order from the object side of the zoom lens along the direction in which light rays move.

TABLE 5 f = 28.80–44.81–80.69 mm
FNO = 3.54–4.78–7.00
2ω = 75.41°–50.68°–29.50°

| Surface Number | Radius of Curvature | Intersurface Distance | Abbe Number | Refractive Index |
|---|---|---|---|---|
| 1 | 998.8858 | 1.409 | 45.37 | 1.79668 |
| 2 | 17.5826 | 4.681 | | |
| 3 | 21.8995 | 3.842 | 25.50 | 1.80458 |
| 4 | 43.0166 | (d4 = variable) | | |
| 5 | 27.7367 | 3.842 | 64.10 | 1.51680 |
| 6 | −26.0150 | 1.281 | 23.01 | 1.86074 |
| 7 | −43.9216 | 2.561 | | |
| 8 | 13.8897 | 3.051 | 61.09 | 1.58913 |
| 9 | 76.7671 | 0.837 | | |
| 10 | −89.9191 | 1.025 | 33.89 | 1.80384 |
| 11 | 14.9793 | 0.897 | | |
| 12 | 26.7040 | 4.007 | 39.15 | 1.62606 |
| 13 | −14.4413 | 1.281 | 45.37 | 1.79668 |
| 14 | −25.3154 | 0.640 | | |
| 15 | ∞ | (d15 = variable) | (aperture Stop S) | |
| 16 | −54.3114 | 2.305 | 40.76 | 1.58144 |
| 17 | −19.4416 | 4.070 | | |
| 18 | −12.6007 | 1.537 | 49.45 | 1.77279 |
| 19 | −104.8258 | (Bf) | | |

| Variable Space For Zooming | | | |
|---|---|---|---|
| f | 28.8000 | 44.8257 | 80.6862 |
| d4 | 19.1553 | 10.2316 | 1.9211 |
| d15 | 9.7465 | 6.8430 | 4.4726 |
| Bf | 12.9019 | 25.7915 | 51.8792 |

| Focusing Displacement Of Lens Unit 5G2b At Photographic Magnification Of −1/30 | | | |
|---|---|---|---|
| Focal Length f | 28.8000 | 44.8257 | 80.6862 |
| Displacement Δ | −0.6063 | −0.5463 | −0.4456 |

The focusing displacement Δ is positive for movement toward the object side of the zoom lens.

| Values Corresponding To Conditions | |
|---|---|
| f1 = −44.0343 | |
| f2 = 24.9909 | |
| f2a = 40.6070 | |
| f2b = 53.1000 | |
| β2bw = 0.3895 | |
| β2bt = 0.2778 | |
| (β2bw × β2bt)$^{1/2}$ = 0.329 | (6) |
| f2b/ (fw × ft)$^{1/2}$ = 1.101 | (7) |
| \|f1\|/(fw × ft)$^{1/2}$ = 0.913 | (8) |
| f2a/\|f1\| = 0.922 | (9) |
| (d23w − d23t)/(d12w − d12t) = 0.306 | (10) |

FIGS. 21(a)–26(d) show various aberration diagrams for the fifth preferred embodiment. FIGS. 21(a)–21(d) show various aberration diagrams for the infinite focus state at a maximum wide-angle or the shortest focal length state, FIGS. 22(a)–22(d) show various aberration diagrams for the infinite focus state at medium focal length state, and FIGS. 23(a)–23(d) show various aberration diagrams for the infinite focus state at a maximum telephoto state (longest focal length state), FIGS. 24(a)–24(d) show various aberrations at a close-distance focus state (photographic magnification of −1/30 at the maximum wide-angle state, FIGS. 25(a)–25(d) show various aberrations at a close-distance focusing state (photographic magnification of −1/30) at a medium focal length state, and FIGS. 26(a)–26(d) show various aberrations at a close-distance focusing state (photographic magnification of −1/30) at the maximum telephoto state.

Figure 27:
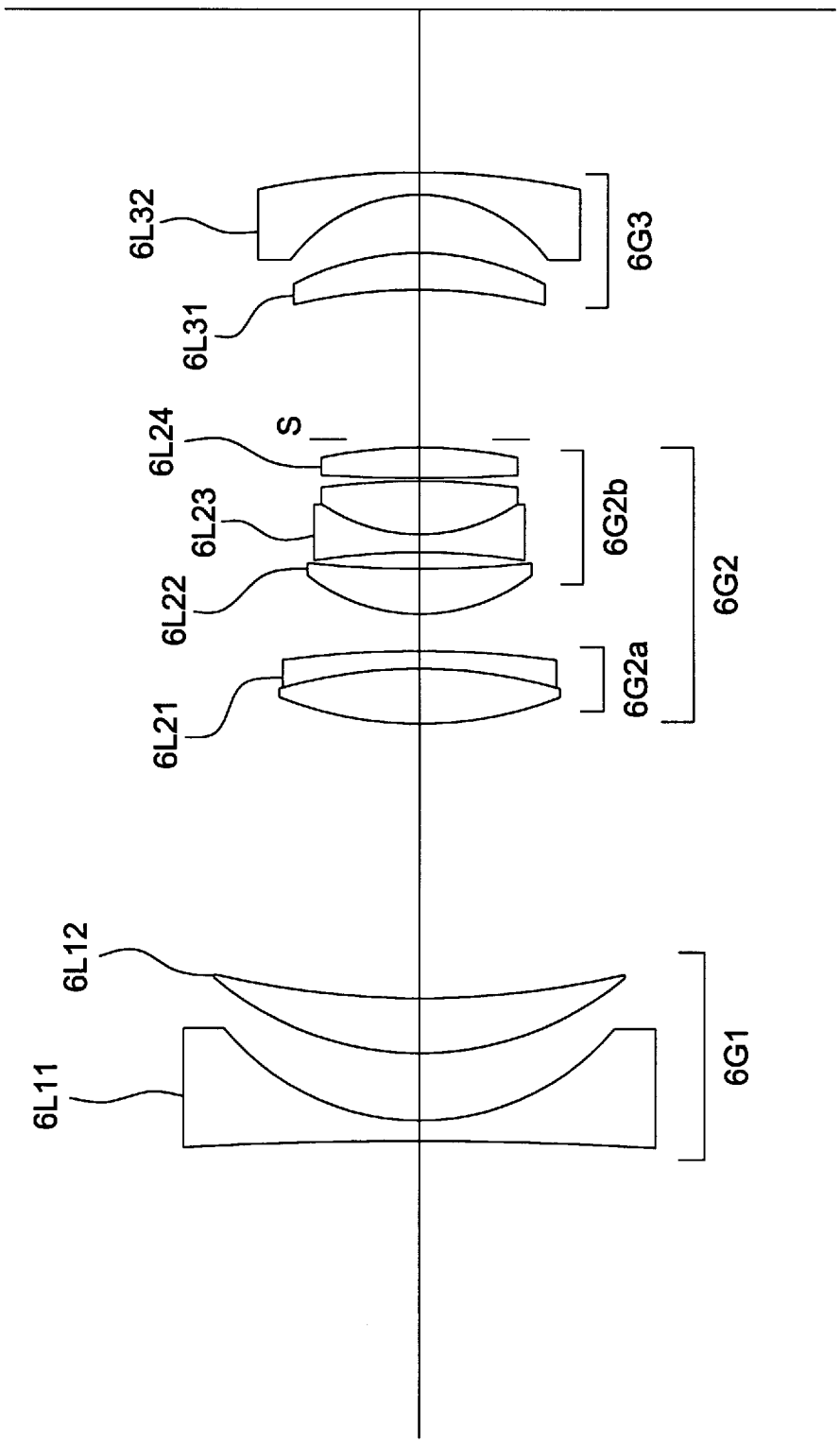
FIG. 27 shows a zoom lens according to a sixth preferred embodiment of the invention.
Figures 28A, 28B, 28C, 28D:
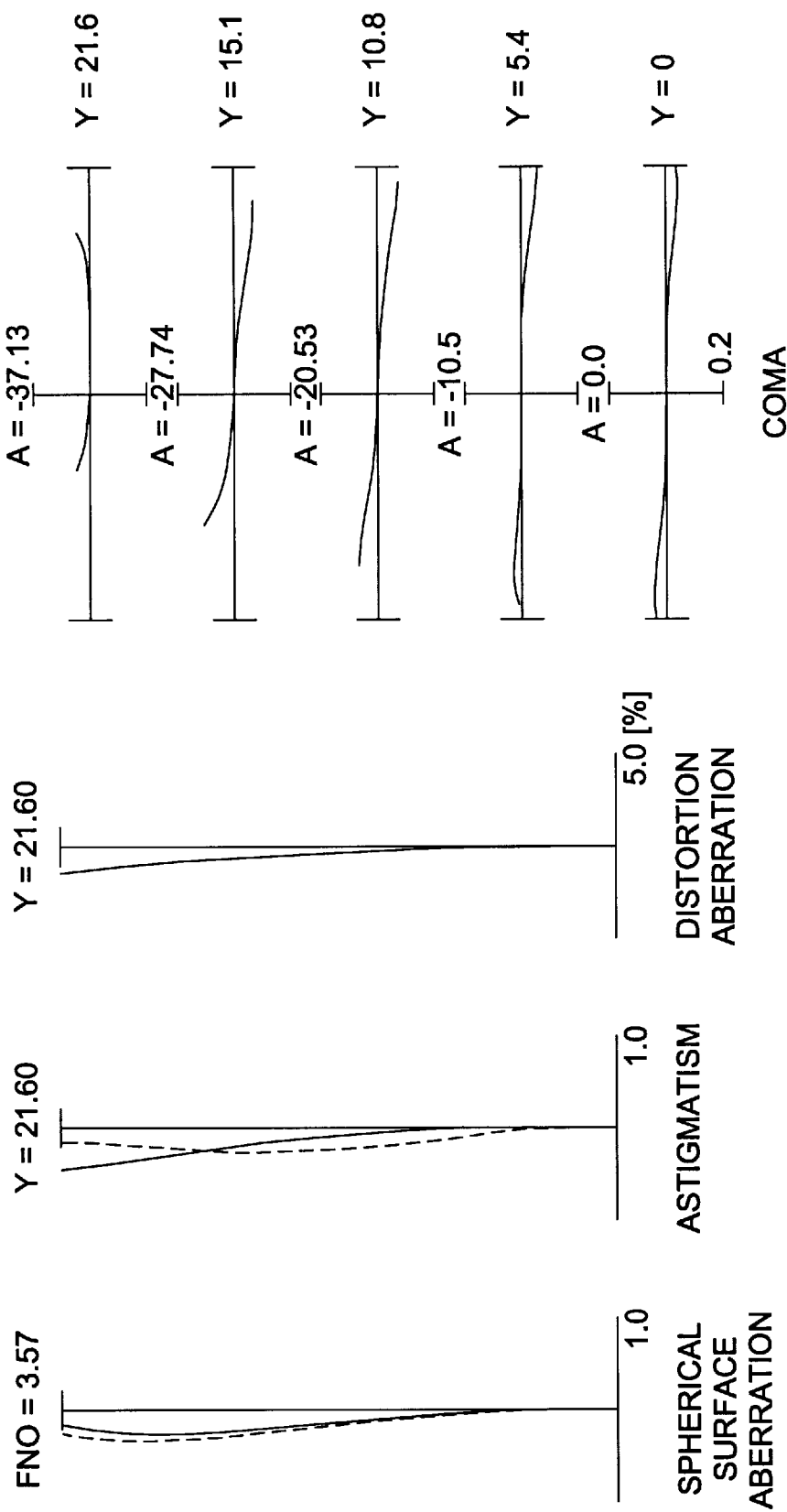
FIGS. 28(a)–28(d) show various aberration diagrams for an infinite focus state at a maximum wide-angle state according to the sixth preferred embodiment.

FIG. 27 shows a zoom lens according to a sixth preferred embodiment of the invention. The zoom lens shown in FIG. 27 comprises, in order from the object side, a first lens group 6G1, which consists of biconcave lens 6L11 and a positive meniscus lens 6L12 with the convex surface facing the object side; a lens unit 6G2a, which consists of a cemented positive lens 6L21 having a biconvex lens and a negative meniscus lens with the concave surface facing the object side; a focusing lens unit 6G2b, which consists of a positive meniscus lens 6L22 with the convex surface facing the object side, a cemented lens 6L23 having a biconvex lens and a biconcave lens; and a third lens group 6G3, which consists of a positive meniscus lens 6L31 with the concave surface facing the object side and a negative meniscus lens 6L32 with the concave surface facing the object side.

FIG. 27 shows the positional relationship of each lens group at a maximum wide-angle state. Each lens group moves on the optical axis along the zoom locus shown by an arrow in FIG. 18 during zooming to a maximum telephoto state.

Moreover, an aperture stop S can be placed between the focusing lens unit 6G2b and the third lens group 6G3 or adjacent to the focusing lens unit 6G2b to move with the second lens group G2 as one unit during zooming.

The values of various dimensions of the sixth preferred embodiment of the invention are listed in Table (6) below. In Table (6), f is focal length, FNO is F-number, 2ω is field angle, and Bf is back focus. Moreover, refractive indices and Abbe numbers correspond to a d-line (λ=587.6 nm), respectively. The aperture ratio at the infinite focus state and at the close distance focus state is defined by F-number (FNO), and numerical apertures (NA). Moreover, the surface number indicates the lens surface order from the object side of the zoom lens along the direction in which light rays move.

TABLE 6 f = 28.96–45.05–81.08 mm
FNO = 3.60–4.88–7.00
2ω = 74.26°–50.74°–29.52°

| Surface Number | Radius of Curvature | Intersurface Distance | Abbe Number | Refractive Index |
|---|---|---|---|---|
| 1 | -305.9674 | 1.416 | 45.37 | 1.79668 |
| 2 | 17.3432 | 4.707 | | |
| 3 | 23.4997 | 3.861 | 25.50 | 1.80458 |
| 4 | 60.5091 | (d4 = variable) | | |
| 5 | 28.2215 | 3.861 | 61.09 | 1.58913 |
| 6 | -33.3708 | 1.287 | 23.01 | 1.86074 |
| 7 | -71.4381 | 2.574 | | |
| 8 | 15.2185 | 2.831 | 61.09 | 1.58913 |
| 9 | 52.5879 | 1.287 | | |
| 10 | -68.6486 | 1.287 | 43.35 | 1.84042 |
| 11 | 12.5237 | 3.827 | 64.10 | 1.51680 |
| 12 | -71.7120 | 0.257 | | |
| 13 | 239.3287 | 1.965 | 55.60 | 1.69680 |
| 14 | -41.9365 | 0.644 | | |
| 15 | ∞ | (d15 = variable) | (aperture stop S) | |
| 16 | -35.9648 | 2.573 | 28.19 | 1.74000 |
| 17 | -18.9160 | 3.846 | | |
| 18 | -12.0798 | 1.544 | 47.47 | 1.78797 |
| 19 | -55.2593 | (Bf) | | |

Variable Space For Zooming

| f | 28.9577 | 45.0452 | 81.0813 |
|---|---|---|---|
| d4 | 19.0243 | 10.3967 | 1.9305 |
| d15 | 10.4030 | 6.9591 | 4.4088 |
| Bf | 13.2561 | 27.5897 | 55.6423 |

TABLE 6-continued f = 28.96–45.05–81.08 mm
FNO = 3.60–4.88–7.00
2ω = 74.26°–50.74°–29.52°

Focusing Displacement Of Lens Unit 6G2b At Photographic Magnification of –1/30

| Focal length f | 28.9577 | 45.0452 | 81.0813 |
|---|---|---|---|
| Displacement Δ | -0.6073 | -0.5403 | -0.4430 |

Where the focusing displacement Δ is positive for movement toward the object side of the zoom lens Values Corresponding To Conditions

| | |
|---|---|
| f1 = -43.4007 | |
| f2 = 25.3798 | |
| f2a = 40.8548 | |
| f2b = 54.3116 | |
| β2bw = 0.3933 | |
| β2bt = 0.2817 | |
| $(β2bw × β2bt)^{1/2} = 0.333$ | (6) |
| $f2b/(fw × ft)^{1/2} = 1.121$ | (7) |
| $|f1|/(fw × ft)^{1/2} = 0.802$ | (8) |
| $f2a/|f1| = 0.941$ | (9) |
| $(d23w - d23t)/(d12w - d12t) = 0.351$ | (10) |

FIGS. 28(a)–33(d) show various aberration diagrams for the sixth preferred embodiment. FIGS. 28(a)–28(d) show various aberration diagrams for the infinite focus state at a maximum wide-angle state, FIGS. 29(a)–29(d) show various aberration diagrams for the infinite focus state at medium focal length state, and FIGS. 30(a)–30(d) show various aberration diagrams for the infinite focus state at a maximum telephoto state, FIGS. 31(a)–31(d) show various aberrations at a close-distance focus state (photographic magnification of –1/30) at the maximum wide-angle state, FIGS. 32(a)–32(d) show various aberrations at a close-distance focusing state (photographic magnification of –1/30) at a medium focal length state, and FIGS. 33(a)–33(d) show various aberrations at a close-distance focusing state (photographic magnification of –1/30) at the maximum telephoto state.

Figure 34:
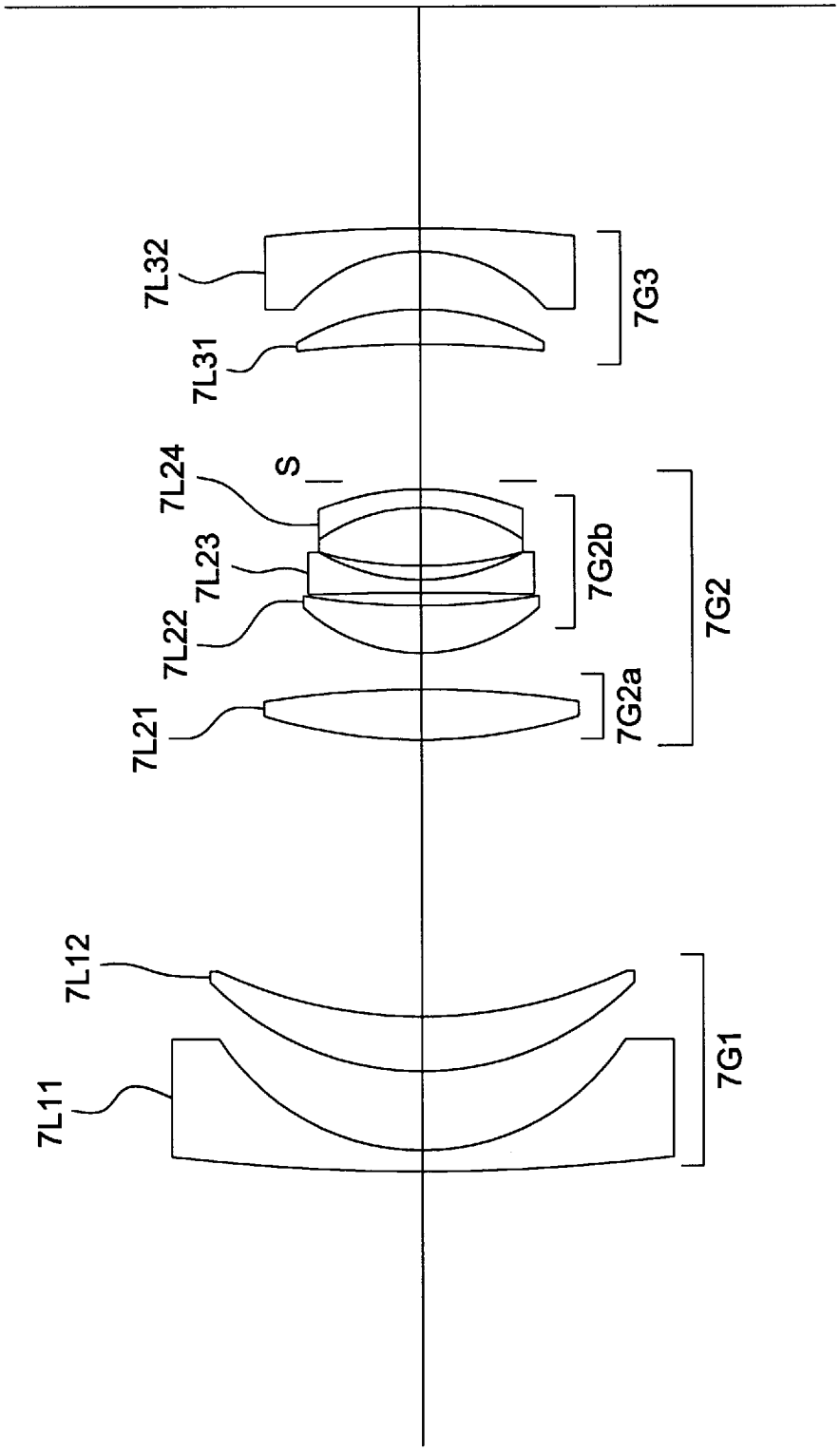
FIG. 34 shows a zoom lens according to a seventh preferred embodiment of the invention.
Figures 36A, 36B, 36C, 36D:
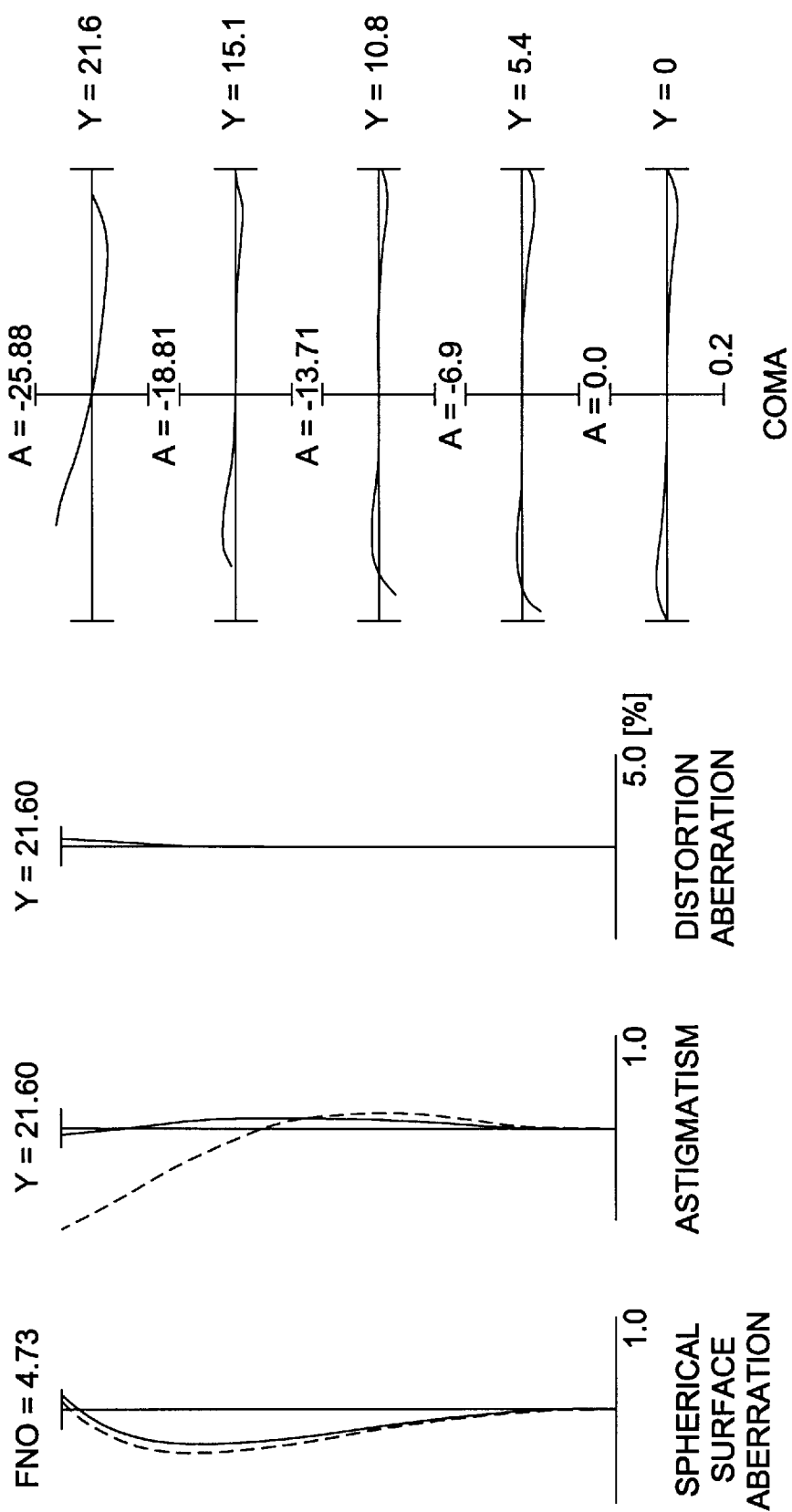
FIGS. 36(a)–36(d) show various aberration diagrams for an infinite focus state at a medium focal length state according to the seventh preferred embodiment.

FIG. 34 shows a zoom lens according to a seventh preferred embodiment of the invention. The zoom lens shown in FIG. 34 comprises, in order from the object side, a first lens group 7G1, which consists of a negative meniscus lens 7L11 with the convex surface facing the object side and a positive meniscus lens 7L12 with the convex surface facing the object side; the lens unit 7G2a, which consists of biconvex lens 7L21; a focusing lens unit 7G2b, which consists of a positive meniscus lens 7L22 with the convex surface facing the object side, a biconcave lens 7L23 and a cemented positive lens 7L24 having a biconvex lens and a negative meniscus lens with the concave surface facing the object side; and a lens group 7G3, which consists of a positive meniscus lens 7L31 with the concave surface facing the object side and a negative meniscus lens 7L32 with the concave surface facing the object side.

FIG. 34 shows the positional relationship of each lens group at a maximum wide-angle state. Each lens group moves on the optical axis along the zoom locus shown by an arrow in FIG. 18 during zooming to a maximum telephoto state.

Moreover, an aperture stop S can be placed between the focusing lens unit 7G2b and the third lens group 7G3 or adjacent to the focusing lens unit 7G2b to move with the second lens group 7G2 as one unit during zooming.

The values of various dimensions of the seventh preferred embodiment of the invention are listed in Table (7) below. In Table (7), f is focal length, FNO is F-number, 2ω is field angle, and Bf is back focus. Moreover, refractive indices and Abbe numbers that correspond to a d-line (λ=587.6 nm), respectively. The aperture ratio at the infinite focus state and at the close distance focus state is defined by F-number (FNO), and numerical apertures (NA). Moreover, the surface number indicates lens surface order from the object side of the zoom lens along the direction in which light rays move.

TABLE 7 f = 28.81–44.30–80.64 mm
FNO = 3.60–4.72–7.00
2ω = 74.96°–51.76°–29.73°

| Surface Number | Radius of Curvature | Intersurface Distance | Abbe Number | Refractive Index |
|---|---|---|---|---|
| 1 | 158.6153 | 1.408 | 45.37 | 1.79668 |
| 2 | 16.5253 | 5.253 | | |
| 3 | 20.8320 | 3.840 | 25.50 | 1.80458 |
| 4 | 32.8210 | (d4 = variable) | | |
| 5 | 36.8162 | 3.456 | 56.05 | 1.56883 |
| 6 | −67.7923 | 2.560 | | |
| 7 | 12.8474 | 3.072 | 57.03 | 1.62280 |
| 8 | 44.9067 | 0.896 | | |
| 9 | −106.2553 | 1.024 | 25.50 | 1.80458 |
| 10 | 14.5488 | 0.896 | | |
| 11 | 26.1364 | 3.968 | 40.76 | 1.58144 |
| 12 | −12.1979 | 1.280 | 45.37 | 1.79668 |
| 13 | −21.2128 | 0.640 | | |
| 14 | ∞ | (d15 = variable) | (aperture stop S) | |
| 15 | −43.2743 | 2.560 | 33.75 | 1.64831 |
| 16 | −17.4168 | 3.956 | | |
| 17 | −12.0751 | 1.536 | 49.45 | 1.77279 |
| 18 | −54.0782 | (Bf) | | |

| Variable Space For Zooming | | | |
|---|---|---|---|
| f | 28.8054 | 44.3046 | 80.6363 |
| d4 | 19.2380 | 10.5111 | 1.9200 |
| d15 | 9.5159 | 6.3618 | 4.1010 |
| Bf | 15.8915 | 30.0264 | 58.5580 |

| Focusing Displacement Of Lens Unit 7G2b At Photographic Magnification Of (−1/30) | | | |
|---|---|---|---|
| Focal Length f | 28.8054 | 44.3046 | 80.6363 |
| Displacement Δ | −0.6104 | −0.5840 | −0.5232 |

The focusing displacement Δ is positive for movement toward the object side of the zoom lens.

| Values Corresponding To Conditions | |
|---|---|
| f1 = −39.1922 | |
| f2 = 25.2093 | |
| f2a = 42.4526 | |
| f2b = 52.6443 | |
| β2bw = 0.3288 | |
| β2bt = 0.1656 | |
| (β2bw × β2bt)$^{1/2}$ = 0.233 | (6) |
| f2b/ (fw × ft)$^{1/2}$ = 1.094 | (7) |
| \|f1\|/(fw × ft)$^{1/2}$ = 0.661 | (8) |
| f2a/\|f1\| = 1.083 | (9) |
| (d23w − d23t)/(d12w − d12t) = 0.313 | (10) |

FIGS. 35(a)–40(d) show various aberration diagrams for the seventh preferred embodiment FIGS. 35(a)–35(d) show various aberration diagrams for the infinite focus state at a maximum wide-angle state, FIGS. 36(a)–36(d) show various aberration diagrams for the infinite focus state at medium focal length state, and FIGS. 37(a)–37(d) show various aberration diagrams for the infinite focus state at a maximum telephoto state, FIGS. 38(a)–38(d) show various aberrations at a close-distance focus state (photographic magnification of −1/30) at the maximum wide-angle state, FIGS. 39(a)–39(d) show various aberrations at a close-distance focusing state (photographic magnification of −1/30) at a medium focal length state, and FIGS. 40(a)–40(d) show various aberrations at a close-distance focusing state (photographic magnification of −1/30) at the maximum telephoto state.

Figure 41:
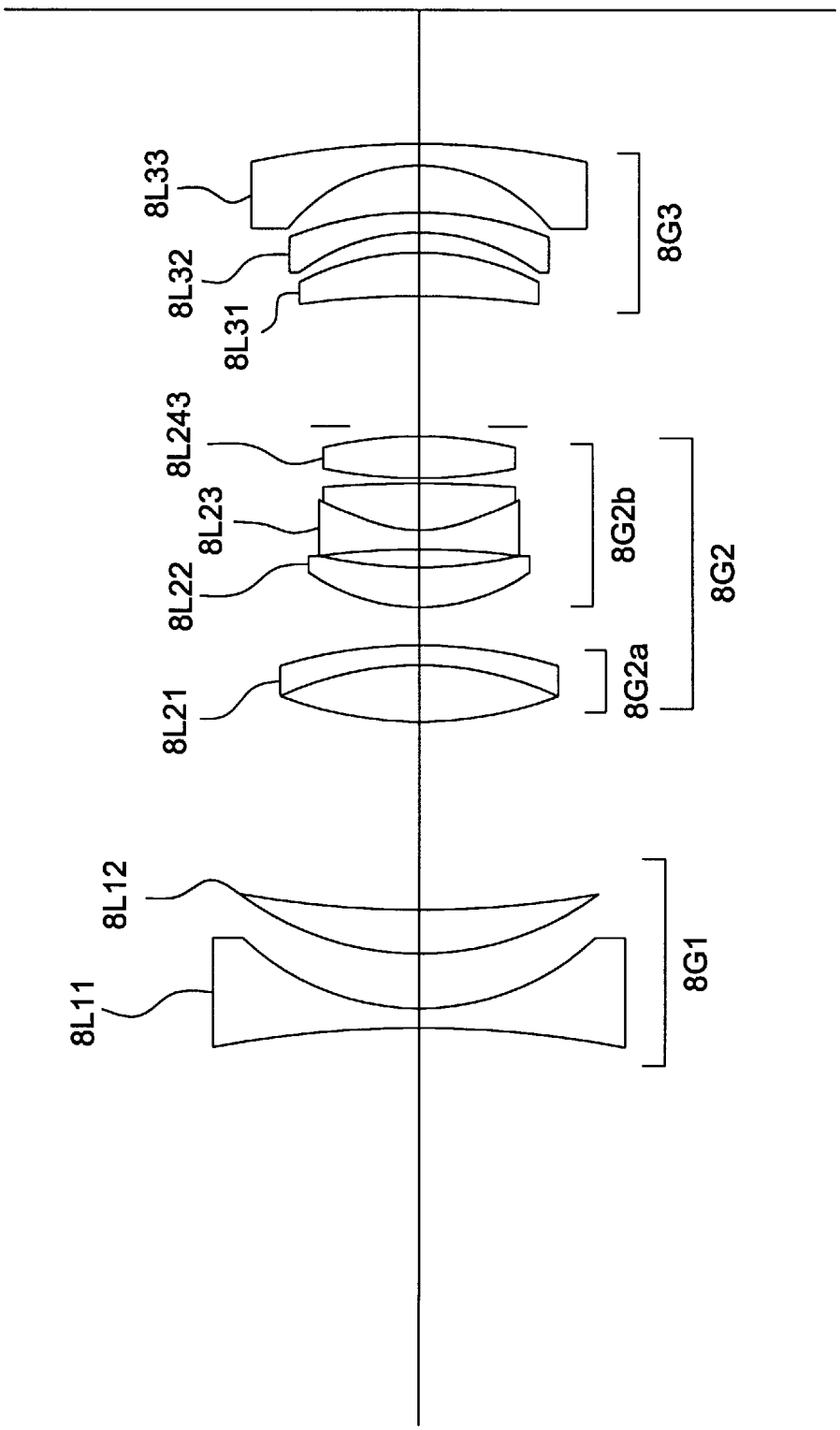
FIG. 41 shows a zoom lens according to an eighth preferred embodiment of the invention.
Figures 43A, 43B, 43C, 43D:
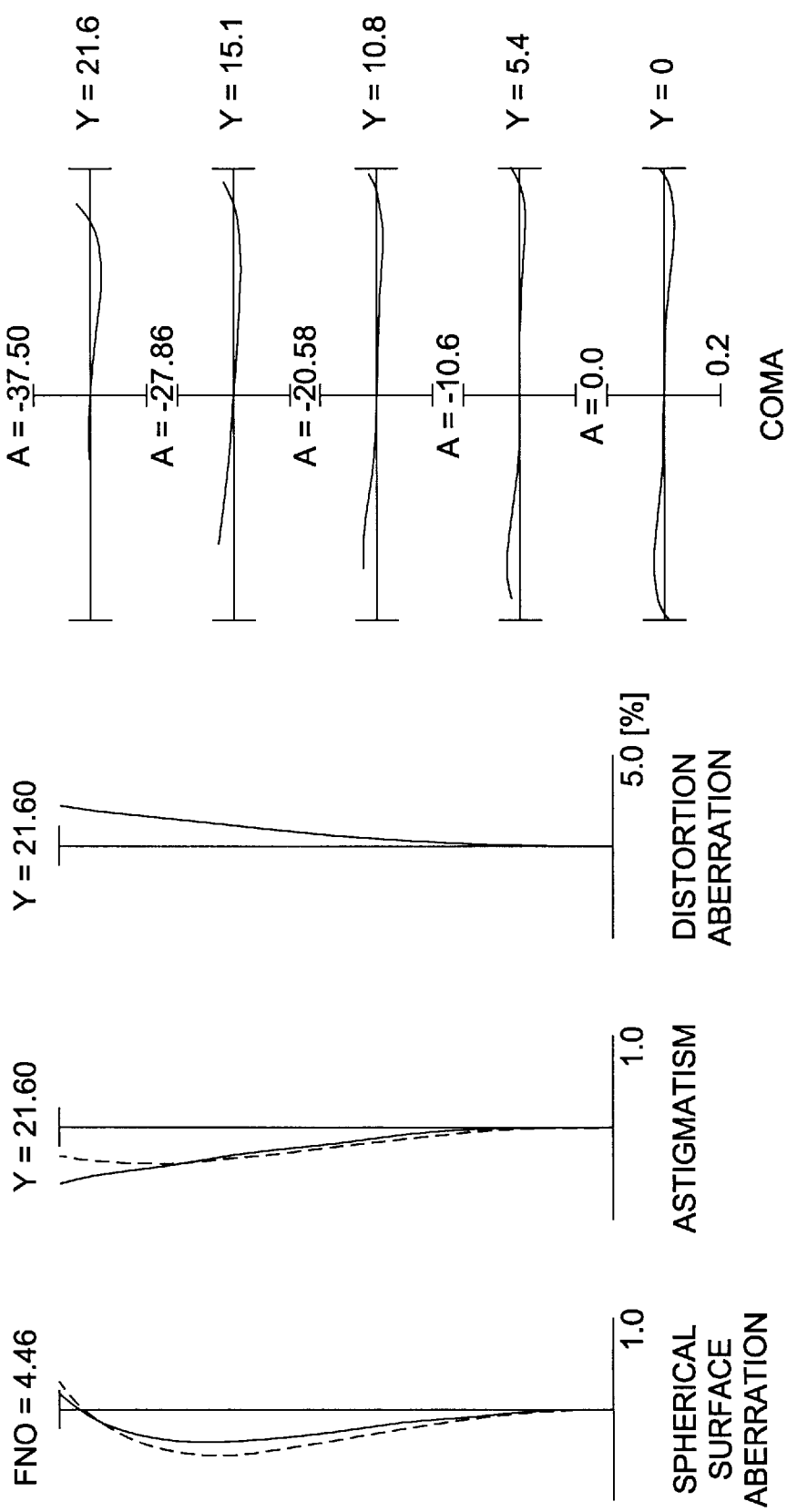
FIGS. 43(a)–43(d) show various aberration diagrams for an infinite focus state at a medium focal length state according to the eighth preferred embodiment.
Figures 47A, 47B, 47C, 47D:
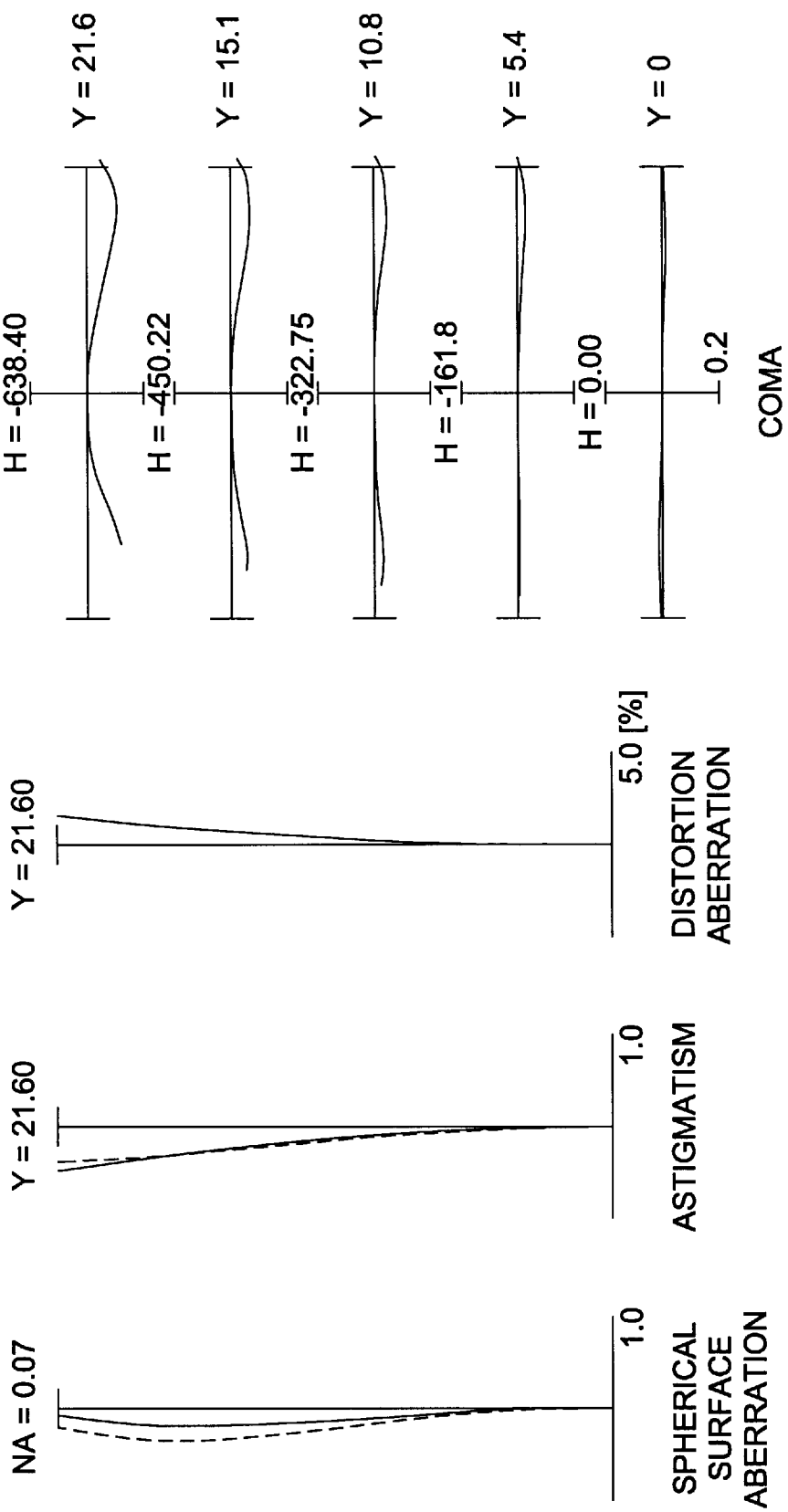
FIGS. 47(a)–47(d) show various aberration diagrams for a close distance focus state at a maximum telephoto state according to the eighth preferred embodiment.

FIG. 41 shows the structure of a zoom lens in a according to an eighth preferred embodiment of the invention. The zoom lens shown in the FIG. 41 comprises, in order from the object side, a first lens group 8G1, which consists of biconcave lens 8L11 and positive meniscus lens 8L12 with the convex surface facing the object side; a lens unit 8G2a, which consists of a cemented positive lens 8L21 having a biconvex lens and a negative meniscus lens with the concave surface facing the object side; a focusing lens unit 8G2b, which consists of a positive meniscus lens 8L31 with the concave surface facing the object side, a cemented lens having a biconvex lens and a biconcave lens, and a biconvex lens 8L24; and the third lens group 8G3, which consists of a negative meniscus lens 8L32 with the concave surface facing the object side and a negative meniscus lens 8L33 with the concave surface facing the object side.

FIG. 41 shows the positional relationship of each lens group in maximum wide-angle state. Each lens group moves on the optical axis along the zoom locus shown by an arrow in FIG. 18 during zooming to a maximum telephoto state.

Moreover, an aperture stop S can be placed between the focusing lens unit 8G2b and the third lens group 8G3 or adjacent to the focusing lens unit 8G2b to move with the second lens group 8G2 as one unit during zooming.

The values of various dimensions of the eighth preferred embodiment of the invention are listed in Table (8) below. In Table (8), f is focal length, FNO is F-number, 2ω is field angle, and Bf is back focus. Moreover, refractive indices and Abbe numbers correspond to a d-line (λ=587.6 nm), respectively. The aperture ratio at the infinite focus state and at the close distance focus state is defined by F-number (FNO), and numerical apertures (NA). Moreover, the surface number indicates the lens surface order from the object side of the zoom lens along the direction in which light rays move.

TABLE 8 f = 28.87–44.91–80.84 mm
FNO = 3.60–4.43–7.34
2ω = 75.00°–50.38°–29.51°

| Surface Number | Radius of Curvature | Intersurface Distance | Abbe Number | Refractive Index |
|---|---|---|---|---|
| 1 | −82.7365 | 1.412 | 49.45 | 1.77279 |
| 2 | 18.1947 | 3.850 | | |
| 3 | 21.8527 | 3.080 | 27.61 | 1.75520 |
| 4 | 71.7324 | (d4 = variable) | | |
| 5 | 31.5772 | 3.850 | 64.10 | 1.51680 |
| 6 | −21.3396 | 1.283 | 25.50 | 1.80458 |
| 7 | −32.8561 | 2.566 | | |
| 8 | 13.1157 | 2.823 | 64.10 | 1.51680 |
| 9 | 34.9292 | 1.283 | | |
| 10 | −49.1259 | 1.283 | 43.35 | 1.84042 |
| 11 | 11.6852 | 3.465 | 69.98 | 1.51860 |
| 12 | −104.8487 | 0.257 | | |
| 13 | 30.9481 | 2.951 | 64.10 | 1.51680 |
| 14 | −30.3113 | 0.642 | | |

TABLE 8-continued f = 28.87–44.91–80.84 mm
FNO = 3.60–4.43–7.34
2ω = 75.00°–50.38°–29.51°

| 15 | ∞ | (d15 = variable) | (aperture stop S) | |
|---|---|---|---|---|
| 16 | −52.5153 | 3.208 | 28.34 | 1.72825 |
| 17 | −16.4585 | 1.283 | | |
| 18 | −14.7819 | 1.283 | 45.37 | 1.79668 |
| 19 | −29.1527 | 3.336 | | |
| 20 | −12.3545 | 1.540 | 49.45 | 1.77279 |
| 21 | −55.9648 | (Bf) | | |

Variable Space For Zooming

| f | 28.8717 | 44.9125 | 80.8350 |
|---|---|---|---|
| d4 | 13.4200 | 6.6257 | 1.2832 |
| d15 | 9.1810 | 6.6263 | 3.8495 |
| Bf | 9.3340 | 20.9825 | 47.2478 |

Focusing Displacexnent Of Lens Unit 8G2b At Photographic Magnification Of −1/30

| Focal Length f | 28.8717 | 44.9125 | 80.8350 |
|---|---|---|---|
| Displacement Δ | −0.5624 | −0.4719 | −0.3338 |

The focusing displacement Δ is positive for movement toward the object side.

Values Corresponding To Conditions

| f1 = −43.9378 | |
| f2 = 23.3365 | |
| f2a = 37.2417 | |
| f2b = 46.6993 | |
| β2bw = 0.3894 | |
| β2bt = 0.3116 | |
| (β2bw × β2bt)$^{1/2}$ = 0.348 | (6) |
| f2b/ (fw × ft)$^{1/2}$ = 0.967 | (7) |
| |f1|/(fw × ft)$^{1/2}$ = 0.889 | (8) |
| f2a/|f1| = 0.848 | (9) |
| (d23w − d23t)/(d12w − d12t) = 0.439 (10) | (10) |

FIGS. 42(a)–47(d) show various aberration diagrams for the eight preferred embodiment. FIGS. 42(a)–42(d) show various aberration diagrams for the infinite focus state at a maximum wide-angle state, FIGS. 43(a)–43(d) show various aberration diagrams for the infinite focus state at medium focal length state, FIGS. 44(a)–44(d) show various aberration diagrams for the infinite focus state at a maximum telephoto state, FIGS. 45(a)–45(d) show various aberrations at a close-distance focus state (photographic magnification of −1/30) at the maximum wide-angle state, FIGS. 46(a)–46(d) show various aberrations at a close-distance focusing state (photographic magnification of −1/30) at a medium focal length state, and FIGS. 47(a)–47(d) show various aberrations at a close-distance focusing state (photographic magnification of −1/30) at the maximum telephoto state.

The zoom lens of the ninth trough thirteenth preferred embodiments will now be generally described. The zoom lens shown in FIG. 48, in order from the object side, comprises a first lens group IIG1 having a negative refractive power, a second lens group IIG2 having a positive refractive power, and a third lens group IIG3 having a negative refractive power. During zooming from a maximum wide-angle state to a maximum telephoto state, at least the second lens group IIG2 and the third lens group IIG3 move toward the object side so that the distance between the first lens group IIG1 and the second lens group IIG2 decreases and the distance between the second lens group IIG2 and the third lens group IIG3 decreases. Therefore, both widening of an angle and superior performance of the zoom lens are achieved.

In the ninth-thirteenth preferred embodiments, a second lens group IIG2 comprises a lens unit IIG2a, which has a positive refractive power, positioned towards the object and a lens unit IIG2b, which has a negative refractive power, positioned towards the image plane. Thus, the principal point of the second lens group IIG2 is on the object side of the second lens group IIG2. This permits the total length of the lens system can be shortened.

Additionally, by placing the principal point of the second lens group IIG2 on the object side of the second lens group IIG2, the distance changes between the first lens group IIG1 and the second lens group IIG2 during zooming is effectively utilized during zooming.

In particular, according to the ninth through thirteenth preferred embodiments, the second lens group IIG2 is the only lens group with a positive refractive power. The second lens group IIG2 comprises a positive lens unit IIG2a and a negative lens unit IIG2b. Therefore, it is important to correct negative spherical aberrations in the lens unit IIG2a. The zoom lens according to the ninth-thirteenth preferred embodiments satisfies conditions (11) and 12):

$$-0.75<(f1-f3)/(f1+f3)<-0.35 \tag{11}$$

$$0.4<(\beta 3t/\beta 3w)/(\beta 2t/\beta 2w)<0.75 \tag{12}$$

Where, f1 is the focal length of the first lens group IIG1, f3 is the focal length of the third lens group IIG3, β2w is the lateral magnification of the second lens group IIG2 at a maximum wide-angle state, β2t is the lateral magnification of the second lens group IIG2 at a maximum telephoto state, β3w is the lateral magnification of the third lens group IIG3 at a maximum wide-angle state, and β3t is the lateral magnification of the third lens group IIG3 at a maximum telephoto state.

Condition (11) balances the focal length of the first lens group IIG1 and the focal length of the third lens group IIG3.

If the upper limit of the condition (11) is exceeded, the focal length of the first lens group IIG1 would become large in negative value, compared to the focal length of the third lens group IIG3. This would cause the diverging effect of the first lens group IIG1 to become smaller. Thus, off-axis rays passing through the first lens group IIG1 at a maximum wide-angle state would separate from the optical axis. It would be impossible to minimize the diameter of frontmost lens to maintain the amount of light in the marginal zone.

If the lower limit of the condition (11) is not reached, the focal length of the first lens group IIG1 would become a smaller negative value, compared to the focal length of the third lend group IIG3. Thus, the total length of the lens system at a maximum telephoto state would become large and negative spherical aberrations at a maximum wide-angle state could not be controlled.

Further, to reduce size of the system while maintaining a high performance of the system, the upper limit of the condition (11) should be −0.4, or the lower limit of the condition (11) should be −0.7.

Condition (12) specifies the ratio of the change in the lateral magnification of second lens group IIG2 the change of the lateral magnification of the third lens group IIG3.

If the upper limit of the condition (12) is exceeded, the variation of the lateral magnification ratio of the third lens group IIG3 becomes larger. Thus, a sufficient back focus could not be obtained at a maximum wide-angle state. Moreover, an exit pupil position approaches the image plane in the marginal area, compared to the exit pupil position in a region near the axis. This results in a smaller exit pupil diameter, and a sufficient amount of light in the marginal zone could not be obtained.

If the lower limit of the condition (12) is not reached, the zoom ratio of the second lens group IIG2 becomes larger. However, the height of off-axis ray, i.e., the distance between the off-axis ray and the optical axis orthogonal to the optical axis, that passes through the second lens group IIG2, does not change with the zoom ratio, but only changes its incident angle. Thus, it is difficult to control off-axis aberration fluctuations generated by the second lens group IIG2.

To achieve a high zoom ratio, while maintaining a high functionality, the upper limit of the condition (12) should be 0.7, or the lower limit of the condition (12) should be 0.5.

Moreover, according to an other aspect of the ninth-thirteenth preferred embodiments of the invention, the zoom lens comprises a first lens group IIG1 having a negative refractive power, a second lens group IIG2 having a positive refractive power, and a third lens group IIG3 having a negative refractive power. During zooming from a maximum wide-angle state to a maximum telephoto state, at least the second lens group IIG2 and the third lens group IIG3 move toward the object side, so that the distance between the first lens group IIG1 and the second lens group IIG2 decreases. Also, the distance between the second lens group IIG2 and the third lens group IIG3 decreases. The second lens group IIG2 comprises a lens group or first lens group unit IIG2a having a positive refractive power and a lens group or second lens group unit IIG2b having negative refractive power. Thus, both widening of the angle and superior performance in the zoom lens can be achieved by satisfying the condition (13) below.

$$0.3 < f2a/|f2b| < 0.7 \tag{13}$$

in here, f2a is the focal length of the lens group IIG2a; and f2b is the focal length of the lens group IIG2b.

Condition (13) defines an appropriate range for the ratio between the focal length of the lens group IIG2a and the focal length of the lens group IIG2b.

If the upper limit of the condition (13) is exceeded, the focal length of the lens group IIG2a becomes a large positive value and the focal length of the lens group IIG2b becomes a small negative value. The interval between principal points of the lens group IIG2a and the lens group IIG2b must be sufficiently large, assuming the refractive power of the second lens group IIG2 is constant. The interval between principal points can be made large by making thickness of the second lens group IIG2 large, or alternatively by making the principal point position of the lens group IIG2a closer to the object. Where the thickness of the second lens group IIG2 is made larger, an off-axis ray that passes the lens group away from aperture stop at a maximum wide-angle state is separated from the axis. Thus, the diameter of the lens could not be made smaller.

Further, where the position of the principal point of the lens group IIG2a is closer to the object, it is difficult to satisfactorily correct negative spherical aberrations generated by the lens group IIG2a.

On the other hand, if the lower limit of the condition (13) is not reached, the refractive power of the lens group IIG2a becomes a smaller positive value and the refractive power of the lens group IIG2b becomes a larger negative value. The interval between principal points of the lens groups IIG2a and IIG2b becomes smaller. However, the principal point of the second lens group IIG2 could not be moved closer to the object, and the change of the distance between the first lens group IIG1 and the second lens group IIG2 during zooming could not be effectively utilized. Moreover, off-axis aberration fluctuations generated in conjunction with zooming could not be controlled if the predetermined zoom ratio could not be obtained.

If a larger diameter zoom lens is desired, the lower limit of the condition (13) should be 0.4, or the upper limit of the condition (13) should be 0.55.

In order to control coma fluctuations due to the field angle at a maximum wide-angle state, and to make the rearmost lens diameter smaller, the zoom lens should satisfy condition (14):

$$0.35 < Bfw/fw < 0.60 \tag{14}$$

where Bfw is the back focus at a maximum wide-angle state and fw is the total focal length of the lens system at a maximum wide-angle state.

Condition (14) defines an appropriate range for back focus at a maximum wide-angle state. If the upper limit of the condition (14) is exceeded, the difference between on-axis and off-axis rays that passes through the third lens group IIG3 at the maximum wide-angle state becomes small. Thus, the of coma fluctuation to the field angle could not be controlled.

If the lower limit of the condition (14) is not reached, a sufficiently large back focus could not be obtained at the maximum wide-angle state. Furthermore, an off-axis ray that passes through the third lens group IIG3 is separated far from the optical axis, resulting in the diameter of rearmost lens being too large.

In order to make the lens diameter small, it is desirable to position an aperture stop in or adjacent to second lens group IIG2. In particular, the aperture diameter can be smaller if the aperture stop can be placed between the second lens group IIG2 and the third lens group IIG3.

The invention according to the ninth-thirteenth preferred embodiments is capable of controlling aberration fluctuation generated during an image shift, when the image shift is executed by properly moving or decentering all, one or some of the lens group that comprise the zoom lens, in a direction substantially orthogonal to the optical axis. Moreover, for focusing, the first lens group IIG1 or the third lens group IIG3 is moved to obtain a better imaging capability. Focusing can be executed by moving a part of the second lens group IIG2 to obtain a favorable imaging capability.

Figure 48:
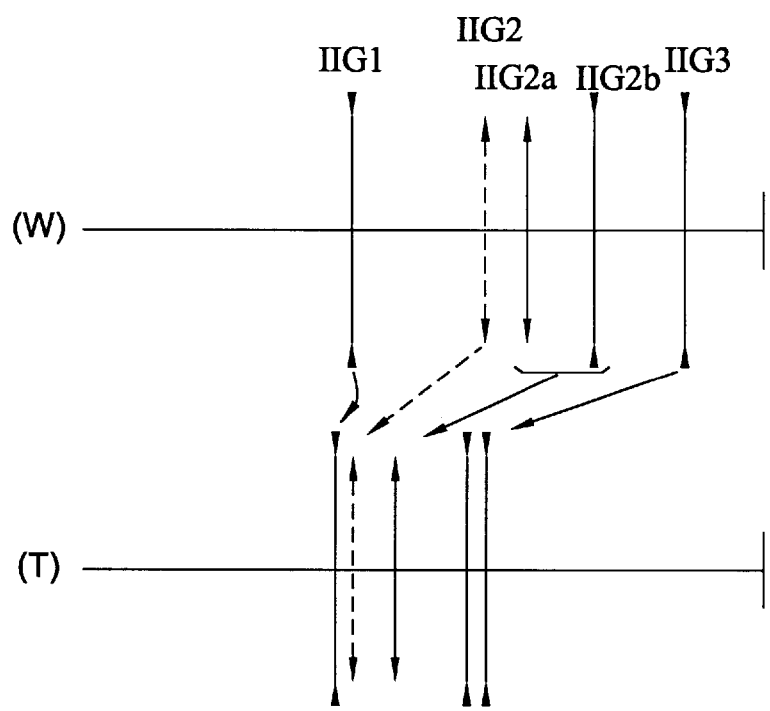
FIG. 48 is a drawing showing a zoom lens and the movement of each lens group during zooming from a maximum wide-angle state to a maximum telephoto state for the ninth-thirteenth preferred embodiments of the invention.

Hereafter, each of the ninth-thirteenth preferred embodiments of the invention will be described with reference to the attached drawings. FIG. 48 shows zoom lens and the movement of each lens group during zooming from maximum wide-angle state (W) to a maximum telephoto state (T).

Figure 49:
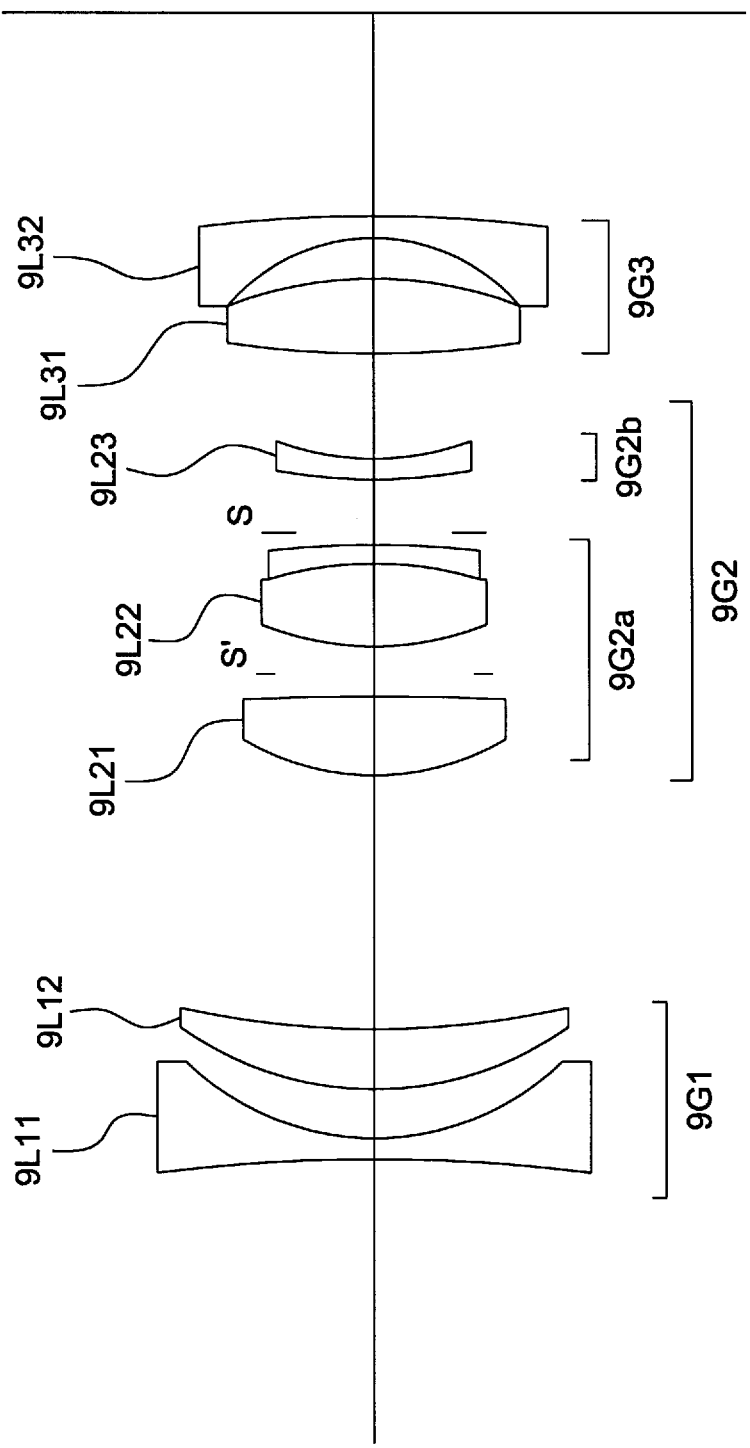
FIG. 49 shows a zoom lens according to a ninth preferred embodiment of the invention of the invention.
Figures 51A, 51B, 51C, 51D:
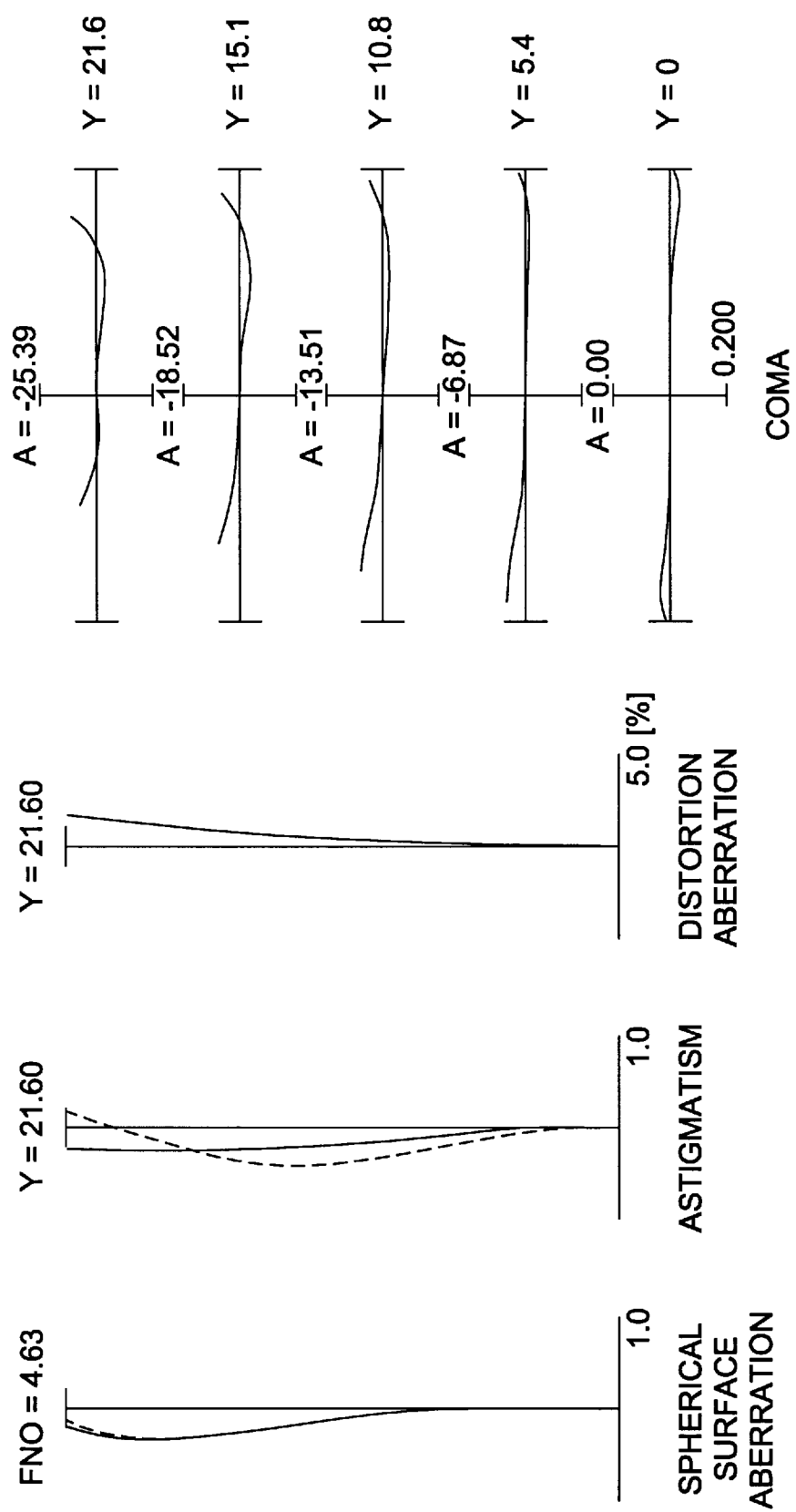
FIGS. 51(a)–51(d) show various aberration diagrams for an infinite focus state at a medium focal length state according to the ninth preferred embodiment.
Figures 52A, 52B, 52C, 52D:
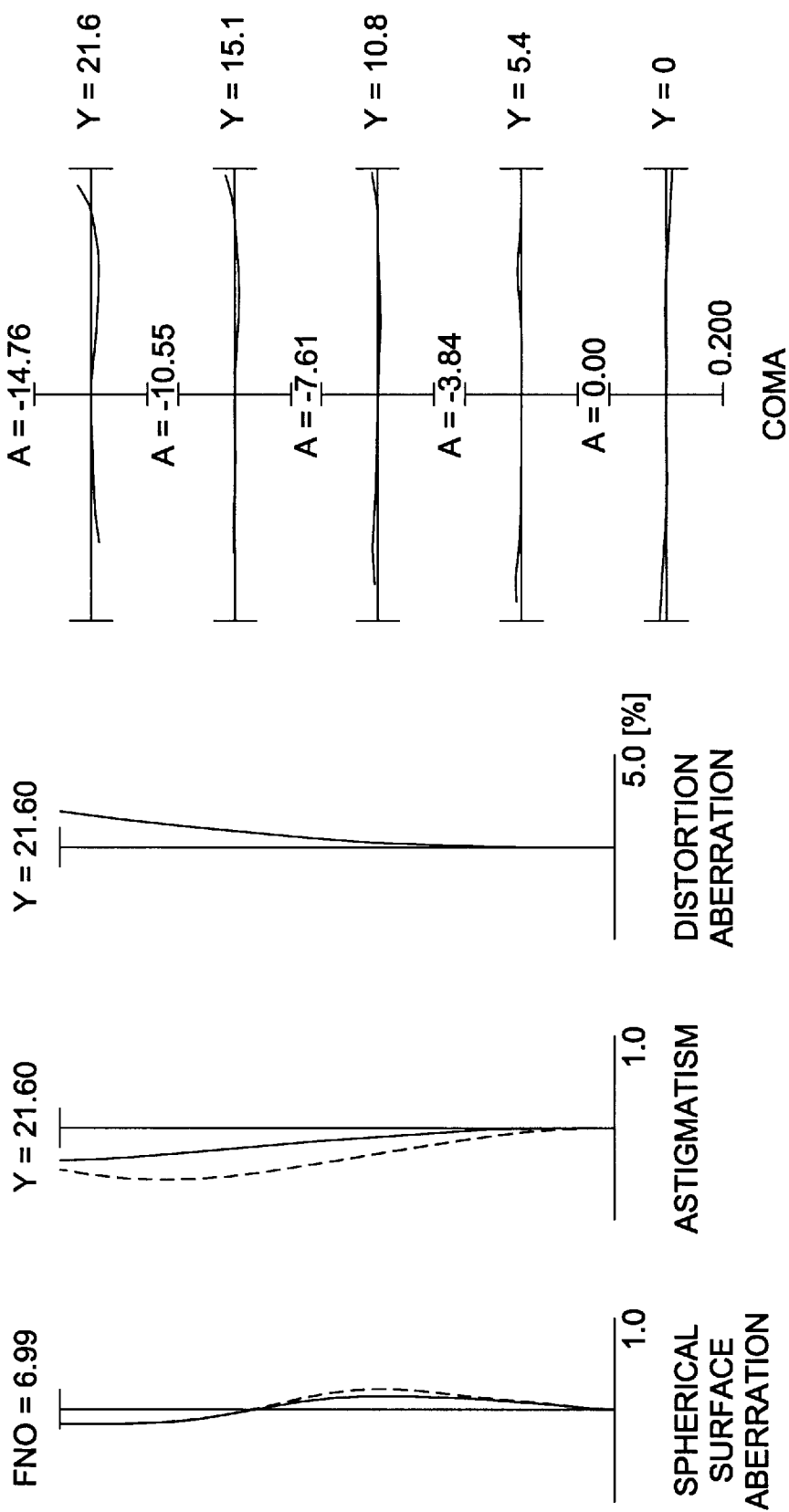
FIGS. 52(a)–52(d) show various aberration diagrams for infinite focus state at a maximum telephoto state according to the ninth preferred embodiment.

FIG. 49 shows with particularity a zoom lens according to the ninth preferred embodiment of the present invention. The zoom lens comprises, in order from the object side, a first lens group 9G1, which consists of biconcave lens 9L11 and positive meniscus lens 9L12 with the convex surface facing the object side; a lens unit 9G2a, which consists of biconvex lens 9L21 and a cemented positive lens 9L22 having a biconvex lens and a negative meniscus lens with the concave surface facing the object side; a lens unit 9G2b, which consists of a negative meniscus lens 9L23 with the convex surface facing the object side; and a third lens group 9G3, which consists of a negative meniscus lens 9L32 with the concave surface facing the object side.

FIG. 49 shows the positional relationship of each lens group at a maximum wide-angle state. Each lens group on the optical axis along the zoom locus, shown by an arrow in FIG. 48 during zooming to a maximum telephoto state. Moreover, in the second lens group 9G2, aperture stop S and fixed stop S' are provided.

The values of various dimensions of the ninth preferred embodiment of the invention are listed in Table (9) below. In Table (9), f is focal length, FNO is F-number, 2ω is field angle, and Bf is back focus. Moreover, refractive indices and Abbe numbers correspond to a d-line (λ=587.6 nm). The aperture ratio is defined by F-number (FNO). Moreover, the surface number indicates the lens surface order from the object side of the zoom lens along the direction in which light rays move.

The shape of non-spherical surfaces is expressed by equation (9a), where y is the height in the perpendicular direction to the optical axis, S(y) is a displacement amount (where the direction from the object side to the image side is the positive direction on the optical axis at height y, R is a reference radius of curvature (vertex radius of curvature), κ is a conical coefficient, and $C_n$ is a non-spherical surface coefficient of nth degree.

$$S(y) = (y^2/R)/[1+(1-\kappa \cdot y^2/R^2)^{1/2}] + C_2 \cdot y^2 + C_4 \cdot y^4 + C_6 \cdot y^6 + C_8 \cdot y^8 + C_{10} \cdot y^{10} + \quad (9a)$$

Furthermore, a near-axis radius of curvature for each non-spherical surface is defined by equation (9b).

$$R = 1/(2 \cdot C_2 + (1/R)) \quad (9b)$$

The non-spherical surfaces in the table indicating the various dimensions are marked with the symbol * to the right of the surface number.

TABLE 9 f = 28.81–44.74–80.44 mm
FNO = 3.60–4.64–7.00
2ω = 75.24°–50.78°–29.52°

| Surface Number | Radius of Curvature | Intersurface Distance | Abbe Number | Refractive Index |
|---|---|---|---|---|
| 1 | −86.5235 | 1.4086 | 45.37 | 1.79668 |
| 2* | 18.5293 | 3.2257 | | |
| 3 | 23.1080 | 3.8417 | 28.24 | 1.7400 |
| 4 | 62.4446 | (d4 = variable) | | |
| 5 | 18.0979 | 5.122 | 70.45 | 1.48749 |
| 6 | −188.8233 | 1.5367 | | |
| 7 | ∞ | 1.9208 | (fixed stop S') | |
| 8* | 21.6259 | 5.4332 | 60.82 | 1.56384 |
| 9 | −22.4770 | 1.2806 | 23.01 | 1.86074 |
| 10 | −67.7695 | 0.6403 | | |
| 11 | ∞ | 3.6173 | (aperture stop S) | |
| 12 | 82.0148 | 1.2806 | 43.35 | 1.84042 |
| 13 | 24.1626 | (d13 = variable) | | |
| 14 | 79.0240 | 4.9942 | 32.17 | 1.67270 |
| 15 | −26.7277 | 2.6359 | | |
| 16 | −12.8480 | 1.2806 | 52.30 | 1.74810 |
| 17 | −81.4863 | (Bf) | | |

Non-spherical Surface Data

| | κ | $C_2$ | $C_4$ | $C_6$ | $C_8$ | $C_{10}$ |
|---|---|---|---|---|---|---|
| surface 2 | 1.0000 | 0.0000 | −5.40130 × 10$^{-6}$ | 2.82370 × 10$^{-8}$ | −3.80130 × 10$^{-10}$ | 7.31820 × 10$^{-13}$ |
| surface 8 | 1.0000 | 0.0000 | −3.00600 × 10$^{-5}$ | 1.73100 × 10$^{-8}$ | −2.78700 × 10$^{-9}$ | 1.05440 × 10$^{-11}$ |

Variable Space For Zooming

| | | | |
|---|---|---|---|
| f | 28.8132 | 44.7399 | 80.4424 |
| d4 | 16.6236 | 8.2806 | 1.2806 |
| d13 | 6.9090 | 4.5256 | 2.8711 |
| Bf | 13.3078 | 25.3383 | 49.4910 |

Values Corresponding To Conditions

| | |
|---|---|
| f1 = −34.2866 | |
| f2 = 24.2101 | |
| f3 = −96.5165 | |
| f2a = 20.1589 | |
| f2b = −41.1747 | |
| β2w = −0.809 | |
| β2t = −1.659 | |
| β3w = 1.039 | |
| β3t = 1.414 | |
| (f1 − f3)/(f1 + f3) = −0.475 | (11) |
| (β3t/β3w)/(β2t/β2w) = 0.663 | (12) |
| f2a/|f2b| = 0.490 | (13) |
| Bfw/fw = 0.462 | (14) |

FIGS. 50(a)–52(d) show various aberration diagrams for d-line (λ=587.8 nm) according to the ninth preferred embodiment. FIG. 50(a)–50(d) show various aberration diagrams for the infinite focus state at a maximum wide-angle or minimum focal length condition. FIGS. 51(a)–51(d) show various aberration diagrams for the infinite focus state at medium focal length state, and FIGS. 52(a)–52(d) show various aberration diagrams for the infinite focus state at a maximum telephoto state (maximum focal length condition).

Figure 53:
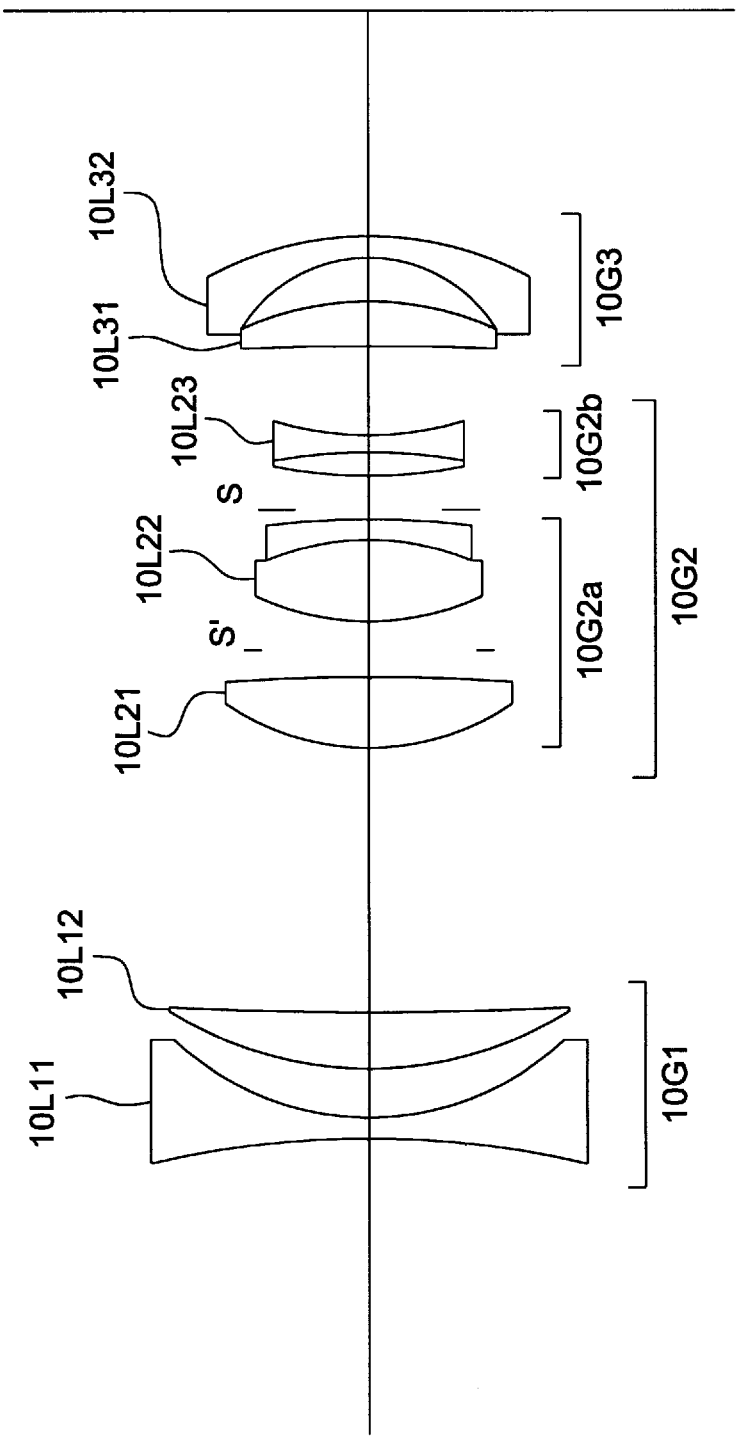
FIG. 53 shows a zoom lens according to a tenth preferred embodiment of the invention.
Figure 54:
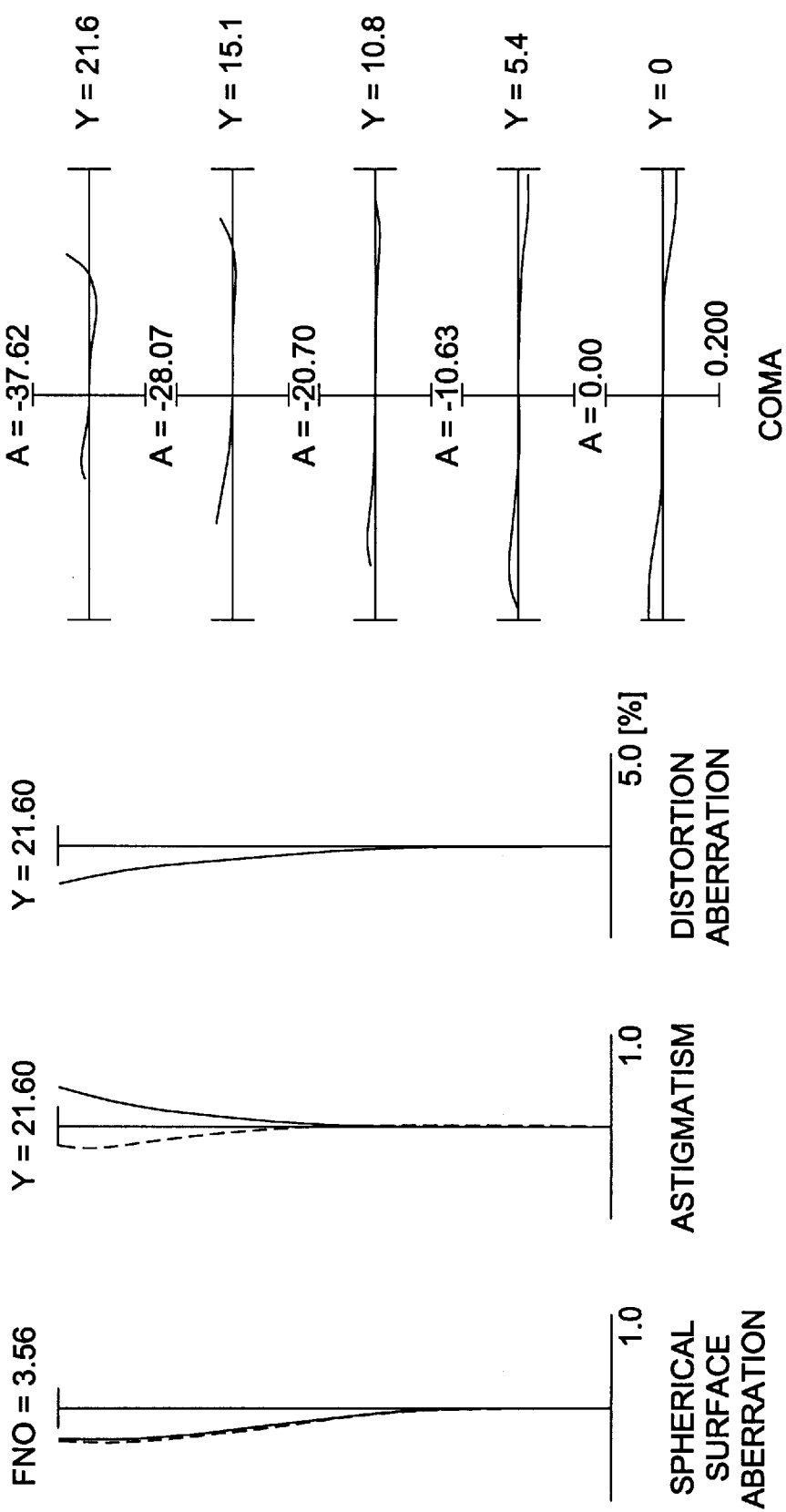
FIGS. 54(a)–54(d) show various aberration diagrams for an infinite focus state at a maximum wide-angle state according to the tenth preferred embodiment of the invention.
Figure 55:
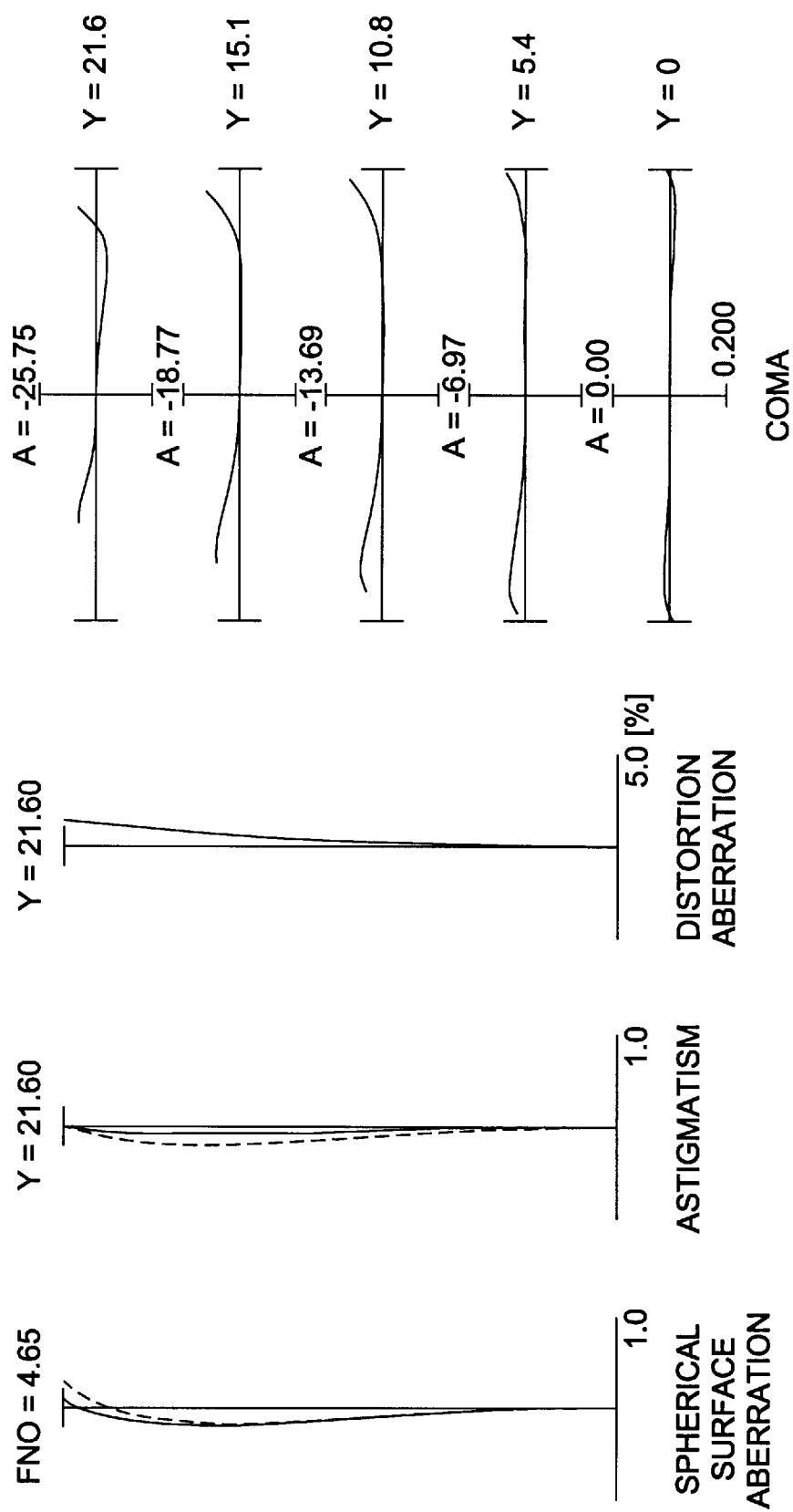
FIGS. 55(a)–55(d) show various aberration diagrams for an infinite focus state at a medium focal length state according to the tenth preferred embodiment of the invention.
Figure 56:
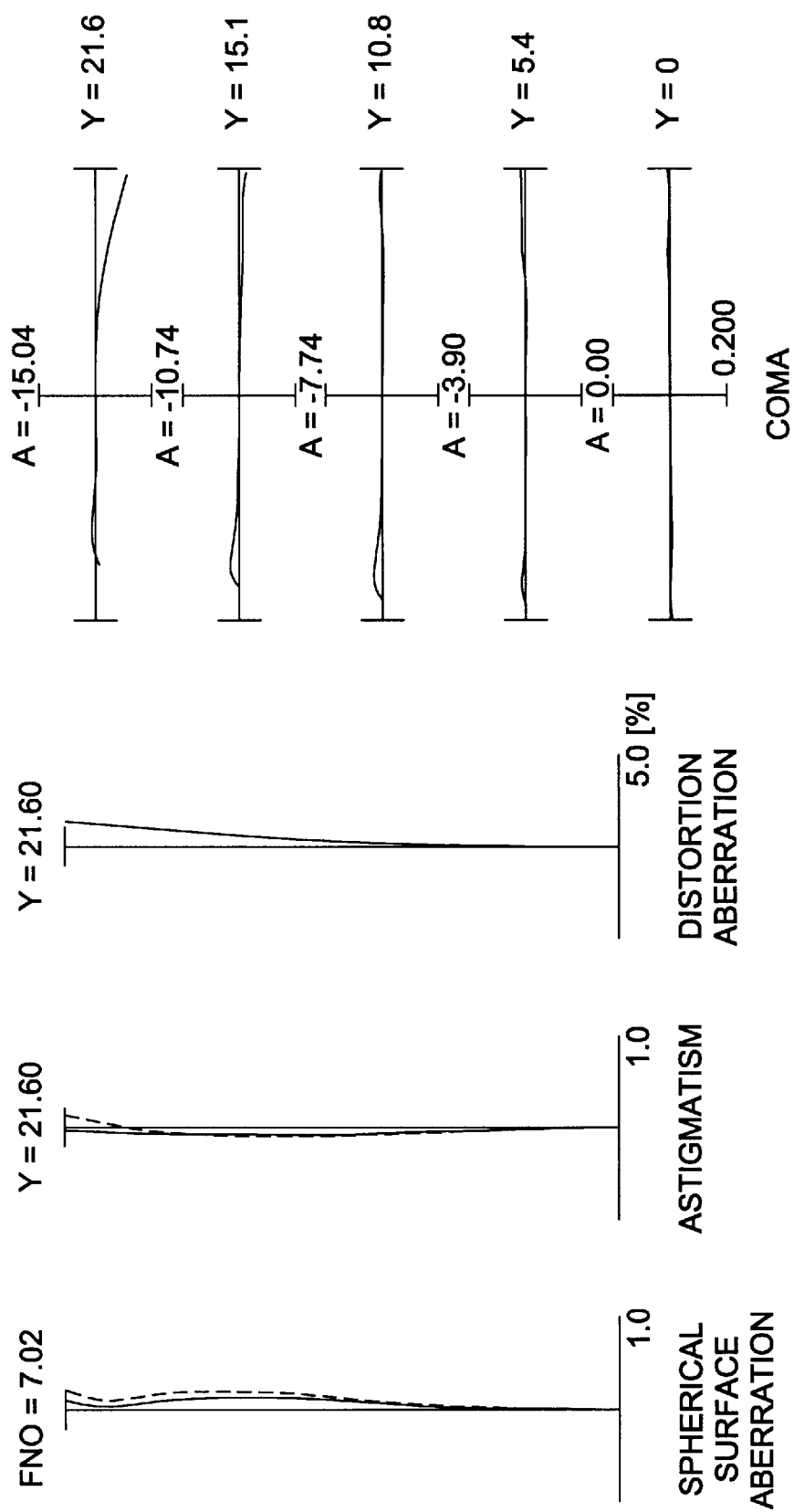
FIGS. 56(a)–56(d) show various aberration diagrams for an infinite focus state at a maximum telephoto state according to the tenth preferred embodiment of the invention.

FIG. 53 shows a zoom lens according to a tenth preferred embodiment of the invention. The zoom lens in the FIG. 53 comprises, in order from the object side, a first lens group 10G1, which consists of biconcave lens 10L11 and positive meniscus lens 10L12 with the convex surface facing the object side; a lens unit 10G2a, which consists of biconvex lens 10L21 and a cemented positive lens 10L22 having a biconvex lens and a negative meniscus lens with the concave surface facing the object side; a lens unit 10G2b, which consists of a cemented negative lens 10L23 having a biconvex lens and a biconcave lens; and a third lens group 10G3, which consists of a positive meniscus lens 10L31 with the concave surface facing the object side and a negative meniscus lens 10L32 with the concave surface facing the object side.

FIG. 53 shows the positional relationship of each lens group in a maximum wide-angle state. Each lens group moves on the optical axis along the zoom locus shown by an arrow in FIG. 48 during zooming to a maximum telephoto state. Moreover, in the second lens group 10G2, aperture stop S and fixed stop S' are provided.

The values of various dimensions of the eleventh preferred embodiment of the invention are listed in Table (10) below. In Table (10), f is focal length, FNO is F-number, 2ω is field angle, and Bf is back focus. Moreover, refractive indices and Abbe numbers correspond to a d-line (λ=587.6 nm). The aperture ratio is defined by F-number (FNO). Moreover, the surface number indicates the order of the lens surfaces from the object side of the zoom lens along the direction in which light rays move.

TABLE 10 f = 28.24–44.15–79.14 mm
FNO = 3.60–4.62–7.00
2ω = 75.98°–51.49°–30.09°

| Surface Number | Radius of Curvature | Intersurface Distance | Abbe Number | Refractive Index |
|---|---|---|---|---|
| 1 | −62.5972 | 1.3814 | 43.35 | 1.84042 |
| 2* | 17.5587 | 3.1782 | | |
| 3 | 25.4141 | 3.7674 | 27.53 | 1.75520 |
| 4 | 278.1139 | (d4 = variable) | | |
| 5 | 17.2463 | 4.7343 | 70.45 | 1.48749 |
| 6 | −165.0839 | 1.5070 | | |
| 7 | ∞ | 1.6041 | (fixed stop S) | |
| 8* | 18.2126 | 5.6512 | 60.82 | 1.56384 |
| 9 | −15.9258 | 1.2558 | 23.01 | 1.86074 |
| 10 | −84.1314 | 0.8054 | | |
| 11 | ∞ | 2.3766 | (aperture stop S) | |
| 12 | 50.1432 | 1.5070 | 30.04 | 1.69895 |
| 13 | −32.2233 | 1.0047 | 49.45 | 1.77279 |
| 14 | 20.5654 | (d14 = variable) | | |
| 15 | −191.0295 | 3.1395 | 32.17 | 1.67270 |
| 16 | −20.9698 | 2.8256 | | |
| 17 | −10.1338 | 1.2558 | 52.30 | 1.74810 |
| 18 | −25.1297 | (Bf) | | |

Non-spherical Surface Data

| | κ | $C_2$ | $C_4$ | $C_6$ | $C_8$ | $C_{10}$ |
|---|---|---|---|---|---|---|
| surface 2 | 1.0000 | 0.0000 | $-1.48510 \times 10^{-9}$ | $-4.13300 \times 10^{-8}$ | $-8.83350 \times 10^{-11}$ | $-2.27680 \times 10^{-13}$ |
| surface 8 | 1.0000 | 0.0000 | $-1.39730 \times 10^{-5}$ | $-4.68510 \times 10^{-8}$ | $5.35720 \times 10^{-10}$ | $-5.28980 \times 10^{-12}$ |

Variable Space For Zooming

| | | | |
|---|---|---|---|
| f | 28.2400 | 44.1529 | 79.1423 |
| d4 | 17.4357 | 8.5730 | 1.2558 |
| d14 | 5.8276 | 3.5838 | 2.2306 |
| Bf | 14.8683 | 27.5533 | 52.2012 |

Values Corresponding To Conditions f1 = −34.0722
f2 = 23.4646
f3 = −89.7076
f2a = 19.8035
f2b = −39.7015
β2w = −0.740
βt = −1.513
β3w = 1.119
β3t = 1.536

TABLE 10-continued f = 28.24–44.15–79.14 mm
FNO = 3.60–4.62–7.00
2ω = 75.98°–51.49°–30.09°

| | |
|---|---|
| (f1 − f3)/(f1 + f3) = −0.449 | (11) |
| (β3t/β3w)/(β2t/βw) = 0.671 | (12) |
| f2a/\|f2b\| = 0.499 | (13) |
| Bfw/fw = 0.526 | (14) |

FIGS. 54(a)–54(d) show various aberration diagrams for d-line (λ=587.6 nm) in the tenth preferred embodiment. FIGS. 54(a)–54(d) show various aberration diagrams for the infinite focus state at a maximum wide-angle state, FIGS. 55(a)–55(d) show various aberration diagrams for the infinite focus state at a medium focal length state, and FIGS. 56(a)–56(d) show various aberration diagrams for the infinite focus state at a maximum telephoto state.

Figure 57:
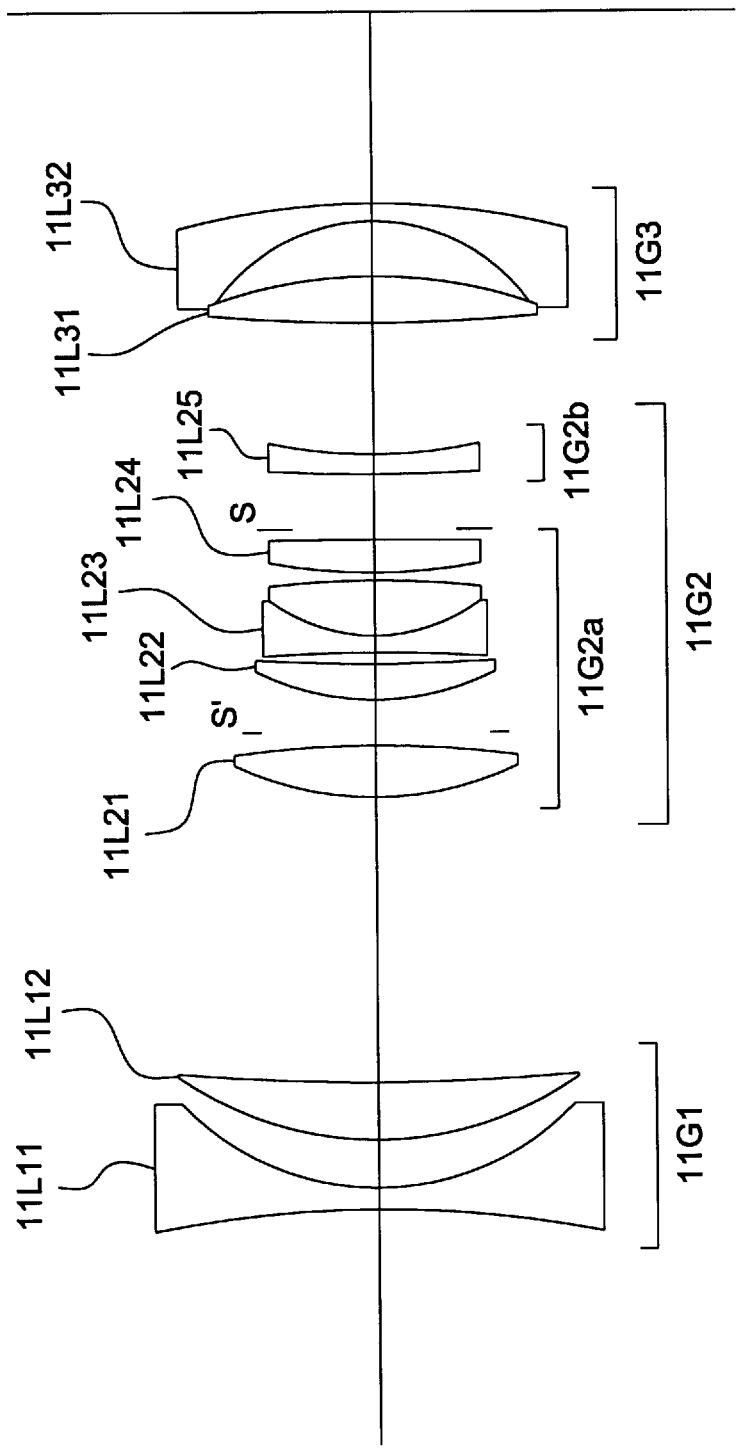
FIG. 57 shows a zoom lens according to an eleventh preferred embodiment of the invention.
Figure 59D:
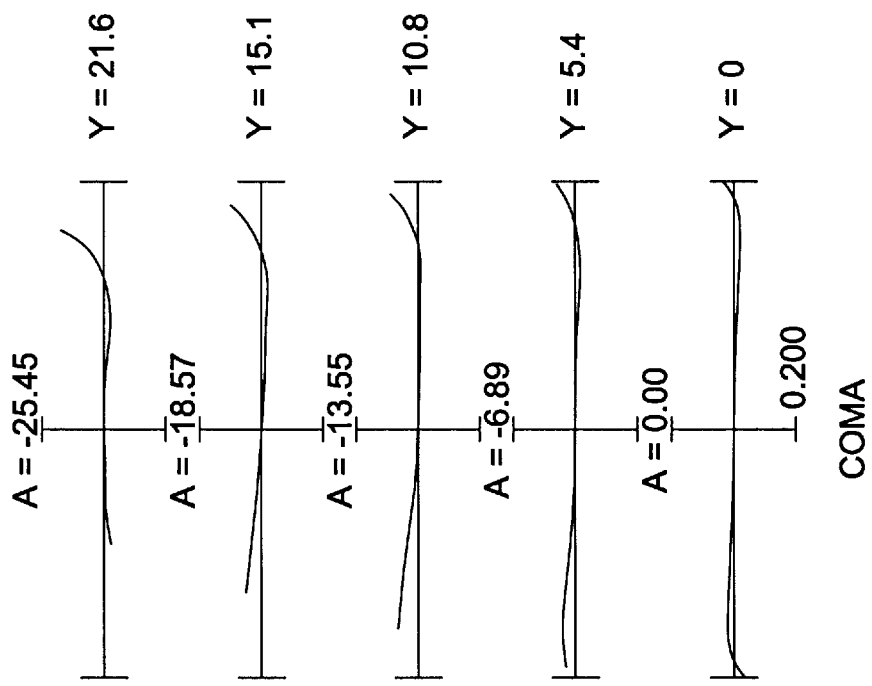
FIGS. 59(a)–59(d) show various aberration diagrams for an infinite focus state at a medium focal length state according to the eleventh preferred embodiment of the invention.
Figures 59A, 59B, 59C:
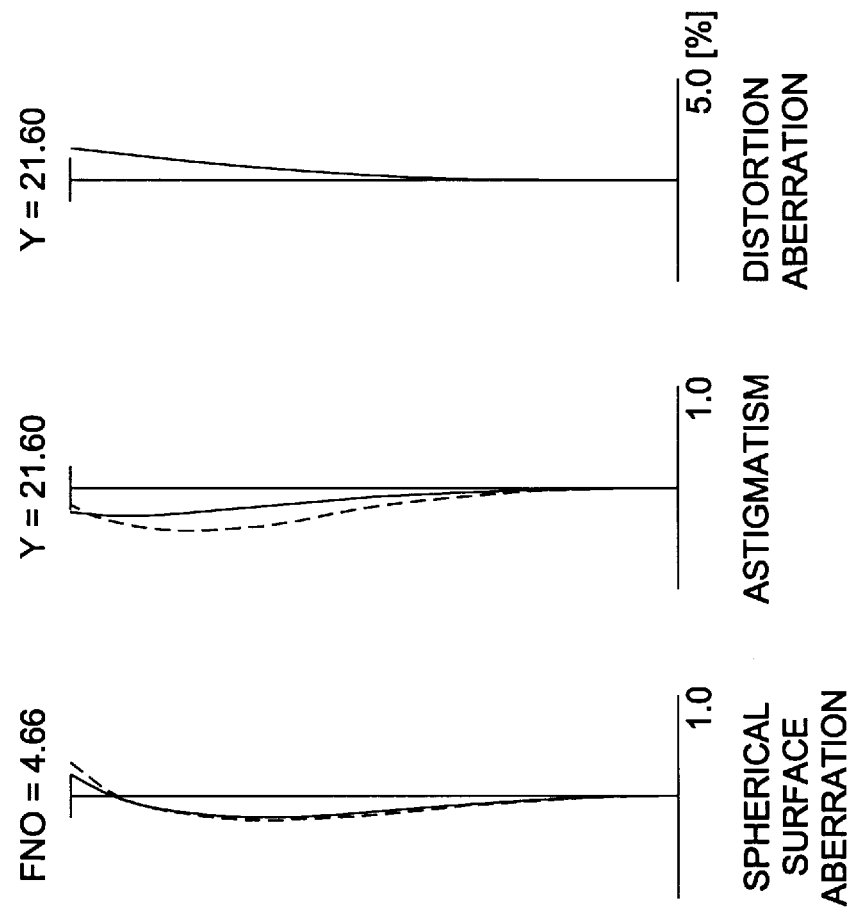
Figures 60A, 60B, 60C, 60D:
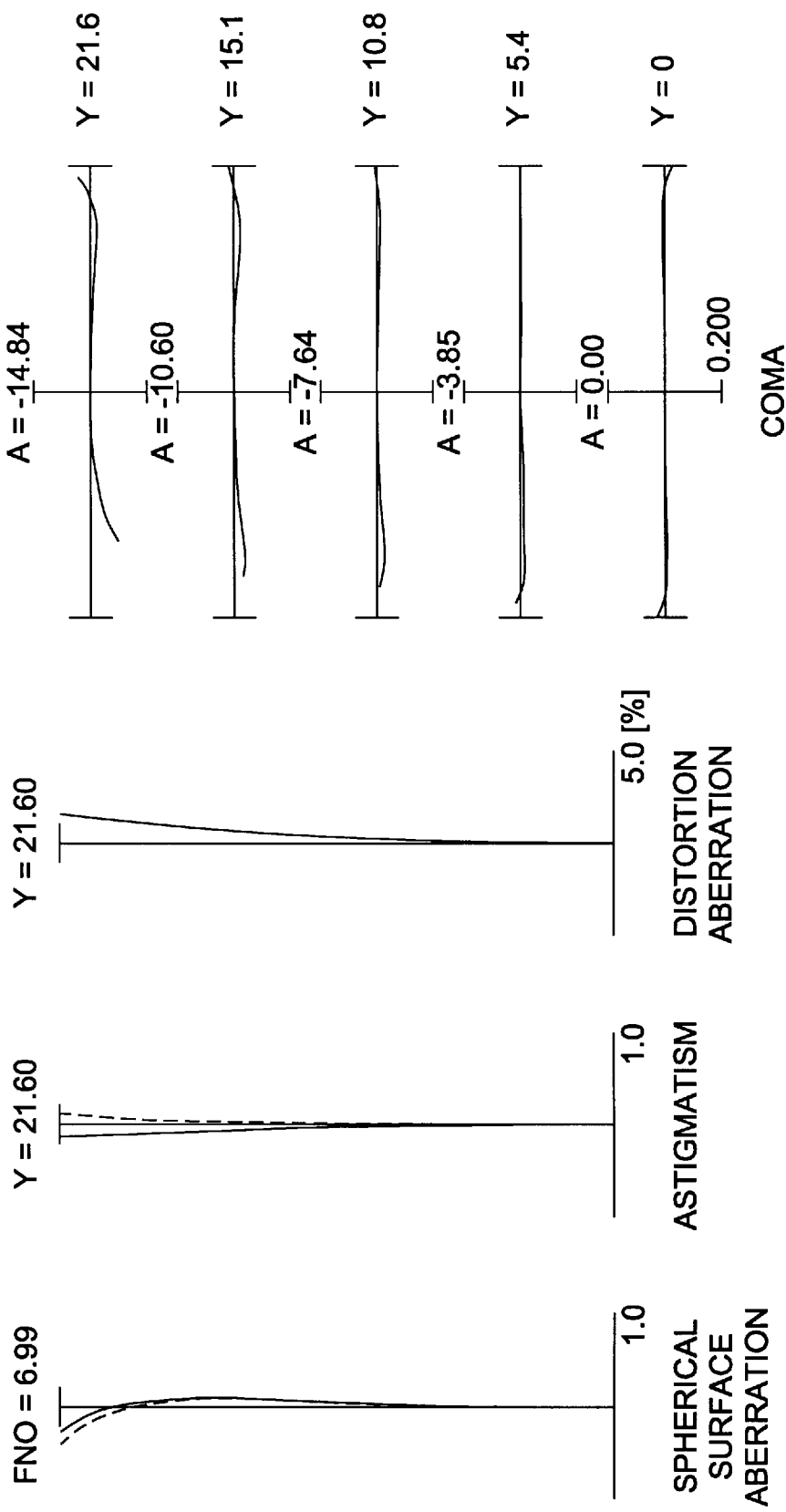
FIGS. 60(a)–60(d) show various aberration diagrams for an infinite focus state at a maximum telephoto state according to the eleventh preferred embodiment of the invention.

FIG. 57 shows a zoom lens according to an eleventh preferred embodiment of the invention. The zoom lens shown in FIG. 57 comprises, in order from the object side, a first lens group 11G1 consisting of biconcave lens 11L11 and positive meniscus lens 1L12 with the convex surface facing the object side; the lens unit 11G2a consisting of biconvex lens 11L21, positive meniscus lens 11L22 with the convex surface facing the object side, a cemented lens 11L23 having a biconcave lens and a biconvex lens, and a biconvex lens 11L24; the lens unit 11G2b consisting of a negative meniscus lens 11L25 with the convex surface facing the object side; and the lens group 11G3 consisting of a biconvex lens 11L31 and a negative meniscus lens 11L32 with the concave surface facing the object side.

FIG. 57 shows the positional relationship of each lens group in maximum wide-angle state. Each lens group moves on the optical axis along the zoom locus shown, by an arrow in FIG. 48 during zooming to a maximum telephoto state. Moreover, in the second lens group 11G2, aperture stop S and fixed stop S' are provided.

The values of various dimensions of the twelfth preferred embodiment of are listed in Table (11) below. In Table (11), f is focal length, FNO is F-number, 2ω is field angle, and Bf is back focus. Moreover, refractive indices and Abbe numbers correspond to a d-line (λ=587.6 nm). The aperture ratio is defined by F-number (FNO). Moreover, the surface number indicates the lens surface order from the object side of the zoom lens along the direction in which light rays move.

TABLE 11 f = 28.24–44.65–80.17 mm
FNO = 3.56–4.62–7.00
2ω = 74.98°–50.91°–29.68°

| Surface Number | Radius of Curvature | Intersurface Di9tance | Abbe Number | Refractive Index |
|---|---|---|---|---|
| 1 | −79.0470 | 1.4009 | 45.37 | 1.79668 |
| 2* | 16.1826 | 3.1838 | | |
| 3 | 23.6971 | 3.8206 | 28.56 | 1.79504 |
| 4 | 116.6604 | (d4 = variable) | | |
| 5 | 21.6995 | 3.5659 | 70.45 | 1.48749 |
| 6 | −66.2190 | 0.8915 | | |
| 7 | ∞ | 1.9103 | (fixed stop S') | |
| 8 | 16.9119 | 2.5471 | 64.10 | 1.51680 |
| 9 | 93.2956 | 0.6368 | | |
| 10 | −59.0272 | 1.0188 | 39.61 | 1.80454 |
| 11 | 10.9709 | 3.6933 | 61.09 | 1.58913 |

TABLE 11-continued f = 28.24–44.65–80.17 mm
FNO = 3.56–4.62–7.00
2ω = 74.98°–50.91°–29.68°

| | | | | |
|---|---|---|---|---|
| 12 | −148.6528 | 0.6368 | | |
| 13 | 41.8197 | 2.0377 | 52.30 | 1.74810 |
| 14 | −278.5042 | 0.6368 | | |
| 15 | ∞ | 3.6837 | (Aperture stop S) | |
| 16 | 263.8029 | 1.2735 | 40.90 | 1.79631 |
| 17 | 29.6423 | (d17 = variable) | | |
| 18 | 115.5738 | 3.0729 | 29.50 | 1.71736 |
| 19 | −35.9756 | 3.5734 | | |
| 20 | −13.3328 | 1.2735 | 55.48 | 1.69680 |
| 21 | −49.0703 | (Bf) | | |

Non-spherical Surface Data

| | κ | $C_2$ | $C_4$ | $C_6$ |
|---|---|---|---|---|
| surface 2 | 1.0000 | 0.0000 | $-1.31520 \times 10^{-5}$ | $-7.60640 \times 10^{-8}$ |

Variable Space For Zooming

| | | | |
|---|---|---|---|
| f | 28.7893 | 44.6519 | 80.1676 |
| d4 | 18.7085 | 9.2052 | 1.2735 |
| d17 | 8.5816 | 6.1733 | 4.7419 |
| Bf | 12.5535 | 24.8025 | 49.0555 |

Values Corresponding To Conditions

| | |
|---|---|
| f1 = −35.7750 | |
| f2 = 25.7850 | |
| f3 = −125.5571 | |
| f2a = 21.5126 | |
| f2b = −42.0382 | |
| β2w = −0.795 | |
| β2t = −1.720 | |
| β3w = 1.012 | |
| β3t = 1.303 | |
| (f1 − f3)/(f1 + f3) = −0.557 | (11) |
| (β3t/β3w)/(β2t/β2w) = 0.595 | (12) |
| f2a/\|f2b\| = 0.512 | (13) |
| βfw/fw = 0.436 | (14) |

FIGS. 58(a)–60(d) show various aberration diagrams for d-line (λ=587.6 nm) for the eleventh preferred embodiment. FIGS. 58(a)–58(d) show various aberration diagrams for infinite focus state at a maximum wide-angle state, FIGS. 59(a)–59(d) show various aberration diagrams for infinite focus state at medium focal length state, and FIGS. 60(a)–60(d) show various aberration diagrams for infinite focus state at a maximum telephoto state.

Figure 61:
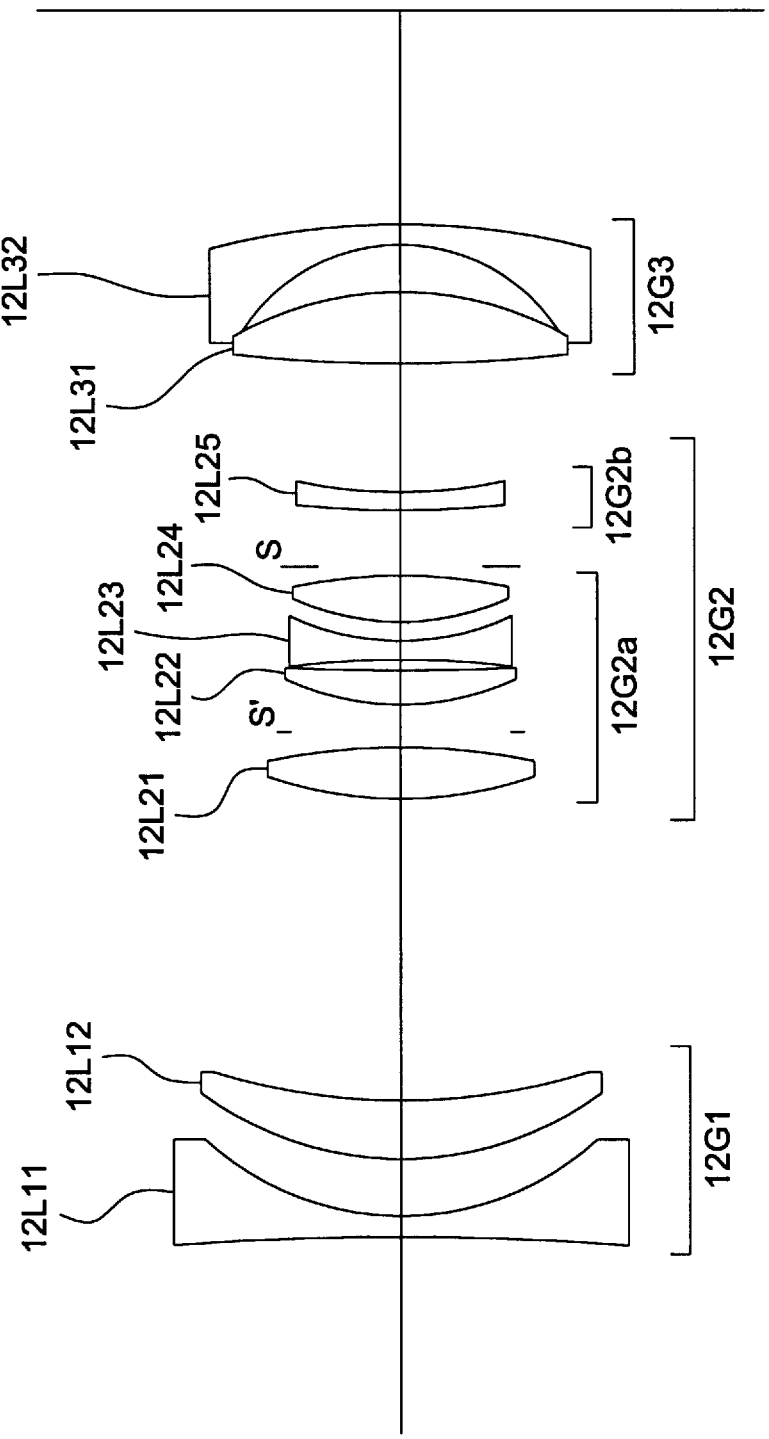
FIG. 61 shows a zoom lens according to a twelfth preferred embodiment of the invention.

FIG. 61 shows a zoom lens according to a twelfth preferred embodiment of the invention. The zoom lens shown in FIG. 61 comprises, in order from the object side, a first lens group 12G1, which consists of biconcave lens 12L11 and positive meniscus lens 12L12 with the convex surface facing the object side; a lens group 12G2a which consist of biconvex lens 12L21, a positive meniscus lens 12L22 with the convex surface facing the object side, a biconvex lens 12L23, and a biconvex lens 12L24; a lens group 12G2b which consists of a negative meniscus lens 12L25 with the convex surface facing the object side; and a lens group 12G3, which consists of a biconvex lens 12L31 and a negative meniscus lens 12L32 with the concave surface facing the object side.

FIG. 61 shows the positional relationship of each lens group at a maximum wide-angle state. Each lens group moves on the optical axis along the zoom locus shown by an arrow in FIG. 48 during zooming to a maximum telephoto state. Moreover, in the second lens group 12G2, aperture stop S and fixed stop S' are provided.

The values of various dimensions according to the twelfth preferred embodiment of the present invention are listed in Table (12) below. In Table (12), f is focal length, FNO is F-number, $2\omega$ is field angle, and Bf is back focus. Moreover, refractive indices and Abbe numbers correspond to a d-line ($\lambda$=587.6 nm). The aperture ratio is defined by F-number (FNO). Moreover, the surface number indicates the lens surface order from the object side of the zoom lens along the direction in which light rays move.

TABLE 12 f = 28.24–44.80–80.64 mm
FNO = 3.54–4.55–6.97
$2\omega$ = 75.08°–50.68°–29.50°

| Surface Number | Radius of Curvature | Intersurface Distance | Abbe Number | Refractive Index |
|---|---|---|---|---|
| 1 | −200.6368 | 1.4080 | 43.35 | 1.84042 |
| 2 | 19.0264 | 3.7715 | | |
| 3 | 23.3592 | 3.8400 | 23.01 | 1.86074 |
| 4 | 45.3900 | (d4 = variable) | | |
| 5 | 26.3701 | 3.3959 | 70.45 | 1.48749 |
| 6 | −38.9879 | 0.8960 | | |
| 7 | ∞ | 1.9200 | (fixed stop S') | |
| 8 | 17.3509 | 2.2934 | 55.60 | 1.69580 |
| 9 | 237.2862 | 0.6771 | | |
| 10 | −51.0642 | 1.2800 | 33.89 | 1.80384 |
| 11 | 15.5840 | 1.1540 | | |
| 12 | 17.7135 | 3.0091 | 60.69 | 1.56384 |
| 13 | −40.4775 | 0.6400 | | |
| 14 | ∞ | 1.9200 | (aperture stop S) | |
| 15 | 139.6357 | 1.2800 | 45.37 | 1.79668 |
| 16 | 29.8436 | (d16 = variable) | | |
| 17 | 160.1058 | 4.7692 | 33.75 | 1.64831 |
| 18 | −21.5588 | 2.9224 | | |
| 19 | −12.9247 | 1.2800 | 52.30 | 1.74810 |
| 20 | −55.8002 | (Bf) | | |
| 21 | −49.0703 | (Bf) | | |

Variable Space For Zooming

| f | 28.7999 | 44.7999 | 80.6396 |
|---|---|---|---|
| d4 | 19.8167 | 9.6351 | 1.2800 |
| d16 | 8.5385 | 5.8152 | 3.7450 |
| Bf | 13.9748 | 26.7046 | 52.0958 |

Values Corresponding To Conditions f1 = −36.3960
f2 = 26.4673
f3 = −177.8777
f2a = 21.9171
f2b = −47.8899
$\beta$2w = −0.807
$\beta$2t = −1.853
$\beta$3w = 0.981
$\beta$3t = 1.195
(f1 − f3)/(f1 + f3) = −0.660   (11)
($\beta$3t/$\beta$3w)/($\beta$t/$\beta$w) = 0.530   (12)

TABLE 12-continued f = 28.24–44.80–80.64 mm
FNO = 3.54–4.55–6.97
$2\omega$ = 75.08°–50.68°–29.50° f2a/|f2b| = 0.458   (13)
Bfw/fw = 0.485   (14)

FIGS. 62(a)–64(d) show various aberration diagrams for d-line ($\lambda$=587.6 nm) for the thirteenth preferred embodiment. FIGS. 62(a)–62(d) show various aberration diagrams for the infinite focus state at a maximum wide-angle state, FIGS. 63(a)–63(d) show various aberration diagrams for the infinite focus state at a medium focal length state, and FIGS. 64(a)–64(d) show various aberration diagrams for the infinite focus state at a maximum telephoto state.

Figure 65:
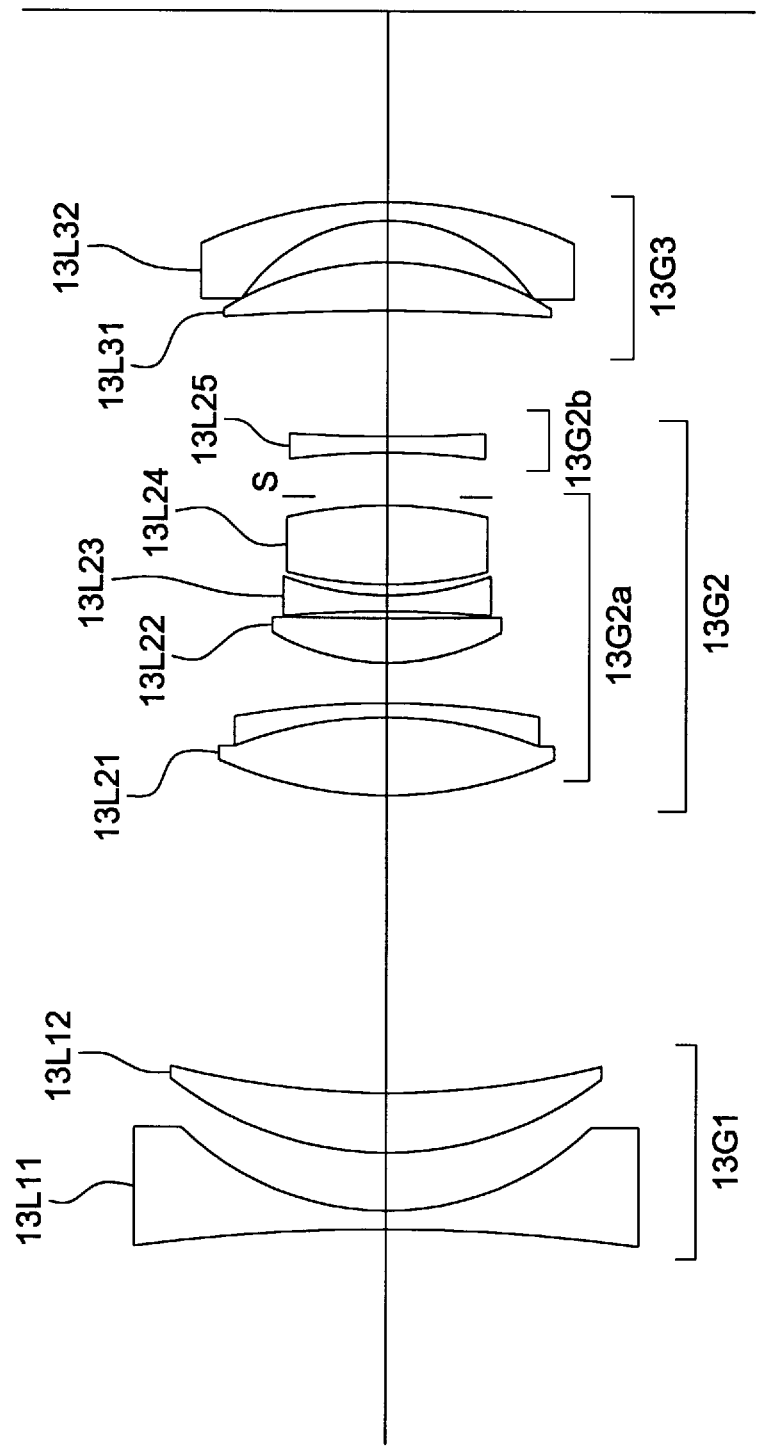
FIG. 65 shows a zoom lens according to a thirteenth preferred embodiment of the invention.

FIG. 65 describes the structure of a zoom lens according to a thirteenth preferred embodiment of the invention. The zoom lens shown in the FIG. 65 comprises, in order from the object side, a first lens group 13G1, which consists of biconcave lens 13L11 and positive meniscus lens 13L12 with the convex surface facing the object side; the lens unit 13G2a, which consists of a cemented positive lens 13L21 having a biconvex lens and a negative meniscus lens with the concave surface facing the object side, a positive meniscus lens 13L22 with the convex surface facing the object side, a biconvex lens 13L23, and a biconvex lens 13L24; the lens unit 13G2b consisting of a biconcave lens 13L25; and the lens group 13G3, which consists of a positive meniscus lens 13L31 with the concave surface facing the object side and a negative meniscus lens 13L32 with concave surface facing the object side.

FIG. 65 shows the positional relationship of each lens group at a maximum wide-angle state. Each lens group moves on the optical axis along the zoom locus shown by an arrow in FIG. 48 during zooming to a maximum telephoto state. Moreover, in the second lens group 13G2, aperture stop S and fixed stop S' are provided.

The values of various dimensions of embodiment of the present invention are listed in Table (13) below. In Table (13), f is focal length, FNO is F-number, $2\omega$ is field angle, and Bf is back focus. Moreover, refractive indices and Abbe numbers correspond to a d-line ($\lambda$=587.6 nm). The aperture ratio is defined by F-number (FNO). Moreover, the surface number indicates the lens surface and from the object side of the zoom lens along the direction in which light rays move.

TABLE 13 f = 28.80–44.80–80.64 mm
FNO = 3.55–4.52–7.03
$2\omega$ = 75.34°–51.20°–29.64°

| Surface Number | Radius of Curvature | Intersurface Distance | Abbe Number | Refractive Index |
|---|---|---|---|---|
| 1 | −123.6917 | 1.4080 | 43.35 | 1.84042 |
| 2 | 20.4097 | 3.7120 | | |
| 3 | 24.1357 | 3.8400 | 25.50 | 1.80458 |
| 4 | 53.4270 | (d4 = variable) | | |
| 5 | 25.4859 | 5.2480 | 57.03 | 1.62280 |
| 6 | −27.0629 | 1.0240 | 23.01 | 1.86074 |
| 7 | −46.7967 | 2.4320 | | |
| 8 | 15.3700 | 2.9440 | 57.53 | 1.67025 |
| 9 | 82.3670 | 0.5120 | | |
| 10 | −90.5145 | 1.0240 | 43.35 | 1.84042 |
| 11 | 15.7943 | 0.6400 | | |
| 12 | 22.8763 | 5.1200 | 60.64 | 1.60311 |
| 13 | −43.0867 | 0.6400 | | |

TABLE 13-continued f = 28.80–44.80–80.64 mm
FNO = 3.55–4.52–7.03
2ω = 75.34°–51.20°–29.64°

| | | | | |
|---|---|---|---|---|
| 14 | ∞ | 2.8160 | (aperture stop S) | |
| 15 | −78.1088 | 1.1520 | 49.45 | 1.77279 |
| 16 | 70.9341 | (d16 = variable) | | |
| 17 | −150.1146 | 2.3280 | 36.98 | 1.61293 |
| 18 | −20.3980 | 2.5600 | | |
| 19 | −11.9349 | 1.2800 | 49.45 | 1.77279 |
| 20 | −29.0633 | (Bf) | | |

Variable Surface For Zooming

| | | | |
|---|---|---|---|
| f | 28.8000 | 44.8000 | 80.6400 |
| d4 | 19.6515 | 9.7382 | 1.2800 |
| d16 | 8.2689 | 4.7129 | 2.4320 |
| Bf | 12.5440 | 26.3731 | 52.3153 |

Values Corresponding To Conditions

| | |
|---|---|
| f1 = −37.2787 | |
| f2 = 25.0863 | |
| f3 = −110.6777 | |
| f2a = 21.4276 | |
| f2b = −47.9626 | |
| β2w = −1.063 | |
| β2t = −2.234 | |
| β3w = 1.080 | |
| β3t = 1.439 | |
| (f1 − f3)/(f1 + f3) = −0.496 | (11) |
| (β3t/β3w)/(β2t/β2w) = 0.634 | (12) |
| f2a/|f2b| = 0.447 | (13) |
| Bfw/fw = 0.436 | (14) |

FIGS. 66(a)–68(d) show various aberration diagrams for d-line (λ=587.6 nm) in the thirteenth preferred embodiment. FIGS. 66(a)–66(d) show various aberration diagrams for the infinite focus state at a maximum wide-angle state, FIGS. 67(a)–67(d) show various aberration diagrams for the infinite focus state at a medium focal length state, and FIGS. 68(a)–68(d) show various aberration diagrams for the infinite focus state at a maximum telephoto state.

Figure 69:
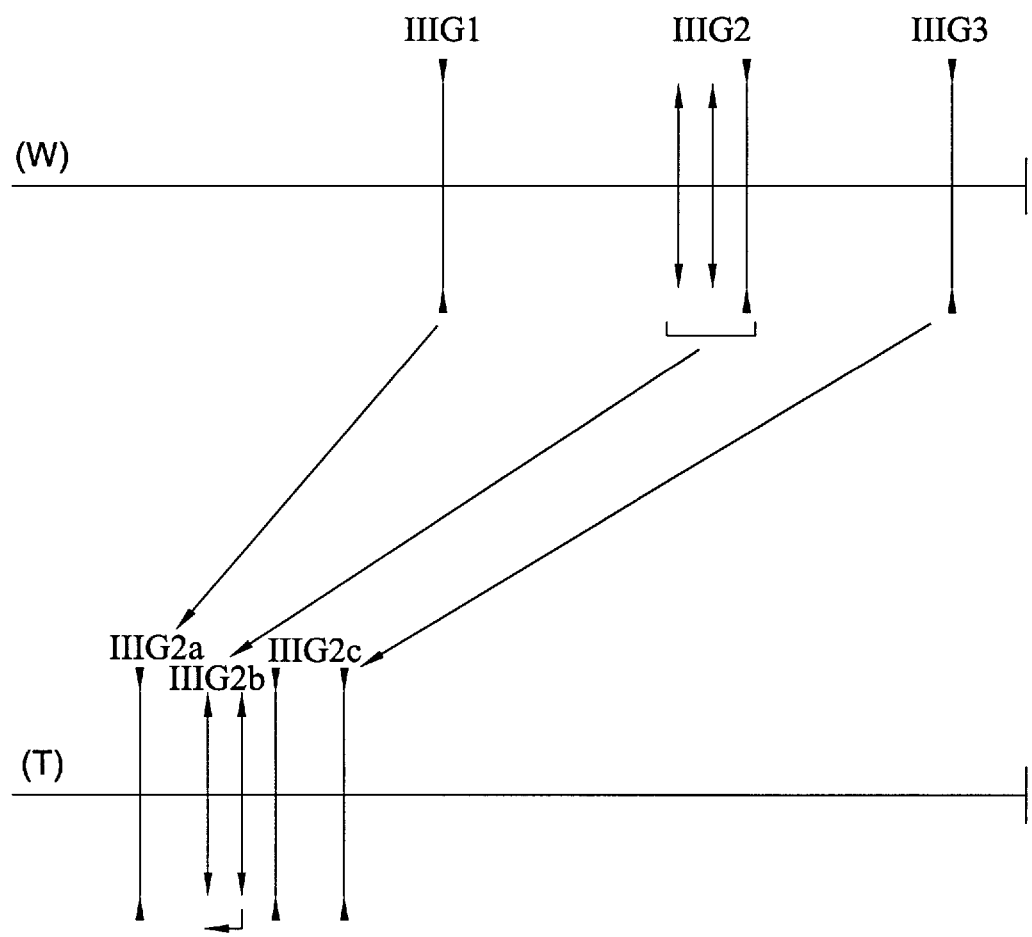
FIG. 69 shows a zoom lens and the movement of each lens group during zooming from a maximum wide-angle state to a maximum telephoto state for the fourteenth-eighteenth preferred embodiments.

The zoom lens according to the fourteenth–eighteenth preferred embodiments of the invention will now be generally described. In FIG. 69, the zoom lens comprises, in order from the object side, a first lens group IIIG1 having a negative refractive power, a second lens group IIIG2 having a positive refractive power, and a third lens group IIIG3 having a negative refractive power. During zooming from the maximum wide-angle state to the maximum telephoto state, at least the second lens group IIIG2 and the third lens group IIIG3 move toward the object side. The distance between the first lens group IIIG1 and the second lens group IIIG2 decreases, and the distance between the second lens group IIIG2 and the third lens group IIIG3 decreases. The second lens group IIIG2 has, in order from the object side, a lens sub-group or first lens unit IIIG2a of positive refractive power, a lens sub-group or second lens unit IIIG2b of positive refractive power, and a lens sub-group or third lens unit IIIG2c of negative refractive power. Focusing on close distance objects causes the lens unit IIIG2b to move along the optical axis.

In the invention according to the fourteenth–eighteenth preferred embodiments, the second lens group IIIG2 can comprise, in order from the object side, a lens unit IIIG2a having a positive refractive power, a lens group IIIG2b having a positive refractive power, and a lens unit IIIG2c having a negative refractive power. Thus, the principal point of the second lens group IIIG2 is positioned on the object side of the second lens group IIIG2, so that the total length of the lens system can be shortened.

In addition, by placing the principal point of the second lens group IIIG2 on the object side, changes in the distance between the first lens group IIIG1 and the second lens group IIIG2 during zooming are effectively utilized.

In particular, in the present invention, the second lens group IIIG2, which is the only lens group having positive refractive power, is comprised of positive lens groups and negative lens groups. Consequently, it is important to adequately correct negative spherical aberrations created in the lens units IIIG2a and IIIG2b.

The focusing method for the fourteenth-eighteenth preferred embodiments of the invention will be described. When an object moves from a far distance to a close distance, focusing is caused by the lens unit IIIG2b moving along the optical axis. Thus, focusing is possible if the focusing lens unit IIIG2b moves so the position of the first lens unit IIIG1, with respect to the lens unit IIIG2c, and the position of an object point created by the focusing lens unit IIIG2b, are constant. The conditions under which the displacement Δ of the focusing lens unit IIIG2b is small are described with reference to the thin lens system of FIG. 70.

Figure 70:
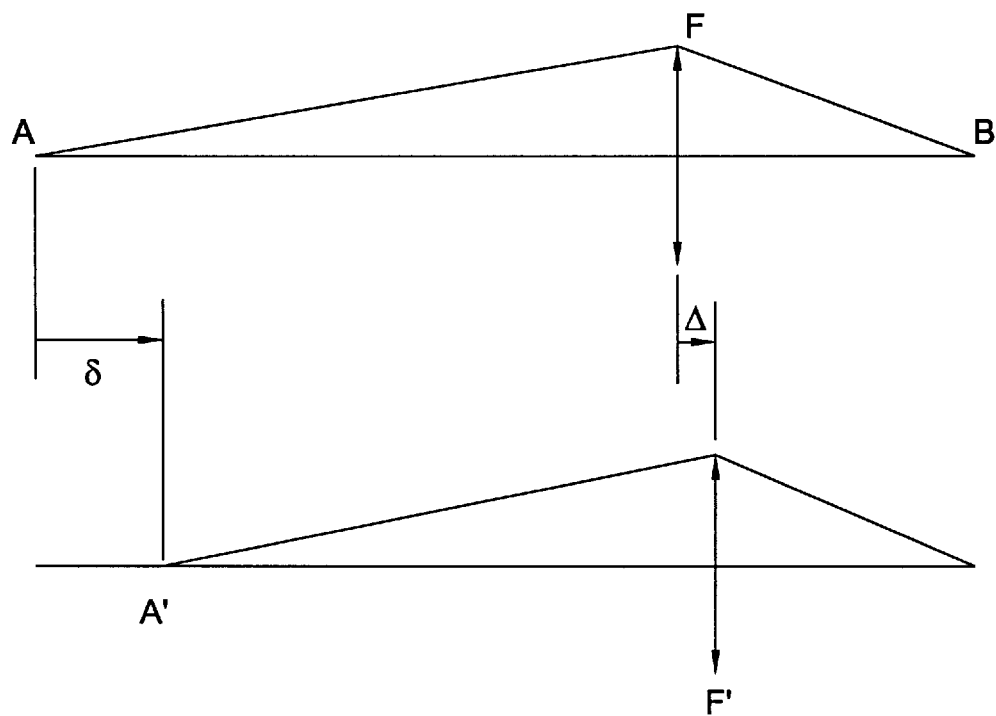
FIG. 70 shows the focusing method of the present invention for the fourteenth-eighteenth preferred embodiments.

In FIG. 70, F designates the position of the focusing lens unit IIIG2b at an infinite focus state, and F' designates the position of the focusing lens unit IIIG2b at a close distance focus state. Furthermore, A designates the position of the point object, with respect to the focusing lens unit IIIG2b at the infinite focus state. In other words, the position of the image formed by the first lens group IIIG1 and the lens unit IIIG2a. B designates the position of the point object of the focusing lens unit IIIG2b, i.e., the position of the point object with respect to the lens unit IIIG2c.

Additionally, A' designates the position of the point object with respect to the focusing lens unit IIIG2b, at a close distance focus state. As shown in FIG. 70, when the object moves from an infinite distance to a close distance, close distance focusing is conducted by the focusing lens unit IIIG2b moving by an amount Δ along the optical axis, so the position B of the point object with respect to the lens unit IIIG2c is maintained at a predetermined position.

As described above, when the position of the point object, point with respect to the focusing lens unit IIIG2b, moves by an amount δ from A to A', the lens unit IIIG2b moves by an amount Δ from F to F', in order to fix the position of the point object, with respect to the lens unit IIIG2c. In this case, the displacement Δ of the lens group G2b can be found from the following equation (a1), where β2b is the lateral magnification of the lens unit IIIG2b.

$$\Delta = [\beta 2b^2/(\beta 2b^2 - 1)] \cdot \delta \tag{a1}$$

In equation (a), when the $k = \beta 2b^2/(\beta 2b^2 - 1)$, the value of k depends on the value of $\beta 2b^2$, and is expressed by the following equations.

$$1 \leq k(\beta 2b^2 > 1) \tag{b1}$$

$$0 > k(\beta 2b^2 < 1) \tag{c1}$$

Accordingly, to make the focusing displacement Δ of the lens unit IIIG2b smaller, it is necessary that k approach 1 in (b), with $\beta 2b^2 > 1$, i.e., to make 1/β2b approach 0 and in the case of (c) with $\beta 2b^2 < 1$, it is necessary to make k approach 0, in other words make β2b approach 0. In the invention according to the fourteenth–eighteenth preferred embodiments, the displacement Δ of the lens unit IIIG2b during focusing can be made smaller by causing β2b to approach 0.

At this time, because the value β2b approaches 0, it is desirable for the composite refractive power of the first lens group IIIG1 and the lens unit IIIG2b to also approach 0. In other words, it is desirable for the value 1/β2a to approach 0, where β2a is the lateral magnification of the lens unit IIIG2a.

The zoom lens of the fourteenth–eighteenth preferred embodiments satisfies the following condition.

$$\beta bt^2 < 0.5 \tag{1III}$$

where, βbt is the imaging magnification of the focusing lens unit IIG2b at a maximum telephoto state.

Condition (1III) stipulates the lateral magnification of the focusing lens group IIG2b at the maximum telephoto state. Condition (1III) reduces the displacement of the lens unit IIIG2b during focusing. It is desirable for the lateral magnification to have a value within a suitable range to reduce the displacement of the focusing lens unit IIIG2b.

When the upper limit in condition equation (1III) is exceeded, the displacement of the lens unit IIIG2b during focusing becomes excessively large.

In the invention according to the fourteenth–eighteenth preferred embodiments, to reduce the focusing displacement of the lens unit IIIG2b over the entire zooming range, the following condition (2III) should be satisfied for the entire zooming range.

$$\beta 2b^2 < 0.5 \tag{2III}$$

The lateral magnification of the focusing lens unit IIIG2b is taken to be β2b. Additionally, to suppress fluctuations in the various aberrations created during focusing, it is desirable for the following condition equation (3III) to be satisfied in the fourteenth–eighteenth embodiments. To adequately correct fluctuations in the various aberrations created when system is made compact but maintaining a high zoom ratio, condition (4III) should be satisfied.

$$1 < f2b/fw < 3 \tag{3III}$$

$$-0.8 < (f1-f3)/(f1+f3) < -0.3 \tag{4III}$$

here, f2b is the focal length of the focusing lens unit IIIG2b, fw is the total focal length of the lens system at a maximum wide-angle state, f1 is the focal length of the first lens group IIIG1 and f3 is the focal length of the third lens group IIIG3.

Condition (3III) stipulates the focal length of the focusing lens unit IIIG2b. When the upper limit in condition (3III) is exceeded, the focal length of the focusing lens unit IIIG2b becomes excessively large, and the focusing displacement, with respect to a predetermined photographic distance, becomes large.

Conversely, when the lower limit in condition (3III) is breached, the focal length of the focusing lens unit IIIG2b becomes small. Consequently, the focusing displacement, with respect to a predetermined photographic distance, becomes too small. Thus, it becomes impossible to adequately suppress fluctuations in the various aberrations during focusing.

Condition (4III) prescribes the balance between the focal length of the first lens group IIIG1 and the focal length of the third lens unit IIIG3.

When the upper limit in condition (4III) is exceeded, the focal length of the first lens group IIIG1 becomes large in a negative direction, compared with the focal length of the third lens unit IIIG3. Therefore, a dispersion effect of the first lens unit IIIG1 becomes weaker. Consequently, the height of the off-axis rays passing through the first lens unit IIIG1 at the maximum wide-angle state are separated from the optical axis. Thus, it becomes impossible to make the diameter of the frontmost lens smaller, when maintaining a predetermined amount of light in a marginal zone.

Conversely, when the lower limit in condition (4III) is breached, the focal length of the first lens group IIIG1 becomes smaller in a negative direction, compared with the focal length of the third lens group IIIG3, and the total length of the lens system becomes larger at a maximum telephoto state. Additionally, it is impossible to suppress negative distortion aberrations at the maximum wide-angle state.

In order to enhance performance and compactness of the zoom lens, the upper limit in condition (3III) should be −0.4, or the lower limit should be −0.7.

In addition, in the invention according to the fourteenth through eighteenth preferred embodiments, condition (5IIII) should be satisfied to suppress coma aberration fluctuations caused by the field angle at the maximum wide-angle state. This also enhances the compactness of the diameter of the rearmost lens.

$$0.35 < Bfw/fw < 0.60 \tag{5III}$$

where, Bfw is the back focus at the maximum wide-angle state.

Condition (5III) stipulates the back focus at the maximum wide-angle state. When the upper limit in condition (5III) is exceeded, the height difference between the on-axis rays and the off-axis rays passing through the third lens group IIIG3 at a maximum wide-angle state becomes smaller. Thus, coma aberration fluctuations caused by the field angle could not be suppressed.

Conversely, when the lower limit in condition (5III) is breached, back focus at the maximum wide-angle state could not be sufficiently achieved. Additionally, the off-axis rays passing through the third lens group IIIG3 are separated too far from the optical axis, so the rearmost lens diameter becomes larger.

Moreover, in the invention according to the fourteenth-eighteenth preferred embodiments, condition (6III) should be satisfied to adequately suppress off-axis aberrations fluctuations created during zooming:

$$0.15 < (d2w-d2t)/(d1w-d1t) < 0.45 \tag{6III}$$

where d2w is the on-axis distance between the second lens group IIIG2 and the third lens group IIIG3 at a maximum wide-angle state, d2t is the on-axis distance between the second lens group IIIG2 and the third lens group IIIG3 at a maximum telephoto state, d1w is the on-axis distance between the first lens group IIIG1 and the second lens group IIIG2 at a maximum wide-angle state, and d1t is the on-axis distance between the first lens group IIIG1 and the second lens group IIIG2 at a maximum telephoto state.

Condition (6III) stipulates the suitable range for the ratio between the amount of change in the on-axis distance between the first lens group IIIG1 and the second lens group IIIG2 during zooming, and the amount of change in the on-axis distance between the second lens group IIIG2 and the third lens group IIIG3.

Because the first lens group IIIG1 and the third lens group IIIG3 are positioned on the object side, the image side of the lens system, respectively, off-axis rays that pass through positions are separated from the optical axis.

When the upper limit in condition (6III) is exceeded, the lateral magnification change of the third lens group IIIG3 during zooming becomes large. Thus, it is impossible to suppress fluctuations in the off-axis aberrations created in the third lens group IIIG3 during zooming.

Conversely, when the lower limit in the condition (6III) is breached, the change in the lateral magnification of the first lens group IIIG1 during zooming becomes large. Thus, it is impossible to suppress fluctuations in the off-axis aberrations created in the first lens group IIIG1 during zooming.

Further, it is desirable for an aperture stop to be positioned in the second lens group IIIG2, or adjacent to the second lens group IIIG2, reduce the diameter of the lens. In particular, when the aperture stop is positioned between the second lens group IIIG2 and the third lens group IIIG3, the stop diameter can be made smaller.

When the aperture stop is positioned on the object side of the focusing lens group IIIG2b or adjacent to the image side, it is possible to cause off-axis rays passing through the focusing lens group IIIG2b to approach the optical axis. Thus, it is possible to make the focusing lens group IIIG2b smaller, and adequately suppress fluctuations in the various aberrations during focusing.

Moreover, when image shifting is conducted by causing all or a plurality of lens groups that comprise the zoom lens to be decentered in a direction substantially orthogonal to the optical axis, the suppression of fluctuations in aberrations created during image shifting is possible.

Hereafter, each of the fourteenth through eighteenth preferred embodiments of the invention will be described in particular with reference to the attached drawings.

FIG. 69 shows a zoom lens and movement of each lens group during zooming from a maximum wide-angle state (W) to a maximum telephoto state (T) and FIG. 70 shows the focusing method.

Figure 71:
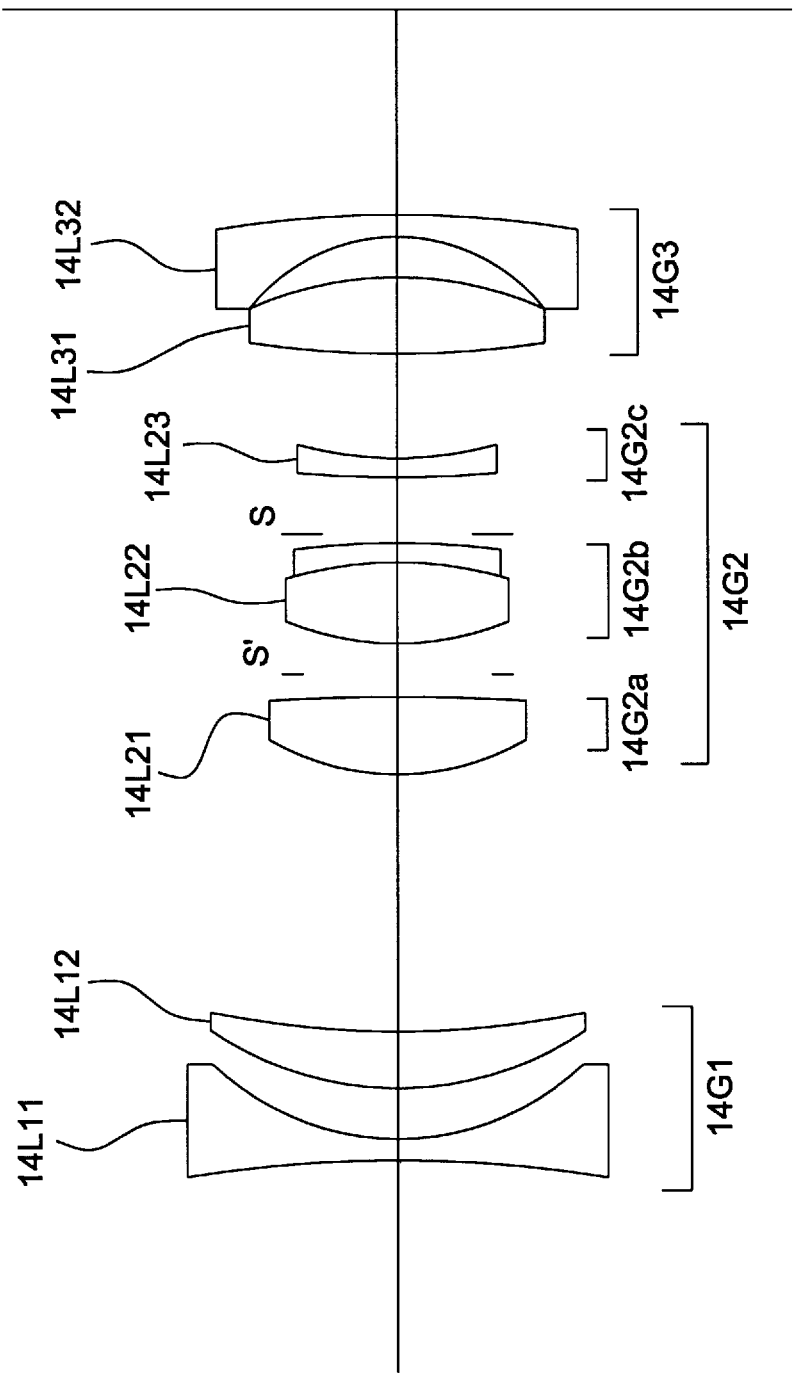
FIG. 71 shows the zoom lens according to the fourteenth preferred embodiment of the invention.
Figures 73A, 73B, 73C, 73D:
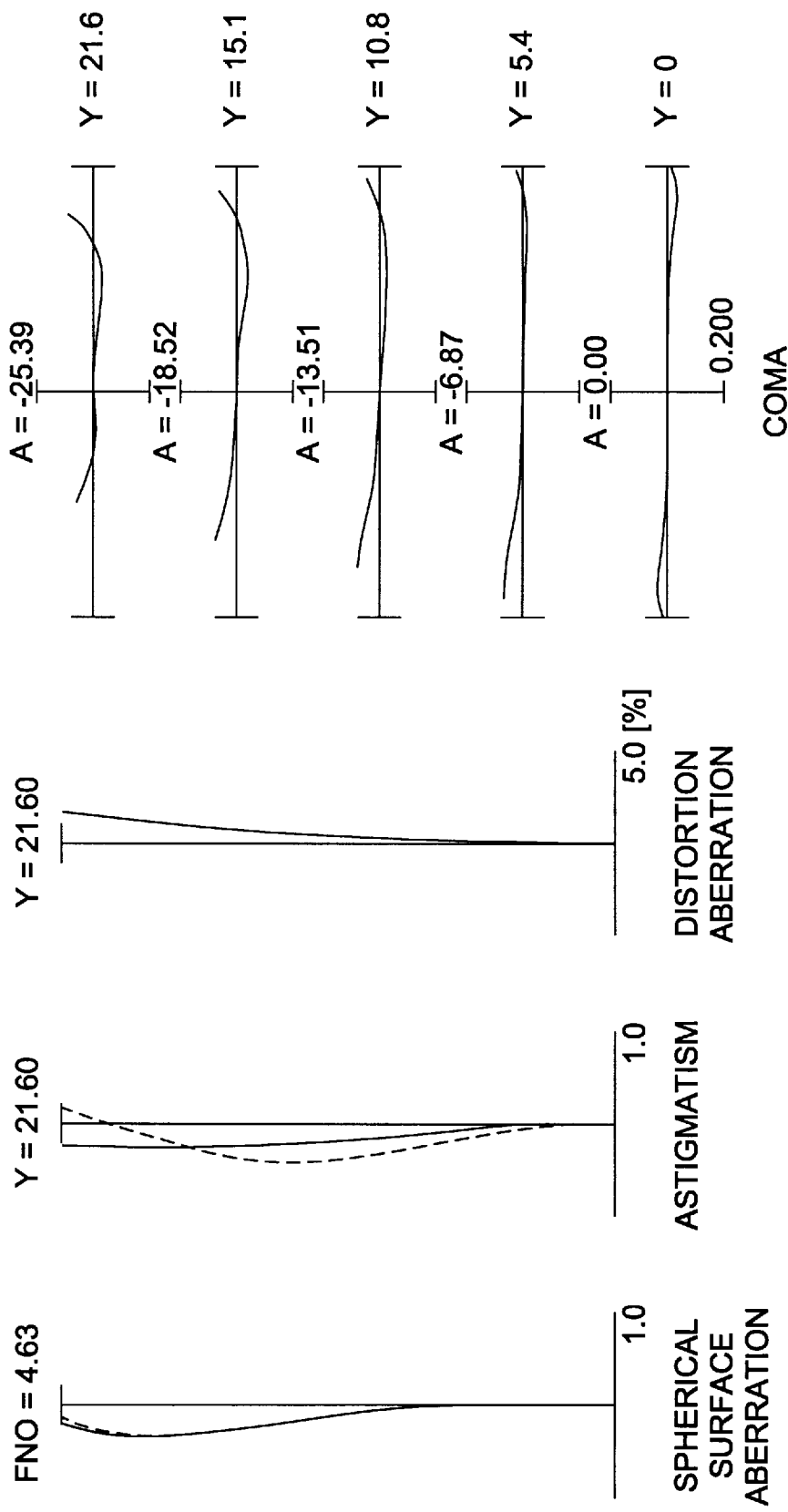
FIGS. 73(a)–73(d) show various aberrations for the infinite focus state at medium focal length state according to the fourteenth preferred embodiment of the invention.

FIG. 71 describes the structure of a zoom lens in a fourteenth preferred embodiment of the invention. The zoom lens shown in FIG. 71 comprises, in order from the object side, a first lens group 14G1 consisting of biconcave lens 14L11 and positive meniscus lens 14L12 with the convex surface facing the object side; a lens unit 14G2a consisting of biconvex lens 14L21; a focusing lens unit 14G2b consisting of a cemented positive lens 14L22 having a biconvex lens and a negative meniscus lens with the concave surface facing the object side; a lens unit 14G2c consisting of a negative meniscus lens with the convex surface facing the object side; and a third lens group 14G3 consisting of a biconvex lens 14L31 and a negative meniscus lens 14L32 with the concave surface facing the object side.

An aperture stop S can be provided between the focusing lens unit 14G2b and the lens unit 14G2c. A fixed stop S' can be provided between the lens unit 14G2a and the focusing lens unit 14G2b.

FIG. 71 shows the position of each lens group at the maximum wide-angle state. Each lens group moves on the optical axis along the zoom locus shown by an arrow in FIG. 69 during zooming to a maximum telephoto state. Focusing on close distance objects is caused the lens unit IIIG2b moving along the optical axis.

The values of various dimensions of the fourteenth preferred embodiment are listed in Table (14) below. In Table (14), f is focal length, FNO is F-number, 2ω is the field angle, and Bf is back focus. Moreover, the surface number indicates the lens surface order from the object side of the zoom lens along the direction in which the light rays move. The refractive indices and Abbe numbers values correspond to a d-line (λ=587.6 nm). The aperture ratio is defined by F-number (FNO) in the infinite focus state, and by numerical aperture (NA) on the object side in the close distance focus state.

The shape of non-spherical surfaces is expressed by the following equation (14d), where y is the height in the direction perpendicular to the optical axis, S(y) is amount of displacement in the direction of optical axis at height y, R is a reference radius of curvature (vertex radius of curvature), κ is a conical coefficient, and Cn is a non-spherical surface coefficient of nth degree.

$$S(y)=(y^2/R)/[1+(1-\kappa \cdot y^2/R^2)^{1/2}]+C_2 \cdot y^2 C_4 \cdot y^4 + C_6 \cdot y^6 + C_8 \cdot y^8 + C_{10} y^{10} + \quad (14D)$$

Furthermore, the near-axis radius of curvature of each non-spherical surface is defined by the equation (14E) below.

$$R=1/(2 \cdot C_2+1/R) \quad (14E)$$

The non-spherical surfaces in the tables indicate the various dimensions of the embodiments are marked with the symbol * to the right of the surface number.

TABLE 14 f = 28.81–44.74–80.44 mm
FNO = 3.60–4.64–7.00
2ω = 75.24°–50.78°–29.52°

| Surface Number | Radius of Curvature | Intersurface Distance | Abbe Number | Refractive Index |
|---|---|---|---|---|
| 1 | −86.5235 | 1.4086 | 45.37 | 1.79668 |
| 2* | 18.5293 | 3.2257 | | |
| 3 | 23.1080 | 3.8417 | 28.24 | 1.7400 |
| 4 | 62.4446 | (d4 = variable) | | |
| 5 | 18.0979 | 5.122 | 70.45 | 1.48749 |
| 6 | −188.8233 | 1.5367 | | |
| 7 | ∞ | 1.9208 | (fixed - stop S) | |
| 8* | 21.6259 | 5.4332 | 60.82 | 1.56384 |
| 9 | −22.4770 | 1.2806 | 23.01 | 1.86074 |
| 10 | −67.7695 | 0.6403 | | |
| 11 | ∞ | 3.6173 | (aperture - stop S) | |
| 12 | 82.0148 | 1.2806 | 43.35 | 1.84042 |
| 13 | 24.1626 | (d13 = variable) | | |
| 14 | 79.0240 | 4.9942 | 32.17 | 1.67270 |
| 15 | −26.7277 | 2.6359 | | |

TABLE 14-continued f = 28.81–44.74–80.44 mm
FNO = 3.60–4.64–7.00
2ω = 75.24°–50.78°–29.52°

| | | | | | |
|---|---|---|---|---|---|
| 16 | | −12.8480 | 1.2806 | 52.30 | 1.74810 |
| 17 | | −81.4863 | (Bf) | | |

Non-spherical Surface Data

| | κ | $C_2$ | $C_4$ | $C_6$ | $C_8$ | $C_{10}$ |
|---|---|---|---|---|---|---|
| surface 2 | 1.0000 | 0.0000 | $-5.40130 \times 10^{-6}$ | $2.82370 \times 10^{-8}$ | $-3.80130 \times 10^{-10}$ | $7.31820 \times 10^{-13}$ |
| surface 8 | 1.0000 | 0.0000 | $-3.00600 \times 10^{-5}$ | $1.73100 \times 10^{-8}$ | $-2.78700 \times 10^{-9}$ | $1.05440 \times 10^{-11}$ |

Variable Space For Zooming

| | | | |
|---|---|---|---|
| f | 28.8132 | 44.7399 | 80.4424 |
| d4 | 16.6236 | 8.2806 | 1.2806 |
| d13 | 6.9090 | 4.5256 | 2.8711 |
| Bf | 13.3078 | 25.3383 | 49.4910 |

Focusing displacement of lens unit 14G2b at photographic magnification of −1/30

| | | | |
|---|---|---|---|
| Focal length f | 28.8132 | 44.7399 | 80.4424 |
| Displacement Δ | 0.3573 | 0.3445 | 0.2943 |

Here, the focusing displacement Δ is positive for a movement toward the object side of the zoom lens.

| | |
|---|---|
| f1 = −34.2866 | |
| f2 = 24.2101 | |
| f3 = −96.5165 | |
| f2a = 34.1547 | |
| f2b = 39.2350 | |
| f2c = −41.1747 | |
| βbt = 0.1985 | |
| β2b = 0.3424–0.1985 | |
| βbt² = 0.039 | (1III) |
| β2b² = 0.039–0.117 | (2III) |
| f2b/fw = 1.362 | (3III) |
| (f1 − f3)/(f1 + f3) = −0.475 | (4III) |
| Bfw/fw = 0.462 | (5III) |
| (d2w − d2t)/(d1w − d1t) = 0.263 | (6III) |

FIGS. 72(a)–77(d) show various aberration diagrams for d-line (λ=587.6 nm) of the fourteenth preferred embodiment.

FIGS. 72(a)–72(d) show various aberration diagrams for the infinite focus state at a maximum wide-angle state or shortest focal length state. FIGS. 73(a)–73(d) show various aberration diagrams for the infinite focus state at medium focal length state, and FIG. 74(a)–74(d) show various aberration diagrams for the infinite focus state at a maximum telephoto state or longest focal length state. Additionally, FIGS. 75(a)–75(d) show the aberrations at a close distance focus state (a photographic magnification of −1/30) at the maximum wide-angle state, FIGS. 76(a)–76(d) show the aberrations at a close distance focusing state (photographic magnification of −1/30) at a medium focal length state, and FIGS. 77(a)–77(b) show aberrations at a close distance focusing state (photographic magnification of −1/30) at the maximum telephoto state.

Figure 78:
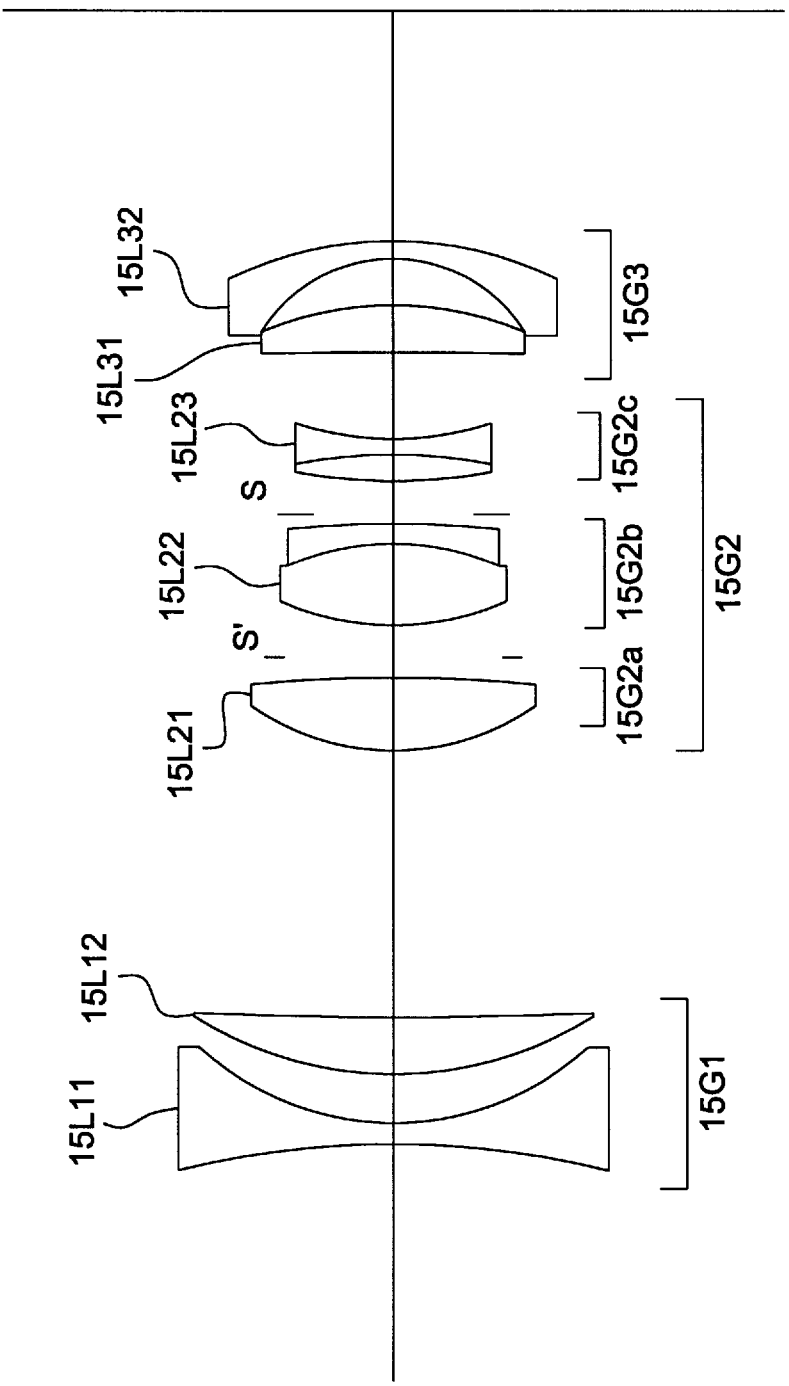
FIG. 78 shows a zoom lens according to a fifteenth preferred embodiment of the invention.
Figures 81A, 81B, 81C, 81D:
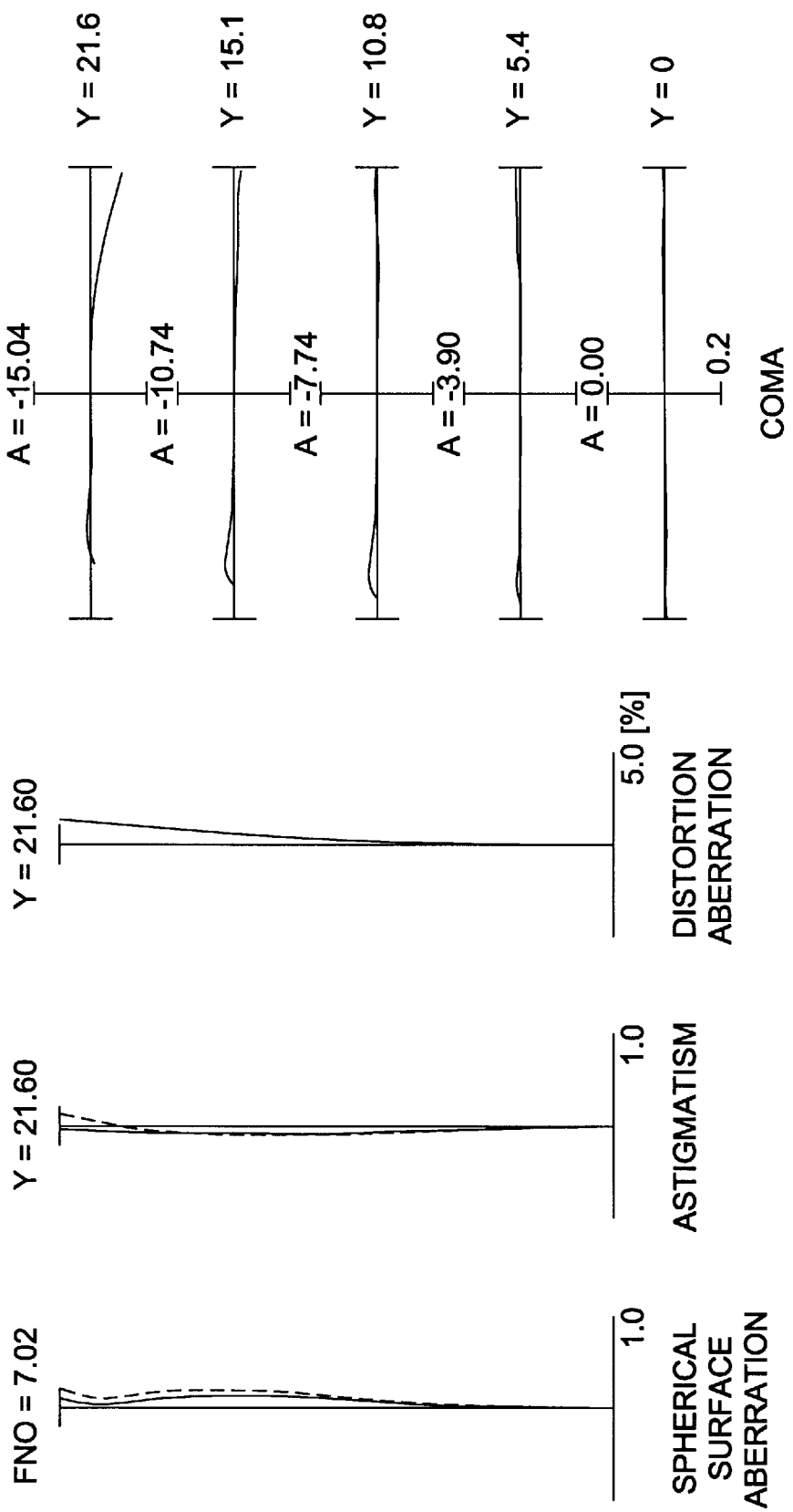
FIGS. 81(a)–81(d) show various aberrations for the infinite focus state at a maximum telephoto state according to the fifteenth preferred embodiment of the invention.

FIG. 78 shows the structure of a zoom lens in a fifteenth preferred embodiment of the present invention. The zoom lens of FIG. 78 comprises, in order from the object side, a first lens group 15G1 consisting of biconcave lens 15L11 and positive meniscus lens 15L12 with the convex surface facing the object side; a lens unit 15G2a consisting of biconvex lens 15L21; a focusing lens unit 15G2b consisting of a cemented positive lens 15L22 having a biconvex lens and a negative meniscus lens with the concave surface facing the object side; a lens unit 15G2c consisting of a negative cemented lens consisting of a biconvex lens and a biconcave lens; and a third lens group 15G3 consisting of a positive meniscus lens 15L31 with the concave surface facing the object side and a negative meniscus lens 15L32 with the concave surface facing the object side.

An aperture stop S can be provided between the focusing lens unit 15G2b and the lens unit 15G2c, and a fixed stop S' can be provided between the lens unit 15G2a and the focusing lens unit 15G2b.

FIG. 78 shows the relationship of each lens group at the maximum wide-angle state. Each lens group moves the optical axis along the zoom locus shown by an arrow in FIG. 69 during zooming to a maximum telephoto state. Focusing on close distance objects is caused by the negative cemented lens 15L23, which includes the lens unit 15G2b, moving along the optical axis.

The values of various dimensions of the fifteenth preferred embodiment of the invention are listed in Table (15) below. In Table (15), f is focal length, FNO is F-number, 2ω is field angle, and Bf is back focus. Moreover, the surface number indicates the lens surface from the object side of the zoom lens along the direction in which the light rays move. The refractive indices and Abbe numbers values correspond to a d-line (λ=587.6 nm). The aperture ratio is defined by F-number (FNO) in the infinite focus state, and by numerical aperture (NA) on the object side in the close distance focus state.

TABLE 15 f = 28.24–44.15–79.14 mm
FNO = 3.60–4.64–7.00
2ω = 75.98°–51.49°–30.09°

| Surface Number | Radius of Curvature | Intersurface Distance | Abbe Number | Refractive Index |
|---|---|---|---|---|
| 1 | −62.5972 | 1.3814 | 43.35 | 1.84042 |
| 2* | 17.5587 | 3.1782 | | |
| 3 | 25.4141 | 3.7674 | 27.53 | 1.75520 |
| 4 | 278.1139 | (d4 = variable) | | |
| 5 | 17.2463 | 4.7343 | 70.45 | 1.48749 |
| 6 | −165.0839 | 1.5070 | | |
| 7 | ∞ | 1.6041 | (fixed - stop S) | |
| 8* | 18.2126 | 5.6512 | 60.82 | 1.56384 |
| 9 | −15.9258 | 1.2558 | 23.01 | 1.86074 |
| 10 | −84.1314 | 0.8054 | | |
| 11 | ∞ | 2.3766 | (aperture stop S) | |
| 12 | 50.1432 | 1.5070 | 30.04 | 1.69895 |
| 13 | −32.2233 | 1.0047 | 49.45 | 1.77279 |
| 14 | 20.5654 | (d14 = variable) | | |
| 15 | −191.0295 | 3.1395 | 32.17 | 1.67270 |
| 16 | −20.9698 | 2.8256 | | |
| 17 | −10.1338 | 1.2558 | 52.30 | 1.74810 |
| 18 | −25.1297 | (Bf) | | |

Non-spherical Surface Data

| | κ | $C_2$ | $C_4$ | $C_6$ | $C_8$ | $C_{10}$ |
|---|---|---|---|---|---|---|
| surface 2 | 1.0000 | 0.0000 | $-1.48510 \times 10^{-5}$ | $-4.13300 \times 10^{-8}$ | $-8.83350 \times 10^{-10}$ | $-2.27680 \times 10^{-13}$ |
| surface 8 | 1.0000 | 0.0000 | $-1.39730 \times 10^{-5}$ | $-4.68510 \times 10^{-8}$ | $5.35720 \times 10^{-10}$ | $-5.28980 \times 10^{-12}$ |

Variable Space For Zooming

| f | 28.2400 | 44.1529 | 79.1423 |
|---|---|---|---|
| d4 | 17.4357 | 8.5730 | 1.2558 |
| d14 | 5.8276 | 3.5838 | 2.2306 |
| Bf | 14.8683 | 27.5533 | 52.2012 |

Focusing Displacement Of Lens Unit 15G2b At Photographic Magnification Of −1/30

| Focal length f | 28.2400 | 44.1529 | 79.1423 |
|---|---|---|---|
| Displacement Δ | 0.3389 | 0.3268 | 0.2797 |

Here, the focusing displacement Δ is positive for movement toward the object side.

f1 = −34.0722
f2 = 23.4646
f3 = −89.7076
f2a = 32.3064
f2b = 42.7558
f2c = −39.7015
βbt = 0.2760
β2b = 0.4016–0.2760
βbt² = 0.076                           (1III)
β2b² = 0.076–0.161                     (2III)
f2b/fw = 1.514                         (3III)
(f1 − f3)/(f1 + f3) = −0.449           (4III)
Bfw/fw = 0.526                         (5III)
(d2w − d2t)/(d1w − d1t) = 0.222        (6III)

FIGS. 79(a)–84(d) show various aberration diagrams for d-line (λ=587.6 nm) for the fifteenth preferred embodiment. FIGS. 79(a)–79(d) show various aberration diagrams for the infinite focus state at a maximum wide-angle state. FIGS. 80(a)–80(d) show various aberration diagrams for the infinite focus state at medium focal length state, and FIGS. 81(a)–81(d) show various aberration diagrams for the infinite focus state at a maximum telephoto state. FIGS. 82(a)–82(d) show aberrations at a close distance focus state a photographic magnification of −1/30 at the maximum wide-angle state, FIGS. 83(a)–83(d) show aberrations at a close distance focusing state or photographic magnification of −1/30 at a medium focal length state, and FIGS. 84(a)–84(d) show aberrations at a close distance focusing state (photographic magnification of −1/30) at the maximum telephoto state.

Figure 85:
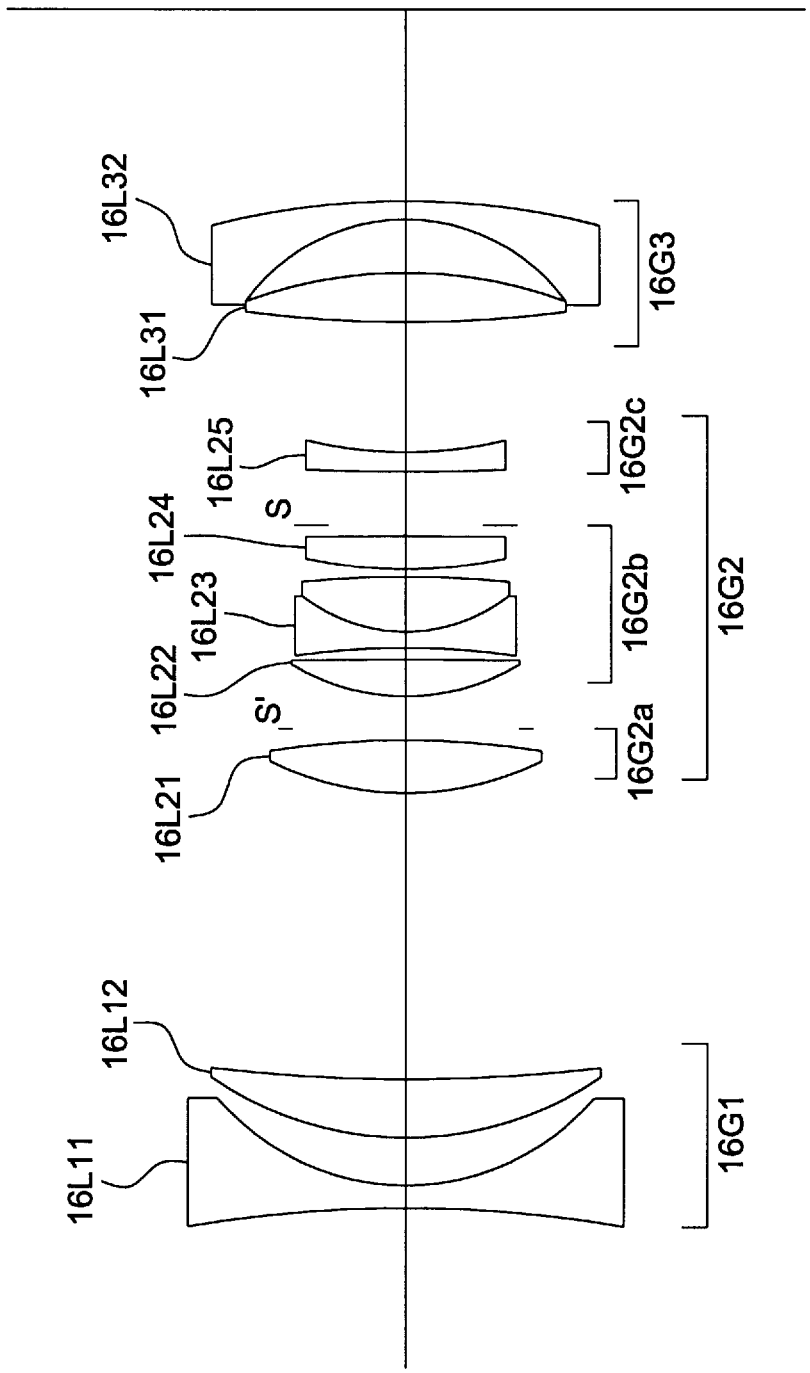
FIG. 85 shows a zoom lens according to the sixteenth preferred embodiment of the invention.

FIG. 85 show the structure of a zoom lens in a sixteenth preferred embodiment of the invention. The zoom lens of FIG. 85 comprises, in order from the object side, a first lens group 16G1 consisting of biconcave lens 16L11 and positive meniscus lens 16L12 with the convex surface facing the object side; a lens unit 16G2a consisting of biconvex lens 16L21; a focusing lens unit 16G2b consisting of a positive meniscus lens 16L22 with the convex surface facing the object side, a cemented lens 16L23 consisting of a biconcave lens and a biconvex lens, and a biconvex lens 16L24; a lens unit 16G2c consisting of a negative meniscus lens 16L25 with the convex surface facing the object side; and a third lens group 16G3 consisting of a biconvex lens 16L31 and a negative meniscus lens 16L32 with the concave surface facing the object side.

An aperture stop S can be provided between the focusing lens unit 16G2b and the lens unit 16G2c. A fixed stop S' can be provided between the lens unit 16G2a and the focusing lens unit 16G2b.

FIG. 85 shows the positional relationship of each lens group at the maximum wide-angle state. Each lens group moves on the optical axis along the zoom locus shown by an arrow in FIG. 69 during zooming to a maximum telephoto state. Focusing on close distance objects is cause the positive meniscus lens 16L22, cemented lens 16L23 and biconvex lens 16L24, which comprise the lens group 16G2*b*, to move along the optical axis.

The values of various dimensions of the sixteenth preferred embodiment of are listed in Table (16) below. In Table (16), f is focal length, FNO is F-number, 2ω is field angle, and Bf is back focus. Moreover, the surface number indicates the order of the lens surface order from the object sides of the zoom lens along the direction in which the light rays move. The refractive indices and Abbe numbers correspond to a d-line (λ=587.6 nm). The aperture ratio is defined by F-number (FNO) in the infinite focus state, and by numerical aperture (NA) on the object side in the close distance focus state.

$f1 = -35.7750$
$f2 = 25.7850$
$f3 = -125.5571$
$f2a = 33.9780$
$f2b = 45.8328$
$f2c = -42.0382$
$\beta bt = 0.2749$
$\beta 2b = 0.4118 - 0.2749$

| | |
|---|---|
| $\beta bt^2 = 0.076$ | (1III) |
| $\beta 2b^2 = 0.076 - 0.170$ | (2III) |
| $f2b/fw = 1.592$ | (3III) |
| $(f1 - f3)/(f1 + f3) = -0.557$ | (4III) |
| $Bfw/fw = 0.436$ | (5III) |
| $(d2w - d2t)/(d1w - d1t) = 0.220$ | (6III) |

FIGS. 86(*a*)–91(*d*) show various aberration diagrams for d-line (λ=587.6 nm) in the sixteenth preferred embodiment.

FIGS. 86(*a*)–86(*c*) show various aberration diagrams for the infinite focus state at a maximum wide-angle state, FIGS. 87(*a*)–87(*d*) show various aberration diagrams for the

TABLE 16 f = 28.79–44.65–80.17 mm
FNO = 3.56–4.62–7.00
2ω = 74.98°–50.91°–29.68°

| Surface Number | Radius of Curvature | Intersurface Distance | Abbe Number | Refractive Index |
|---|---|---|---|---|
| 1 | −79.0470 | 1.4009 | 45.37 | 1.79668 |
| 2* | 16.1826 | 3.1838 | | |
| 3 | 23.6971 | 3.8206 | 28.56 | 1.79504 |
| 4 | 116.6604 | (d4 = variable) | | |
| 5 | 21.6995 | 3.5659 | 70.45 | 1.48749 |
| 6 | −66.2190 | 0.8915 | | |
| 7 | ∞ | 1.9103 | (fixed stop S') | |
| 8 | 16.9119 | 2.5471 | 64.10 | 1.51680 |
| 9 | 943.2956 | 0.6368 | | |
| 10 | −59.0272 | 1.0188 | 39.61 | 1.80454 |
| 11 | 10.9709 | 3.6933 | 61.09 | 1.58913 |
| 12 | −148.6528 | 0.6368 | | |
| 13 | 41.8197 | 2.0377 | 52.30 | 1.74810 |
| 14 | −278.5042 | 0.6368 | | |
| 15 | ∞ | 3.6837 | (aperture stop S) | |
| 16 | 263.8029 | 1.2735 | 40.90 | 1.79631 |
| 17 | 29.6423 | (d17 = variable) | | |
| 18 | 115.5738 | 3.0729 | 29.50 | 1.71736 |
| 19 | −35.9756 | 3.5734 | | |
| 20 | −13.3328 | 1.2735 | 55.48 | 1.69680 |
| 21 | −49.0703 | (Bf) | | |

Non-spherical Surface Data

| | κ | $C_2$ | $C_4$ | $C_6$ | $C_8$ | $C_{10}$ |
|---|---|---|---|---|---|---|
| surface 2 | 1.0000 | 0.0000 | $-1.31520 \times 10^{-5}$ | $-7.60640 \times 10^{-8}$ | $2.07030 \times 10^{-10}$ | $-1.96370 \times 10^{-12}$ |

Variable Space at Zooming

| f | 28.8930 | 44.6519 | 80.1676 |
|---|---|---|---|
| d4 | 18.7085 | 9.2052 | 1.2735 |
| d17 | 8.5816 | 6.1733 | 4.7419 |
| Bf | 12.5535 | 24.8025 | 49.0555 |

Focusing Displacement Of Lens Unit 16G2b At Photographic Magnification Of −1/30

| Focal length f | 28.7893 | 44.6519 | 80.1676 |
|---|---|---|---|
| Displacement Δ | 0.3951 | 0.3861 | 0.3347 |

Figures 88A, 88B, 88C, 88D:
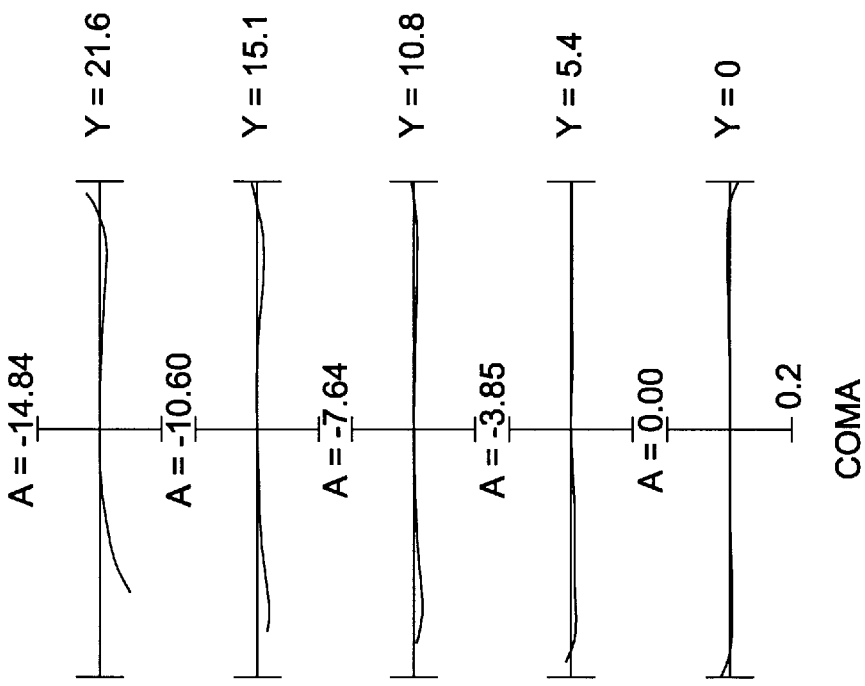
FIGS. 88(a)–88(d) show various aberrations for the infinite focus state at a maximum telephoto state according to the sixteenth preferred embodiment of the invention.

Where, the focusing displacement Δ is positive for a movement toward the object side of the zoom lens.

infinite focus state at a medium focal length state, FIGS. 88(*a*)–88(*d*) show various aberration diagrams for the infinite focus state at a maximum telephoto state, FIGS. 87(*a*)–89(*d*) show aberrations at a close distance focus state a photographic magnification of $-\frac{1}{30}$ at the maximum wide-angle state, FIGS. 90(*a*)–90(*d*) show aberrations at a close distance focusing state (photographic magnification of $-\frac{1}{30}$) at a medium focal length state, and FIGS. 91(*a*)–91(*d*) show aberrations at a close distance focusing state (photographic magnification of $-\frac{1}{30}$) at the maximum telephoto state.

Figure 92:
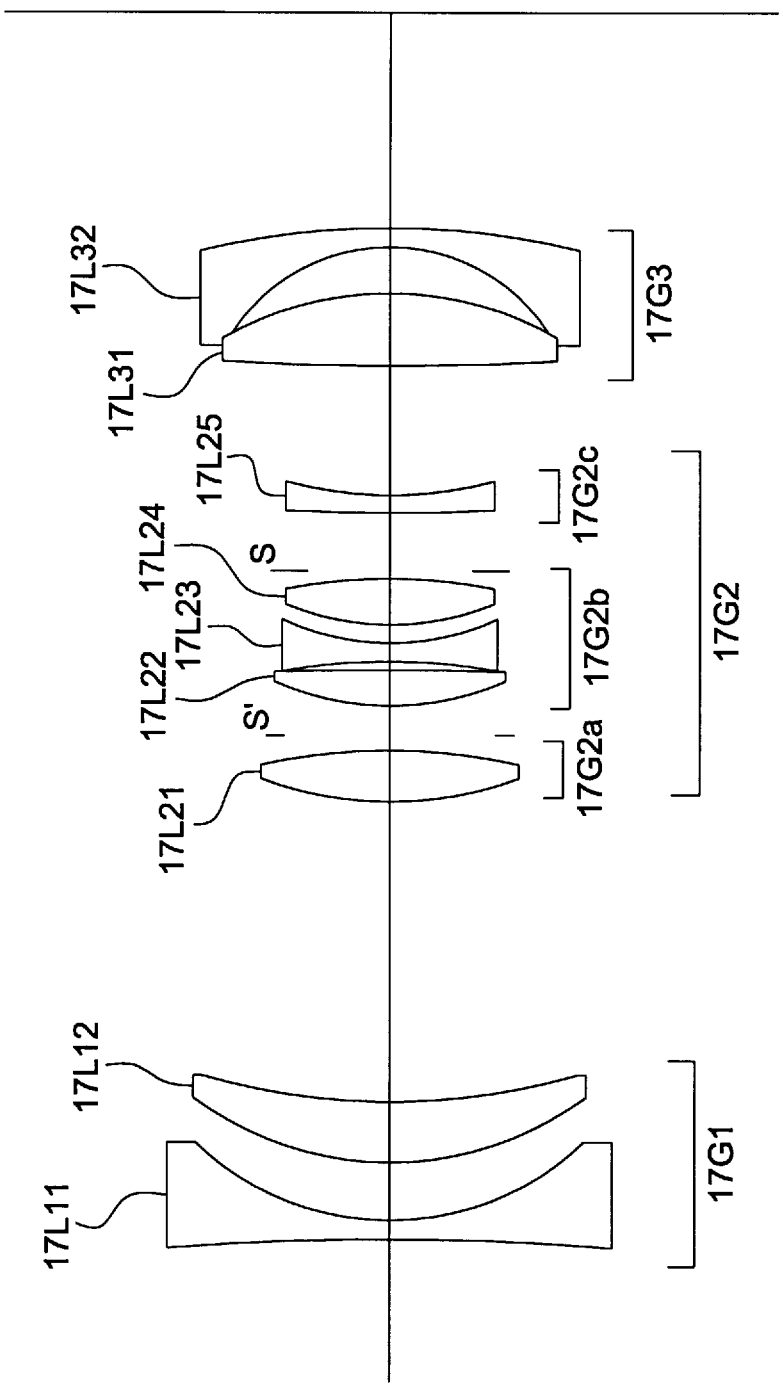
FIG. 92 shows a zoom lens according to a seventeenth preferred embodiment of the invention.

FIG. 92 describes the structure of a zoom lens in a seventeenth preferred embodiment of the invention. The zoom lens of FIG. 92 comprises, in order from the object side, a first lens group 17G1 consisting of biconcave lens 17L11 and positive meniscus lens 17L12 with the convex surface facing the object side; a lens unit 17G2a consisting of biconvex lens L21; a focusing lens unit 17G2b consisting of a positive meniscus lens 17L22 with the convex surface facing the object side, a biconcave lens 17L23, and a biconvex lens 17L24; a lens unit 17G2c consisting of a negative meniscus lens 17L25 with the convex surface facing the object side; and a third lens group 17G3 consisting of a biconvex lens 17L31 and a negative meniscus lens 17L32 with the concave surface facing the object side.

An aperture stop S can be provided between the focusing lens unit 17G2b and the lens unit 17G2c, and a fixed stop S' can be provided between the lens unit 17G2a and the focusing lens unit 17G2b.

FIG. 92 shows the positional relationship of each lens group at the maximum wide-angle state. Each lens group moves on the optical axis along the zoom locus shown by an arrow in FIG. 69 during zooming to a maximum telephoto state. Focusing on close distance objects is cause the positive meniscus lens 17L22, biconcave lens 17L23 and biconvex lens 17L24, which comprise the lens unit 17G2b, moving along the optical axis.

The values of various dimensions of the seventeenth preferred embodiment of the invention are listed in Table (17) below. In Table (17), f is focal length, FNO is F-number, 2ω is field angle, and Bf is back focus. Moreover, the surface number indicates the lens surface order from the object side of the zoom lens along the direction in which the light rays move. The refractive indices and Abbe numbers correspond to a d-line (λ=587.6 nm). The aperture ratio is defined by F-number (FNO) in the infinite focus state, and by numerical aperture (NA) on the object side in the close distance focus state.

TABLE 17 f = 28.80–44.80–80.64 mm
FNO = 3.54–4.55–6.97
2ω = 75.08°–50.68°–29.50°

| Surface Number | Radius of Curvature | Intersurface Distance | Abbe Number | Refractive Index |
|---|---|---|---|---|
| 1 | −200.6368 | 1.4080 | 43.35 | 1.84042 |
| 2 | 19.0264 | 3.7715 | | |
| 3 | 23.3592 | 3.8400 | 23.01 | 1.86074 |
| 4 | 45.3900 | (d4 = variable) | | |
| 5 | 26.3701 | 3.3959 | 70.45 | 1.48749 |
| 6 | −38.9879 | 0.8960 | | |
| 7 | ∞ | 1.9200 | (fixed - stop S') | |
| 8 | 17.3509 | 2.2934 | 55.60 | 1.69680 |
| 9 | 237.2862 | 0.6771 | | |
| 10 | −51.0642 | 1.2800 | 33.89 | 1.80384 |
| 11 | 15.5840 | 1.1540 | | |
| 12 | 17.7135 | 3.0091 | 60.69 | 1.56384 |
| 13 | −40.4775 | 0.6400 | | |

TABLE 17-continued f = 28.80–44.80–80.64 mm
FNO = 3.54–4.55–6.97
2ω = 75.08°–50.68°–29.50°

| | | | | |
|---|---|---|---|---|
| 14 | ∞ | 3.7024 | (aperture stop S) | |
| 15 | 139.6357 | 1.2800 | 45.37 | 1.79668 |
| 16 | 29.8436 | (d16 = variable) | | |
| 17 | 160.1058 | 4.7692 | 33.75 | 1.64831 |
| 18 | −21.5588 | 2.9224 | | |
| 19 | −12.9247 | 1.2800 | 52.30 | 1.74810 |
| 20 | −55.8002 | (Bf) | | |

Variable Space At Zooming

| | | | |
|---|---|---|---|
| f | 28.7999 | 44.7999 | 80.6396 |
| d4 | 19.8167 | 9.6351 | 1.2800 |
| d16 | 8.5385 | 5.8152 | 3.7450 |
| Bf | 13.9748 | 26.7046 | 52.0958 |

Focusing Displacement Of Lens Unit 17G2b At Photographic Magnification Of −1/30)

| | | | |
|---|---|---|---|
| focal length f | 28.7999 | 44.7999 | 80.6396 |
| displacement Δ | 0.4644 | 0.4688 | 0.4215 |

Where, the sign of the focusing displacement Δ is positive for movement toward the object side

| | |
|---|---|
| f1 = −36.3960 | |
| f2 = 26.4673 | |
| f3 = −177.8777 | |
| f2a = 32.8274 | |
| f2b = 53.4007 | |
| f2c = −47.8899 | |
| βbt = 0.3268 | |
| β2b = 0.4674–0.3268 | |
| βbt² = 0.107 | (1III) |
| β2b² = 0.107–0.218 | (2III) |
| f2b/fw = 1.854 | (3III) |
| (f1 − f3)/(f1 + f3) = −0.505 | (4III) |
| Bfw/fw = 0.485 | (5III) |
| (d2w − d2t)/(d1w − d1t) = 0.259 | (6III) |

FIGS. 93(*a*)–98(*d*) show various aberration diagrams for d-line (λ=587.6 nm) for the seventeenth preferred embodiment.

Figure 94D:
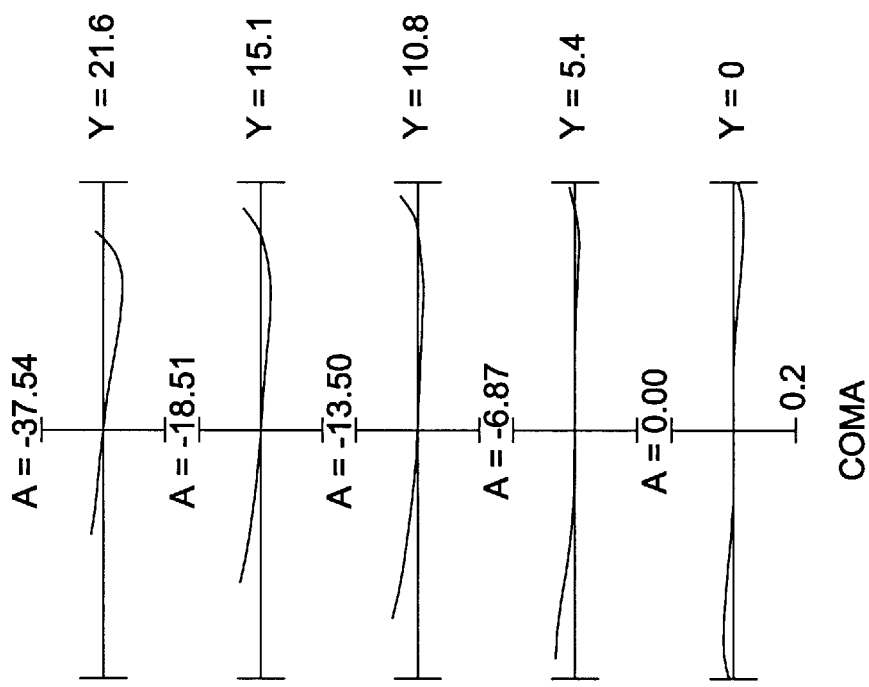
FIGS. 94(a)–94(d) show various aberrations for the infinite focus state at medium focal length state according to the seventeenth preferred embodiment of the invention.
Figures 94A, 94B, 94C:
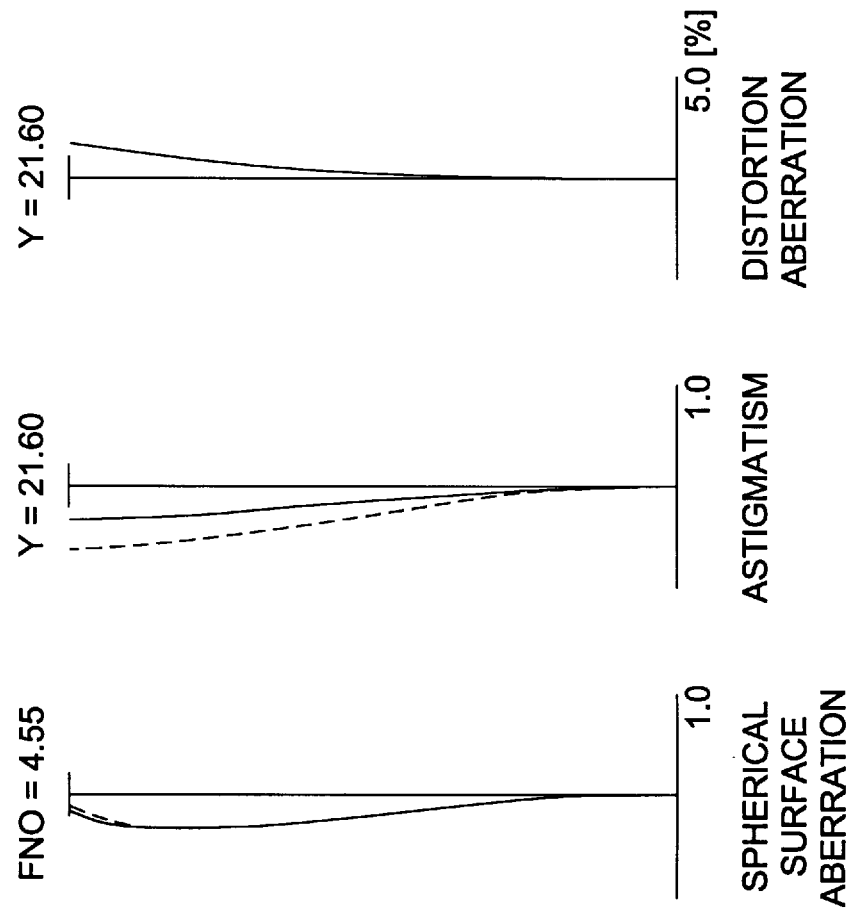

FIGS. 93(*a*)–93(*d*) show various aberration diagrams for the infinite focus state at a maximum wide-angle state, FIGS. 94(*a*)–94(*d*) show various aberration diagrams for the infinite focus state at medium focal length state, FIGS. 95(*a*)–95(*d*) show various aberration diagrams for the infinite focus state at a maximum telephoto state, FIGS. 96(*a*)–96(*d*) show the aberrations at a close distance focus state or a photographic magnification of $-\frac{1}{30}$ at the maximum wide-angle state, FIGS. 97(*a*)–97(*d*) show aberrations at a close distance focusing state or photographic magnification of $-\frac{1}{30}$ at a medium focal length state, and FIGS. 98(*a*)–98(*d*) show aberrations at a close distance focusing state (photographic magnification of $-\frac{1}{30}$) at the maximum telephoto state.

Figure 99:
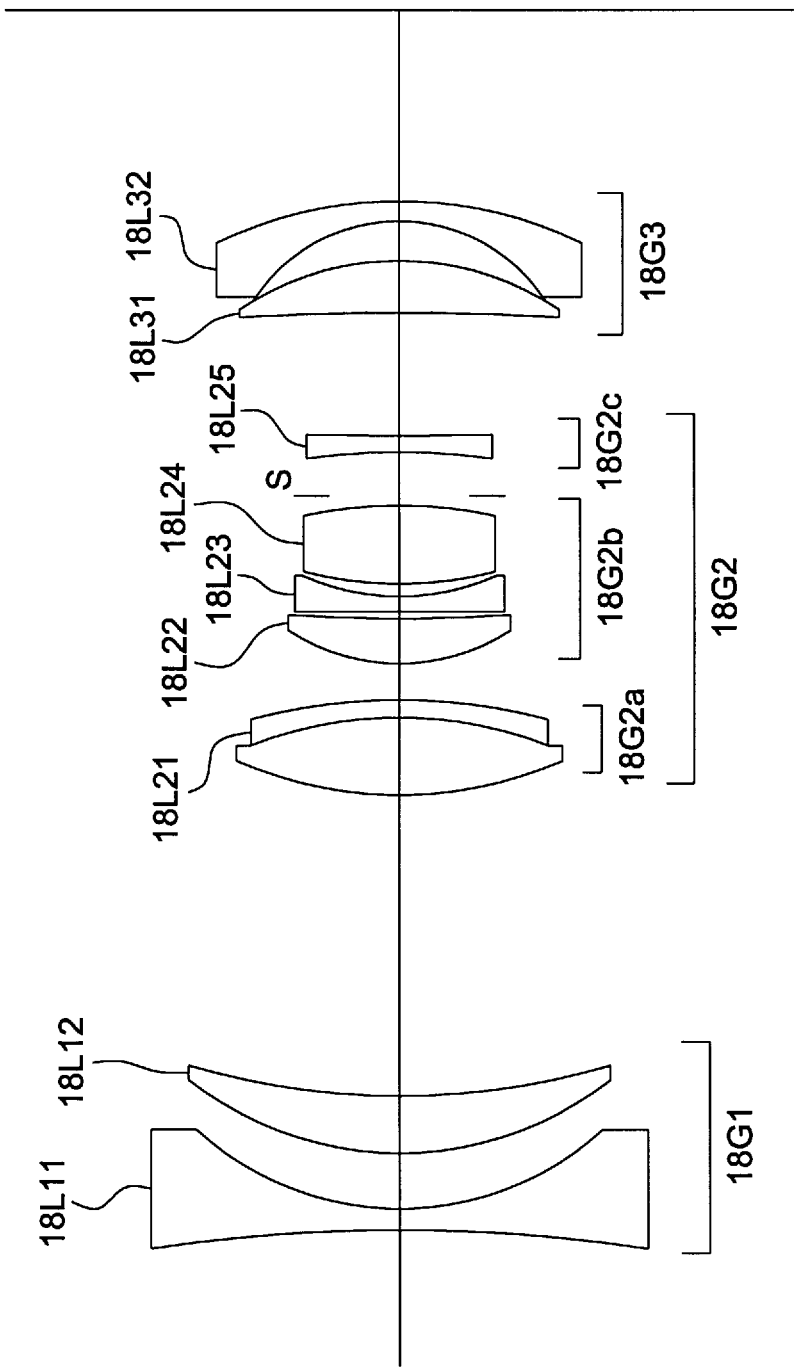
FIG. 99 shows a zoom lens according to the eighteenth preferred embodiment of the invention.
Figures 100A, 100B, 100C, 100D:
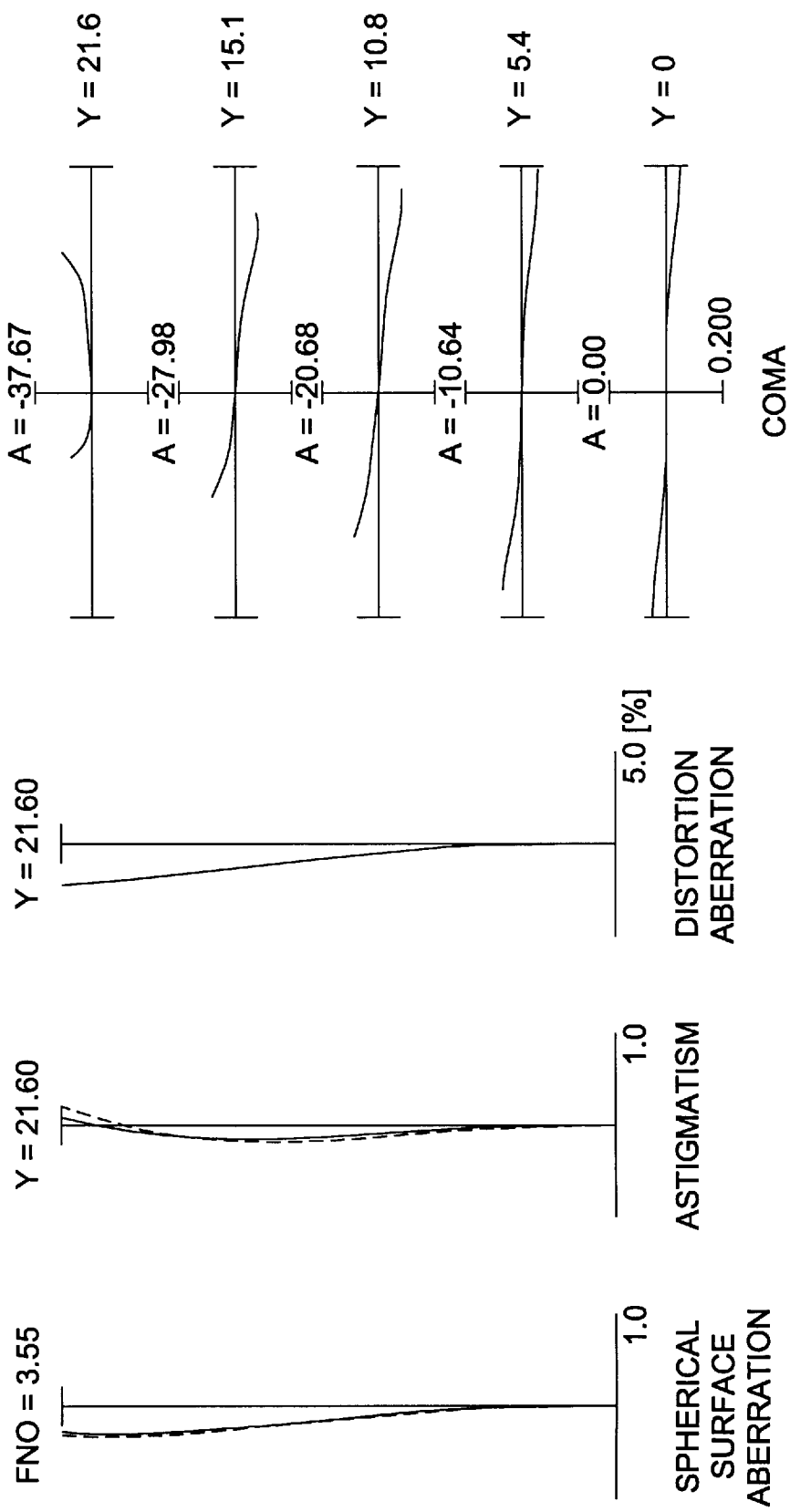
FIGS. 100(a)–100(d) show various aberrations for the infinite focus state at a maximum wide-angle state according to the eighteenth preferred embodiment of the invention.
Figures 104A, 104B, 104C, 104D:
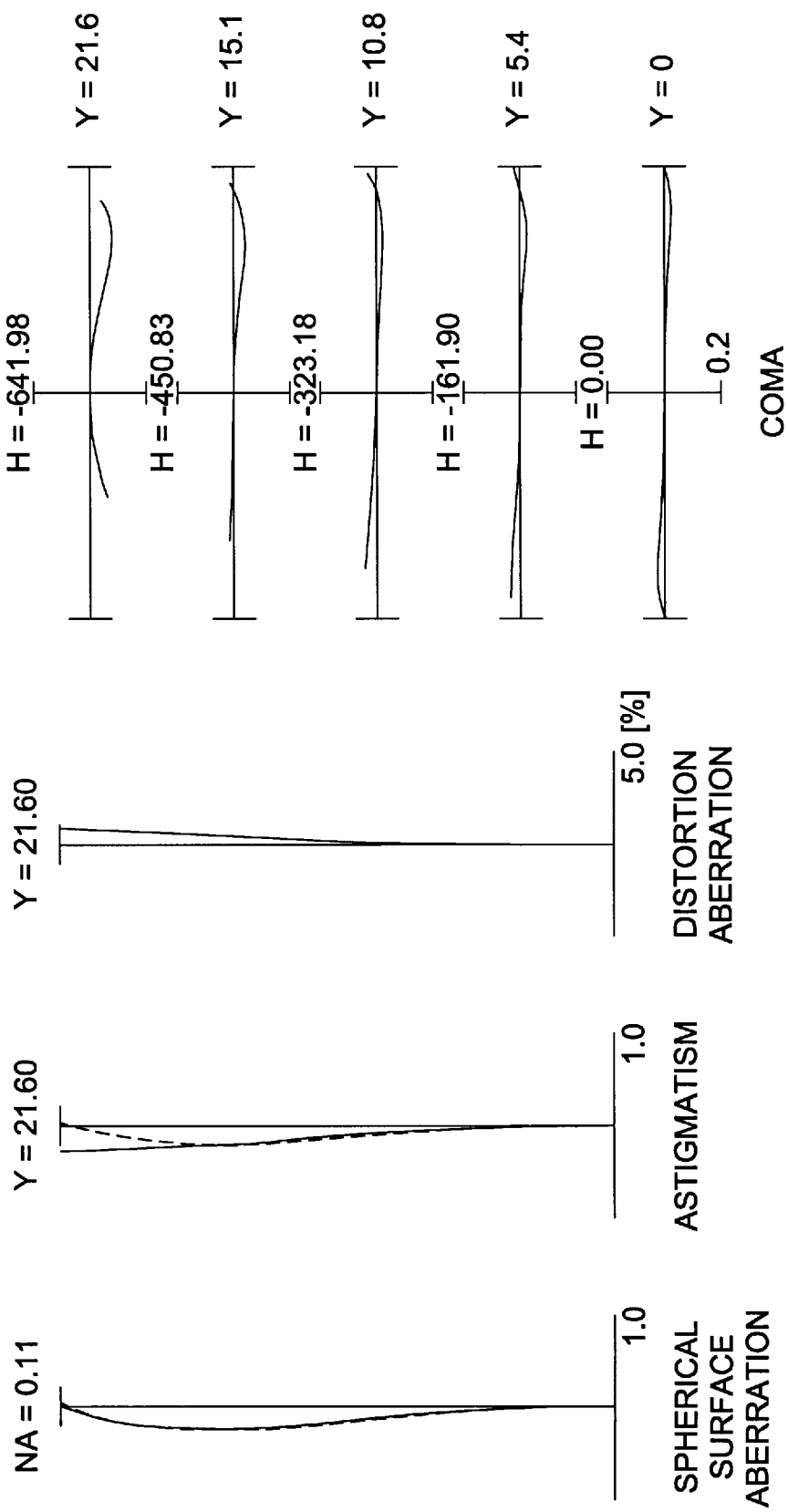
FIGS. 104(a)–104(d) show various aberrations in a photographic magnification of –1/30 at a medium focal length according to the eighteenth preferred embodiment of the invention.

FIG. 99 describes the structure of a zoom lens in an eighteenth preferred embodiment of the present invention. The zoom lens of FIG. 99 comprises, in order from the object side, a first lens group 18G1 consisting of biconcave lens 18L11 and positive meniscus lens 18L12 with the convex surface facing the object side; a lens unit 18G2a consisting of a positive cemented lens 18L21 having a biconvex lens and a negative meniscus lens with the concave surface facing the object side; a focusing lens unit 18G2b consisting of a positive meniscus lens 18L22 with the convex surface facing the object side, a biconcave lens 18L23, and a biconvex lens 18L24; a lens unit 18G2c consisting of a biconcave lens 18L25; and a third lens group 18G3 consisting of a positive meniscus lens 18L31 with the concave surface facing the object side and a negative meniscus lens 18L32 with the concave surface facing the object side.

An aperture stop S can be provided between the focusing lens unit 18G2b and the lens unit 18G2c.

FIG. 99 shows the positional relationship of each lens group at the maximum wide-angle state. Each lens group moves on the optical axis along the zoom locus shown by an arrow in FIG. 69 during zooming to a maximum telephoto state. Focusing on close distance objects is cause the positive meniscus lens 18L22, biconcave lens 18L23 and biconvex lens 18L24, which comprise the lens unit 18G2b, to move along the optical axis.

The values of various dimensions of the eighteenth preferred embodiment listed in Table (18) below. In Table (18), f is focal length, FNO is F-number, 2ω is field angle, and Bf is back focus. Moreover, the surface number indicates the lens surface from the object side of the zoom lens along the direction in which the light rays move. The refractive indices and Abbe numbers correspond to a d-line (λ=587.6 nm). The aperture ratio is defined by F-number (FNO) in the infinite focus state, and by numerical aperture (NA) on the object side in the close distance focus state.

TABLE 18 f = 28.80–44.80–80.64 mm
FNO = 3.55–4.52–7.03
2ω = 75.34°–51.20°–29.64°

| Surface Number | Radius of Curvature | Intersurface Distance | Abbe Number | Refractive Index |
|---|---|---|---|---|
| 1 | –123.6917 | 1.4080 | 43.35 | 1.84042 |
| 2 | 20.4097 | 3.7120 | | |
| 3 | 24.1357 | 3.8400 | 25.50 | 1.80458 |
| 4 | 53.4270 | (d4 = variable) | | |
| 5 | 26.4859 | 5.2480 | 57.03 | 1.62280 |
| 6 | –27.0629 | 1.0240 | 23.01 | 1.86074 |
| 7 | –46.7967 | 2.4320 | | |
| 8 | 15.3700 | 2.9440 | 57.53 | 1.67025 |
| 9 | 82.3670 | 0.5120 | | |
| 10 | –90.5145 | 1.0240 | 43.35 | 1.84042 |
| 11 | 15.7943 | 0.6400 | | |
| 12 | 22.8763 | 5.1200 | 60.64 | 1.60311 |
| 13 | –43.0867 | 0.6400 | | |
| 14 | ∞ | 2.8160 | (aperture stop S) | |
| 15 | –78.1088 | 1.1520 | 49.45 | 1.77279 |
| 16 | 70.9341 | (d16 = variable) | | |
| 17 | –150.1146 | 2.3280 | 36.98 | 1.61293 |
| 18 | –20.3980 | 2.5600 | | |
| 19 | –11.9349 | 1.2800 | 49.45 | 1.77279 |
| 20 | –29.0633 | (Bf) | | |

| Variable Space At Zooming | | | |
|---|---|---|---|
| f | 28.8000 | 44.8000 | 80.6400 |
| d4 | 19.6515 | 9.7382 | 1.2800 |
| d16 | 8.2689 | 4.7129 | 2.4320 |
| Bf | 12.5440 | 26.3731 | 52.3153 |

Focusing Displacement Of Lens Unit 18G2b At Photographic Magnification Of –1/30

| Focal Length f | 28.8000 | 44.8000 | 80.6400 |
|---|---|---|---|
| Displacement Δ | 0.4875 | 0.4763 | 0.4170 |

Where, the focusing displacement Δ is positive for movement toward the object side.

| | |
|---|---|
| f1 = –37.2787 | |
| f2 = 25.0863 | |
| f3 = –110.6777 | |
| f2a = 30.1987 | |
| f2b = 60.2722 | |
| f2c = –47.9426 | |
| βbt = 0.4365 | |
| β2b = 0.5449–0.4365 | |
| βbt$^2$ = 0.191 | (1III) |
| β2b$^2$ = 0.191–0.297 | (2III) |
| 2b/fw = 2.093 | (3III) |
| (f1 – f3)/(f1 + f3) = –0.496 | (4III) |
| Bfw/fw = 0.634 | (5III) |
| (d2w – d2t)/(d1w – d1t) = 0.318 | (6III) |

FIGS. 100(a)–105(d) show various aberration diagrams for d-line (λ=587.6 nm) in the eighteenth preferred embodiment.

FIGS. 100(a)–100(d) show various aberration diagrams for the infinite focus state at a maximum wide-angle state, FIGS. 101(a)–101(d) show various aberration diagrams for the infinite focus state at medium focal length state, FIGS. 102(a)–102(d) show various aberration diagrams for the infinite focus state at a maximum telephoto state. In FIGS. 103(a)–103(d) show aberrations at a close distance focus state or a photographic magnification of –1/30 at the maximum wide-angle state, FIGS. 104(a)–104(d) show aberrations at a close distance focusing state or photographic magnification of –1/30 at a medium focal length state, and FIGS. 105(a)–105(d) show aberrations at a close distance focusing state or photographic magnification of –1/30 at the maximum telephoto state.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A wide-angle zoom lens system, the zoom lens system defining an object side, and in order from the object side, comprising:

a first lens group having a negative refractive power;

a second lens group having a positive refractive power; and a third lens group having a negative refractive power; wherein:

during zooming from a maximum wide-angle state to a maximum telephoto state, each of the first, second and third lens group moves toward the object side so a distance between the first lens group and the second lens group decreases, and the distance between the second lens group and the third lens group decreases; and objects at close distances are focused on by moving at least a part of the second lens group along the optical axis relative to the first and third lens groups;

the zoom lens system satisfying the conditions:

$$-0.25 < (f1-f3)/(f1+f3) < 0.45$$
$$0.65 < (Bft-Bfw)/(ft-fw) < 0.9$$
$$0.65 < |f1|/(fw \times ft)^{1/2} < 0.9,$$

wherein f1 is a focal length of the first lens group, f3 is a focal length of the third lens group, Bfw is a back focus at maximum wide-angle state, Bft is a back focus at the maximum telephone state, fw is a total focal length of the lens system at the maximum wide-angle state, and ft is a total focal length of the lens system at the maximum telephoto state.

2. The zoom lens system of claim 1, further comprising an aperture stop provided within the second lens group, the aperture stop moving as one unit with the second lens group during zooming.

3. The zoom lens system of claim 1, further comprising an aperture stop provided adjacent to the second lens group.

4. The zoom lens system of claim 1, wherein the zoom lens system has an optical axis and satisfies the conditions:

$$-0.75 < f2/f1 < -0.5$$

$$0.15 < (d23w - d23t)/(d12w - d12t) < 0.6,$$

wherein f1 is a focal length of the first lens group, f2 is a focal length of the second lens group, d23w is an axial distance along the optical axis between the second lens group and the third lens group at the maximum wide-angle state, d23t is an axial distance along the optical axis between the second lens group and the third lens group at the maximum telephoto state, d12w is an axial distance along the optical axis between the first lens group and the second lens group at the maximum wide-angle state, and d12t is an axial distance along the optical axis between the first lens group and the second lens group at the maximum telephoto state.

5. The zoom lens system of claim 4, further comprising an aperture stop provided within the second lens group, the aperture stop moving as one unit with the second lens group during zooming.

6. The zoom lens system of claim 4, further comprising an aperture stop provided adjacent to the second lens group.

7. A wide-angle zoom lens system, the zoom lens system defining an optical axis and having an object side and, in order from the object side, comprising:

a first lens group having a negative refractive power;
a second lens group having a positive refractive power, and
comprising, in order from the object side, a first lens unit having a positive refractive power and a second lens unit having a positive refractive power; and
a third lens group having a negative refractive power;
wherein:
during zooming from a maximum wide-angle state to a maximum telephoto state, each of the first, second and third lens groups is moved toward the object side so a distance between the first lens group and the second lens group decreases, a distance between the second lens group and the third lens group decreases, and a distance between the first lens unit and the second lens unit remains fixed, and
objects at close distances are focused on by moving the second lens unit relative to the first lens unit along the optical axis,
wherein the zoom lens system satisfies the condition:

$$(\beta 2bw \times \beta 2bt)^{1/2} < 0.45$$

wherein β2bw is an imaging magnification of the second lens unit at maximum wide-angle state and β2bt is an imaging magnification of the second lens unit at the maximum telephoto state.

8. The zoom lens system of claim 7, wherein the zoom lens system further satisfies the conditions:

$$0.85 < f2b/(fw \times ft)^{1/2} < 1.20$$

$$0.65 < |f1|/(fw \times ft)^{1/2} < 0.925$$

wherein f2b is a focal length of the second lens unit, f1 is a focal length of the first lens group, fw is a focal length of the entire lens system at the maximum wide-angle state, and ft is a focal length of the entire lens system at the maximum telephoto state.

9. The zoom lens system of claim 7, wherein the lens system satisfies the conditions:

$$0.7 < f2a/|f1| < 1.40$$

$$0.15 < (d23w - d23t)/(d12w - d12t) < 0.6$$

wherein f1 is a focal length of the first lens group, f2a is a focal length of the first lens unit, d23w is an axial distance between the second lens group and the third lens group at the maximum wide-angle state, d23t is an axial distance between the second lens group and the third lens group at the maximum telephoto state, d12w is an axial distance between the first lens group and the second lens group at the maximum wide-angle state, and d12t is an axial distance between the first lens group and the second lens group at the maximum telephoto state.

10. The zoom lens system of claim 7, wherein an aperture stop is provided within the second lens group and the aperture-stop moves with the second lens group as one unit during zooming.

11. The zoom lens system of claim 7, wherein an aperture stop is provided adjacent the second lens group and the aperture stop moves with the second lens group as one unit during zooming.

12. A wide-angle zoom lens system, the zoom lens system defining an object side, and in order from the object side, comprising:

a first lens group having a negative refractive power;
a second lens group having a positive refractive power; and
a third lens group having a negative refractive power,
wherein, during zooming from a maximum wide-angle state to a maximum telephoto state, at least the second lens group and the third lens group move toward the object side so a distance between the first lens group and the second lens group decreases, and a distance between the second lens group and the third lens group decreases,
the zoom lens system satisfying the following conditions $$-0.75 < (f1 - f3)/(f1 + f3) < -0.35$$

$$0.4 < (\beta 3t/\beta 3w)/(\beta 2t/\beta 2w) < 0.75$$

wherein f1 is a focal length of the first lens group, f3 is focal length of a third lens group, β2w is a lateral magnification of the second lens group at the maximum wide-angle state, β2t is a lateral magnification of the second lens group at the maximum telephoto state, β3w is a lateral magnification of the third lens group at the maximum wide-angle state, and β3t is a lateral magnification of the third lens group at the maximum telephoto state.

13. The zoom lens system of claim 12, further satisfying the condition:

$$0.35 < Bfw/fw < 0.60$$

wherein Bfw is a back focus at the maximum wide angle state and fw is a focal length of the entire system at the maximum wide-angle state.

14. The zoom lens system of claim 12, wherein an aperture stop is provided within the second lens group.

15. The zoom lens system of claim 14, wherein an aperture stop is provided adjacent the second lens group.

16. A wide angle zoom lens system, the zoom lens system defining an object side, and in order from the object side, comprising:

a first lens group having a negative refractive power;

a second lens group having a positive refractive power, the second lens group comprising a first lens unit having a positive refractive power and a second lens unit having negative refractive power; and a third lens group having a negative refractive power, wherein, during zooming from a maximum wide-angle state to a maximum telephoto state, at least the second lens group and the third lens group move toward the object side so a distance between the first lens group and the second lens group decreases, and a distance between the second lens group and the third lens group decreases; the zoom lens satisfying the condition:

$$0.3 < f2a/|f2b| < 0.7;$$

wherein f2a is a focal length of the first lens unit and f2b is a focal length of the second lens unit.

17. The lens system of claim 16, further satisfying the condition:

$$0.35 < Bfw/fw < 0.60$$

wherein Bfw is a back focus at the maximum wide-angle state and fw is a focal length of the entire system at the maximum wide-angle state.

18. The zoom lens system of claim 16, wherein an aperture stop is provided within the second lens group.

19. The lens system of claim 16, wherein an aperture stop is provided adjacent the second lens group.

20. A zoom lens system, the zoom lens system defining an object side and in order from the object side, comprising:

a first lens group having a negative refractive power;

a second lens group having a positive refractive power, and comprising, in order from the object side, a first lens unit having a positive refractive power, a second lens unit having a positive refractive power and a third lens unit having a negative refractive power; and a third lens group having a negative refractive power;

wherein:

during zooming from a maximum wide-angle state to a maximum telephoto state, at least the second lens group and third lens group move toward the object side so a distance between the first lens group and the second lens group decreases and a distance between the first lens unit of the second lens group and the second lens unit of the second lens group remains fixed, and objects at close distances are focused on by the second lens unit of the second lens group moving relative to the first lens unit along the optical axis;

wherein the lens system satisfies the condition:

$$\beta bt^2 < 0.5$$

wherein β bt is an imaging magnification of the second lens unit at the maximum telephoto state.

21. The zoom lens system of claim 20, further satisfying the condition:

$$0.35 < Bfw/fw < 0.60$$

wherein Bfw is a back focus at the maximum wide-angle state and fw is a focal length of the entire lens system at the maximum wide-angle state.

22. The zoom lens system of claim 20, wherein the zoom lens system defines an optical axis, further satisfying the condition:

$$0.15 < (d2w-d2t)/(d1w-d1t) < 0.45$$

wherein d2w is an axial distance on the optical axis between the second lens group and the third lens group at the maximum wide-angle state, d2t is an axial distance on the optical axis between the second lens group and third lens group at the maximum telephoto state, d1w is an axial distance on the optical axis between the first lens group and the second lens group at the maximum wide-angle state, and d1t is an axial distance on the optical axis between the first lens group and the second lens group at the maximum telephoto state.

23. The zoom lens system of claim 20, further comprising an aperture stop being provided in the second lens group.

24. The zoom lens system of claim 20, further comprising an aperture stop being adjacent to the second lens group.

25. The zoom lens system of claim 20, wherein the zoom lens system, over an entire zooming range from maximum wide-angle state to maximum telephoto state, an imaging magnification β2b of the second lens unit satisfies the condition:

$$\beta 2b^2 < 0.5.$$

26. The zoom lens system of claim 25, further satisfying the condition:

$$0.35 < Bfw/fw < 0.60$$

wherein Bfw is a back focus at the maximum wide-angle state and fw is a focal length of the entire lens system at the maximum wide-angle state.

27. The zoom lens system of claim 25, wherein the zoom lens system defines an optical axis, further satisfying the condition:

$$0.15 < (d2w-d2t)/(d1w-d1t) < 0.45$$

wherein d2w is an axial distance on the optical axis between the second lens group and the third lens group at the maximum wide-angle state, d2t is an axial distance on the optical axis between the second lens group and third lens group at the maximum telephoto state, d1w is an axial distance on the optical axis between the first lens group and the second lens group at the maximum wide-angle state, and d1t is an axial distance on the optical axis between the first lens group and the second lens group at the maximum telephoto state.

28. A zoom lens system, the zoom lens system defining an object side and in order from the object side, comprising:

a first lens group having a negative refractive power;

a second lens group having a positive refractive power and comprising, in order from the object side, a first lens unit having a positive refractive power, a second lens unit having a positive refractive power and a third lens unit having a negative refractive power; and a third lens group having a negative refractive power where, during zooming from a maximum wide-angle to a maximum telephoto state, at least the second lens group and the third lens group move toward the object side so a distance between the first lens group and the second lens group decreases, and focusing on objects at close distances is accomplished by the second lens unit of the second lens group moving along the optical axis;

the lens system satisfies the conditions:

$\beta bt^2 < 0.5,$ $1 < f2b/fw < 3,$ and $-0.8 < (f1-f3)/(f1+f3) < -0.3,$ wherein βbt is an imaging magnification of the second lens unit at the maximum telephoto state, f2b is a focal length of the second lens unit, f1 is a focal length of the first lens group, f3 is a focal length of the third lens group, and fw is a focal length of the entire lens system at the maximum wide-angle state.

29. A zoom lens system, the zoom lens system defining an object side and in order from the object side, comprising:

a first lens group having a negative refractive power;

a second lens group having a positive refractive power and comprising, in order from the object side, a first lens unit having a positive refractive power, a second lens unit having a positive refractive power and a third lens unit having a negative refractive power; and a third lens group having a negative refractive power where, during zooming from a maximum wide-angle state to a maximum telephoto state, at least the second lens group and the third lens group move toward the object side so a distance between the first lens group and the second lens group decreases, and focusing on objects at close distances is accomplished by the second lens unit of the second lens group moving along the optical axis;

the lens system satisfies the conditions:

$\beta bt^2 < 0.5,$ $\beta 2b^2 < 0.5,$ $1 < f2b/fw < 3,$ and $-0.8 < (f1-f3)/(f1+f3) < -0.3,$ wherein βbt is an imaging magnification of the second lens unit at the maximum telephoto state, β2b is an imaging magnification of the second lens unit at any zooming state within zooming range of the zoom lens system, f2b is a focal length of the second lens unit, f1 is a focal length of the first lens group, f3 is a focal length of the third lens group and fw is a focal length of the entire lens system at the maximum wide angle state.

* * * * *